United States Patent
Arai et al.

(10) Patent No.: US 10,156,707 B2
(45) Date of Patent: Dec. 18, 2018

(54) ZOOM LENS, OPTICAL APPARATUS AND METHOD FOR MANUFACTURING THE ZOOM LENS

(71) Applicant: Nikon Corporation, Minato-ku, Tokyo (JP)

(72) Inventors: Daisaku Arai, Kawasaki (JP); Takamichi Kurashige, Funabashi (JP)

(73) Assignee: Nikon Corporation, Tokyo (JP)

(*) Notice: Subject to any disclaimer, the term of this patent is extended or adjusted under 35 U.S.C. 154(b) by 0 days.

(21) Appl. No.: 14/911,065

(22) PCT Filed: Aug. 5, 2014

(86) PCT No.: PCT/JP2014/004084
§ 371 (c)(1),
(2) Date: Apr. 11, 2016

(87) PCT Pub. No.: WO2015/019604
PCT Pub. Date: Feb. 12, 2015

(65) Prior Publication Data
US 2016/0238824 A1 Aug. 18, 2016

(30) Foreign Application Priority Data

Aug. 9, 2013 (JP) .................. 2013-165710
Aug. 9, 2013 (JP) .................. 2013-165711
(Continued)

(51) Int. Cl.
*G02B 15/14* (2006.01)
*G02B 13/00* (2006.01)
(Continued)

(52) U.S. Cl.
CPC .......... *G02B 15/14* (2013.01); *G02B 13/009* (2013.01); *G02B 13/18* (2013.01); *G02B 15/20* (2013.01)

(58) Field of Classification Search
CPC ........ G02B 15/14; G02B 15/15; G02B 15/16; G02B 15/163; G02B 15/20; G02B 15/22; G02B 15/24; G02B 15/167; G02B 13/009
(Continued)

(56) References Cited

U.S. PATENT DOCUMENTS

2008/0088944 A1  4/2008  Watanabe
2009/0103187 A1  4/2009  Watanebe et al.
(Continued)

FOREIGN PATENT DOCUMENTS

JP   2008-102165 A   5/2008
JP   2009-75581 A    4/2009
(Continued)

OTHER PUBLICATIONS

International Search Report from International Patent Application No. PCT/JP2014/004084, dated Nov. 4, 2014.
(Continued)

*Primary Examiner* — Darryl J Collins
(74) *Attorney, Agent, or Firm* — Shapiro, Gabor and Rosenberger, PLLC

(57) ABSTRACT

Provided is a zoom lens having, in order from an object, a first lens group (G1) having positive refractive power, a second lens group (G2) having negative refractive power, a third lens group (G3) having positive refractive power, and a fourth lens group (G4) having positive refractive power. Upon zooming from a wide-angle end state to a telephoto end state, a distance between the first lens group and the second lens group changes, a distance between the second lens group and the third lens group changes, a distance between the third lens group and the fourth lens group changes, and at least the first lens group (G1) moves. The first lens group (G1) is constituted by a set of cemented lenses, the third lens group (G3) is constituted by, in order
(Continued)

from the object, a positive lens and a negative lens, and the conditional expression 0.50<TL/ft<1.28 is satisfied, where TL denotes a total length of the zoom lens (ZL) in the telephoto end state, and ft denotes a focal length of the zoom lens (ZL) in the telephoto end state.

46 Claims, 50 Drawing Sheets

(30) Foreign Application Priority Data

| | | |
|---|---|---|
| Aug. 9, 2013 | (JP) | 2013-165712 |
| Aug. 9, 2013 | (JP) | 2013-165799 |
| Aug. 9, 2013 | (JP) | 2013-165800 |

(51) Int. Cl.
  *G02B 13/18* (2006.01)
  *G02B 15/20* (2006.01)

(58) Field of Classification Search
  USPC .................................. 359/676–679, 683–687
  See application file for complete search history.

(56) References Cited

U.S. PATENT DOCUMENTS

| | | | |
|---|---|---|---|
| 2009/0109546 A1* | 4/2009 | Watanabe | G02B 15/173 359/687 |
| 2009/0168194 A1 | 7/2009 | Watanabe | |
| 2009/0168195 A1 | 7/2009 | Watanabe | |
| 2009/0174952 A1 | 7/2009 | Satori | |
| 2011/0286108 A1* | 11/2011 | Take | G02B 15/173 359/687 |
| 2012/0013995 A1* | 1/2012 | Saruwatari | G02B 15/173 359/687 |
| 2012/0099003 A1* | 4/2012 | Yoshitsugu | G02B 27/646 348/240.3 |
| 2012/0105975 A1 | 5/2012 | Huang et al. | |
| 2012/0127585 A1 | 5/2012 | Peng et al. | |
| 2012/0307377 A1 | 12/2012 | Horiuchi | |
| 2013/0050843 A1* | 2/2013 | Nakamura | G02B 15/173 359/684 |
| 2013/0194465 A1 | 8/2013 | Kimura | |

FOREIGN PATENT DOCUMENTS

| | | |
|---|---|---|
| JP | 2009-133993 A | 6/2009 |
| JP | 2009-139701 A | 6/2009 |
| JP | 2009-186983 A | 8/2009 |
| JP | 2012-093761 A | 5/2012 |
| JP | 2012-113296 A | 6/2012 |
| JP | 2012-252254 A | 12/2012 |

OTHER PUBLICATIONS

Office Action dated Jun. 12, 2017, in Chinese Patent Application No. 201480051702.0.
Office Action dated Jan. 17, 2018, in Chinese Patent Application No. 201480051702.0.
Office Action dated May 25, 2018 in Indian Patent Application No. 201617007588.
Office Action dated Aug. 22, 2018, in Chinese Patent Application No. 201480051702.0.

* cited by examiner

[FIG.1]
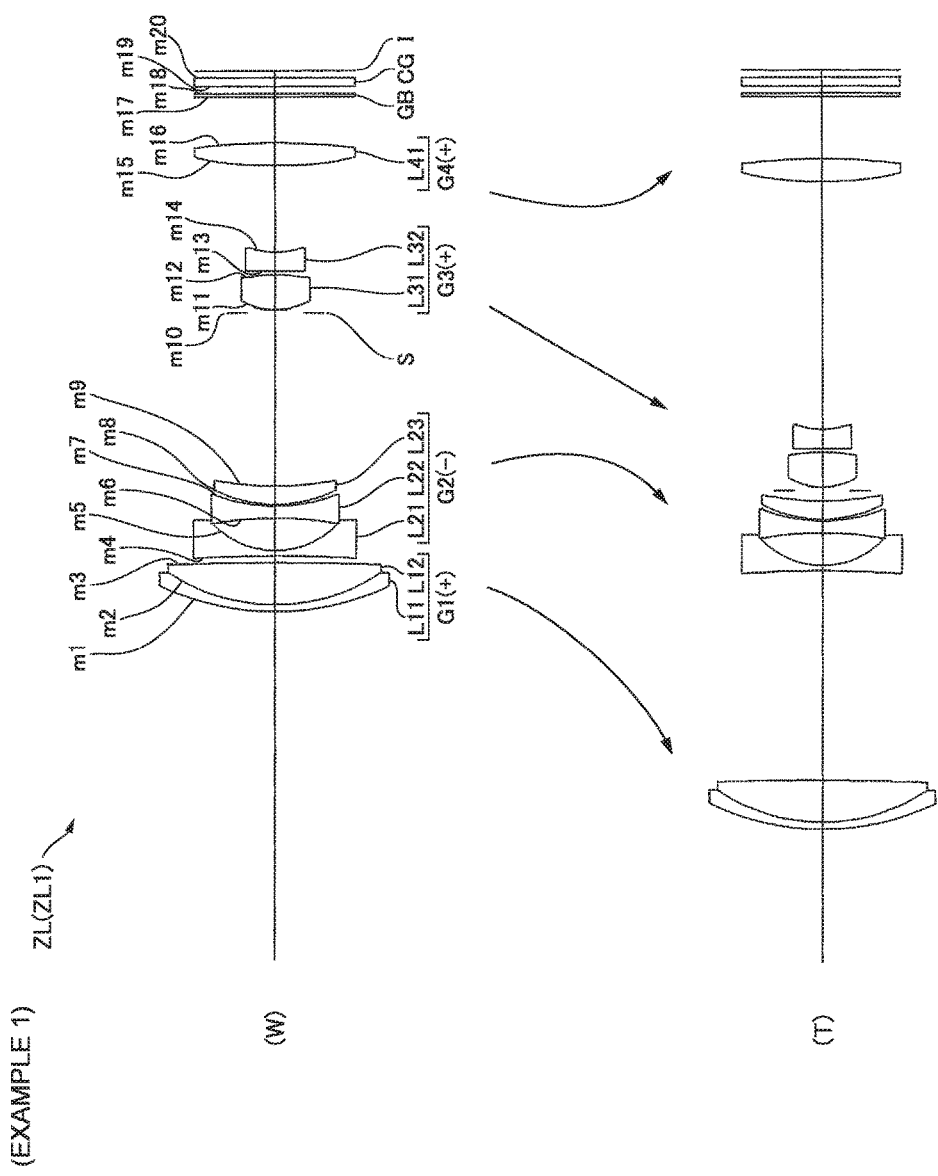

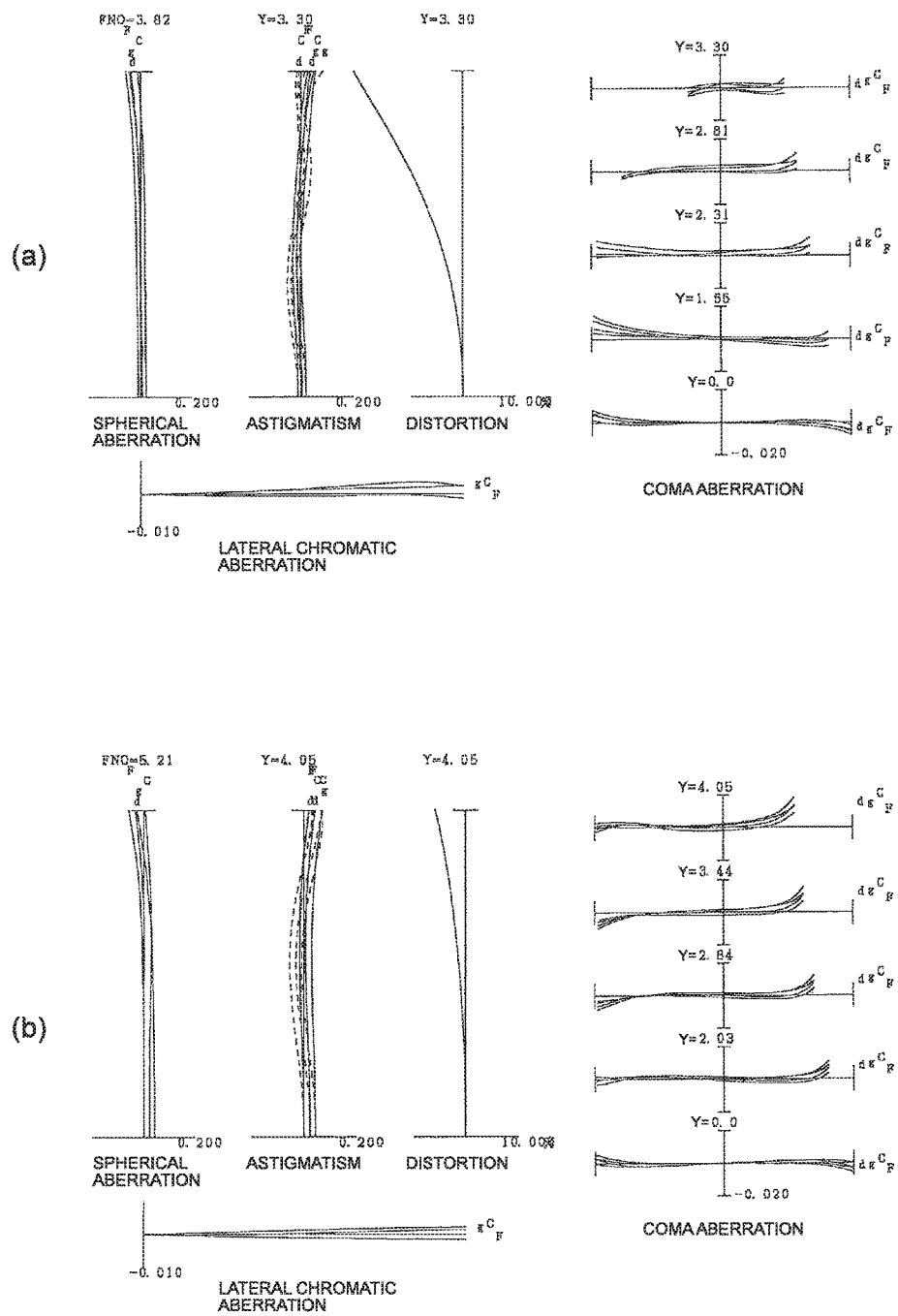

[FIG.3]
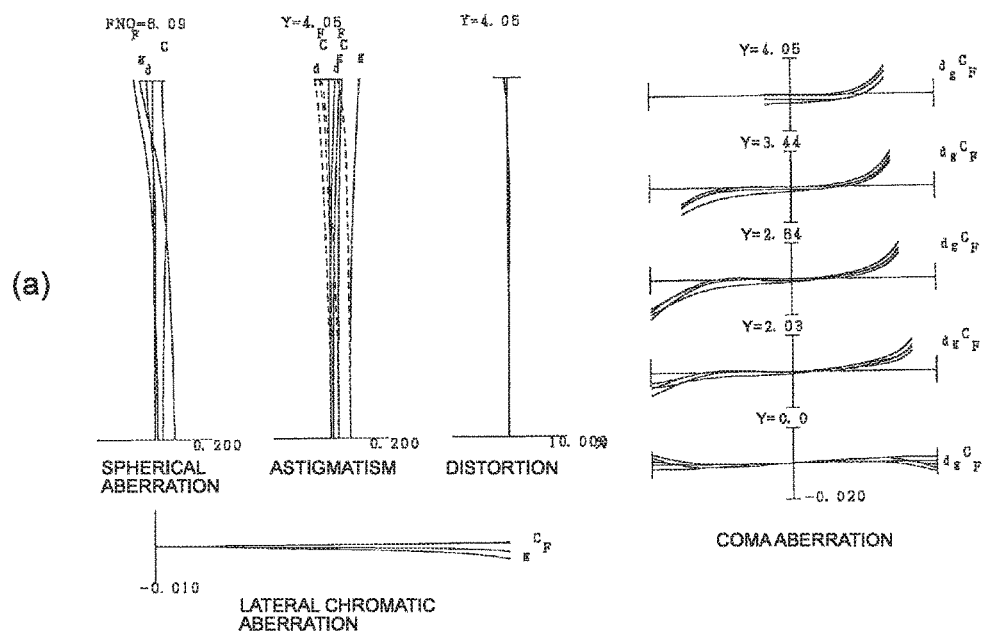
(a)
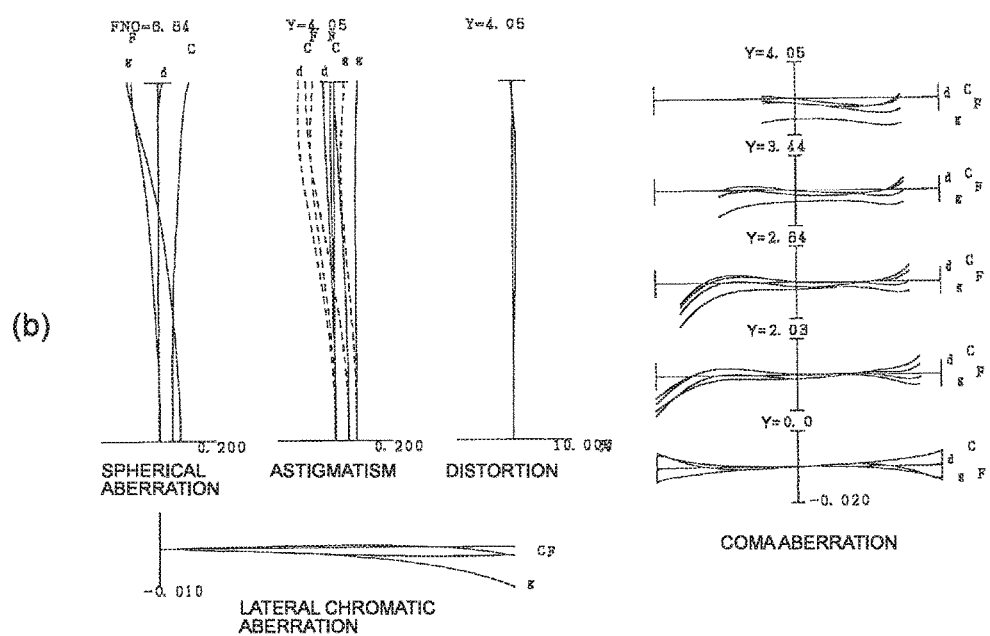
(b)

[FIG.4]
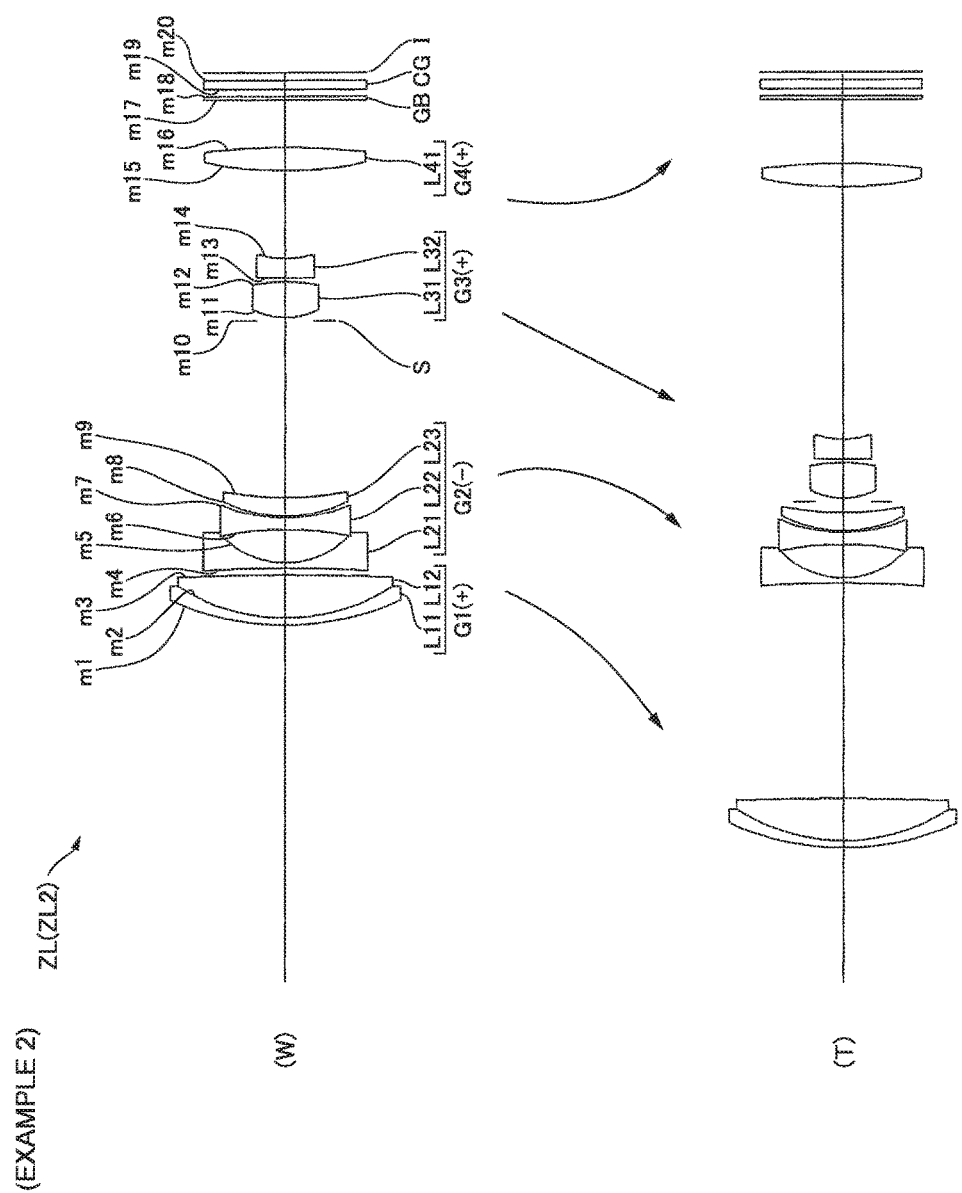

[FIG.5]
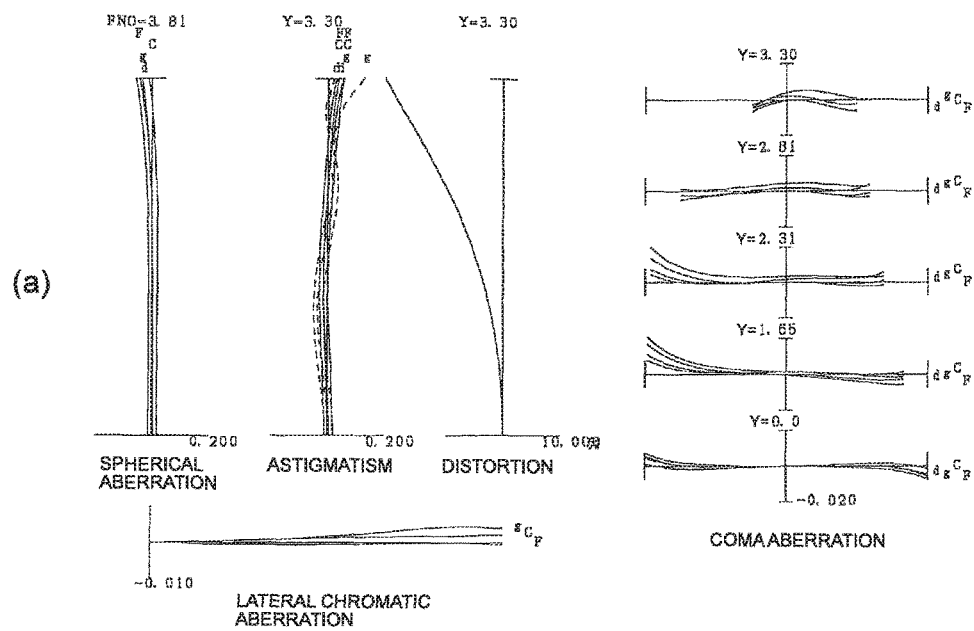
(a)
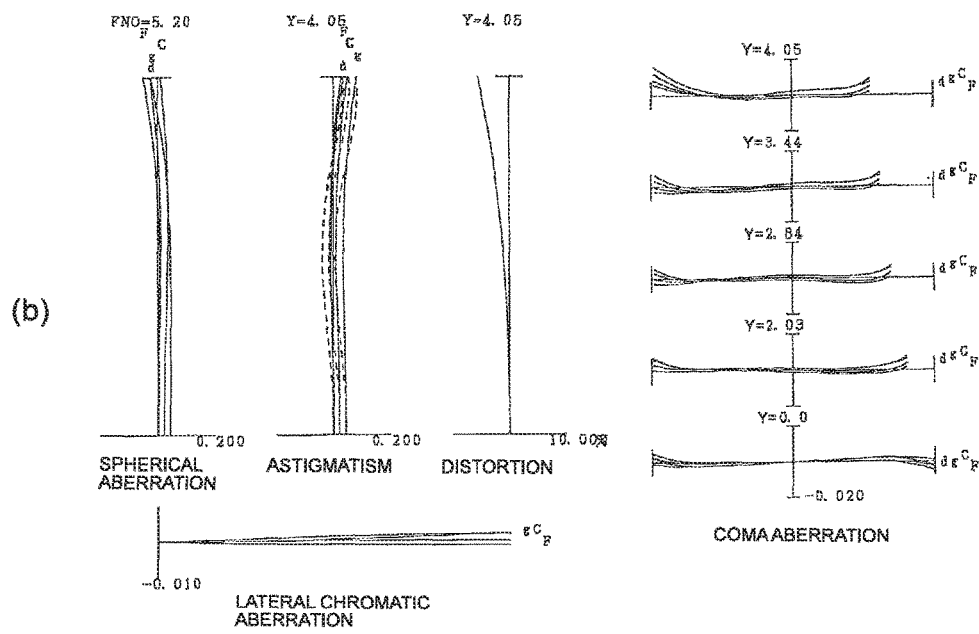
(b)

[FIG.6]
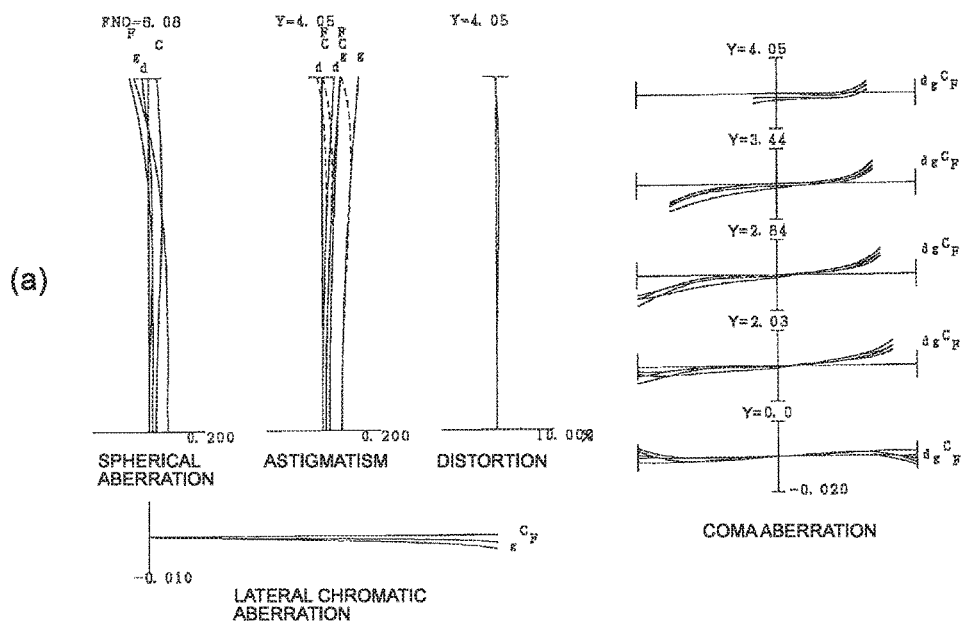
(a)
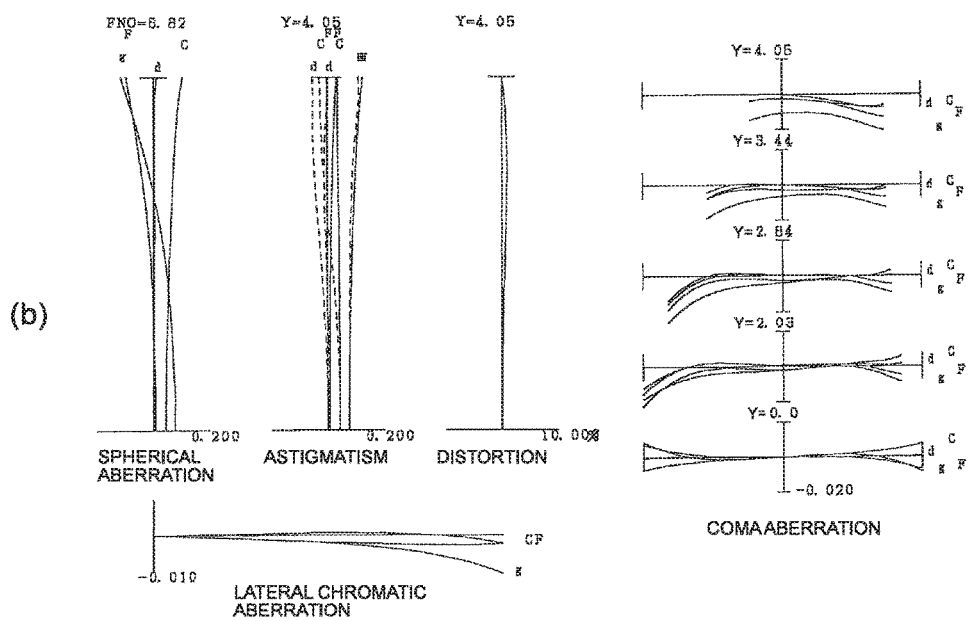
(b)

[FIG.7]
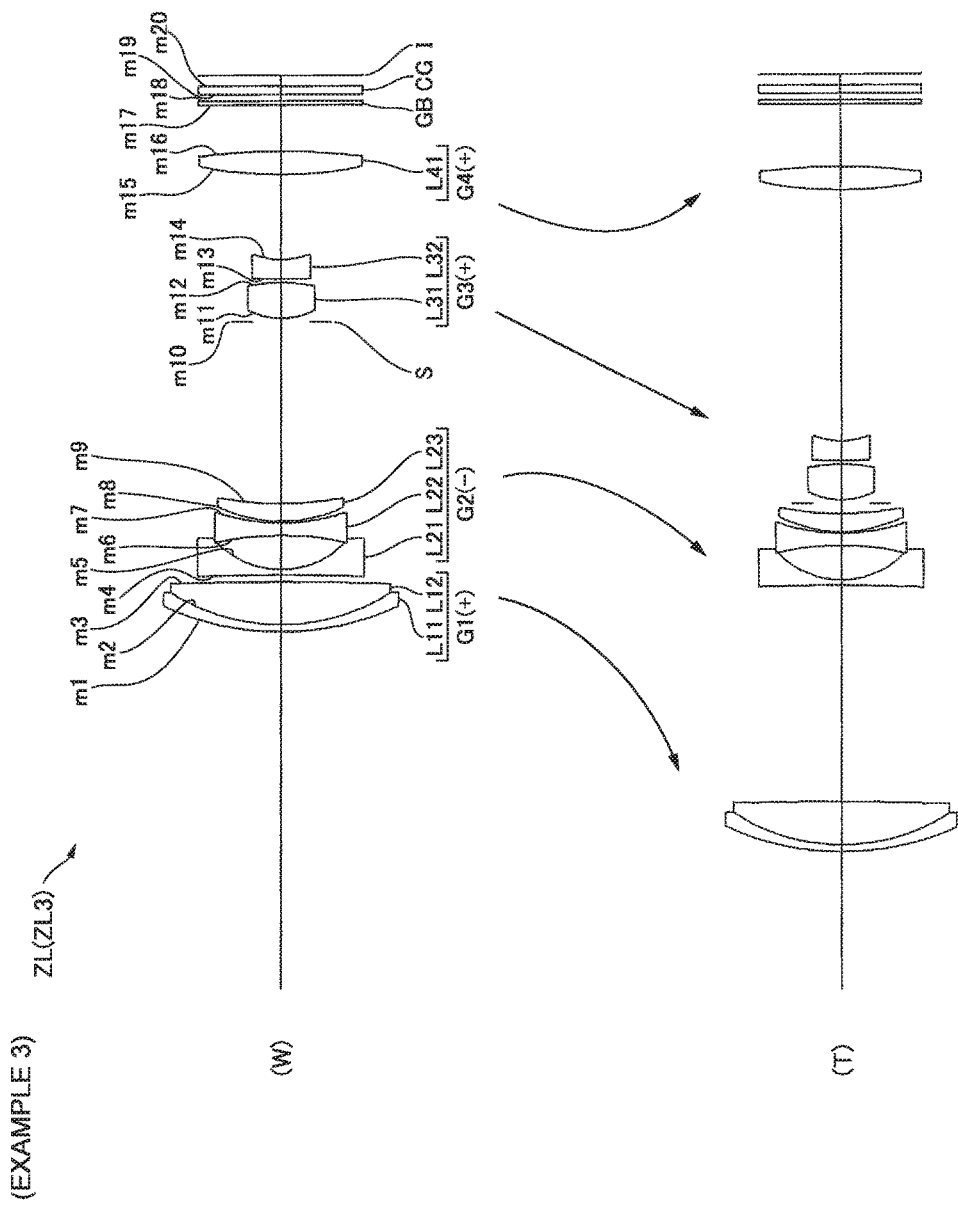

[FIG.8]
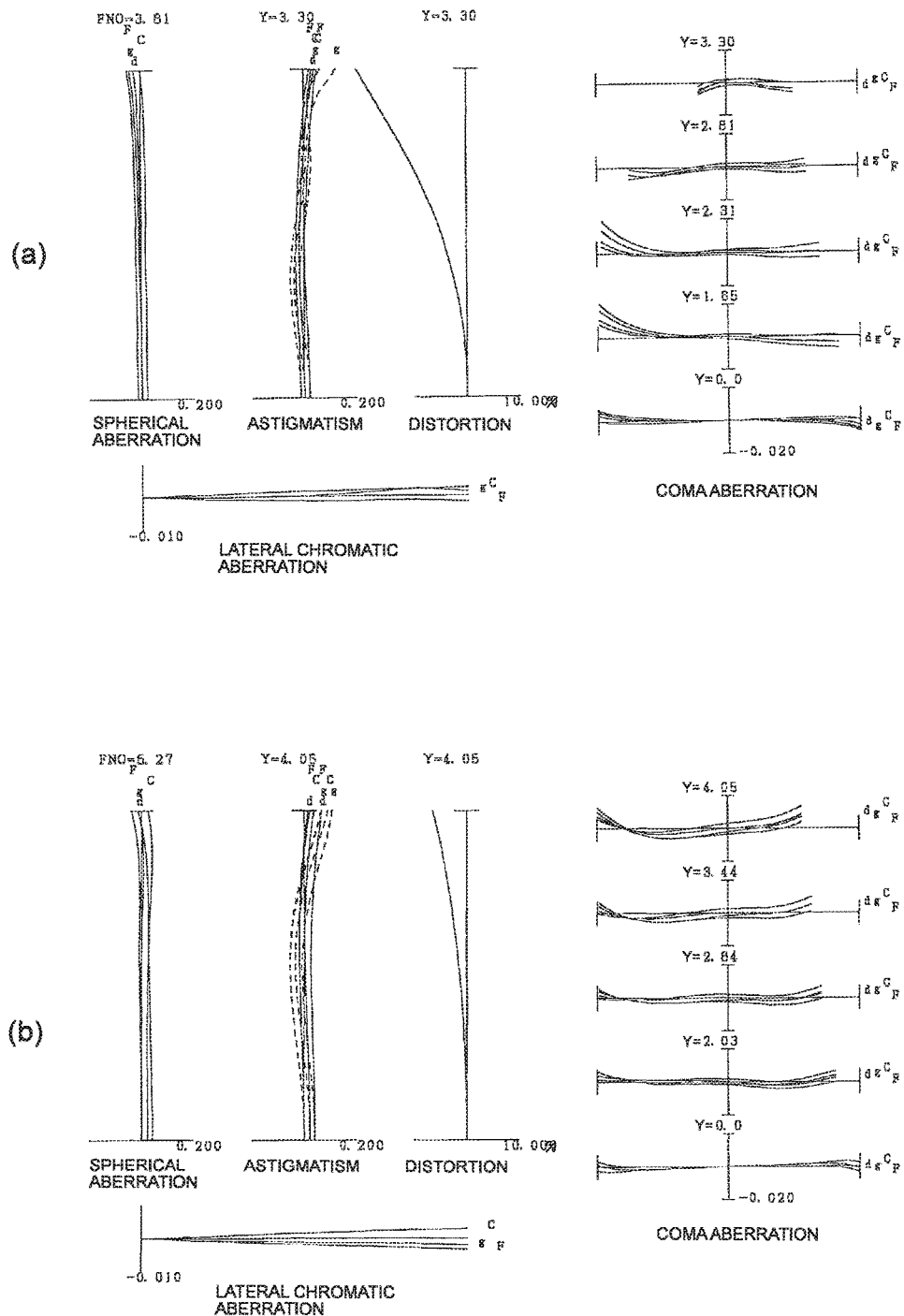

[FIG.9]
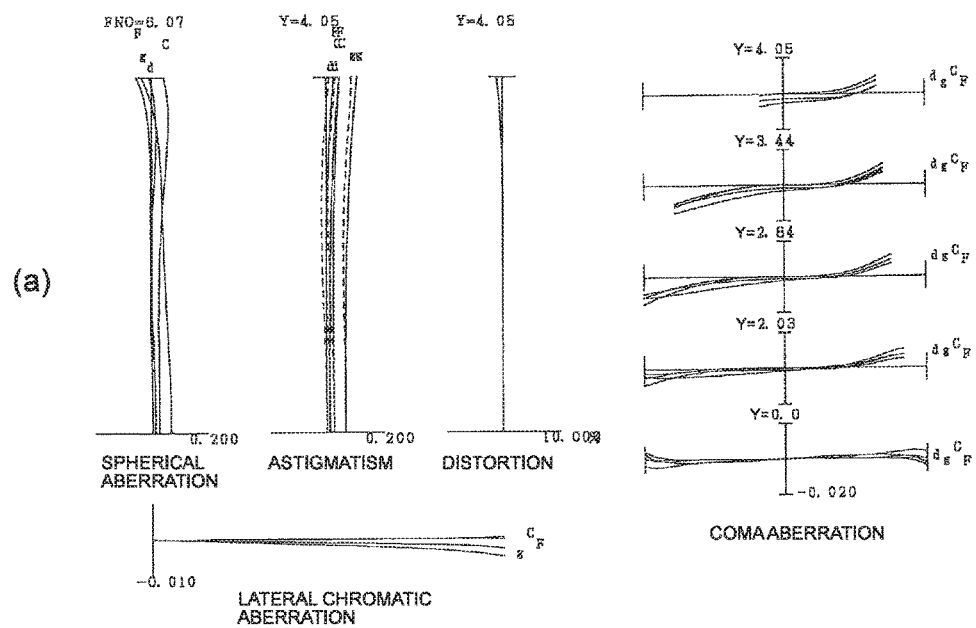
(a)
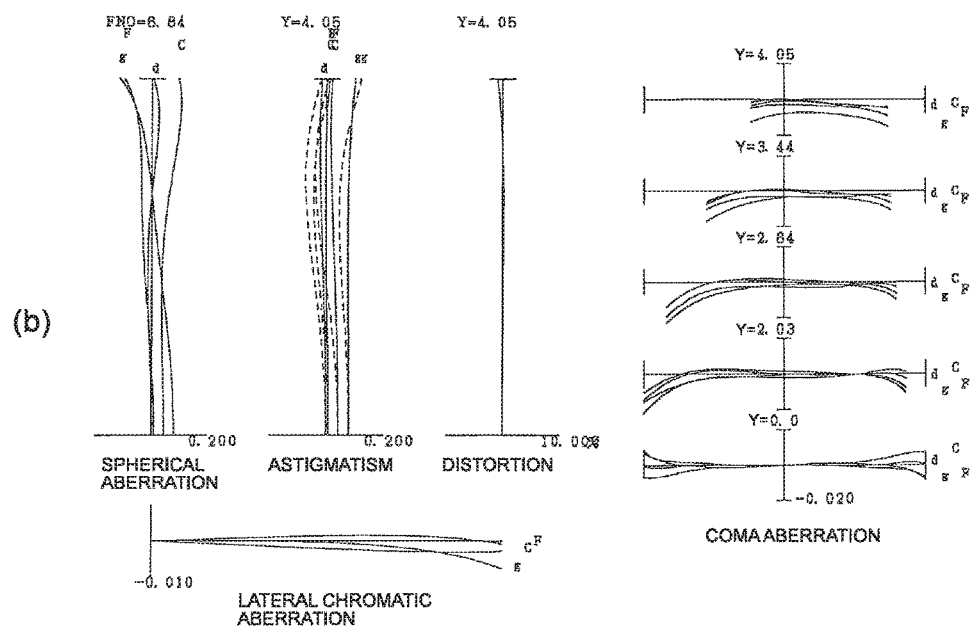
(b)

[FIG.10]
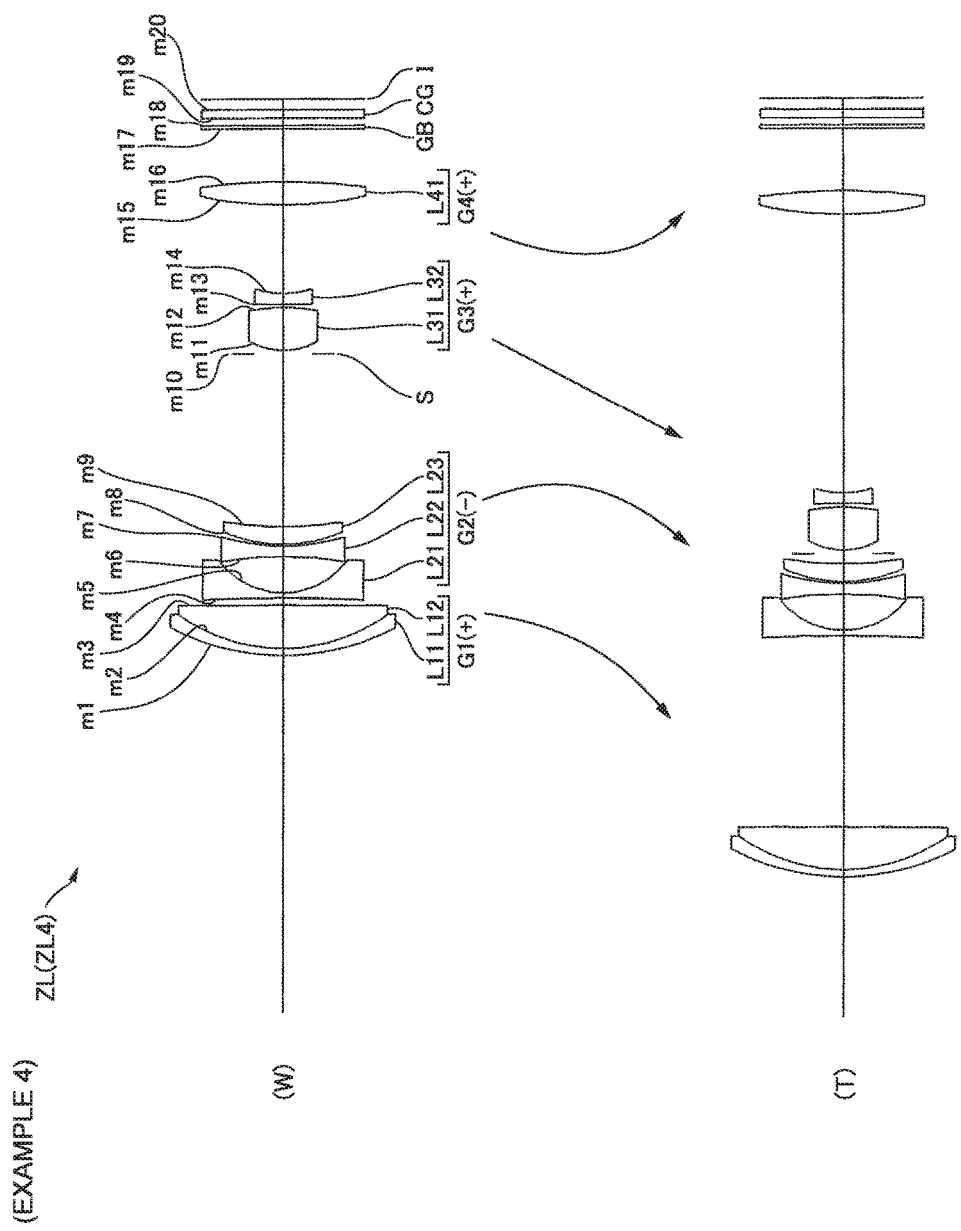

[FIG.11]
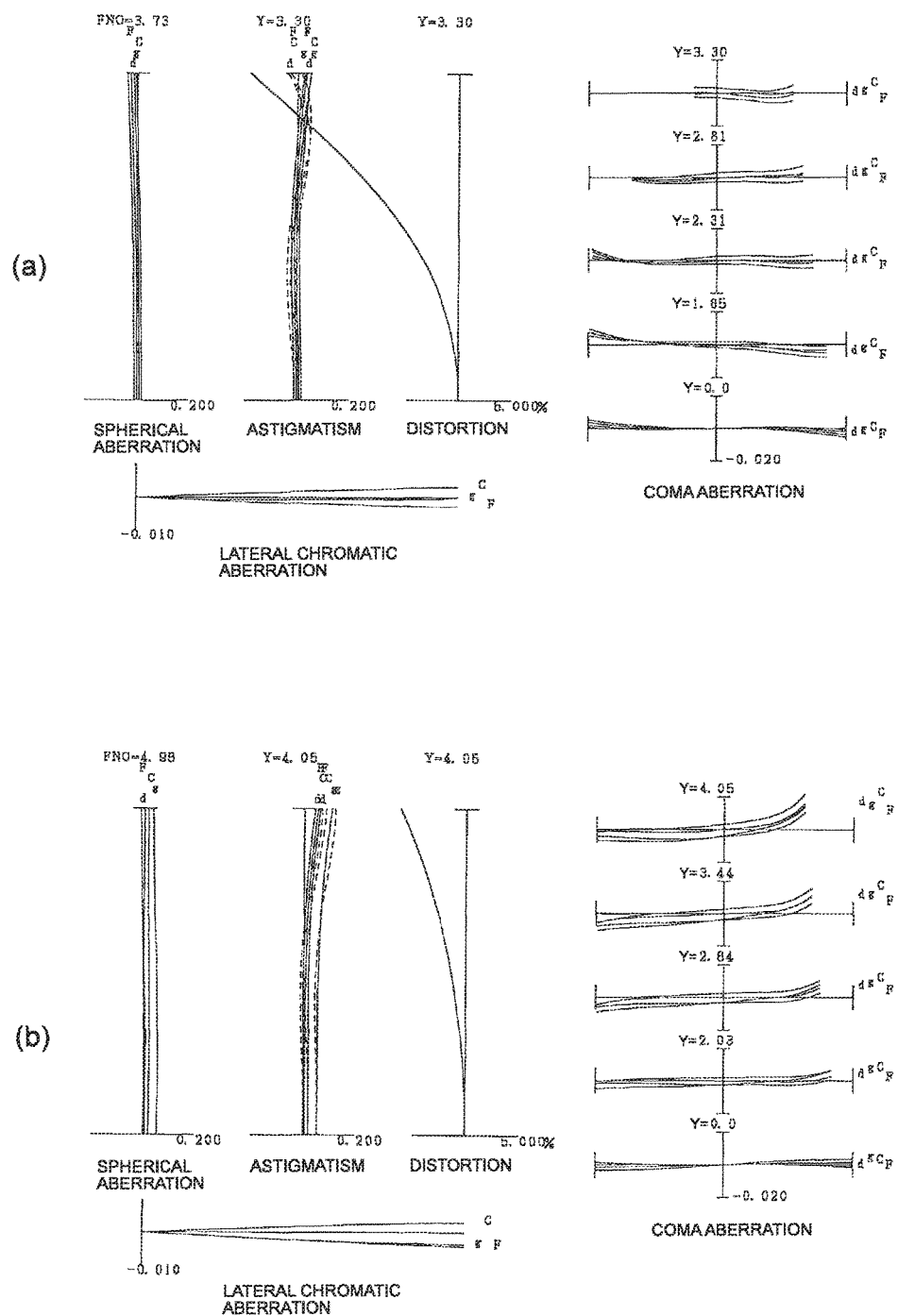

[FIG.12]
(a)
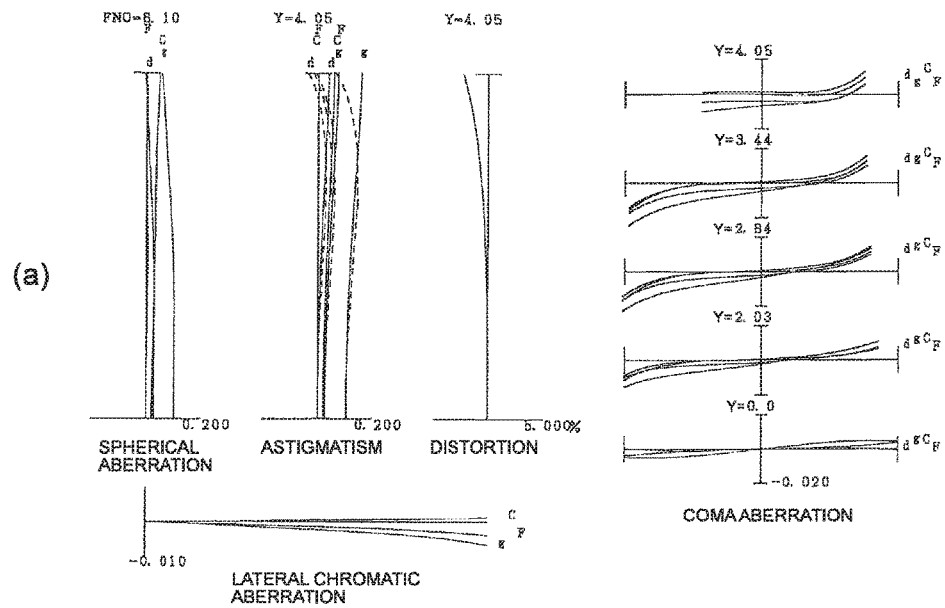
(b)
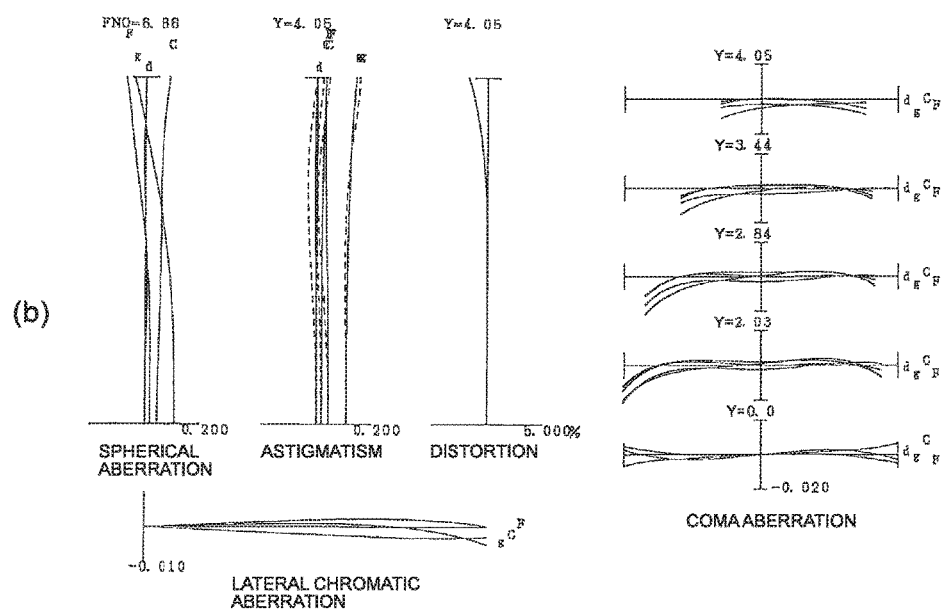

[FIG.13]
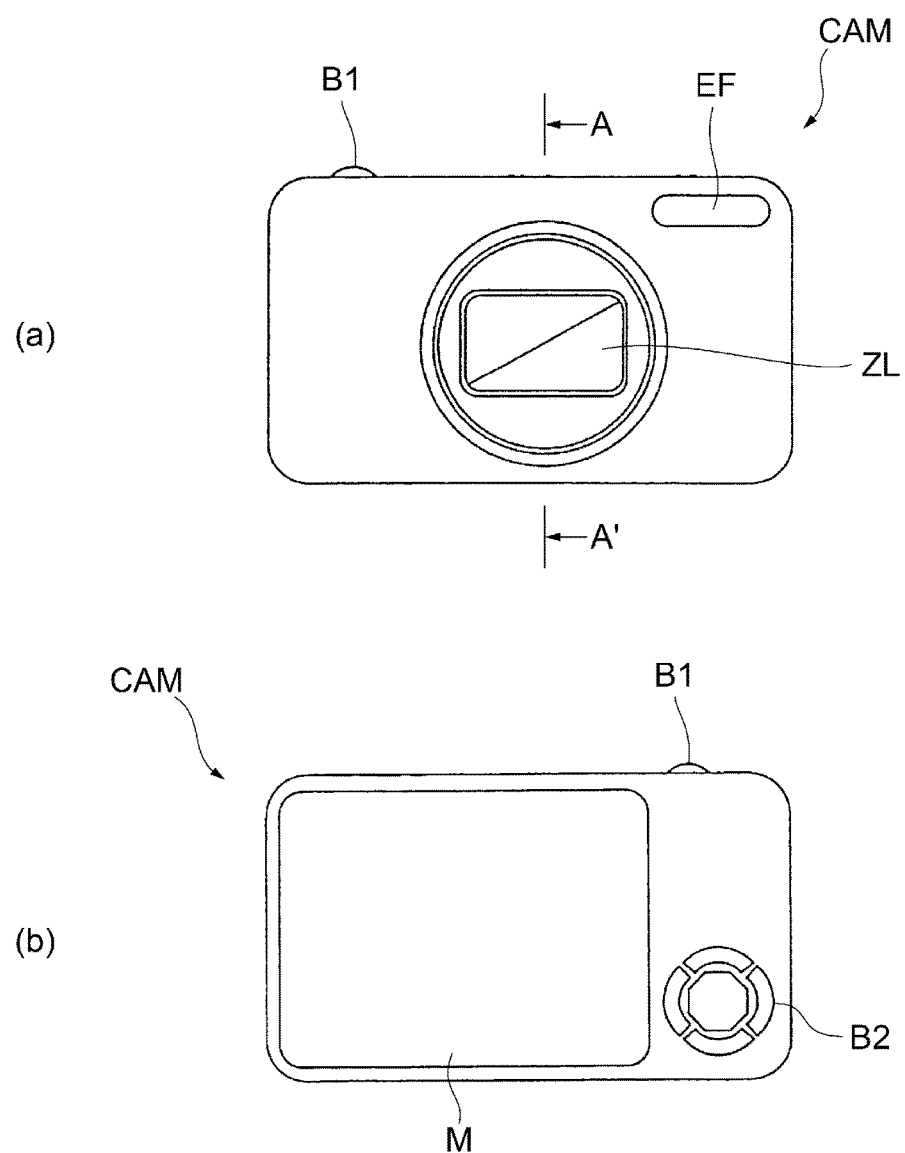

[FIG.14]
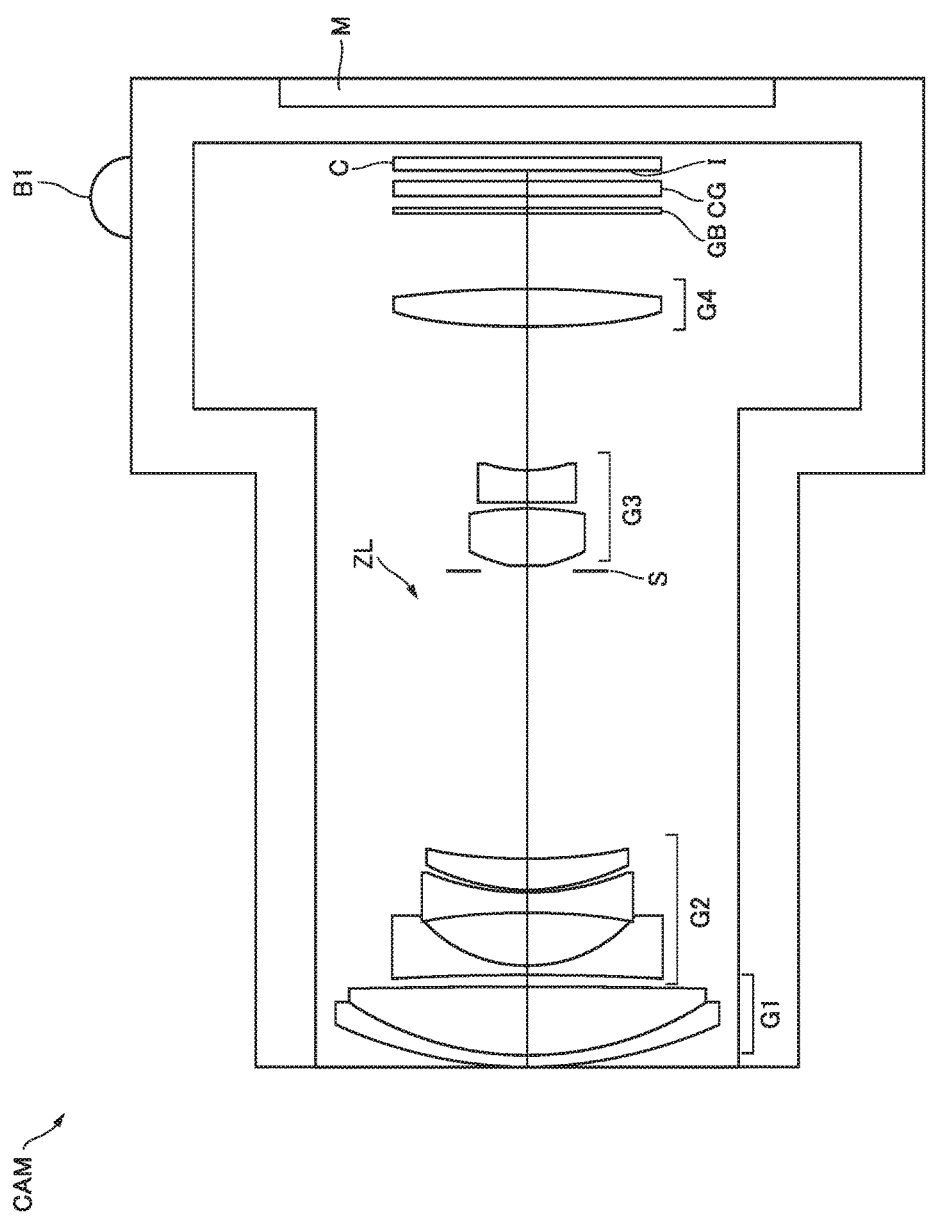

[FIG.15]
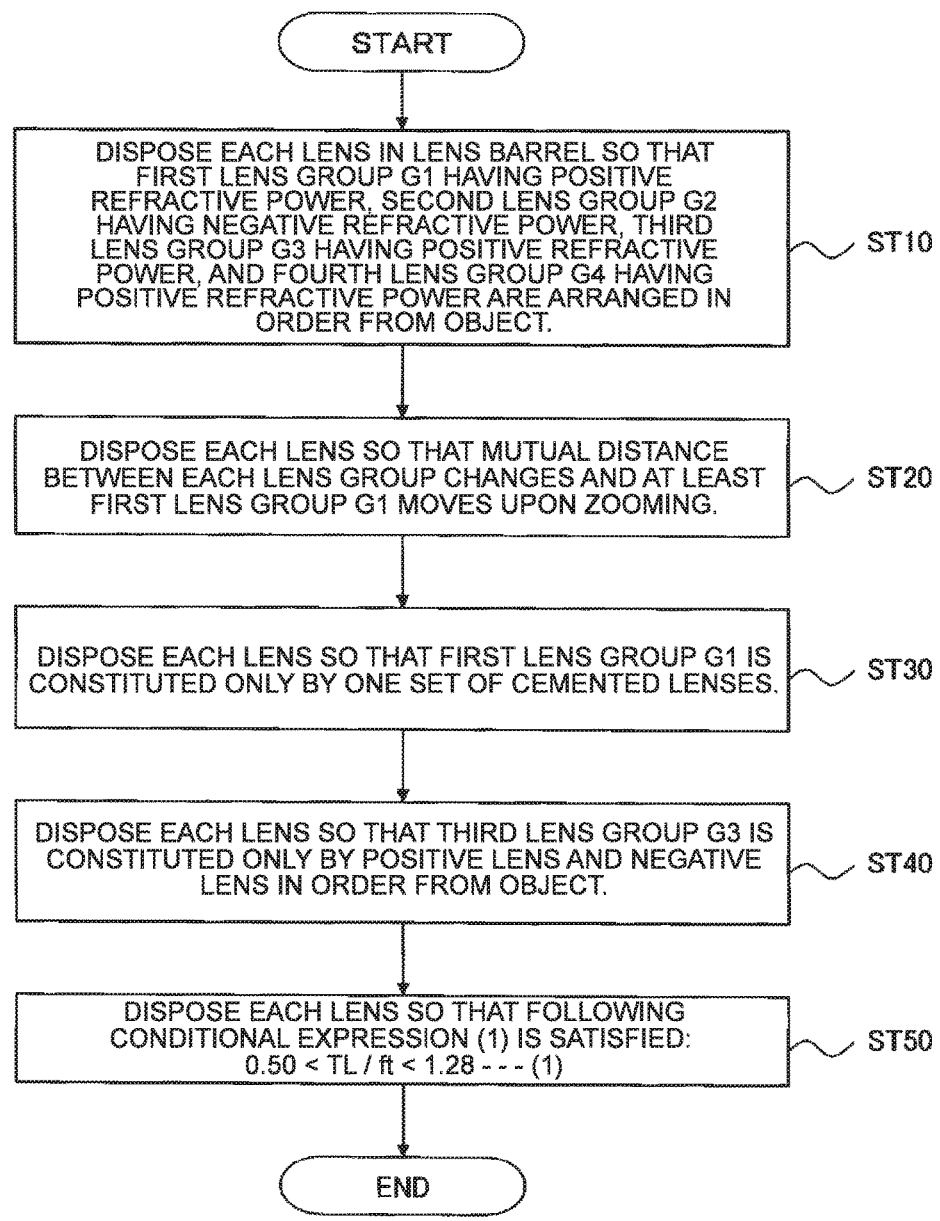

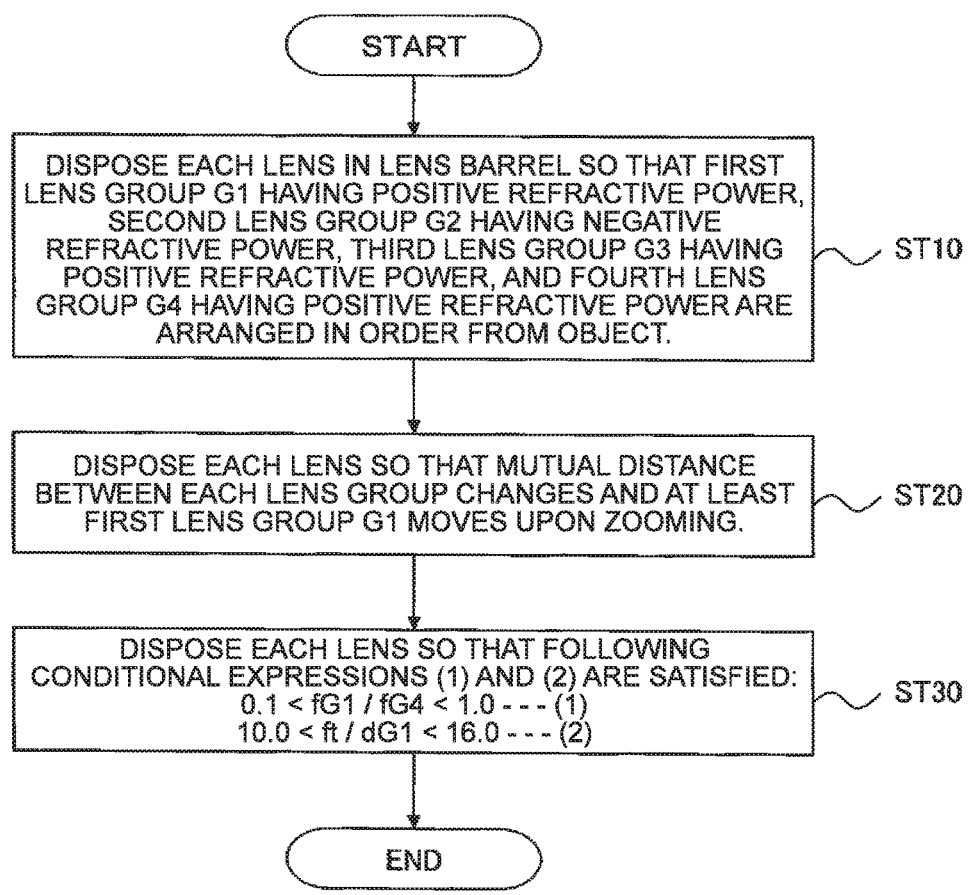
[FIG.16]

[FIG.17]
(EXAMPLE 5)
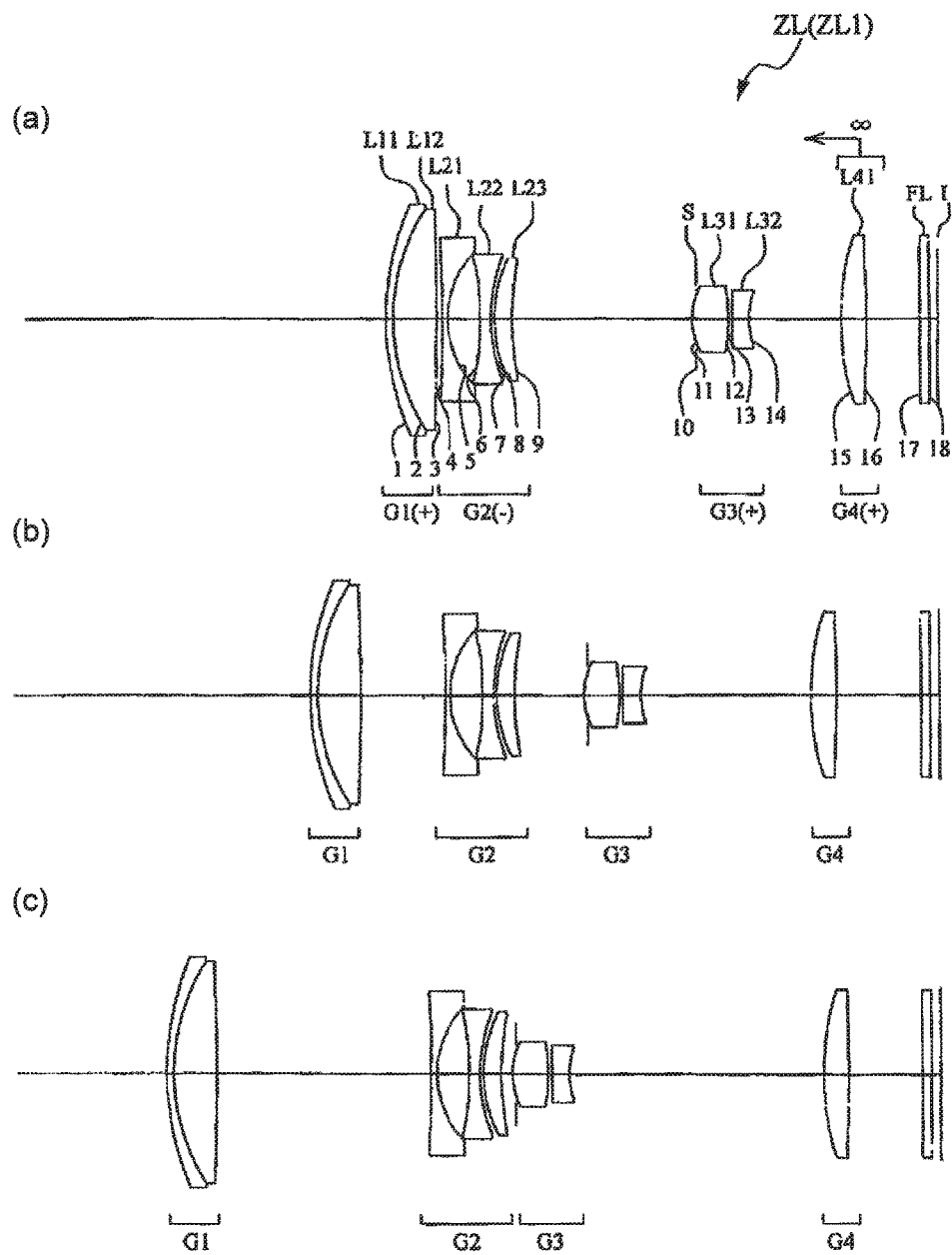

[FIG.18]
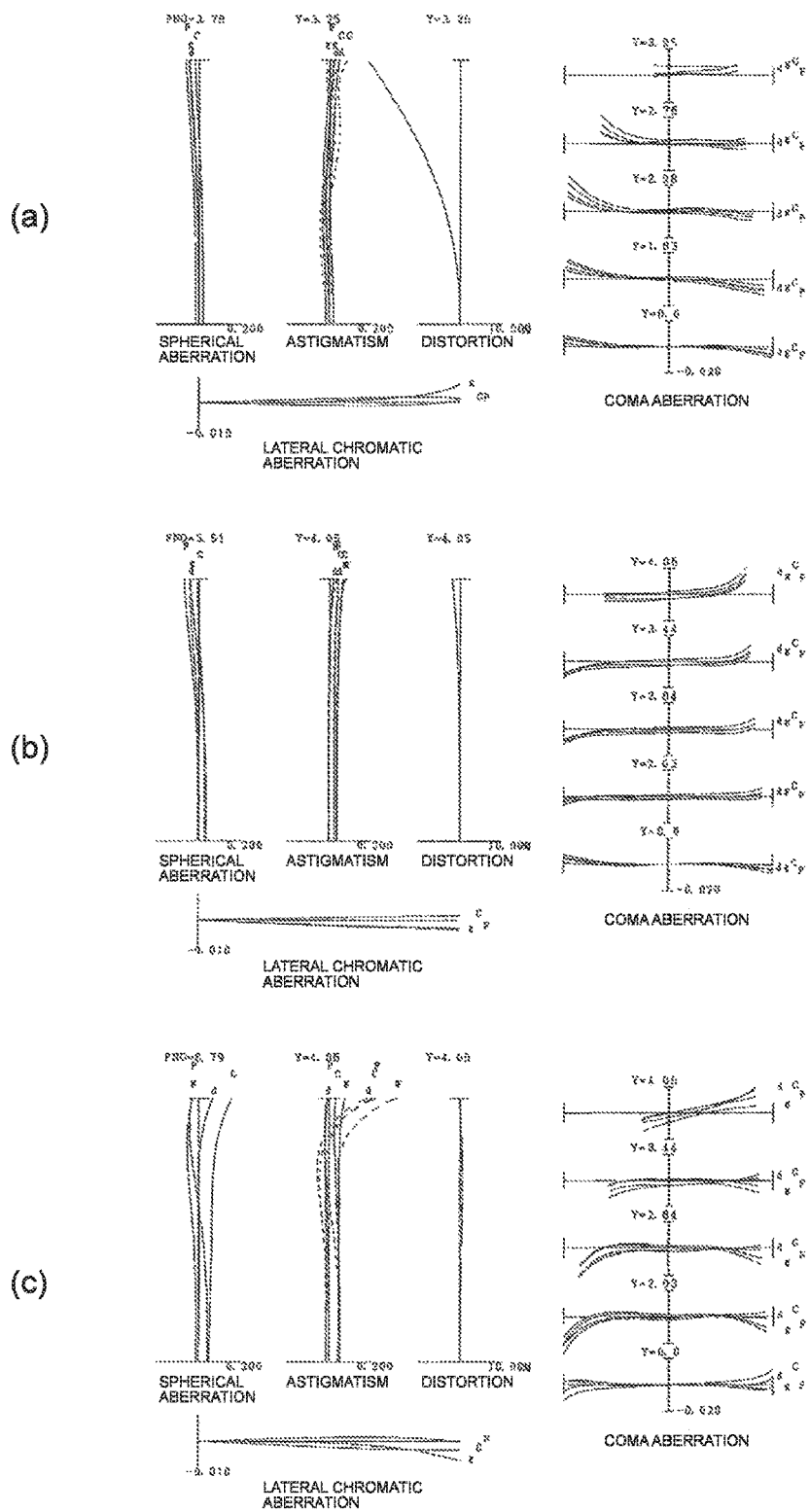

[FIG.19]
(EXAMPLE 6)
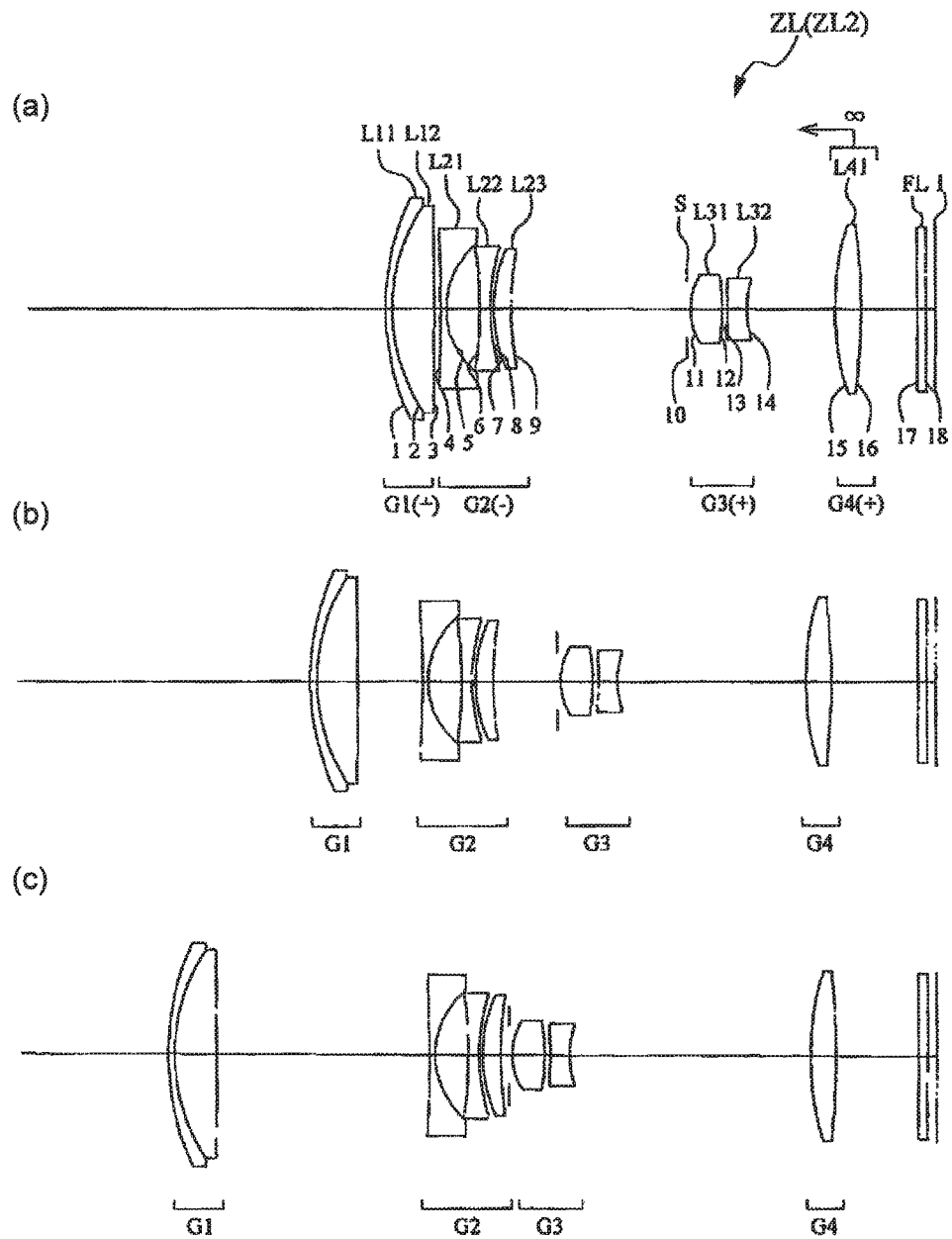

[FIG.20]
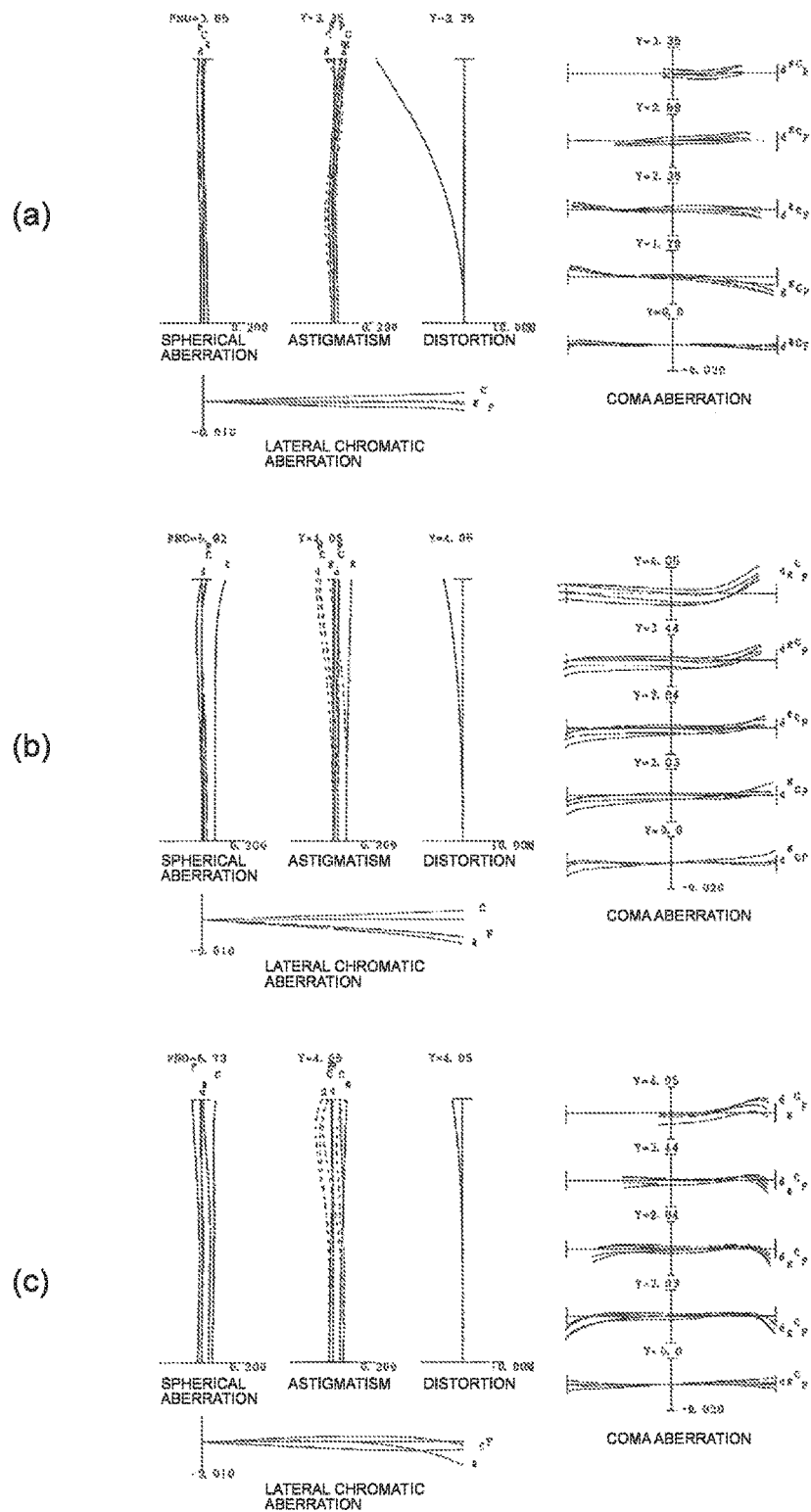

[FIG.21]
(EXAMPLE 7)
(a) 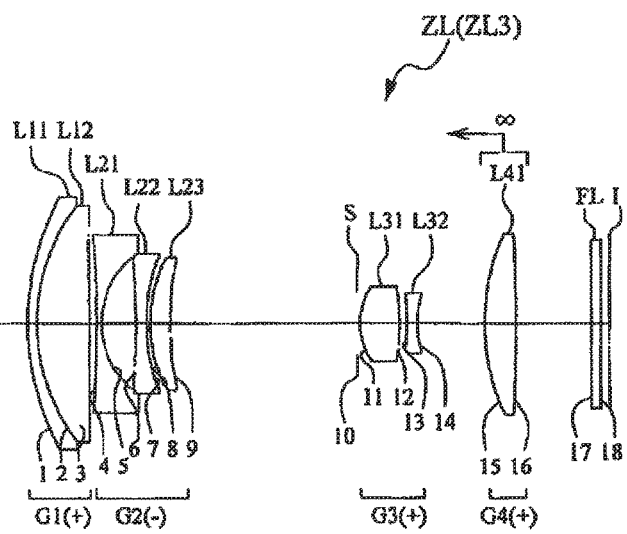
(b) 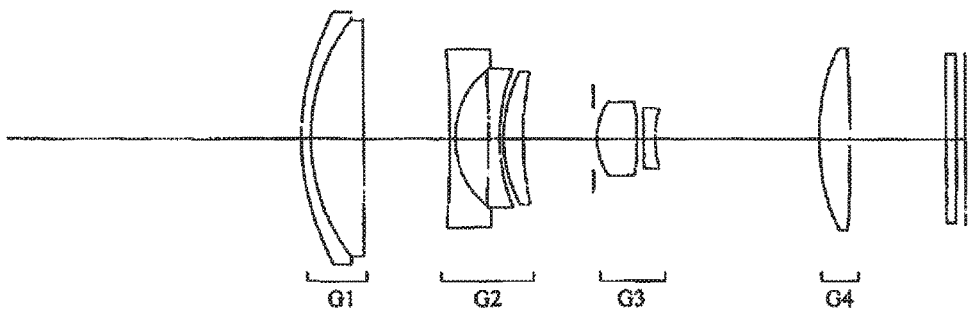
(c) 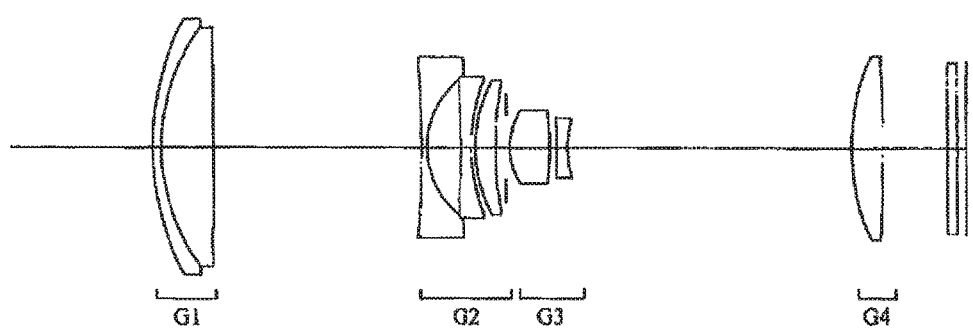

[FIG.22]
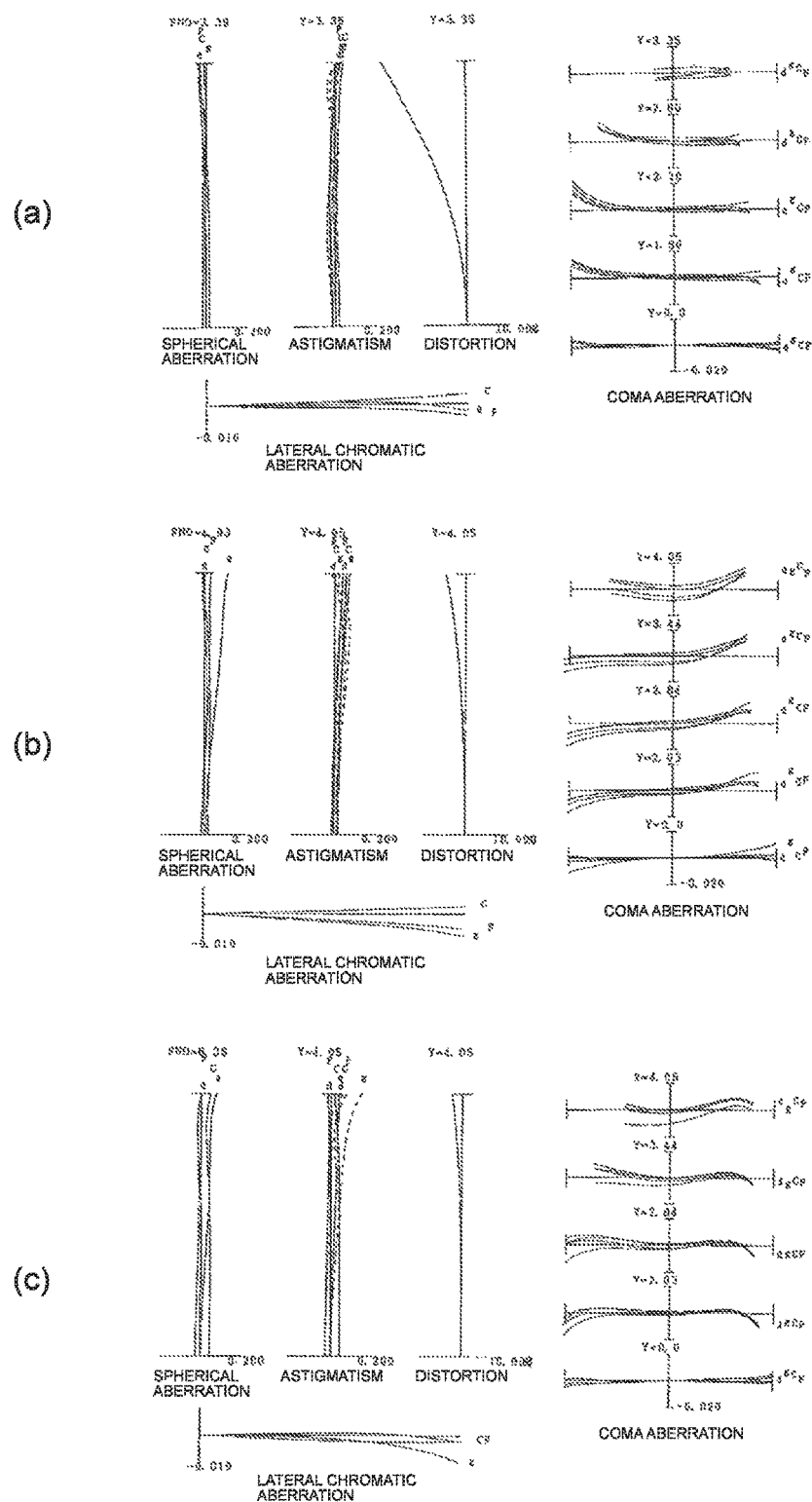

[FIG.23]
(EXAMPLE 8)
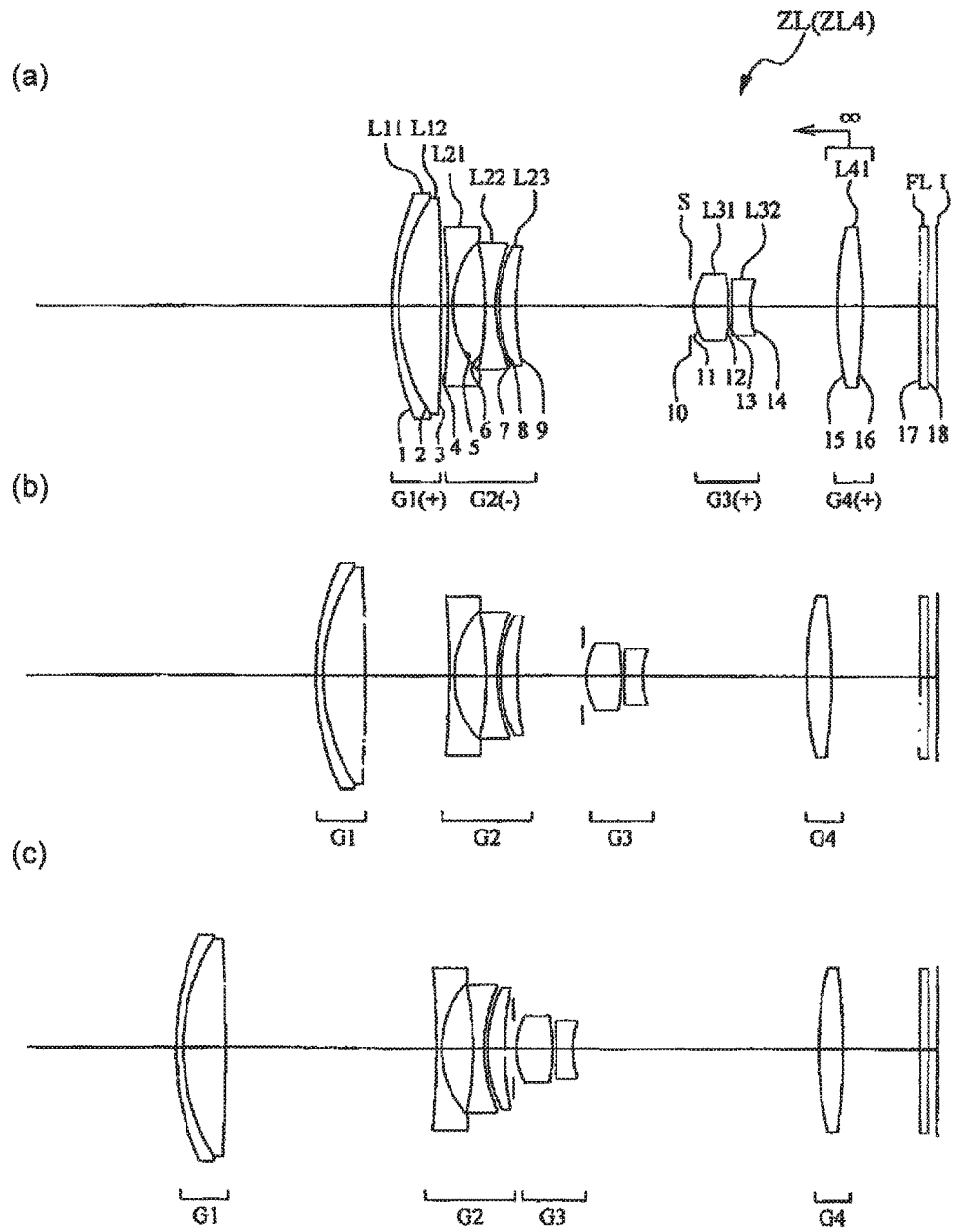

[FIG.24]
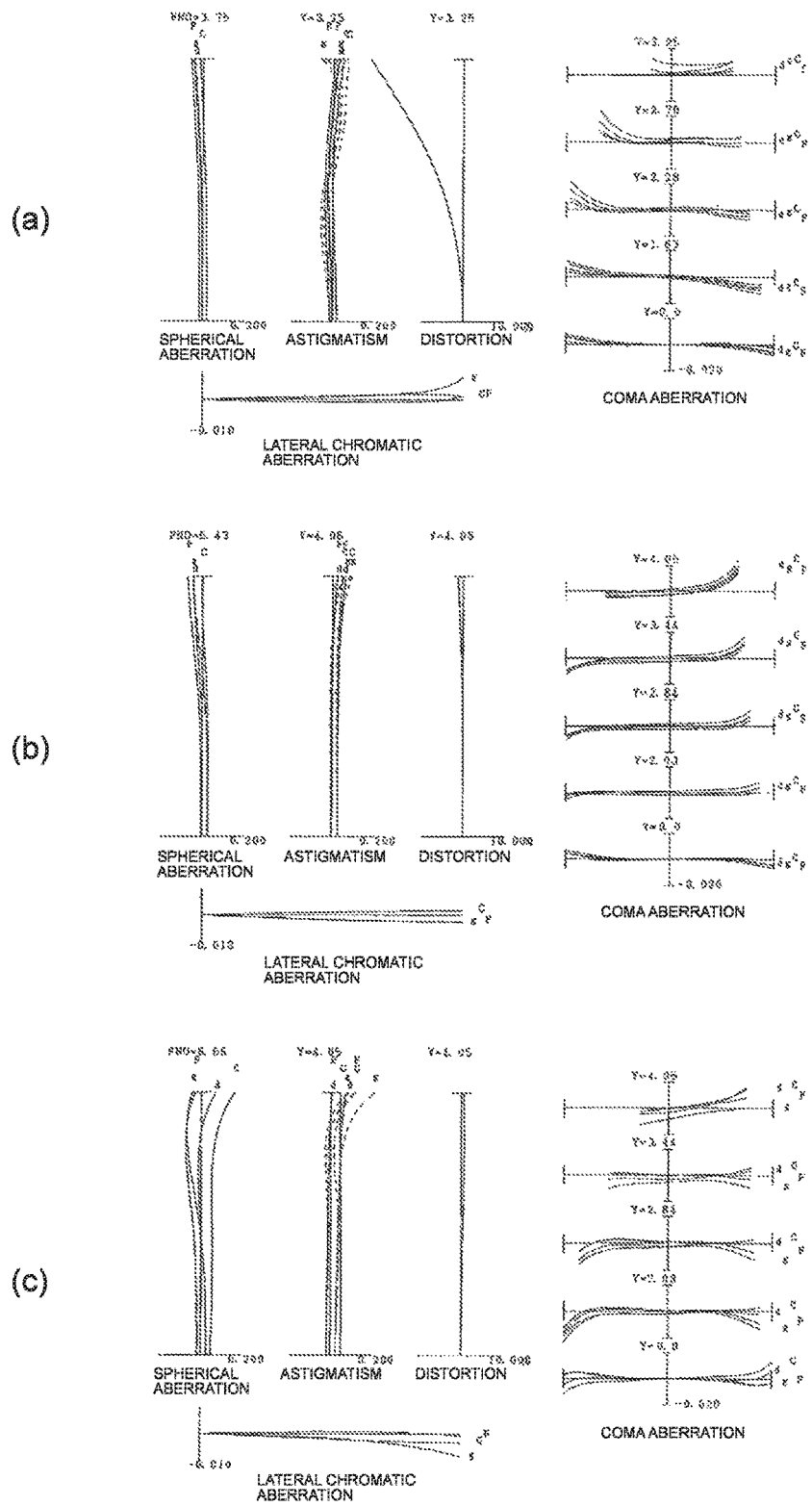

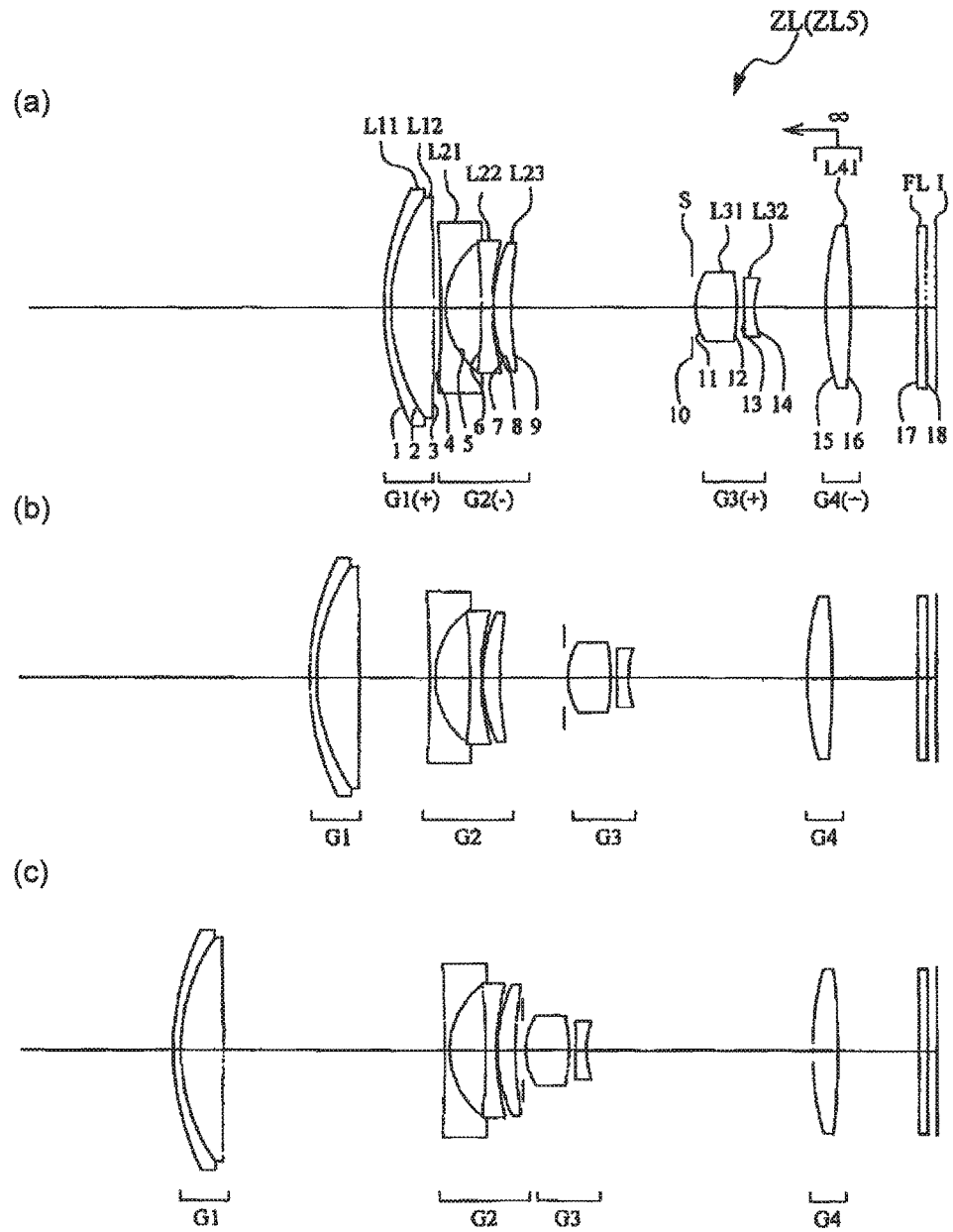

[FIG.26]
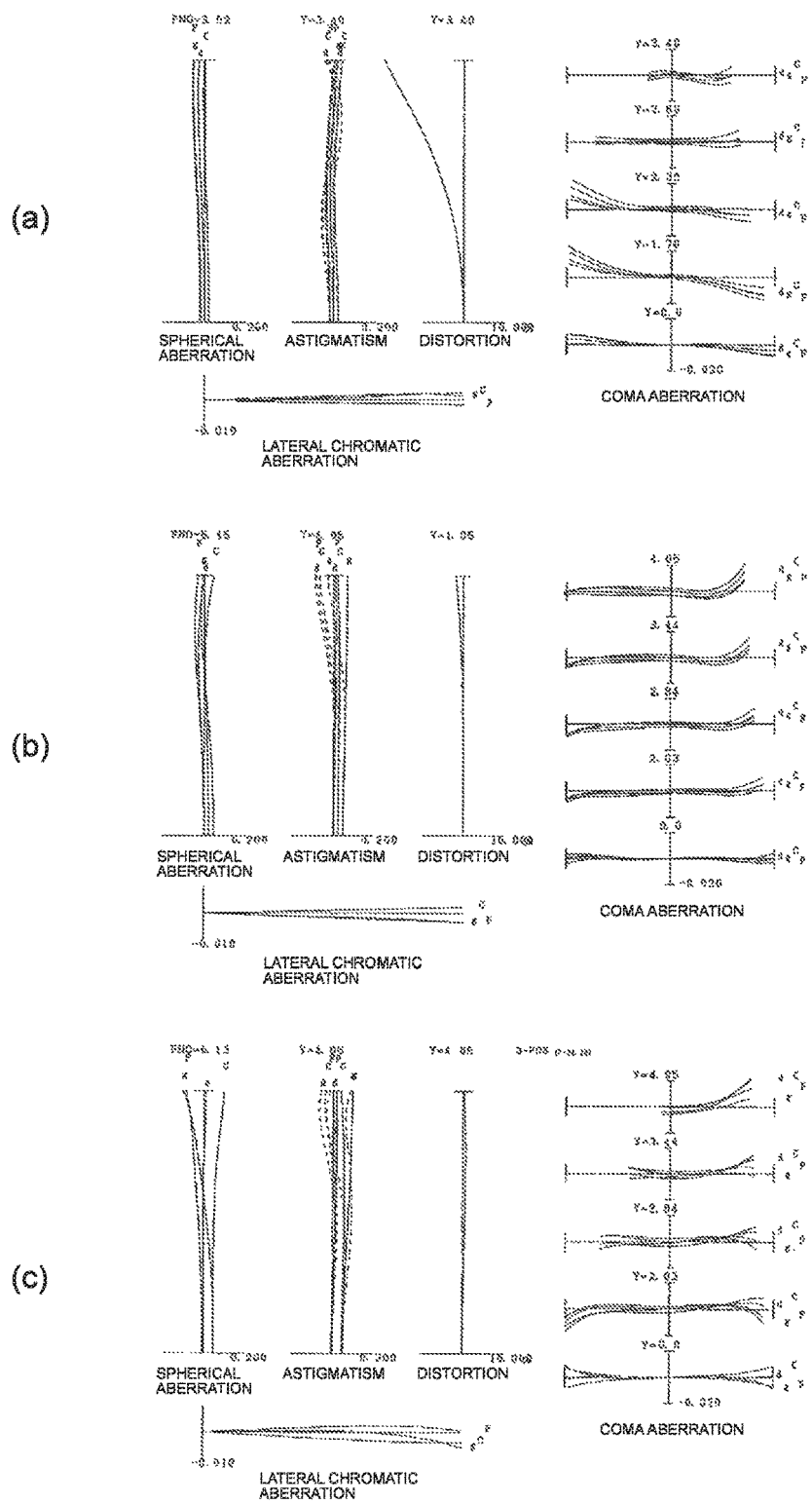

[FIG.27]
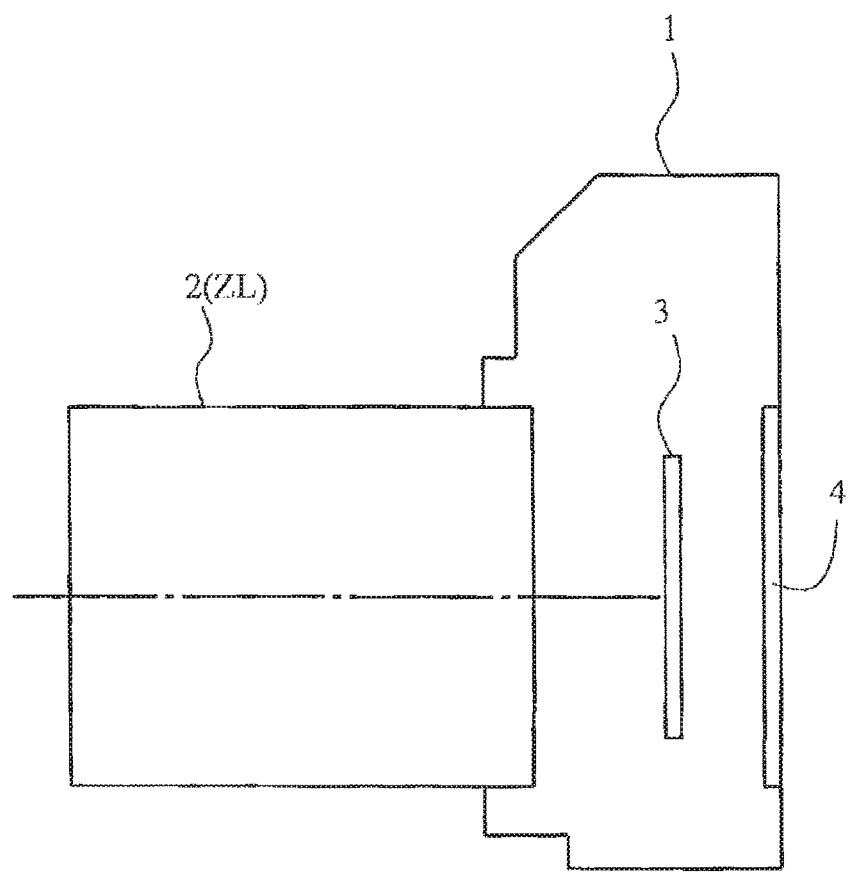

[FIG.28]
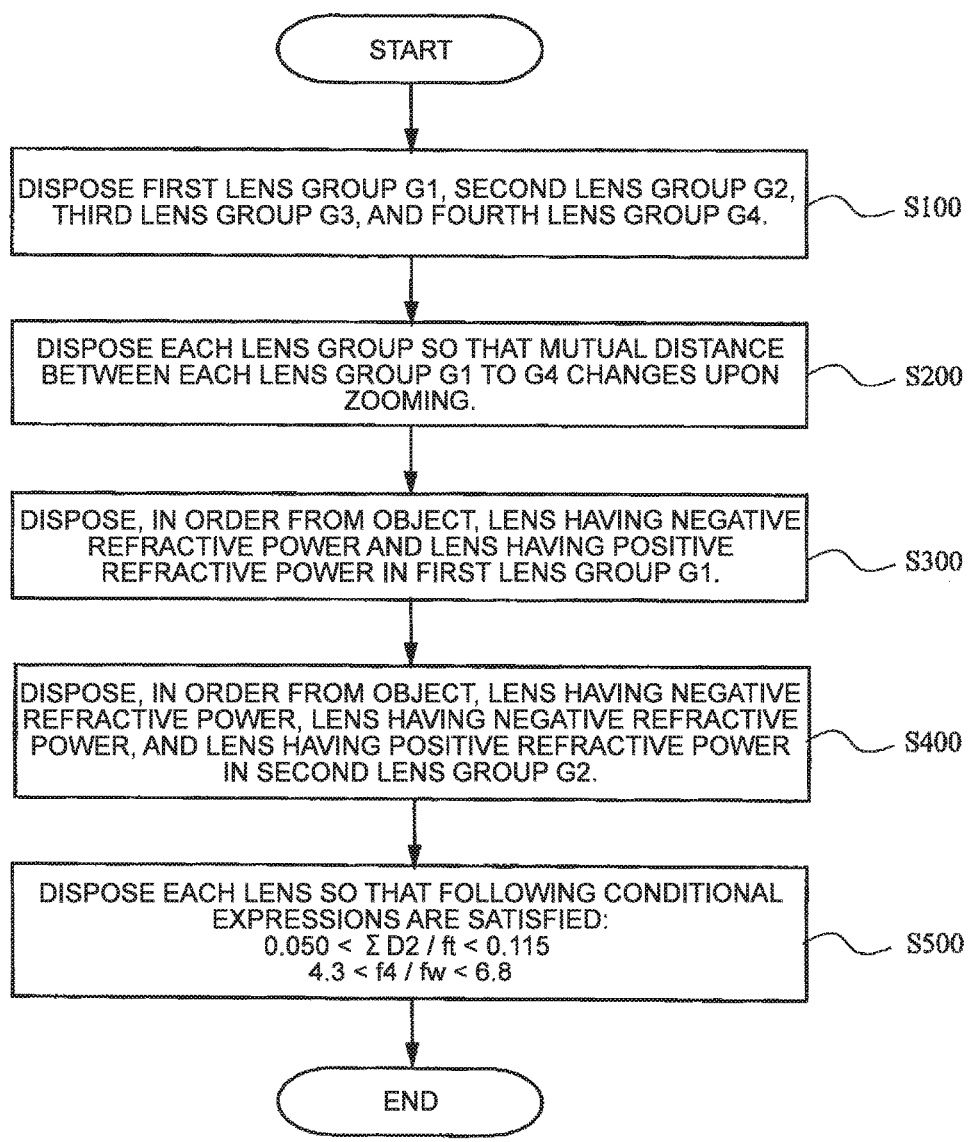

[FIG.29]
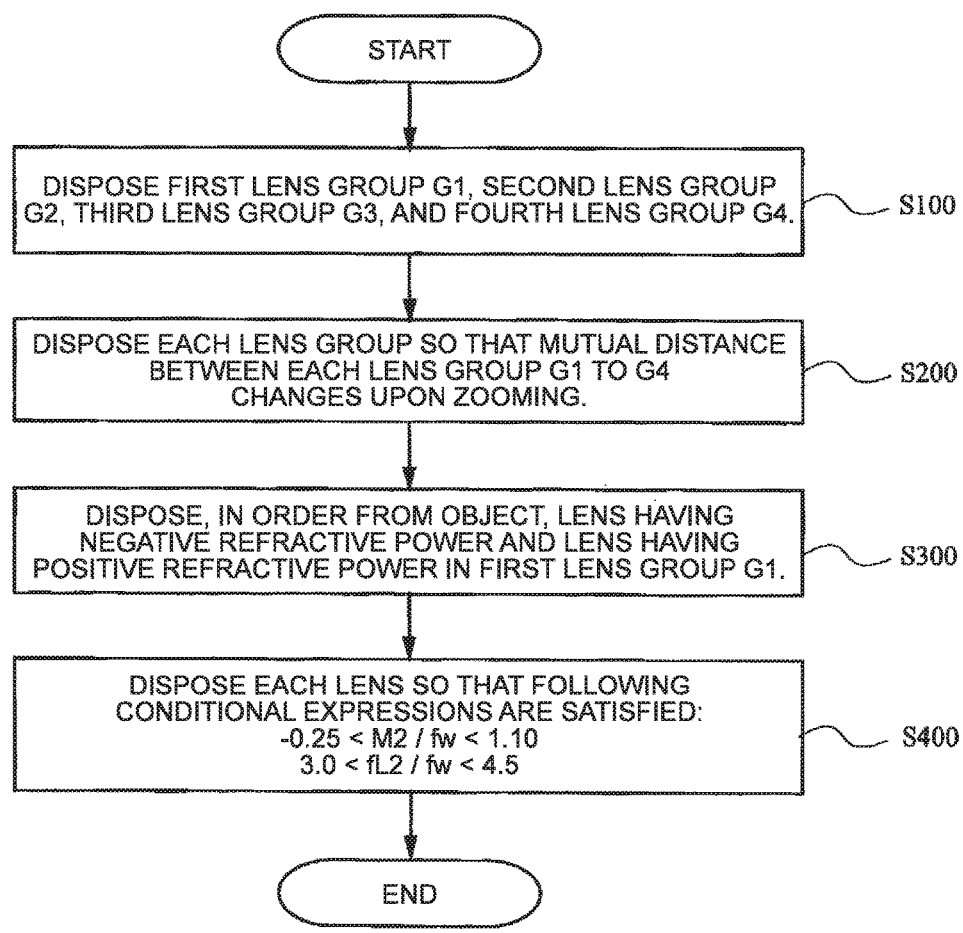

[FIG.30]
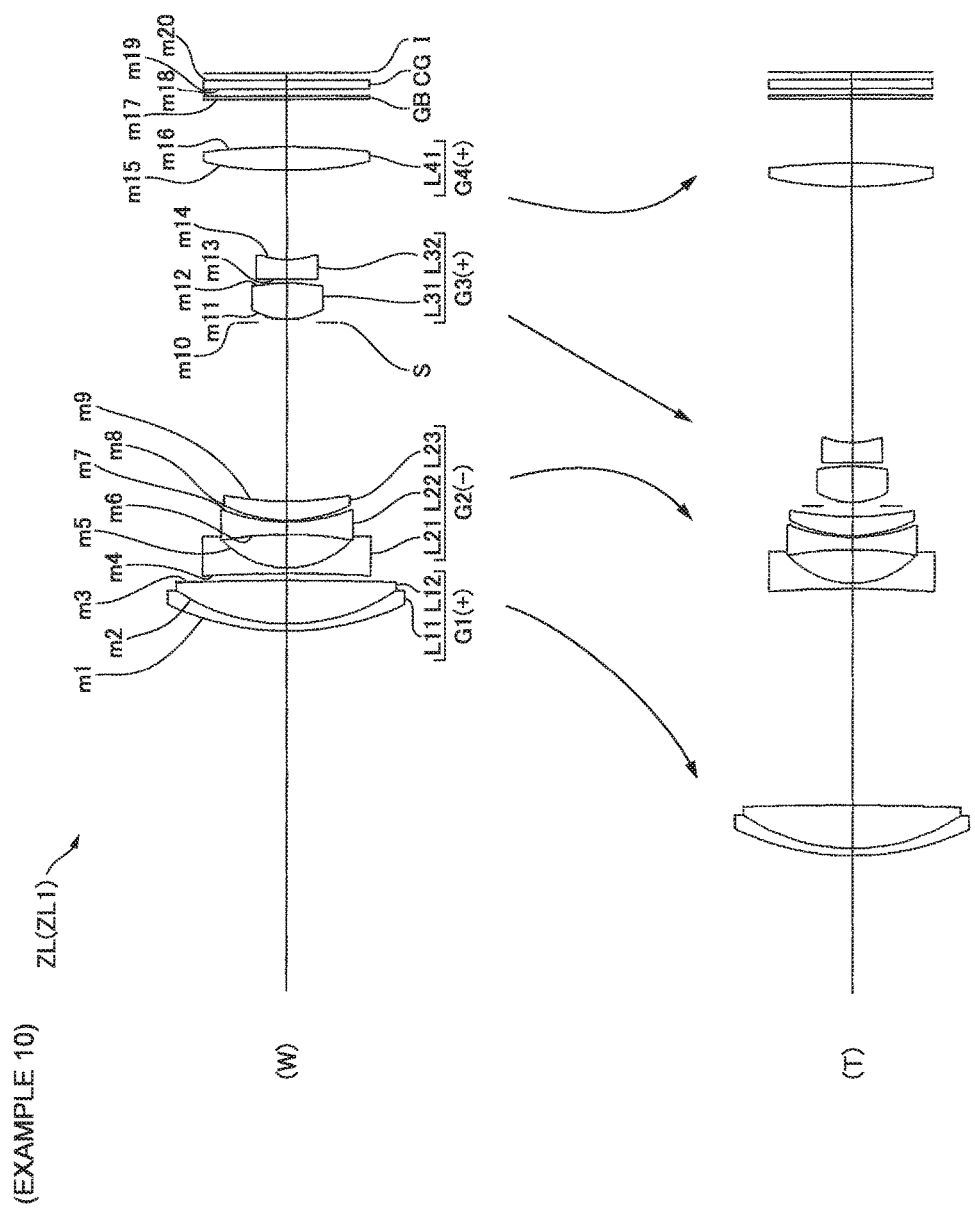

[FIG.31]
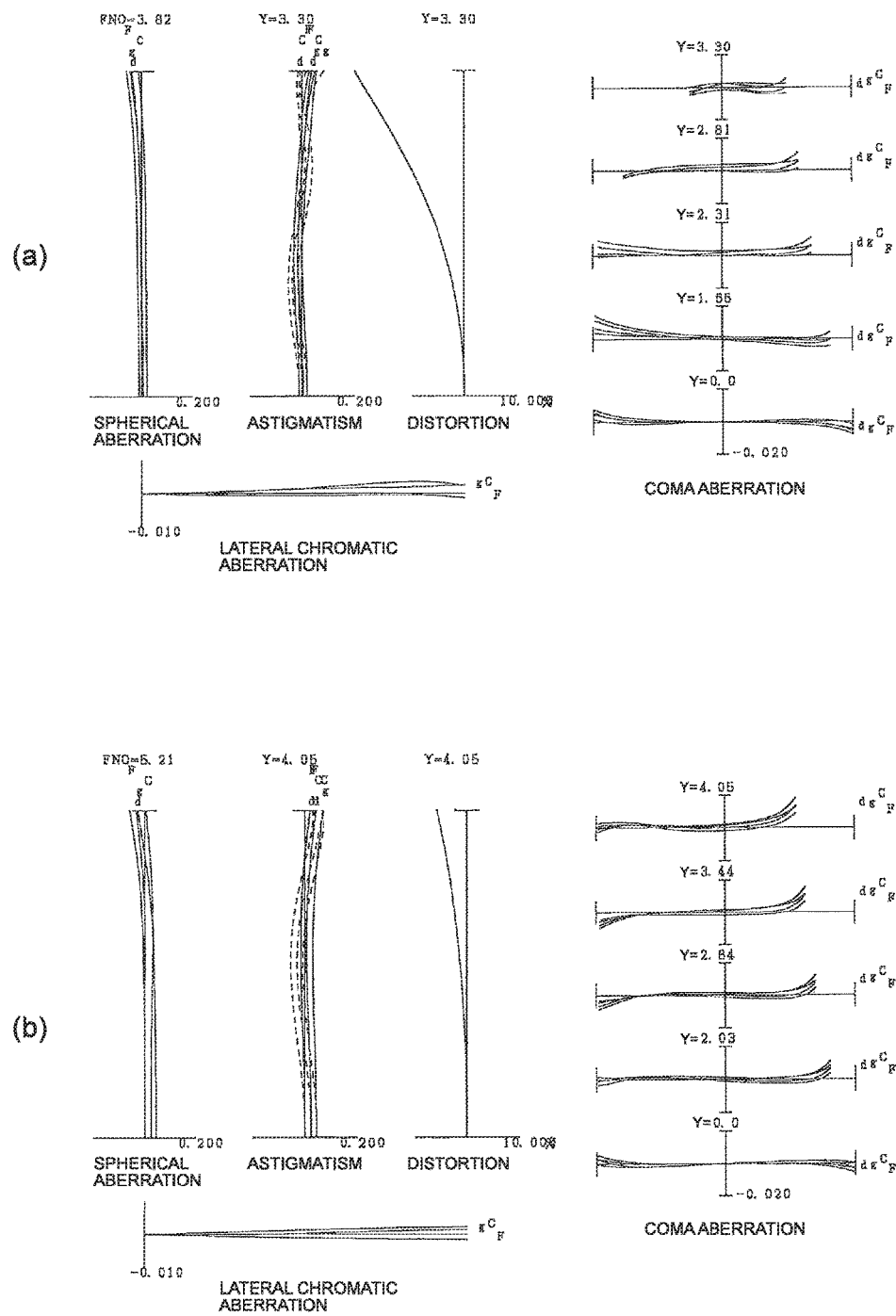

[FIG.32]
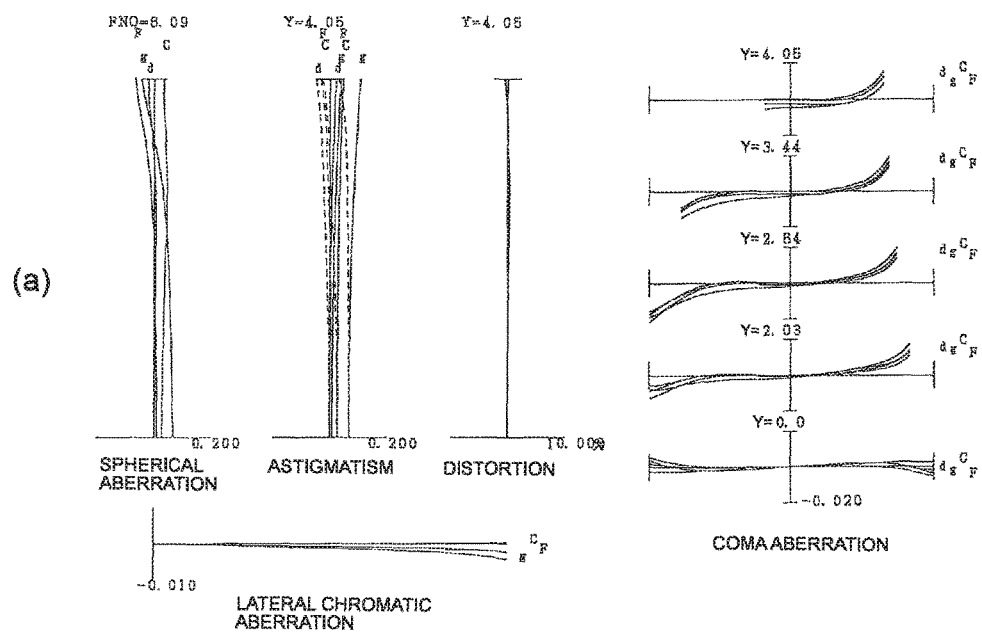
(a)
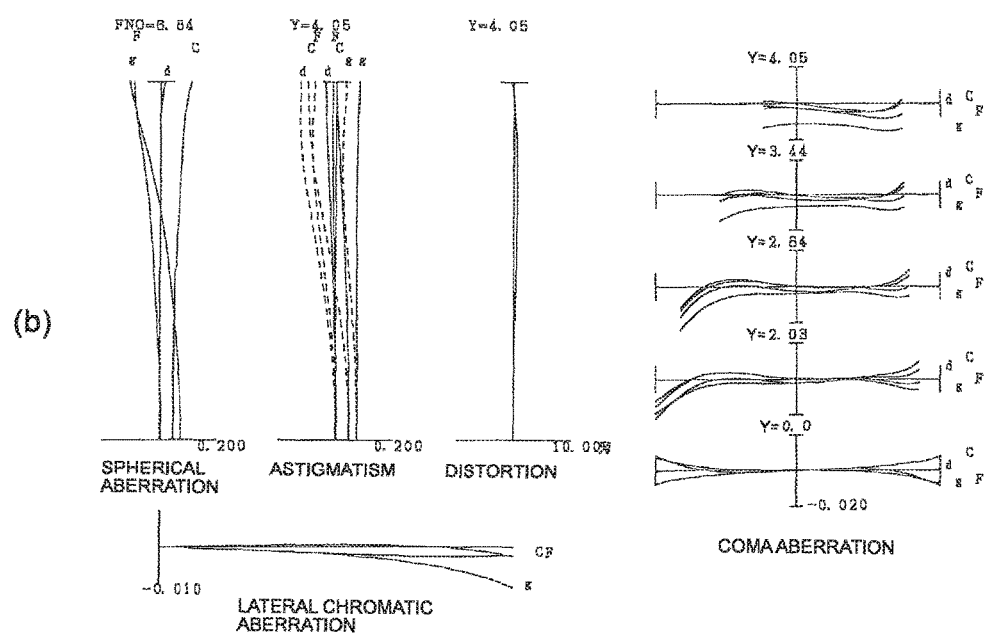
(b)

[FIG.33]
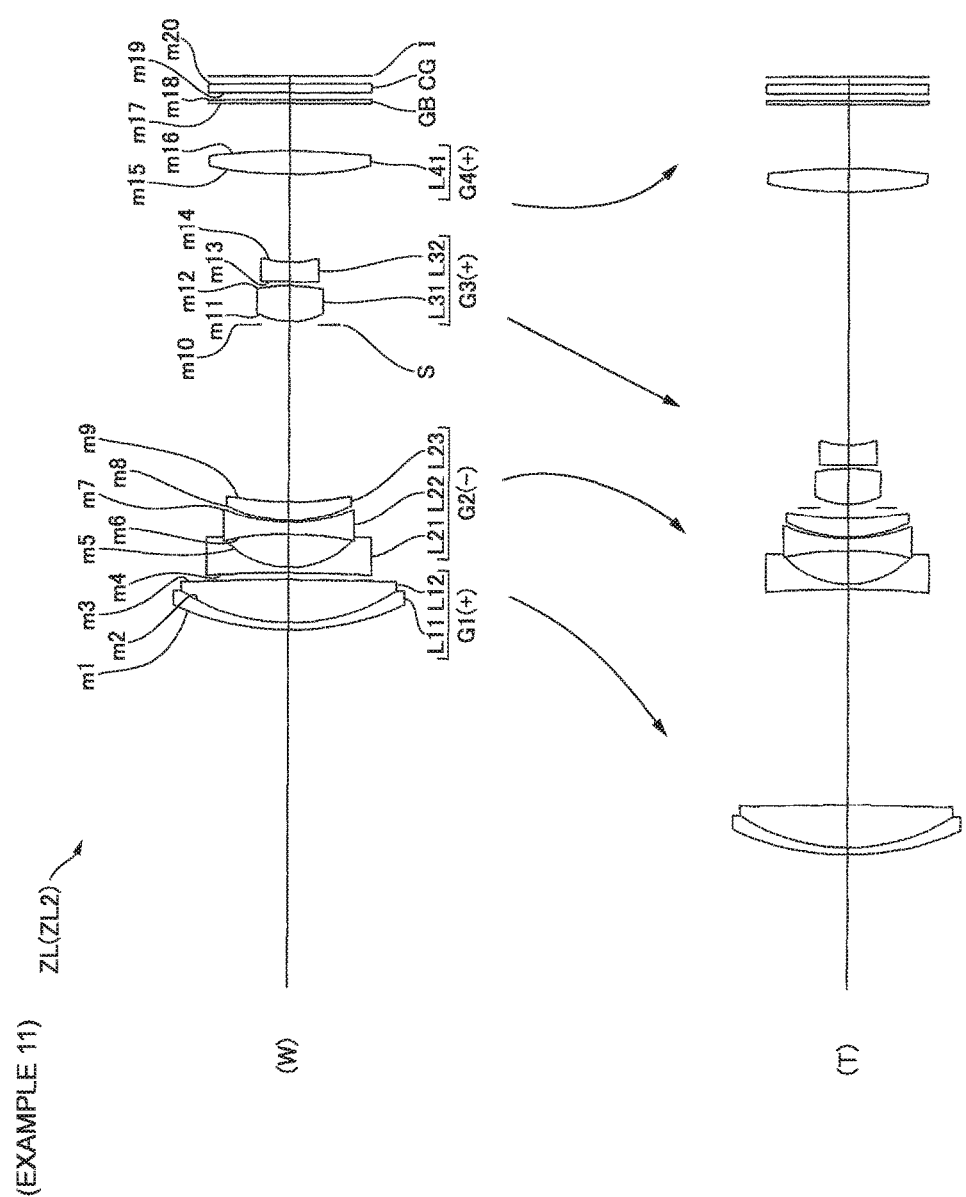

[FIG.34]
(a) 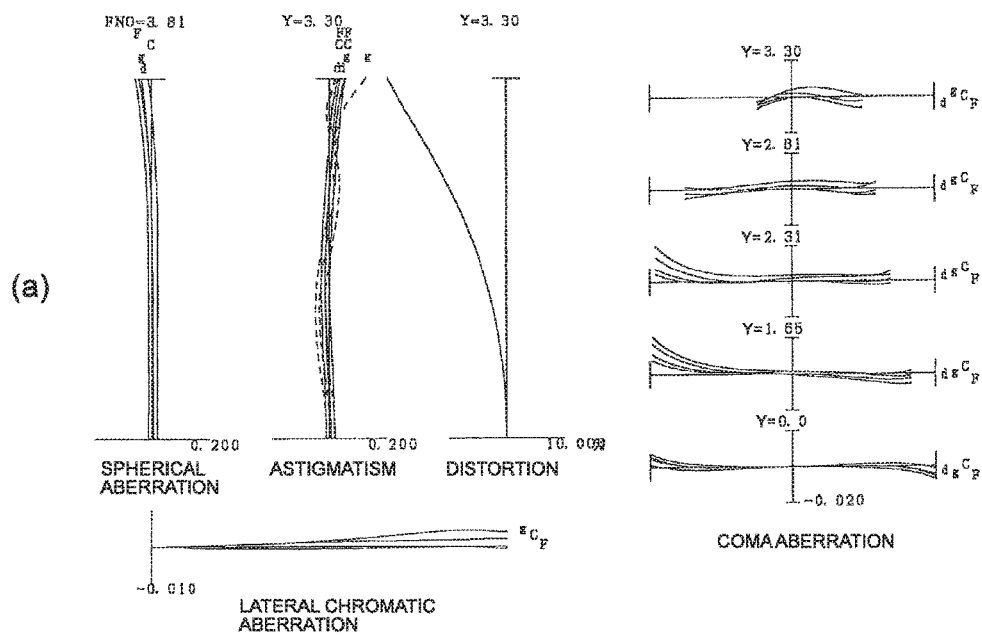
(b) 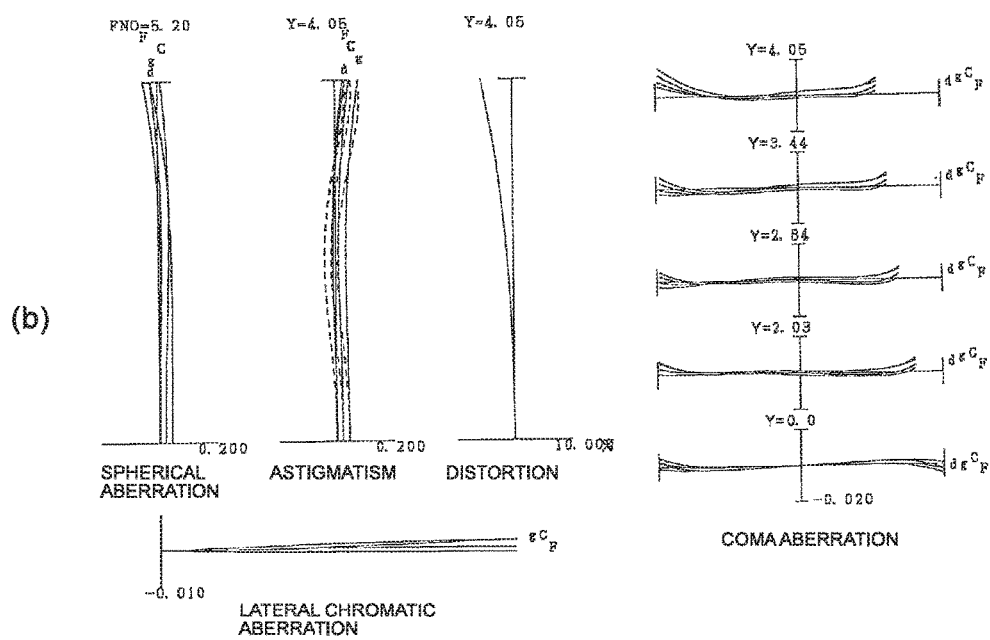

[FIG.35]
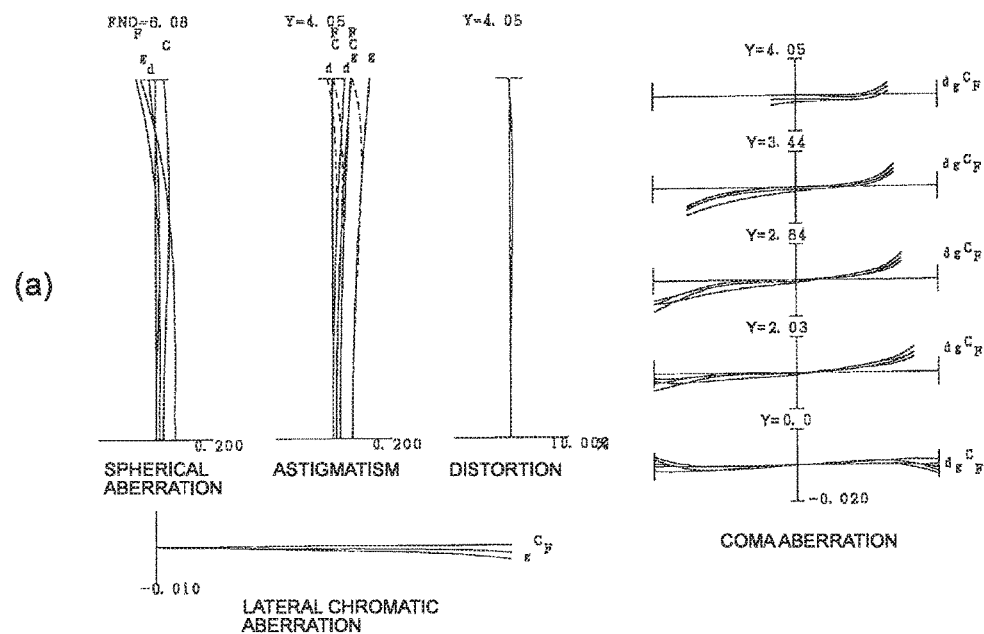
(a)
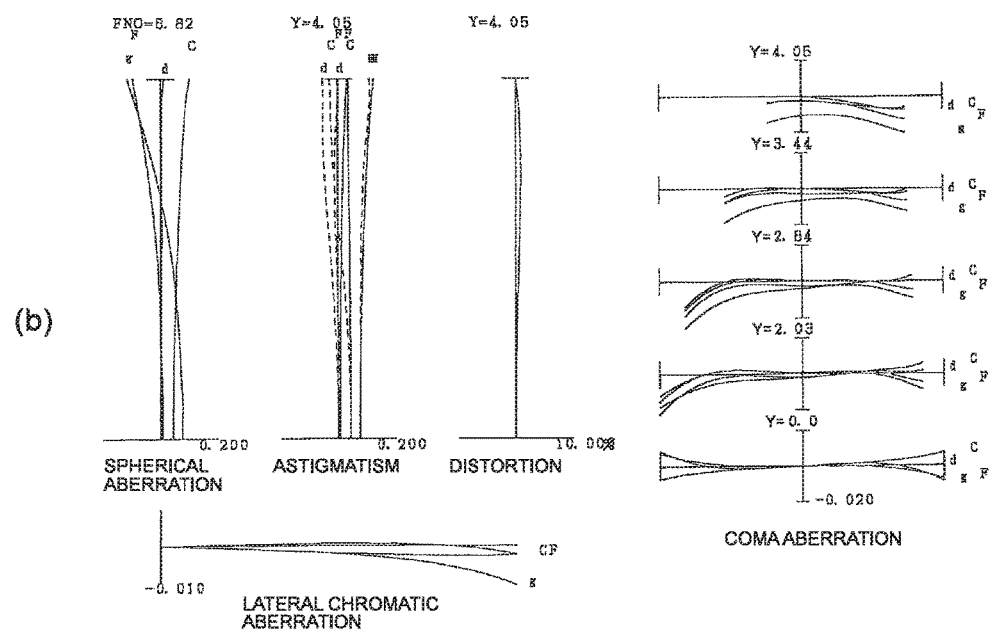
(b)

[FIG.36]
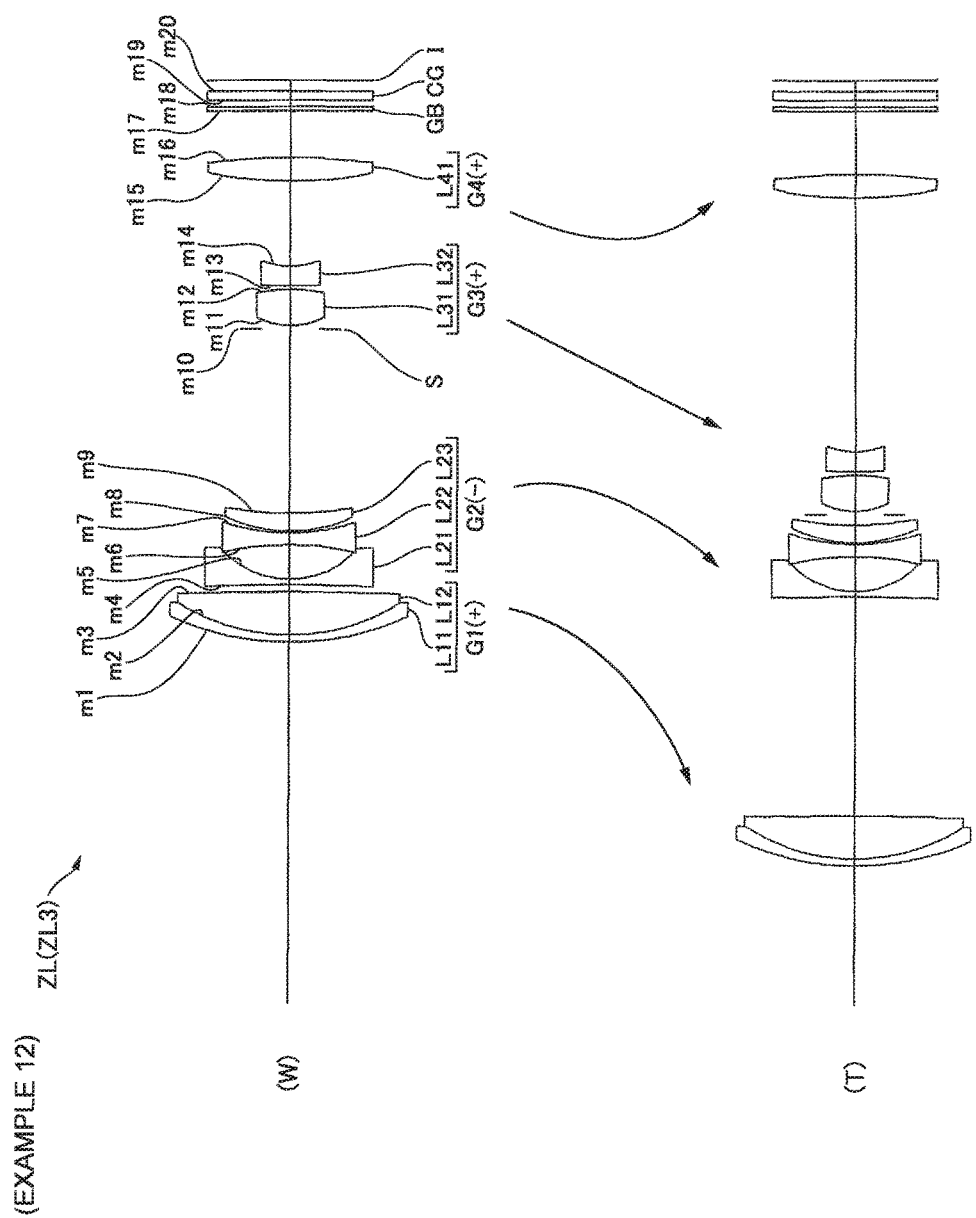

[FIG.37]
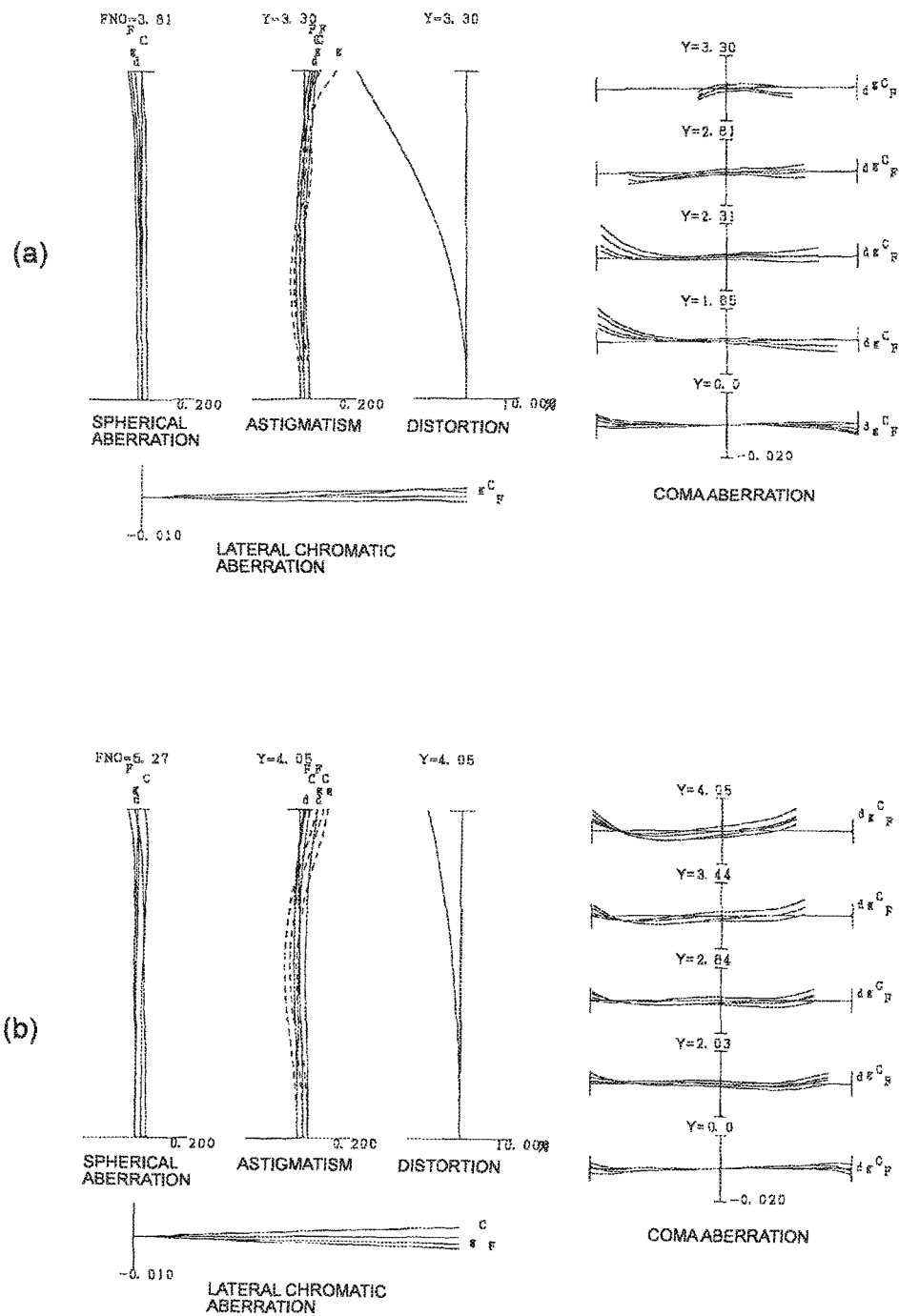

[FIG.38]
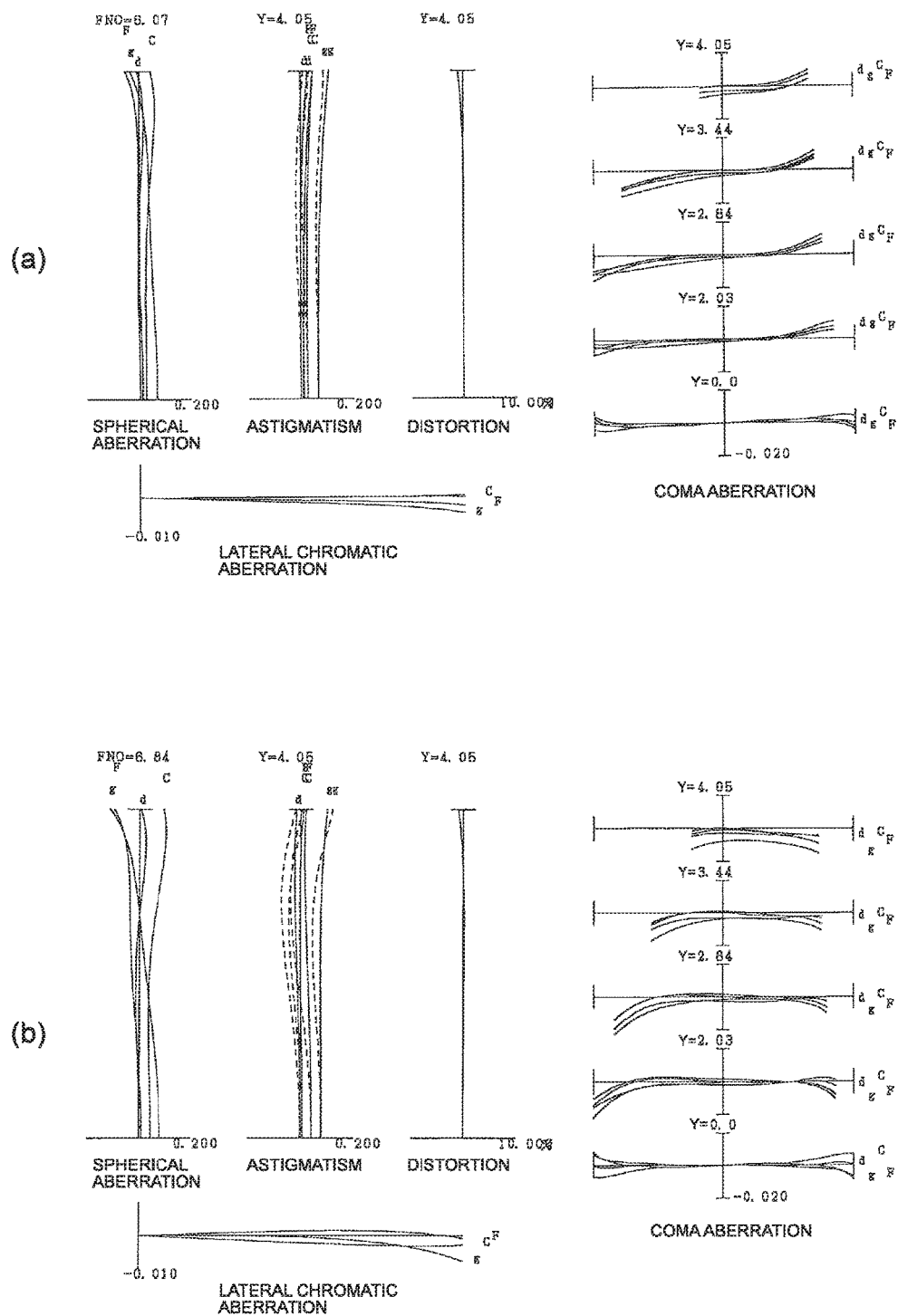

[FIG.39]
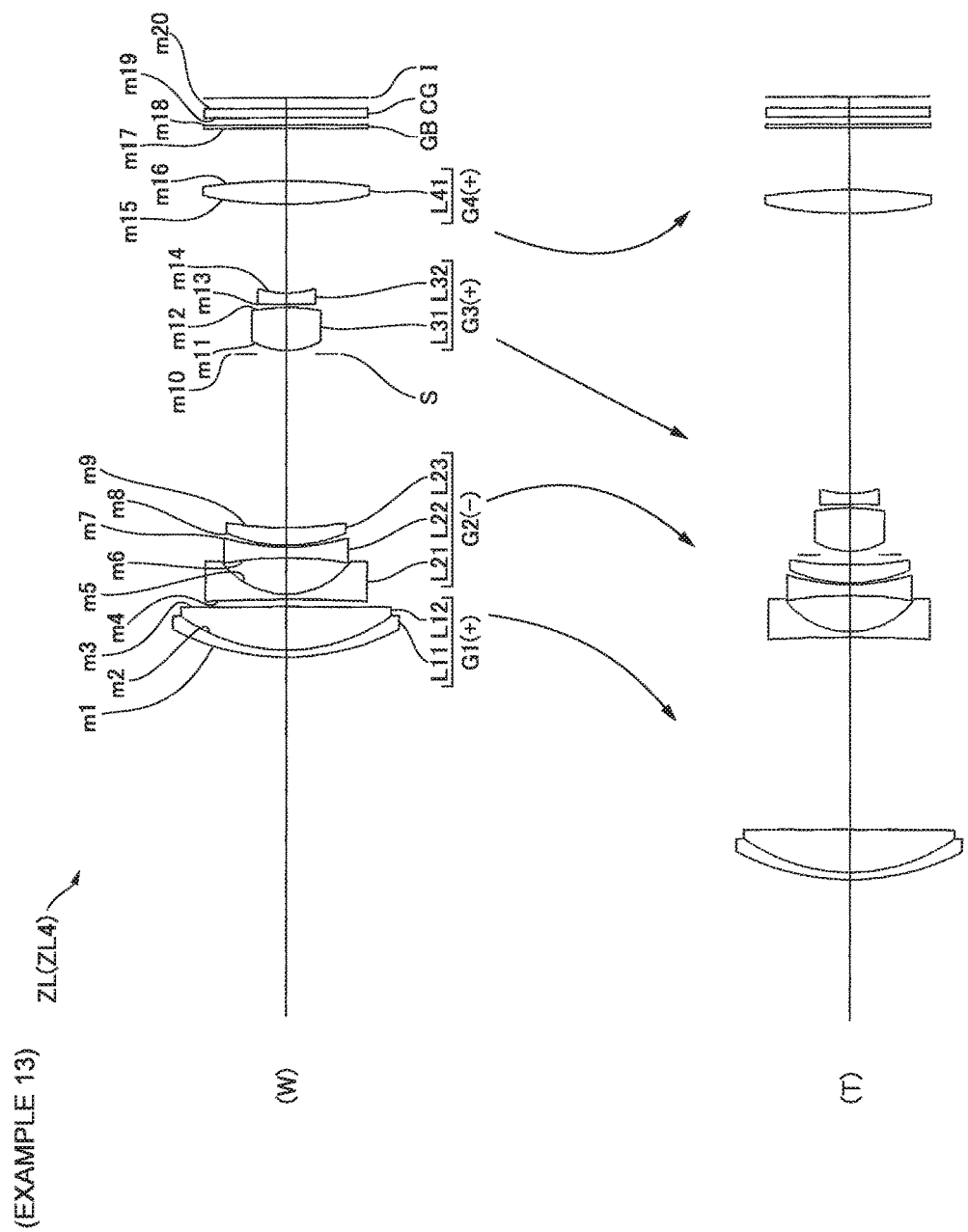

[FIG.40]
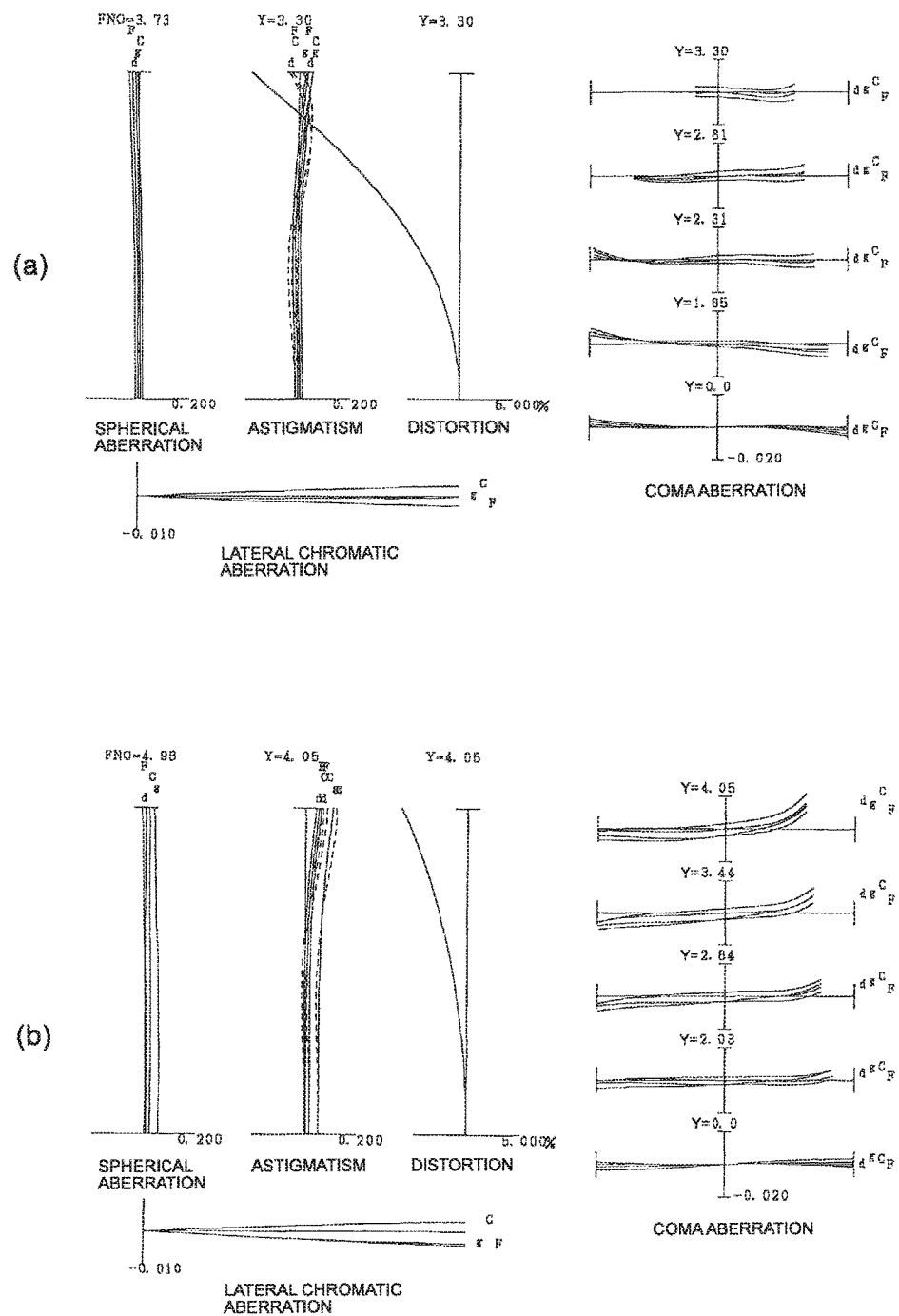

[FIG.41]
(a)
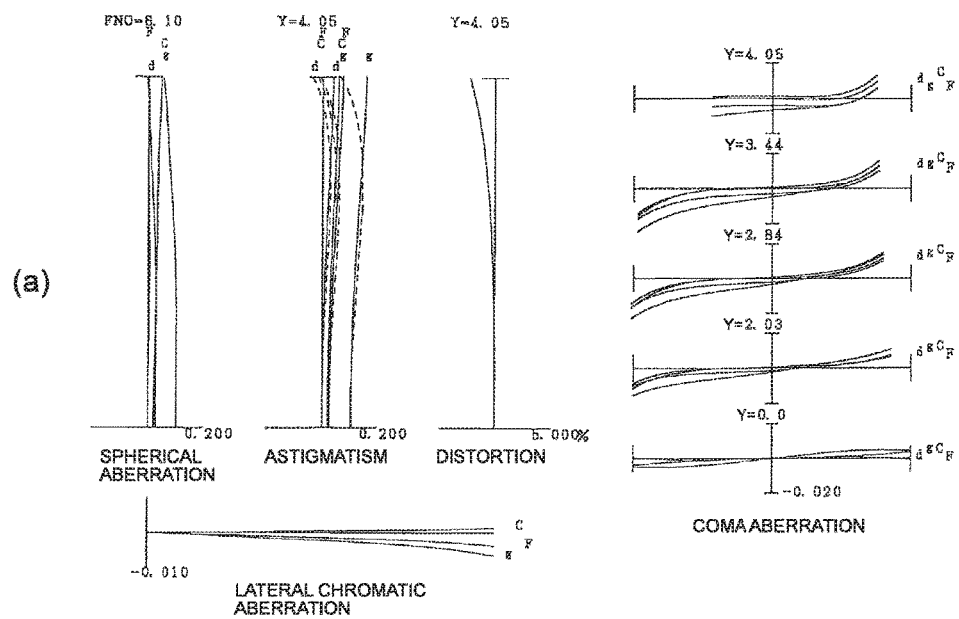
(b)
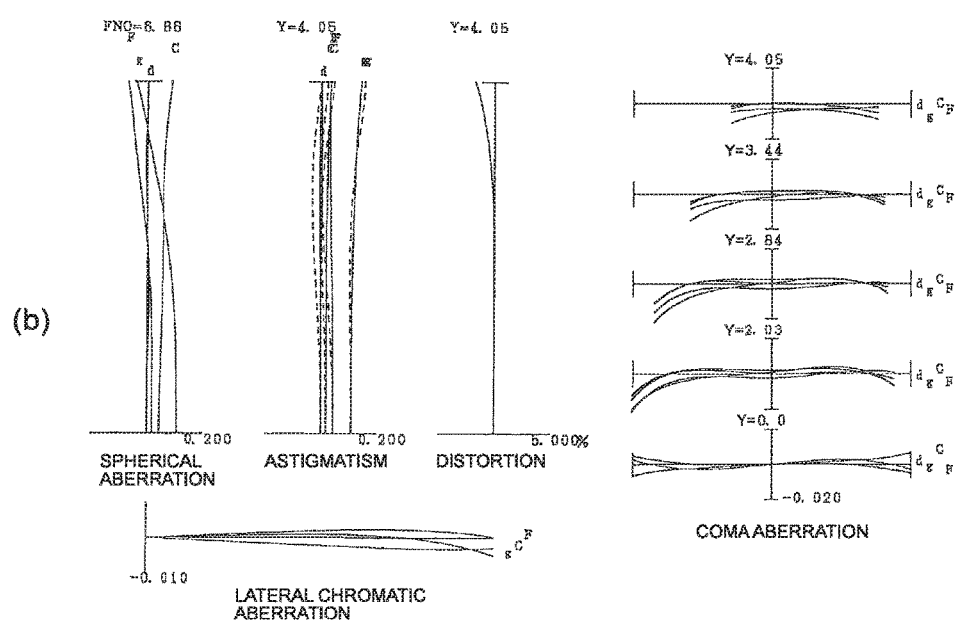

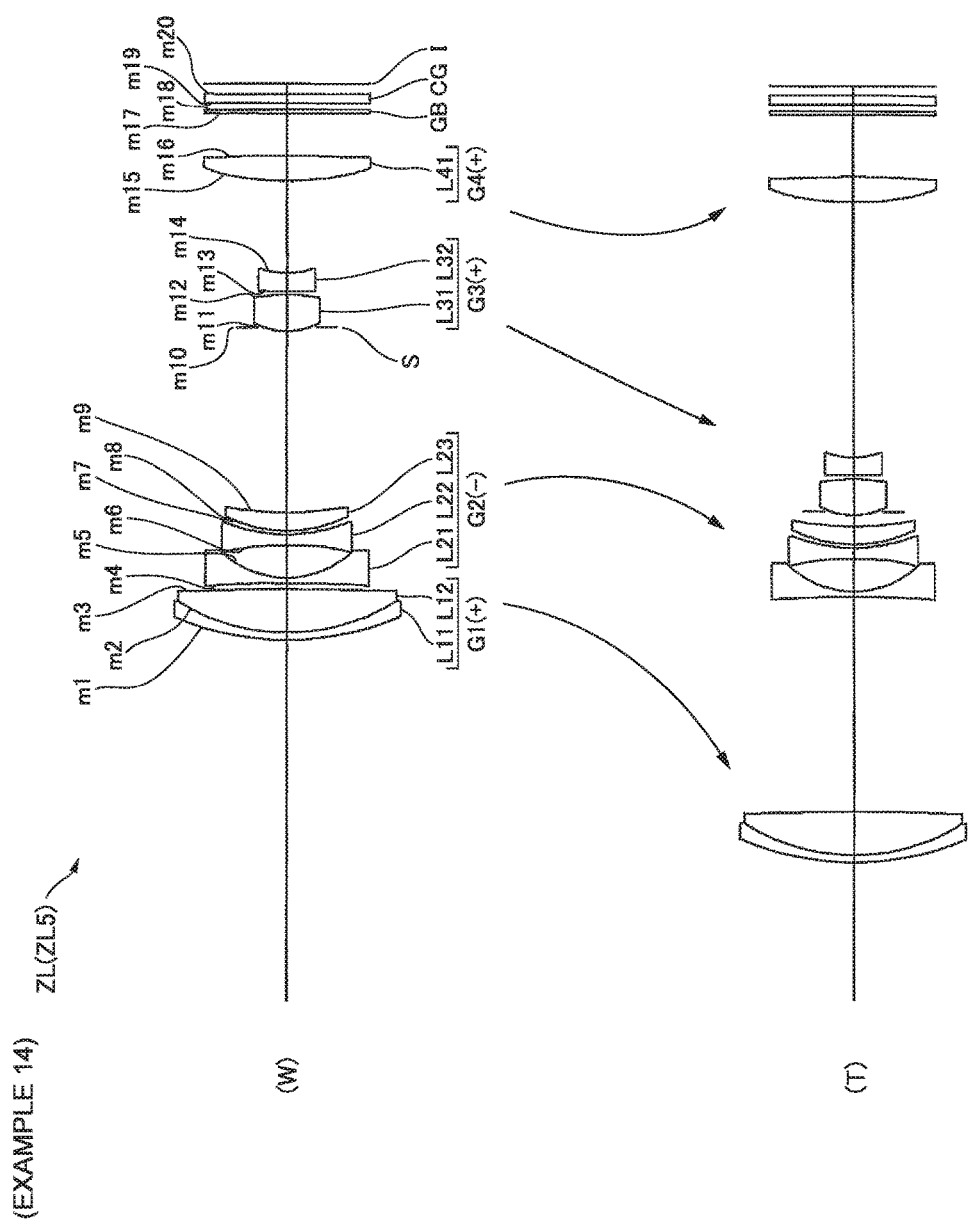
[FIG.42]

[FIG.43]
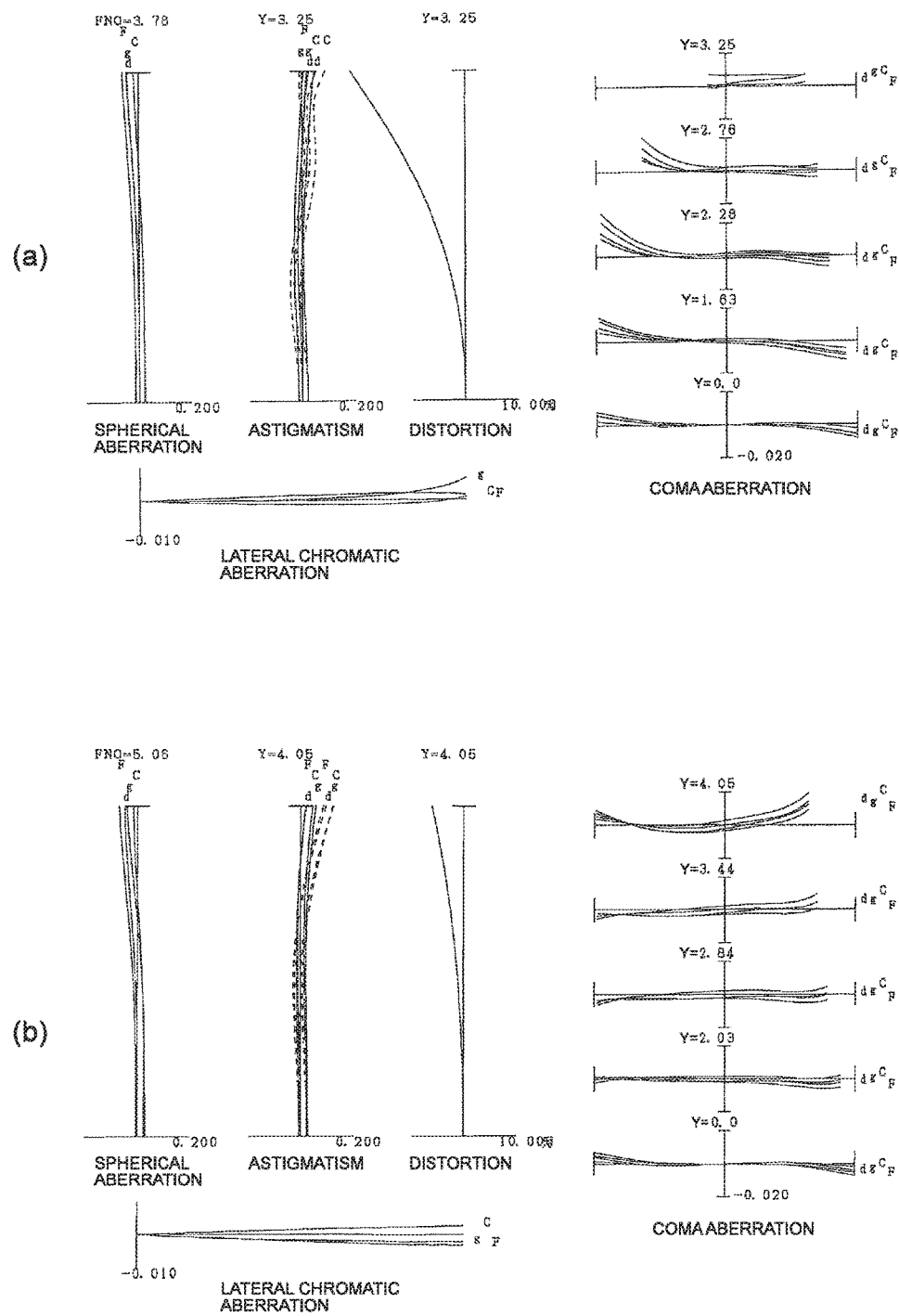

[FIG.44]
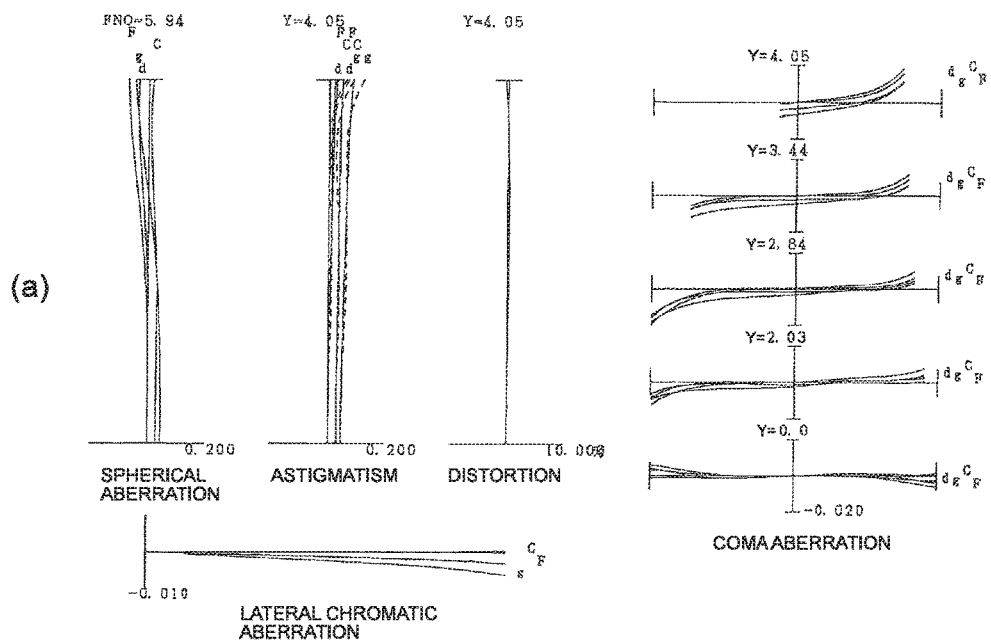
(a)
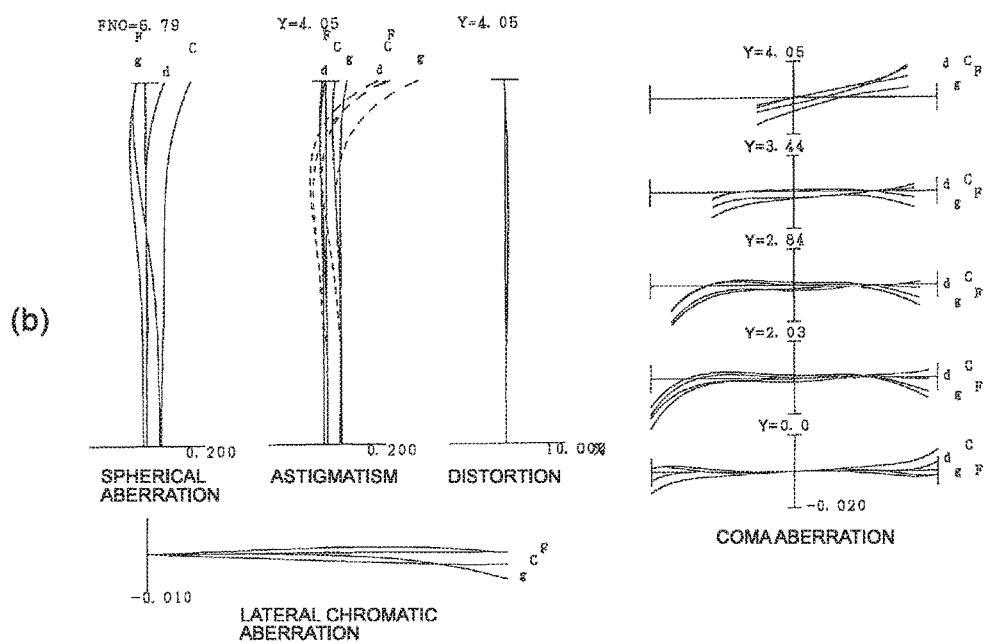
(b)

[FIG.45]
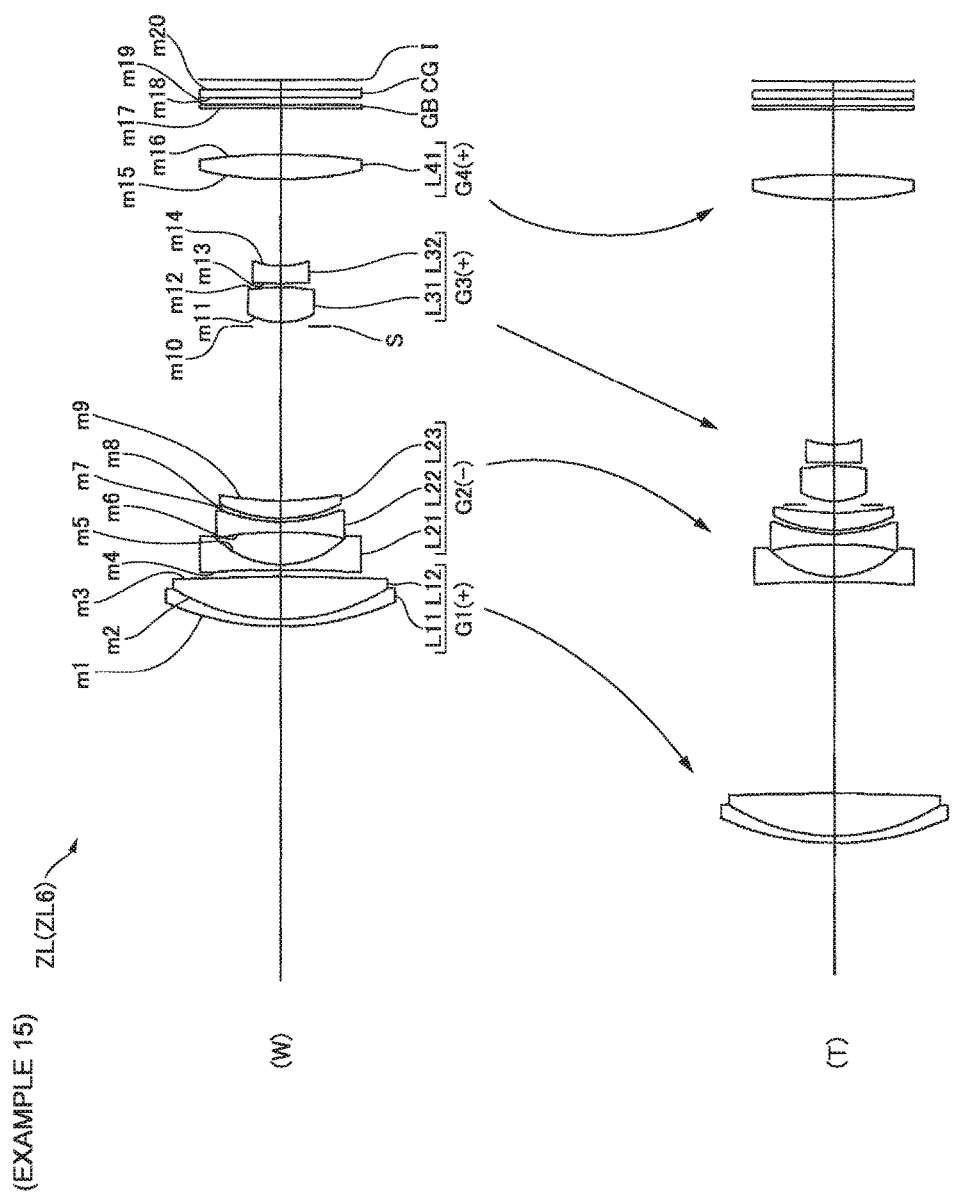

[FIG.46]
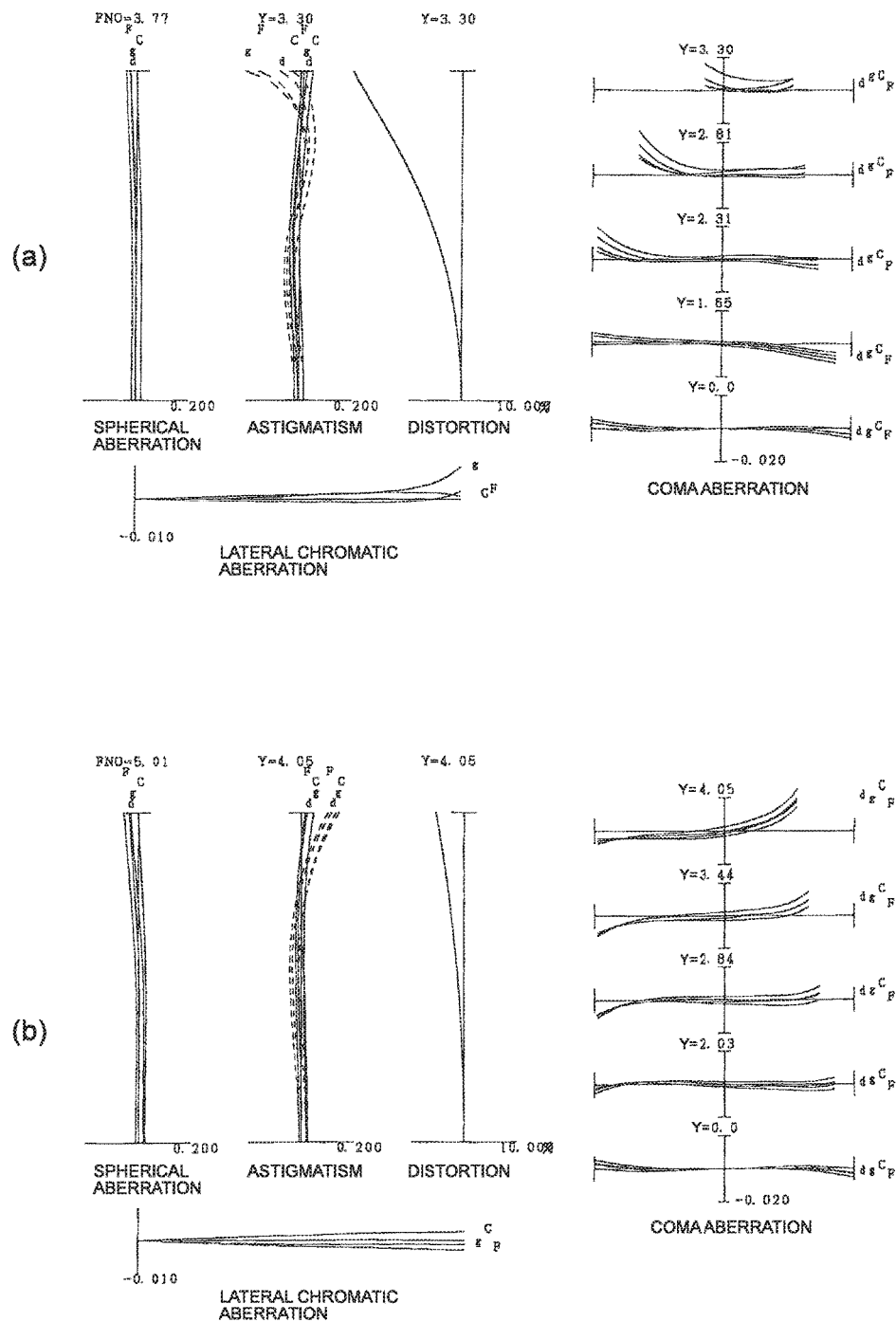

[FIG.47]
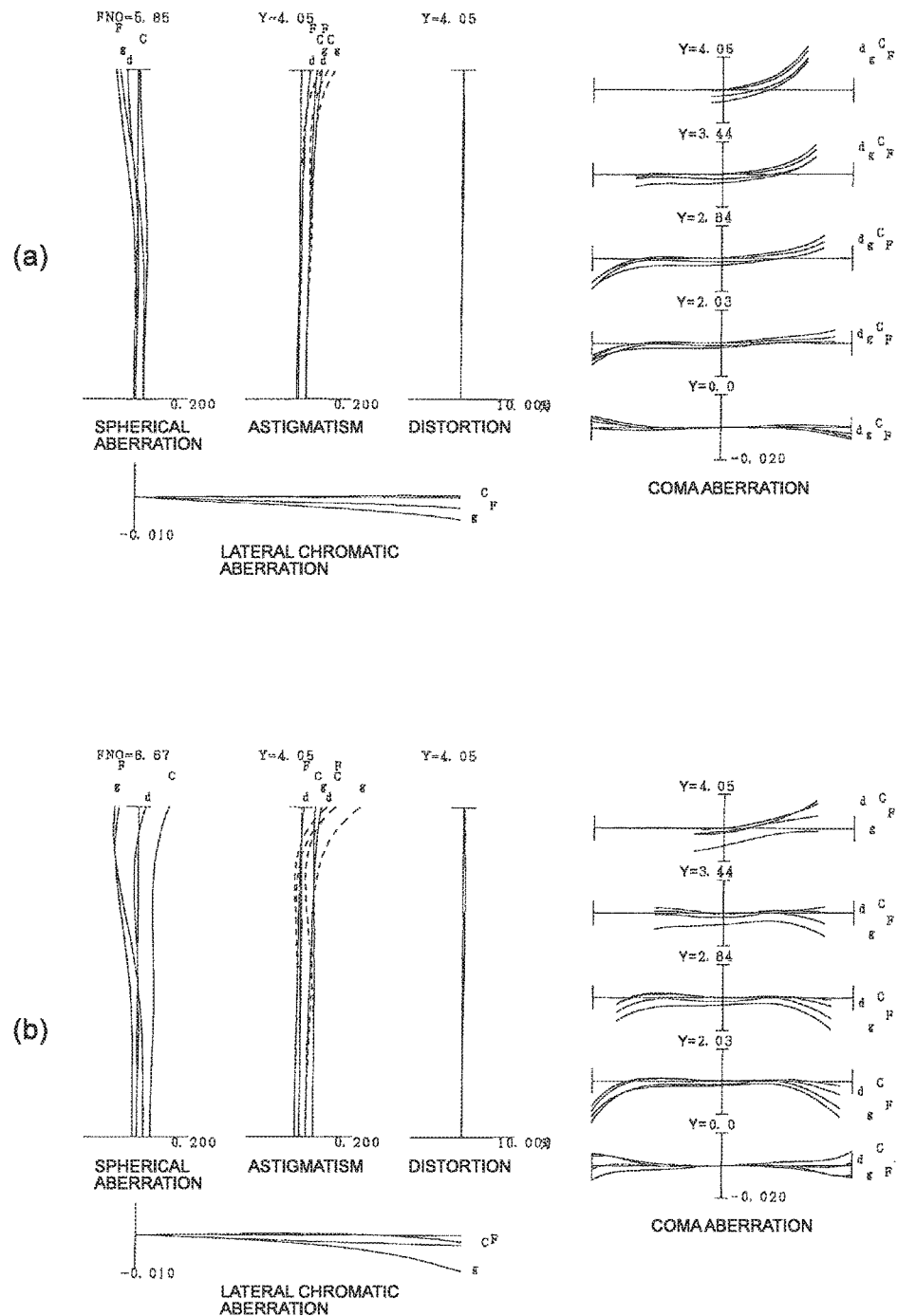

[FIG.48]
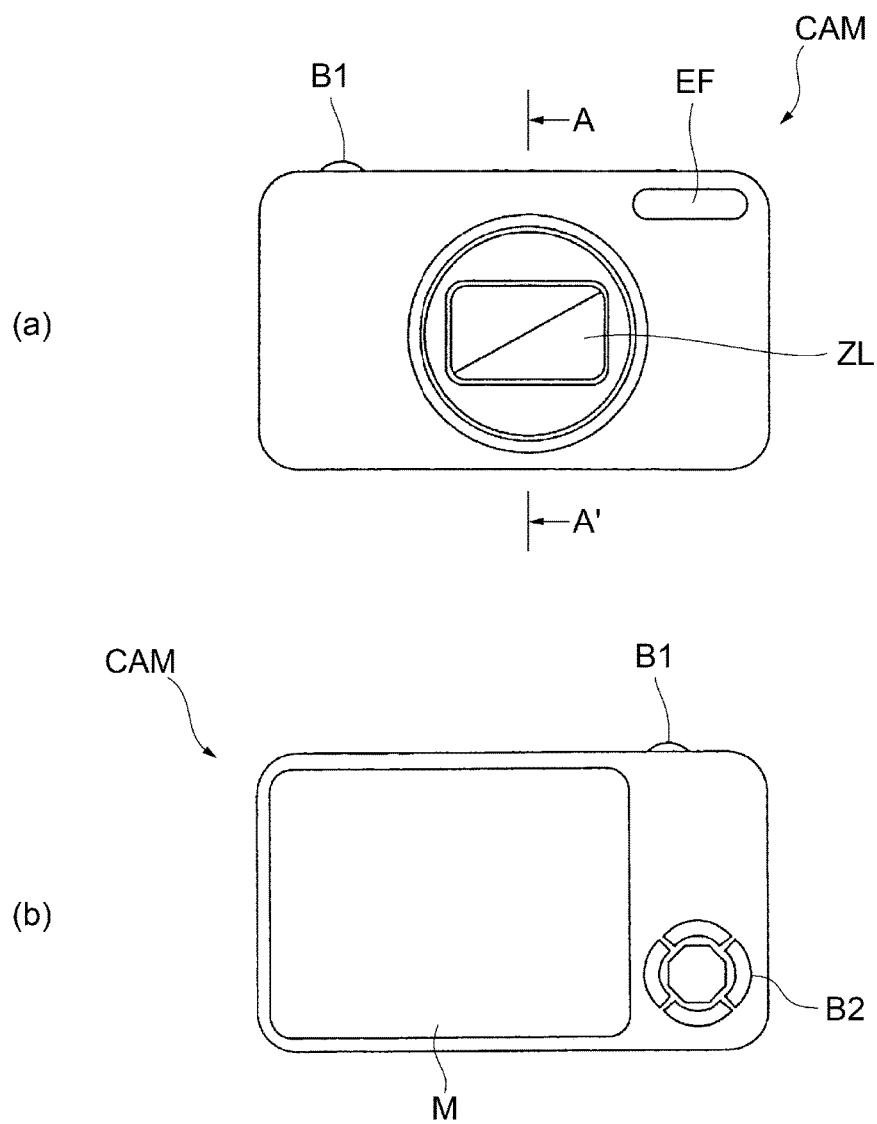

[FIG.49]
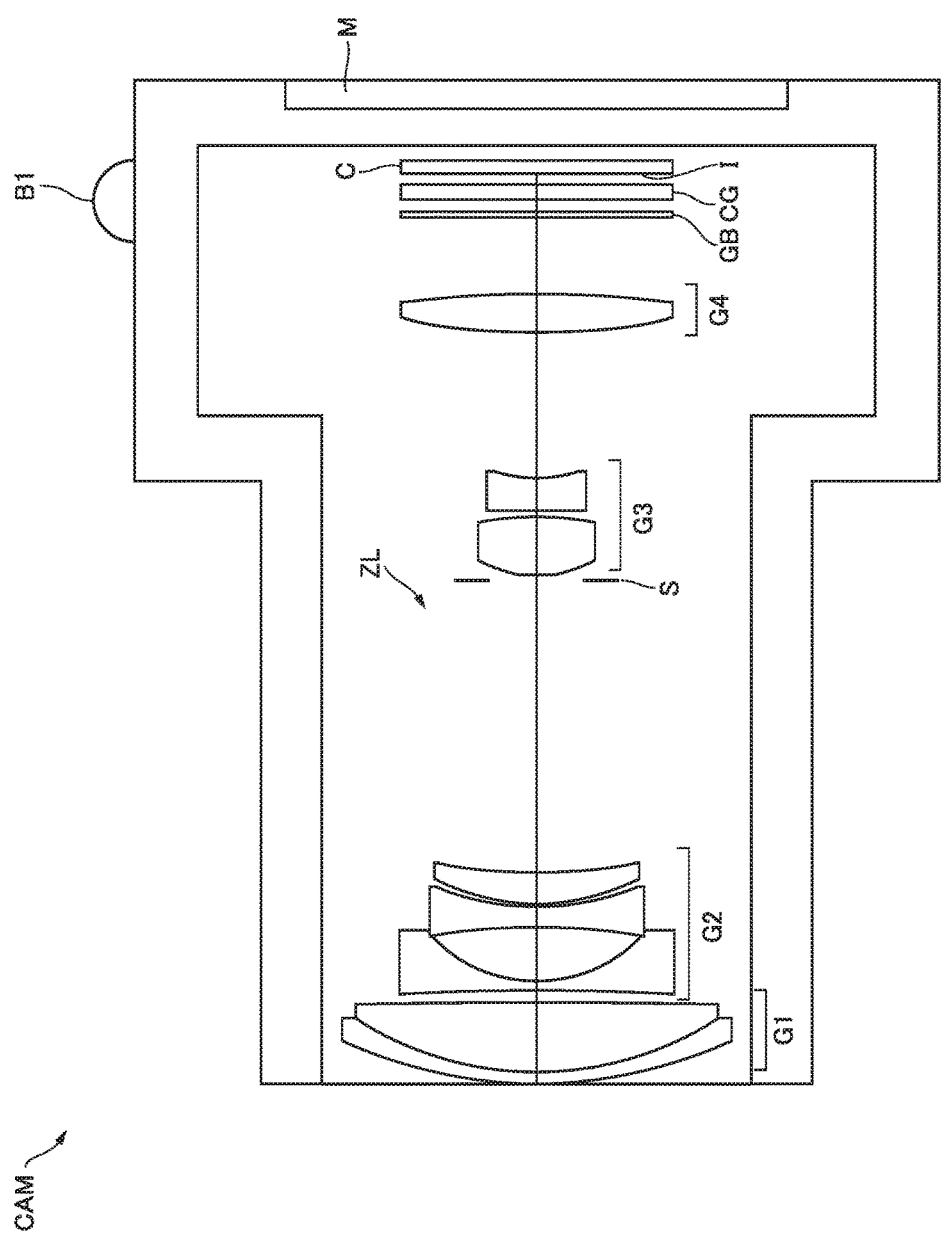

[FIG.50]
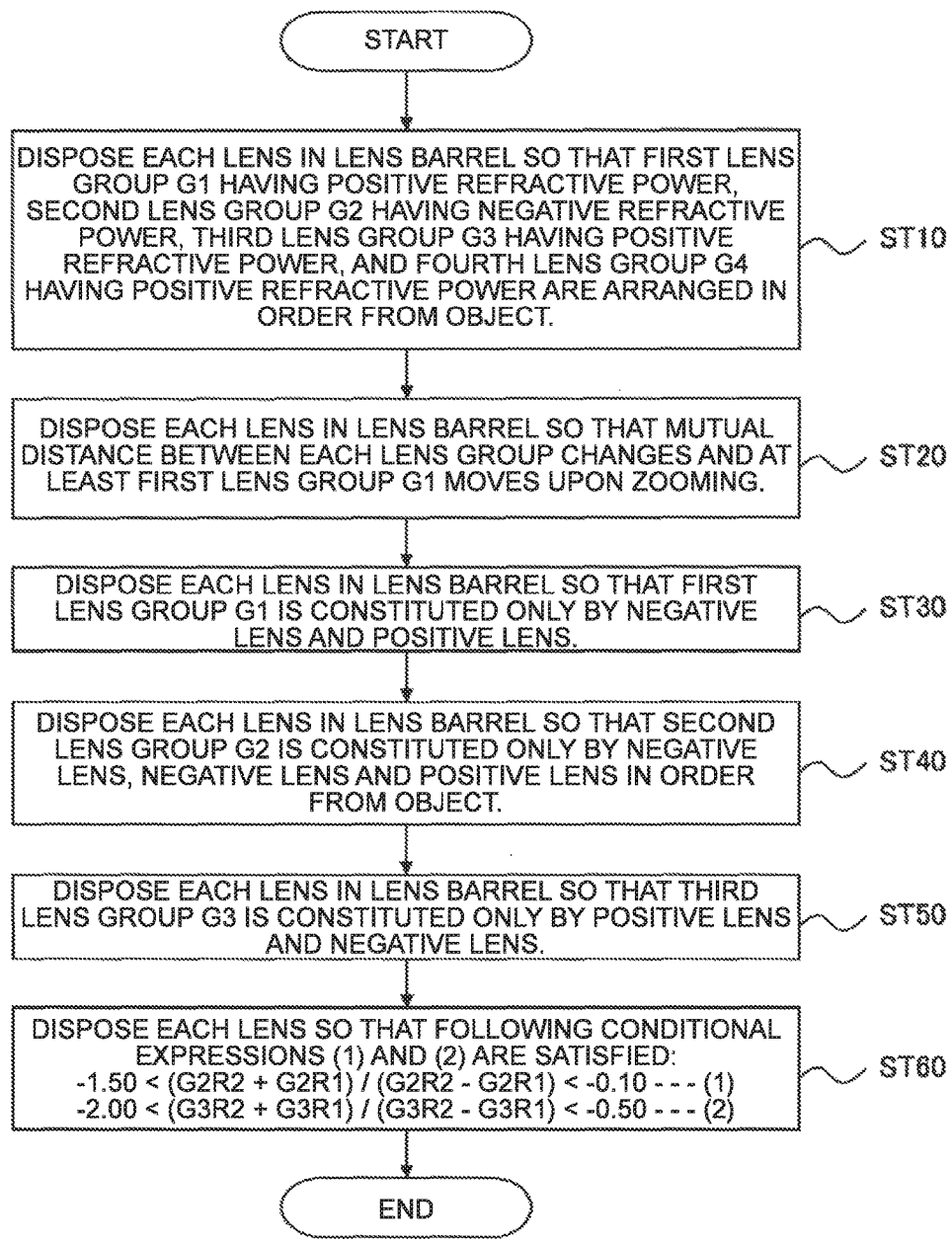

ZOOM LENS, OPTICAL APPARATUS AND METHOD FOR MANUFACTURING THE ZOOM LENS

TECHNICAL FIELD

The present invention relates to a zoom lens, an optical apparatus and a method for manufacturing the zoom lens.

TECHNICAL BACKGROUND

In recent years, zoom lenses having high variable power have been proposed (e.g. see Patent Document 1). High magnification zoom lenses will be demanded for digital cameras in future (e.g. see Patent Document 2) as well.

PRIOR ART LIST

Patent Document

Patent Document 1: Japanese Laid-Open Patent Publication No. 2012-113296(A)
Patent Document 2: Japanese Laid-Open Patent Publication No. 2012-093761(A)

SUMMARY OF THE INVENTION

Problems to be Solved by the Invention

In the case of zoom lenses, further downsizing of conventional zoom lenses is expected. Another problem is that the optical performance of conventional zoom lenses is insufficient.

With the foregoing in view, it is an object of the present invention to provide a compact zoom lens having high variable power, an optical apparatus including the zoom lens, and a method for manufacturing the zoom lens.

It is another object of the present invention to provide a zoom lens having high optical performance, an optical apparatus including the zoom lens, and a method for manufacturing the zoom lens.

Means to Solve the Problems

A zoom lens according to a first aspect of the invention has, in order from an object: a first lens group having positive refractive power; a second lens group having negative refractive power; a third lens group having positive refractive power; and a fourth lens group having positive refractive power. Upon zooming from a wide-angle end state to a telephoto end state, a distance between the first lens group and the second lens group changes, a distance between the second lens group and the third lens group changes, a distance between the third lens group and the fourth lens group changes, and at least the first lens group moves. The first lens group is constituted by a set of cemented lenses, the third lens group is constituted by, in order from the object, a positive lens and a negative lens, and the following conditional expression being satisfied:

$$0.50 < TL/ft < 1.28$$

where TL denotes a total length of the zoom lens in the telephoto end state, and ft denotes a focal length of the zoom lens in the telephoto end state.

In the zoom lens according to the first aspect of the invention, it is preferable that the following conditional expressions are satisfied:

$$0.1 < fG1/fG4 < 1.0$$

$$10.0 < ft/dG1 < 16.0$$

where fG1 denotes a focal length of the first lens group, fG4 denotes a focal length of the fourth lens group, ft denotes a focal length of the zoom lens in the telephoto end state, and dG1 denotes a thickness of the first lens group on the optical axis.

In the zoom lens according to the first aspect of the invention, it is preferable that the first lens group is constituted by, in order from the object, a lens having negative refractive power and a lens having positive refractive power, the second lens group is constituted by, in order from the object, a lens having negative refractive power, a lens having negative refractive power, and a lens having positive refractive power, and the following conditional expressions are satisfied:

$$0.050 < \Sigma D2/ft < 0.115$$

$$4.3 < f4/fw < 6.8$$

where $\Sigma D2$ denotes a distance on the optical axis from a lens surface closest to the object to a lens surface closest to an image in the second lens group, ft denotes a focal length of the zoom lens in the telephoto end state, fw denotes a focal length of the zoom lens in the wide-angle end state, and f4 denotes a focal length of the fourth lens group.

In the zoom lens according to the first aspect of the invention, it is preferable that the first lens group is constituted by, in order from the object, a lens having negative refractive power and a lens having positive refractive power, and the following conditional expressions are satisfied:

$$-0.25 < M2/fw < 1.10$$

$$3.0 < fL2/fw < 4.5$$

where M2 denotes a moving distance of the second lens group upon zooming from the wide-angle end state to the telephoto end state (where a direction toward an image plane is positive), fw denotes a focal length of the zoom lens in the wide-angle end state, and fL2 denotes a focal length of the lens having positive refractive power included in the first lens group.

In the zoom lens according to the first aspect of the invention, it is preferable that the first lens group is constituted by a negative lens and a positive lens, the second lens group is constituted by, in order from the object, a negative lens, a negative lens and a positive lens, the third lens group is constituted by a positive lens and a negative lens, and the following conditional expressions are satisfied:

$$-1.50 < (G2R2+G2R1)/(G2R2-G2R1) < -0.10$$

$$-2.00 < (G3R2+G3R1)/(G3R2-G3R1) < -0.50$$

where G2R1 denotes a radius of curvature of an object side lens surface of the negative lens disposed on an image side of the second lens group, G2R2 denotes a radius of curvature of an image side lens surface of the negative lens disposed on the image side of the second lens group, G3R1 denotes a radius of curvature of an object side lens surface of the negative lens of the third lens group, and G3R2 denotes a radius of curvature of an image side lens surface of the negative lens of the third lens group.

In the zoom lens according to the first aspect of the invention, it is preferable that upon zooming from the wide-angle end state to the telephoto end state, the second lens group moves to an image side first, and then moves to an object side.

In the zoom lens according to the first aspect of the invention, it is preferable that upon zooming from the wide-angle end state to the telephoto end state, the fourth lens group moves to an object side first, and then moves to an image side.

In the zoom lens according to the first aspect of the invention, it is preferable that the following conditional expression is satisfied:

$$1.00 < fG1/(fw \cdot ft)^{1/2} < 2.10$$

where fG1 denotes a focal length of the first lens group, and fw denotes a focal length of the zoom lens in the wide-angle end state.

In the zoom lens according to the first aspect of the invention, it is preferable that the second lens group is constituted by a negative lens, a negative lens and a positive lens.

In the zoom lens according to the first aspect of the invention, it is preferable that the fourth lens group is constituted by one positive lens.

In the zoom lens according to the first aspect of the invention, it is preferable that the third lens group includes at least one aspherical lens.

In the zoom lens according to the first aspect of the invention, it is preferable that the second lens group includes at least one aspherical lens.

In the zoom lens according to the first aspect of the invention, it is preferable that the fourth lens group includes at least one aspherical lens.

In the zoom lens according to the first aspect of the invention, it is preferable that the first lens group includes at least one aspherical lens.

A zoom lens according to a second aspect of the invention has, in order from an object: a first lens group having positive refractive power; a second lens group having negative refractive power; a third lens group having positive refractive power; and a fourth lens group having positive refractive power. Upon zooming from a wide-angle end state to a telephoto end state, a distance between the first lens group and the second lens group changes, a distance between the second lens group and the third lens group changes, a distance between the third lens group and the fourth lens group changes, and at least the first lens group moves, and the following conditional expressions are satisfied:

$$0.1 < fG1/fG4 < 1.0$$

$$10.0 < ft/dG1 < 16.0$$

where fG1 denotes a focal length of the first lens group, fG4 denotes a focal length of the fourth lens group, ft denotes a focal length of the zoom lens in the telephoto end state, and dG1 denotes a thickness of the first lens group on the optical axis.

In the zoom lens according to the second aspect of the invention, it is preferable that the first lens group is constituted by, in order from the object, a lens having negative refractive power and a lens having positive refractive power, the second lens group is constituted by, in order from the object, a lens having negative refractive power, a lens having negative refractive power, and a lens having positive refractive power, and the following conditional expressions are satisfied:

$$0.050 < \Sigma D2/ft < 0.115$$

$$4.3 < f4/fw < 6.8$$

where $\Sigma D2$ denotes a distance on the optical axis from a lens surface closest to the object to a lens surface closest to an image in the second lens group, ft denotes a focal length of the zoom lens in the telephoto end state, fw denotes a focal length of the zoom lens in the wide-angle end state, and f4 denotes a focal length of the fourth lens group.

In the zoom lens according to the second aspect of the invention, it is preferable that the first lens group is constituted by, in order from the object, a lens having negative refractive power and a lens having positive refractive power, and the following conditional expressions are satisfied:

$$-0.25 < M2/fw < 1.10$$

$$3.0 < fL2/fw < 4.5$$

where M2 denotes a moving distance of the second lens group upon zooming from the wide-angle end state to the telephoto end state (where a direction toward an image plane is positive), fw denotes a focal length of the zoom lens in the wide-angle end state, and fL2 denotes a focal length of the lens having positive refractive power included in the first lens group.

In the zoom lens according to the second aspect of the invention, it is preferable that the first lens group is constituted by a negative lens and a positive lens, the second lens group is constituted by, in order from the object, a negative lens, a negative lens and a positive lens, the third lens group is constituted by a positive lens and a negative lens, and the following conditional expressions are satisfied:

$$-1.50 < (G2R2+G2R1)/(G2R2-G2R1) < -0.10$$

$$-2.00 < (G3R2+G3R1)/(G3R2-G3R1) < -0.50$$

where G2R1 denotes a radius of curvature of an object side lens surface of the negative lens disposed on an image side of the second lens group, G2R2 denotes a radius of curvature of an image side lens surface of the negative lens disposed on the image side of the second lens group, G3R1 denotes a radius of curvature of an object side lens surface of the negative lens of the third lens group, and G3R2 denotes a radius of curvature of an image side lens surface of the negative lens of the third lens group.

In the zoom lens according to the second aspect of the invention, it is preferable that the first lens group is constituted by a negative lens and a positive lens.

In the zoom lens according to the second aspect of the invention, it is preferable that the third lens group is constituted by, in order from the object, a positive lens and a negative lens.

In the zoom lens according to the second aspect of the invention, it is preferable that the second lens group is constituted by a negative lens, a negative lens and a positive lens.

In the zoom lens according to the second aspect of the invention, it is preferable that the fourth lens group is constituted by one positive lens.

In the zoom lens according to the second aspect of the invention, it is preferable that the following conditional expression is satisfied:

$$1.00 < fG1/(fw \cdot ft)^{1/2} < 2.10$$

where fw denotes a focal length of the zoom lens in the wide-angle end state.

In the zoom lens according to the second aspect of the invention, it is preferable that upon zooming from the wide-angle end state to the telephoto end state, the fourth lens group moves to an object side first, and then moves to an image side.

In the zoom lens according to the second aspect of the invention, it is preferable that upon zooming from the wide-angle end state to the telephoto end state, the second lens group moves to an image side first, and then moves to an object side.

In the zoom lens according to the second aspect of the invention, it is preferable that the third lens group includes at least one aspherical lens.

In the zoom lens according to the second aspect of the invention, it is preferable that the second lens group includes at least one aspherical lens.

In the zoom lens according to the second aspect of the invention, it is preferable that the fourth lens group includes at least one aspherical lens.

In the zoom lens according to the second aspect of the invention, it is preferable that the first lens group includes at least one aspherical lens.

A zoom lens according to a third aspect of the invention has, in order from an object: a first lens group having positive refractive power; a second lens group having negative refractive power; a third lens group having positive refractive power; and a fourth lens group having positive refractive power. Upon zooming from a wide-angle end state to a telephoto end state, a distance between the first lens group and the second lens group changes, a distance between the second lens group and the third lens group changes, and a distance between the third lens group and the fourth lens group changes. The first lens group is constituted by, in order from the object, a lens having negative refractive power and a lens having positive refractive power, the second lens group is constituted by, in order from the object, a lens having negative refractive power, a lens having negative refractive power and a lens having positive refractive power, and the following conditional expressions are satisfied:

$$0.050 < \Sigma D2/ft < 0.115$$

$$4.3 < f4/fw < 6.8$$

where $\Sigma D2$ denotes a distance on the optical axis from a lens surface closest to the object to a lens surface closest to an image in the second lens group, ft denotes a focal length of the zoom lens in the telephoto end state, fw denotes a focal length of the zoom lens in the wide-angle end state, and f4 denotes a focal length of the fourth lens group.

In the zoom lens according to the third aspect of the invention, it is preferable that the third lens group is constituted by one single lens having positive refractive power and one single lens having negative refractive power.

In the zoom lens according to the third aspect of the invention, it is preferable that the following conditional expression is satisfied:

$$0.50 < TLt/ft < 1.40$$

where TLt denotes a total length of an optical system in the telephoto end state, and ft denotes a focal length of the zoom lens in the telephoto end state.

In the zoom lens according to the third aspect of the invention, it is preferable that the following conditional expression is satisfied:

$$0.16 < (-f2)/f1 < 0.40$$

where f1 denotes a focal length of the first lens group, and f2 denotes a focal length of the second lens group.

In the zoom lens according to the third aspect of the invention, it is preferable that the following conditional expression is satisfied:

$$0.70 < f4/f1 < 1.40$$

where f1 denotes a focal length of the first lens group, and f4 denotes a focal length of the fourth lens group.

In the zoom lens according to the third aspect of the invention, it is preferable that upon zooming from the wide-angle end state to the telephoto end state, the first lens group, the second lens group, the third lens group, and the fourth lens group move.

In the zoom lens according to the third aspect of the invention, it is preferable that the lens having negative refractive power and the lens having positive refractive power, which constitute the first lens group, are cemented.

In the zoom lens according to the third aspect of the invention, it is preferable that the lens having negative refractive power, the lens having negative refractive power, and the lens having positive refractive power, which constitute the second lens group, are separated from each other by an air distance.

In the zoom lens according to the third aspect of the invention, it is preferable that the fourth lens group is constituted by one single lens having positive refractive power.

In the zoom lens according to the third aspect of the invention, it is preferable that an image side lens surface of the lens having positive refractive power, which constitutes the first lens group, is formed in an aspherical shape.

In the zoom lens according to the third aspect of the invention, it is preferable that at least one of lens surfaces of the lenses having negative refractive power, which constitute the second lens group, is formed in an aspherical shape.

In the zoom lens according to the third aspect of the invention, it is preferable that at least one of surfaces of the lenses, which constitute the third lens group, is formed in an aspherical shape.

In the zoom lens according to the third aspect of the invention, it is preferable that at least one of surfaces of the lenses, which constitute the fourth lens group, is formed in an aspherical shape.

In the zoom lens according to the third aspect of the invention, it is preferable that a medium of the lenses constituting the fourth lens group is plastic resin.

In the zoom lens according to the third aspect of the invention, it is preferable that upon focusing from an object at infinity to an object at a close distance, the fourth lens group moves along the optical axis.

A zoom lens according to a fourth aspect of the invention has, in order from an object, a first lens group having positive refractive power; a second lens group having negative refractive power; a third lens group having positive refractive power; and a fourth lens group having positive refractive power. Upon zooming from a wide-angle end state to a telephoto end state, a distance between the first lens group and the second lens group changes, a distance between the second lens group and the third lens group changes, and a distance between the third lens group and the fourth lens group changes. The first lens group is constituted by, in order from the object, a lens having negative refractive power, and a lens having positive refractive power, and the following conditional expressions are satisfied:

$$-0.25 < M2/fw < 1.10$$

$$3.0 < fL2/fw < 4.5$$

where M2 denotes a moving distance of the second lens group upon zooming from the wide-angle end state to the telephoto end state (where a direction toward an image plane is positive), fw denotes a focal length of the zoom lens in the wide-angle end state, and fL2 denotes a focal length of the lens having positive refractive power included in the first lens group.

In the zoom lens according to the fourth aspect of the invention, it is preferable that the third lens group is constituted by one single lens having positive refractive power, and one single lens having negative refractive power.

In the zoom lens according to the fourth aspect of the invention, it is preferable that the third lens group includes a lens having negative refractive power, and the following conditional expression is satisfied:

$$-4.5 < (R72+R71)/(R72-R71) < -0.1$$

where R71 denotes a radius of curvature of an object side lens surface of the lens having negative refractive power included in the third lens group, and R72 denotes a radius of curvature of an image side lens surface of the lens having negative refractive power included in the third lens group.

In the zoom lens according to the fourth aspect of the invention, it is preferable that the following conditional expression is satisfied:

$$0.50 < TLt/ft < 1.40$$

where TLt denotes a total length of an optical system in the telephoto end state, and ft denotes a focal length of the zoom lens in the telephoto end state.

In the zoom lens according to the fourth aspect of the invention, it is preferable that the following conditional expression is satisfied:

$$0.16 < (-f2)/f1 < 0.40$$

where f1 denotes a focal length of the first lens group, and f2 denotes a focal length of the second lens group.

In the zoom lens according to the fourth aspect of the invention, it is preferable that the following conditional expression is satisfied:

$$0.70 < f4/f1 < 1.40$$

where f1 denotes a focal length of the first lens group, and f4 denotes a focal length of the fourth lens group.

In the zoom lens according to the fourth aspect of the invention, it is preferable that the following conditional expression is satisfied:

$$4.0 < f1/fw < 6.5$$

where f1 denotes a focal length of the first lens group, and fw denotes a focal length of the zoom lens in the wide-angle end state.

In the zoom lens according to the fourth aspect of the invention, it is preferable that the following conditional expression is satisfied:

$$-0.4 < M3/ft < -0.05$$

where M3 denotes a moving distance of the third lens group upon zooming from the wide-angle end state to the telephoto end state (where the direction toward the image plane is positive), and ft denotes a focal length of the zoom lens in the telephoto end state.

In the zoom lens according to the fourth aspect of the invention, it is preferable that the second lens group is constituted by, in order from the object, a lens having negative refractive power, a lens having negative refractive power, and a lens having positive refractive power.

In the zoom lens according to the fourth aspect of the invention, it is preferable that the following conditional expression is satisfied:

$$1.55 < (R52+R51)/(R52-R51) < 3.65$$

where R51 denotes a radius of curvature of an object side lens surface of the lens disposed closest to an image in the second lens group, and R52 denotes a radius of curvature of an image side lens surface of the lens disposed closest to the image in the second lens group.

In the zoom lens according to the fourth aspect of the invention, it is preferable that the lens having negative refractive power, the lens having negative refractive power, and the lens having positive refractive power, which constitute the second lens group, are separated from each other by an air distance.

In the zoom lens according to the fourth aspect of the invention, it is preferable that at least one of lens surfaces of the lenses having negative refractive power, which constitute the second lens group, is formed in an aspherical shape.

In the zoom lens according to the fourth aspect of the invention, it is preferable that the lens having negative refractive power and the lens having positive refractive power, which constitute the first lens group, are cemented.

In the zoom lens according to the fourth aspect of the invention, it is preferable that upon zooming from the wide-angle end state to the telephoto end state, the first lens group, the second lens group, the third lens group, and the fourth lens group move.

In the zoom lens according to the fourth aspect of the invention, it is preferable that the fourth lens group is constituted by a lens having positive refractive power.

In the zoom lens according to the fourth aspect of the invention, it is preferable that an image side lens surface of the lens having positive refractive power, which constitutes the first lens group, is formed in an aspherical shape.

In the zoom lens according to the fourth aspect of the invention, it is preferable that at least one of surfaces of the lenses, which constitute the third lens group, is formed in an aspherical shape.

In the zoom lens according to the fourth aspect of the invention, it is preferable that at least one of surfaces of the lenses, which constitute the fourth lens group, is formed in an aspherical shape.

In the zoom lens according to the fourth aspect of the invention, it is preferable that a medium of the lenses constituting the fourth lens group is plastic resin.

In the zoom lens according to the fourth aspect of the invention, it is preferable that upon focusing from an object at infinity to an object at a close distance, the fourth lens group moves along the optical axis.

A zoom lens according to a fifth aspect of the invention has, in order from an object: a first lens group having positive refractive power; a second lens group having negative refractive power; a third lens group having positive refractive power; and a fourth lens group having positive refractive power. Upon zooming from a wide-angle end state to a telephoto end state, a distance between the first lens group and the second lens group changes, a distance between the second lens group and the third lens group changes, a distance between the third lens group and the fourth lens group changes, and at least the first lens group moves. The first lens group is constituted by a negative lens and a positive lens, the second lens group is constituted by, in order from the object, a negative lens, a negative lens and a positive lens, the third lens group is constituted by a positive lens and a negative lens, and the following conditional expressions are satisfied:

$$-1.50<(G2R2+G2R1)/(G2R2-G2R1)<-0.10$$

$$-2.00<(G3R2+G3R1)/(G3R2-G3R1)<-0.50$$

where G2R1 denotes a radius of curvature of an object side lens surface of the negative lens disposed on an image side of the second lens group, G2R2 denotes a radius of curvature of an image side lens surface of the negative lens disposed on the image side of the second lens group, G3R1 denotes a radius of curvature of an object side lens surface of the negative lens of the third lens group, and G3R2 denotes a radius of curvature of an image side lens surface of the negative lens of the third lens group.

In the zoom lens according to the fifth aspect of the invention, it is preferable that the following conditional expression is satisfied:

$$1.00<fG1/(fw \cdot ft)^{1/2}<2.10$$

where fG1 denotes a focal length of the first lens group, fw denotes a focal length of the zoom lens in the wide-angle end state, and ft denotes a focal length of the zoom lens in the telephoto end state.

In the zoom lens according to the fifth aspect of the invention, it is preferable that the fourth lens group is constituted by a positive lens.

In the zoom lens according to the fifth aspect of the invention, it is preferable that upon zooming from the wide-angle end state to the telephoto end state, the fourth lens group moves to an object side first, and then moves to an image side.

In the zoom lens according to the fifth aspect of the invention, it is preferable that the third lens group includes at least one aspherical lens.

In the zoom lens according to the fifth aspect of the invention, it is preferable that the second lens group includes at least one aspherical lens.

In the zoom lens according to the fifth aspect of the invention, it is preferable that the fourth lens group includes at least one aspherical lens.

In the zoom lens according to the fifth aspect of the invention, it is preferable that the first lens group includes at least one aspherical lens.

An optical apparatus according to the first aspect of the invention includes the zoom lens according to the first aspect of the invention. In the same manner, an optical apparatus according to the second aspect of the invention includes the zoom lens according to the second aspect of the invention, an optical apparatus according to the third aspect of the invention includes the zoom lens according to the third aspect of the invention, an optical apparatus according to the fourth aspect of the invention includes the zoom lens according to the fourth aspect of the invention, and an optical apparatus according to the fifth aspect of the invention includes the zoom lens according to the fifth aspect of the invention.

A method for manufacturing a zoom lens according to the first aspect of the invention is a method for manufacturing a zoom lens having, in order from an object: a first lens group having positive refractive power; a second lens group having negative refractive power; a third lens group having positive refractive power; and a fourth lens group having positive refractive power. Each lens in a lens barrel is disposed so that upon zooming from a wide-angle end state to a telephoto end state, a distance between the first lens group and the second lens group changes, a distance between the second lens group and the third lens group changes, a distance beteen the third lens group and the fourth lens group changes, and at least the first lens group moves. The first lens group is constituted by a set of cemented lenses, the third lens group is constituted by, in order from the object, a positive lens and a negative lens, and the following conditional expression is satisfied:

$$0.50<TL/ft<1.28$$

where TL denotes a total length of the zoom lens in the telephoto end state, and ft denotes a focal length of the zoom lens in the telephoto end state.

A method for manufacturing a zoom lens according to the second aspect of the invention is a method for manufacturing a zoom lens having, in order from an object: a first lens group having positive refractive power; a second lens group having negative refractive power; a third lens group having positive refractive power; and a fourth lens group having positive refractive power. Each lens in a lens barrel is disposed so that upon zooming from a wide-angle end state to a telephoto end state, a distance between the first lens group and the second lens group changes, a distance between the second lens group and the third lens group changes, a distance beteen the third lens group and the fourth lens group changes, and at least the first lens group moves, and the following conditional expressions are satisfied:

$$0.1<fG1/fG4<1.0$$

$$10.0<ft/dG1<16.0$$

where fG1 denotes a focal length of the first lens group, fG4 denotes a focal length of the fourth lens group, ft denotes a focal length of the zoom lens in the telephoto end state, and dG1 denotes a thickness of the first lens group on the optical axis.

A method for manufacturing a zoom lens according to the third aspect of the invention is a method for manufacturing a zoom lens having, in order from an object: a first lens group having positive refractive power; a second lens group having negative refractive power; a third lens group having positive refractive power; and a fourth lens group having positive refractive power. Each lens in a lens barrel is disposed so that upon zooming from a wide-angle end state to a telephoto end state, a distance between the first lens group and the second lens group changes, a distance between the second lens group and the third lens group changes, and a distance between the third lens group and the fourth lens group changes, The first lens group is constituted by, in order from the object, a lens having negative refractive power and a lens having positive refractive power, the second lens group is constituted by, in order from the object, a lens having negative refractive power, a lens having negative refractive power, and a lens having positive refractive power, and the following conditional expressions are satisfied:

$$0.050<\Sigma D2/ft<0.115$$

$$4.3<f4/fw<6.8$$

where ΣD2 denotes a distance on the optical axis from a lens surface closest to the object to a lens surface closest to an image in the second lens group, ft denotes a focal length of the zoom lens in the telephoto end state, fw denotes a focal length of the zoom lens in the wide-angle end state, and f4 denotes a focal length of the fourth lens group.

A method for manufacturing a zoom lens according to the fourth aspect of the invention is a method for manufacturing a zoom lens having, in order from an object: a first lens group having positive refractive power; a second lens group having negative refractive power; a third lens group having positive refractive power; and a fourth lens group having positive refractive power. Each lens in a lens barrel is disposed so that upon zooming from a wide-angle end state to a telephoto end state, a distance between the first lens group and the second lens group changes, a distance between the second lens group and the third lens group changes, and a distance between the third lens group and the fourth lens group changes. The first lens group is constituted by, in order from the object, a lens having negative refractive power, and a lens having positive refractive power, and the following conditional expressions are satisfied:

$$-0.25 < M2/fw < 1.10$$

$$3.0 < fL2/fw < 4.5$$

where M2 denotes a moving distance of the second lens group upon zooming from the wide-angle end state to the telephoto end state (where a direction toward an image plane is positive), fw denotes a focal length of the zoom lens in the wide-angle end state, and fL2 denotes a focal length of the lens having positive refractive power included in the first lens group.

A method for manufacturing a zoom lens according to the fifth aspect of the invention is a method for manufacturing a zoom lens having, in order from an object: a first lens group having positive refractive power; a second lens group having negative refractive power; a third lens group having positive refractive power; and a fourth lens group having positive refractive power. Each lens in a lens barrel is disposed so that upon zooming from a wide-angle end state to a telephoto end state, a distance between the first lens group and the second lens group changes, a distance between the second lens group and the third lens group changes, a distance between the third lens group and the fourth lens group changes, and at least the first lens group moves. The first lens group is constituted by a negative lens and a positive lens, the second lens group is constituted by, in order from the object, a negative lens, a negative lens and a positive lens, the third lens group is constituted by a positive lens and a negative lens, and the following conditional expressions are satisfied:

$$-1.50 < (G2R2+G2R1)/(G2R2-G2R1) < -0.10$$

$$-2.00 < (G3R2+G3R1)/(G3R2-G3R1) < -0.50$$

where G2R1 denotes a radius of curvature of an object side lens surface of the negative lens disposed on an image side of the second lens group, G2R2 denotes a radius of curvature of an image side lens surface of the negative lens disposed on the image side of the second lens group, G3R1 denotes a radius of curvature of an object side lens surface of the negative lens of the third lens group, and G3R2 denotes a radius of curvature of an image side lens surface of the negative lens of the third lens group.

Advantageous Effects of the Invention

Any one of the aspect of the invention can provide a compact zoom lens having high variable power, an optical apparatus including the zoom lens, and a method for manufacturing the zoom lens.

Any one of the aspect of the invention can also provide a zoom lens having high optical performance, an optical apparatus including the zoom lens, and a method for manufacturing the zoom lens.

BRIEF DESCRIPTION OF THE DRAWINGS

FIG. 1 is a diagram depicting a configuration of a zoom lens according to Example 1 and the moving locus (arrow marks) of each lens group from a wide-angle end state (W) to a telephoto end state (T);

FIG. 2 is a set of graphs showing various aberrations of the zoom lens according to Example 1, where FIG. 2(a) is a set of graphs showing various aberrations of the zoom lens of Example 1 upon focusing on infinity in the wide-angle end state, and FIG. 2(b) is a set of graphs showing various aberrations of the zoom lens upon focusing on infinity in the intermediate focal length state on the wide-angle end side;

FIG. 3 is a set of graphs showing various aberrations of the zoom lens according to Example 1, where FIG. 3(a) is a set of graphs showing various aberrations of the zoom lens of Example 1 upon focusing on infinity in the intermediate focal length state on the telephoto end side, and FIG. 3(b) is a set of graphs showing various aberrations of the zoom lens upon focusing on infinity in the telephoto end state;

FIG. 4 is a diagram depicting a configuration of a zoom lens according to Example 2 and the moving locus (arrow marks) of each lens group from a wide-angle end state (W) to a telephoto end state (T);

FIG. 5 is a set of graphs showing various aberrations of the zoom lens according to Example 2, where FIG. 5(a) is a set of graphs showing various aberrations of the zoom lens of Example 2 upon focusing on infinity in the wide-angle end state, and FIG. 5(b) is a set of graphs showing various aberrations of the zoom lens upon focusing on infinity in the intermediate focal length state on the wide-angle end side;

FIG. 6 is a set of graphs showing various aberrations of the zoom lens according to Example 2, where FIG. 6(a) is a set of graphs showing various aberrations of the zoom lens of Example 2 upon focusing on infinity in the intermediate focal length state on the telephoto end side, and FIG. 6(b) is a set of graphs showing various aberrations of the zoom lens upon focusing on infinity in the telephoto end state;

FIG. 7 is a diagram depicting a configuration of a zoom lens according to Example 3 and the moving locus (arrow marks) of each lens group from a wide-angle end state (W) to a telephoto end state (T);

FIG. 8 is a set of graphs showing various aberrations of the zoom lens according to Example 3, where FIG. 8(a) is a set of graphs showing various aberrations of the zoom lens of Example 3 upon focusing on infinity in the wide-angle end state, and FIG. 8(b) is a set of graphs showing various aberrations of the zoom lens upon focusing on infinity in the intermediate focal length state on the wide-angle end side;

FIG. 9 is a set of graphs showing various aberrations of the zoom lens according to Example 3, where FIG. 9(a) is a set of graphs showing various aberrations of the zoom lens of Example 3 upon focusing on infinity in the intermediate focal length state on the telephoto end side, and FIG. 9(b) is a set of graphs showing various aberrations of the zoom lens upon focusing on infinity in the telephoto end state;

FIG. 10 is a diagram depicting a configuration of a zoom lens according to Example 4 and the moving locus (arrow marks) of each lens group from a wide-angle end state (W) to a telephoto end state (T);

FIG. 11 is a set of graphs showing various aberrations of the zoom lens according to Example 4, where FIG. 11(a) is a set of graphs showing various aberrations of the zoom lens of Example 4 upon focusing on infinity in the wide-angle end state, and FIG. 11(b) is a set of graphs showing various aberrations of the zoom lens upon focusing on infinity in the intermediate focal length state on the wide-angle end side;

FIG. 12 is a set of graphs showing various aberrations of the zoom lens according to Example 4, where FIG. 12(a) is a set of graphs showing various aberrations of the zoom lens of Example 4 upon focusing on infinity in the intermediate focal length state on the telephoto end side, and FIG. 12(b) is a set of graphs showing various aberrations of the zoom lens upon focusing on infinity in the telephoto end state;

FIG. 13(a) is a front view of a digital still camera using the zoom lens according to Embodiment 1 or 2, and FIG. 13(b) is a rear view of this digital still camera;

FIG. 14 is a cross-sectional view along the arrow A-A' in FIG. 13(a);

FIG. 15 is a flow chart depicting a method for manufacturing the zoom lens according to Embodiment 1;

FIG. 16 is a flow chart depicting a method for manufacturing the zoom lens according to Embodiment 2;

FIG. 17 is a cross-sectional view depicting a lens configuration of a zoom lens according to Example 5, where FIG. 17(a) indicates the wide-angle end state, FIG. 17(b) indicates the intermediate focal length state, and FIG. 17(c) indicates the telephoto end state;

FIG. 18 is a set of graphs showing various aberrations of the zoom lens according to Example 5, where FIG. 18(a) indicates the wide-angle end state, FIG. 18(b) indicates the intermediate focal length state, and FIG. 18(c) indicates the telephoto end state;

FIG. 19 is a cross-sectional view depicting a lens configuration of a zoom lens according to Example 6, where FIG. 19(a) indicates the wide-angle end state, FIG. 19(b) indicates the intermediate focal length state, and FIG. 19(c) indicates the telephoto end state;

FIG. 20 is a set of graphs showing various aberrations of the zoom lens according to Example 6, where FIG. 20(a) indicates the wide-angle end state, FIG. 20(b) indicates the intermediate focal length state, and FIG. 20(c) indicates the telephoto end state;

FIG. 21 is a cross-sectional view depicting a lens configuration of a zoom lens according to Example 7, where FIG. 21(a) indicates the wide-angle end state, FIG. 21(b) indicates the intermediate focal length state, and FIG. 21(c) indicates the telephoto end state;

FIG. 22 is a set of graphs showing various aberrations of the zoom lens according to Example 7, where FIG. 22(a) indicates the wide-angle end state, FIG. 22(b) indicates the intermediate focal length state, and FIG. 22(c) indicates the telephoto end state;

FIG. 23 is a cross-sectional view depicting a lens configuration of a zoom lens according to Example 8, where FIG. 23(a) indicates the wide-angle end state, FIG. 23(b) indicates the intermediate focal length state, and FIG. 23(c) indicates the telephoto end state;

FIG. 24 is a set of graphs showing various aberrations of the zoom lens according to Example 8, where FIG. 24(a) indicates the wide-angle end state, FIG. 24(b) indicates the intermediate focal length state, and FIG. 24(c) indicates the telephoto end state;

FIG. 25 is a cross-sectional view depicting a lens configuration of a zoom lens according to Example 9, where FIG. 25(a) indicates the wide-angle end state, FIG. 25(b) indicates the intermediate focal length state, and FIG. 25(c) indicates the telephoto end state;

FIG. 26 is a set of graphs showing various aberrations of the zoom lens according to Example 9, where FIG. 26(a) indicates the wide-angle end state, FIG. 26(b) indicates the intermediate focal length state, and FIG. 26(c) indicates the telephoto end state;

FIG. 27 is a cross-sectional view of a camera including the zoom lens according to Embodiment 3 or 4;

FIG. 28 is a flow chart depicting a method for manufacturing the zoom lens according to Embodiment 3;

FIG. 29 is a flow chart depicting a method for manufacturing the zoom lens according to Embodiment 4;

FIG. 30 is a diagram depicting a configuration of a zoom lens according to Example 10 and the moving locus (arrow marks) of each lens group from a wide-angle end state (W) to a telephoto end state (T);

FIG. 31 is a set of graphs showing various aberrations of the zoom lens according to Example 10, where FIG. 31(a) is a set of graphs showing various aberrations of the zoom lens of Example 10 upon focusing on infinity in the wide-angle end state, and FIG. 31(b) is a set of graphs showing various aberrations of the zoom lens upon focusing on infinity in the intermediate focal length state on the wide-angle end side;

FIG. 32 is a set of graphs showing various aberrations of the zoom lens according to Example 10, where FIG. 32(a) is a set of graphs showing various aberrations of the zoom lens of Example 1 upon focusing on infinity in the intermediate focal length state on the telephoto end side, and FIG. 32(b) is a set of graphs showing various aberrations of the zoom lens upon focusing on infinity in the telephoto end state;

FIG. 33 is a diagram depicting a configuration of a zoom lens according to Example 11 and the moving locus (arrow marks) of each lens group from a wide-angle end state (W) to a telephoto end state (T);

FIG. 34 is a set of graphs showing various aberrations of the zoom lens according to Example 11, where FIG. 34(a) is a set of graphs showing various aberrations of the zoom lens of Example 2 upon focusing on infinity in the wide-angle end state, and FIG. 34(b) is a set of graphs showing various aberrations of the zoom lens upon focusing on infinity in the intermediate focal length state on the wide-angle end side;

FIG. 35 is a set of graphs showing various aberrations of the zoom lens according to Example 11, where FIG. 35(a) is a set of graphs showing various aberrations of the zoom lens of Example 2 upon focusing on infinity in the intermediate focal length state on the telephoto end side, and FIG. 35(b) is a set of graphs showing various aberrations of the zoom lens upon focusing on infinity in the telephoto end state;

FIG. 36 is a diagram depicting a configuration of a zoom lens according to Example 12 and the moving locus (arrow marks) of each lens group from a wide-angle end state (W) to a telephoto end state (T);

FIG. 37 is a set of graphs showing various aberrations of the zoom lens according to Example 12, where FIG. 37(a) is a set of graphs showing various aberrations of the zoom lens of Example 12 upon focusing on infinity in the wide-angle end state, and FIG. 37(b) is a set of graphs showing various aberrations of the zoom lens upon focusing on infinity in the intermediate focal length state on the wide-angle end side;

FIG. 38 is a set of graphs showing various aberrations of the zoom lens according to Example 12, where FIG. 38(a) is a set of graphs showing various aberrations of the zoom lens of Example 12 upon focusing on infinity in the intermediate focal length state on the telephoto end side, and FIG. 38(b) is a set of graphs showing various aberrations of the zoom lens upon focusing on infinity in the telephoto end state;

FIG. 39 is a diagram depicting a configuration of a zoom lens according to Example 13 and the moving locus (arrow marks) of each lens group from a wide-angle end state (W) to a telephoto end state (T);

FIG. 40 is a set of graphs showing various aberrations of the zoom lens according to Example 13, where FIG. 40(*a*) is a set of graphs showing various aberrations of the zoom lens of Example 13 upon focusing on infinity in the wide-angle end state, and FIG. 40(*b*) is a set of graphs showing various aberrations of the zoom lens upon focusing on infinity in the intermediate focal length state on the wide-angle end side;

FIG. 41 is a set of graphs showing various aberrations of the zoom lens according to Example 13, where FIG. 41(*a*) is a set of graphs showing various aberrations of the zoom lens of Example 13 upon focusing on infinity in the intermediate focal length state on the telephoto end side, and FIG. 41(*b*) is a set of graphs showing various aberrations of the zoom lens upon focusing on infinity in the telephoto end state;

FIG. 42 is a diagram depicting a configuration of a zoom lens according to Example 14 and the moving locus (arrow marks) of each lens group from a wide-angle end state (W) to a telephoto end state (T);

FIG. 43 is a set of graphs showing various aberrations of the zoom lens according to Example 14, where FIG. 43(*a*) is a set of graphs showing various aberrations of the zoom lens of Example 14 upon focusing on infinity in the wide-angle end state, and FIG. 43(*b*) is a set of graphs showing various aberrations of the zoom lens upon focusing on infinity in the intermediate focal length state on the wide-angle end side;

FIG. 44 is a set of graphs showing various aberrations of the zoom lens according to Example 14, where FIG. 44(*a*) is a set of graphs showing various aberrations of the zoom lens of Example 14 upon focusing on infinity in the intermediate focal length state on the telephoto end side, and FIG. 44(*b*) is a set of graphs showing various aberrations of the zoom lens upon focusing on infinity in the telephoto end state;

FIG. 45 is a diagram depicting a configuration of a zoom lens according to Example 15 and the moving locus (arrow marks) of each lens group from a wide-angle end state (W) to a telephoto end state (T);

FIG. 46 is a set of graphs showing various aberrations of the zoom lens according to Example 15, where FIG. 46(*a*) is a set of graphs showing various aberrations of the zoom lens of Example 15 upon focusing on infinity in the wide-angle end state, and FIG. 46(*b*) is a set of graphs showing various aberrations of the zoom lens upon focusing on infinity in the intermediate focal length state on the wide-angle end side;

FIG. 47 is a set of graphs showing various aberrations of the zoom lens according to Example 15, where FIG. 47(*a*) is a set of graphs showing various aberrations of the zoom lens of Example 15 upon focusing on infinity in the intermediate focal length state on the telephoto end side, and FIG. 47(*b*) is a set of graphs showing various aberrations of the zoom lens upon focusing on infinity in the telephoto end state;

FIG. 48(*a*) is a front view of a digital still camera using the zoom lens according to Embodiment 5, and FIG. 48(*b*) is a rear view of this digital still camera;

FIG. 49 is a cross-sectional view along the arrow A-A' in FIG. 48(*a*); and FIG. 50 is a flow chart depicting a method for manufacturing the zoom lens according to Embodiment 5.

DESCRIPTION OF THE EMBODIMENTS
(EMBODIMENTS 1 AND 2)

Embodiment 1 will be described with reference to the drawings. As shown in FIG. 1, a zoom lens ZL according to Embodiment 1 has, in order from an object: a first lens group G1 having positive refractive power; a second lens group G2 having negative refractive power; a third lens group G3 having positive refractive power; and a fourth lens group G4 having positive refractive power. Upon zooming from a wide-angle end state to a telephoto end state, a distance between the first lens group and the second lens group changes, a distance between the second group and the third lens group changes, a distance between the third lens group and the fourth lens group changes, and at least the first lens group G1 moves. The first lens group G1 is constituted by a set of cemented lenses, the third lens group G3 is constituted by, in order from the object, a positive lens and a negative lens, and the following conditional expression (1) is satisfied.

$$0.5 < TL/ft < 1.28 \qquad (1)$$

where TL denotes a total length of the zoom lens ZL in the telephoto end state, and ft denotes a focal length of the zoom lens ZL in the telephoto end state.

In the zoom lens ZL according to Embodiment 1, all of the first lens group G1 to the fourth lens group G4 are moved upon zooming from the wide-angle end state to the telephoto end state, whereby fluctuation of the position of the image plane due to zooming can be corrected well.

By constituting the first lens group G1 by a set of cemented lenses, lateral chromatic aberration and spherical aberration generated in the first lens group G1 can be corrected well, and as a result, lateral chromatic aberration and spherical aberration in the telephoto end state can be corrected well. Further, by constituting the first lens group G1 by one lens component, downsizing becomes possible. Furthermore, by constituting the first lens group G1 only by the cemented lenses, manufacturing becomes easier than the case of arranging a plurality of lenses side by side. It is preferable that the set of cemented lenses of the first lens group G1 is constituted by a negative lens and a positive lens, which are cemented in order from the object.

By constituting the third lens group G3 by the positive lens and the negative lens in order from the object, the fluctuation of spherical aberration and longitudinal chromatic aberration due to zooming can be corrected well. Further, by constituting the third lens group G3 by the two lenses, downsizing becomes possible. It is preferable that the lens surface closest to the object in the third lens group G3 has a convex surface facing the object.

The conditional expression (1) specifies a ratio between the total length TL of the zoom lens ZL in the telephoto end state (distance on the optical axis from the first surface of the lenses to the paraxial image plane in the telephoto end state) and the focal length ft of the zoom lens ZL in the telephoto end state. If the upper limit value of the conditional expression (1) is exceeded, the amount of lateral chromatic aberration and the amount of spherical aberration generated in the first lens group G1 increase, and as a result, it becomes difficult to appropriately correct lateral chromatic aberration and spherical aberration in the telephoto end state, which is not desirable. If the lower limit value of the conditional expression (1) is not reached, astigmatism generated in each subsequent lens group after the first lens group G1 increases, and as a result, it becomes difficult to correct astigmatism well in the entire zoom range, which is not desirable. If the conditional expression (1) is satisfied, a compact zoom lens ZL with high variable power, where various aberrations are corrected well, can be implemented.

To demonstrate the effect of Embodiment 1 with certainty, the upper limit value of the conditional expression (1) is preferably 1.27. To demonstrate the effect of Embodiment 1 with higher certainty, the upper limit value of the conditional expression (1) is preferably 1.26. To demonstrate the effect of Embodiment 1 to the maximum, the upper limit value of the conditional expression (1) is preferably 1.25.

To demonstrate the effect of Embodiment 1 with certainty, the lower limit value of the conditional expression (1) is preferably 0.70. To demonstrate the effect of Embodiment 1 with higher certainty, the lower limit value of the conditional expression (1) is 0.90.

In the zoom lens ZL according to Embodiment 1, it is preferable that upon zooming from the wide-angle end state to the telephoto end state, the second lens group G2 moves toward the image first, and then moves toward the object. By this configuration, longitudinal chromatic aberration in the telephoto end state can be corrected well. If the second lens group G2 is constructed only to move toward the image upon zooming, a sufficient moving distance of the second lens group G2 or the third lens group G3 cannot be secured, which may result in a drop in optical performance and an increase in total length of the zoom lens.

In the zoom lens ZL according to Embodiment 1, it is preferable that upon zooming from the wide-angle end state to the telephoto end state, the fourth lens group G4 moves toward the object first, and then moves toward the image. By this configuration, fluctuation of the position of the image plane due to zooming can be corrected well. Further, if this configuration is used, the positions of the first lens group G1 to the third lens group G3 on the optical axis can be made closer to the image side in the telephoto end state, compared with the configuration of moving the fourth lens group G4 only toward the object, which allows to decrease the moving distance of the first lens group G1, and to make the moving mechanism (e.g. barrel member) of each lens group shorter, that is, to decrease the total length of the zoom lens.

In the zoom lens ZL according to Embodiment 1, it is preferable that the following conditional expression (2) is satisfied.

$$1.00 < fG1/(fw \cdot ft)^{1/2} < 2.10 \quad (2)$$

where fG1 denotes a focal length of the first lens group G1, and fw denotes a focal length of the zoom lens ZL in the wide-angle end state.

The conditional expression (2) specifies the focal length fG1 of the first lens group G1 using the focal length fw of the zoom lens ZL in the wide-angle end state, and the focal length ft of the zoom lens ZL in the telephoto end state. If the upper limit value of the conditional expression (2) is exceeded, astigmatism that generates in each subsequent lens group after the first lens group G1 increases, and as a result, it becomes difficult to correct astigmatism well in the entire zoom range, which is not desirable. If the lower limit value of the conditional expression (2) is not reached, the amount of lateral chromatic aberration and the amount of spherical aberration generated in the first lens group G1 increase, and as a result, it becomes difficult to correct lateral chromatic aberration well and spherical aberration in the telephoto end state, which is not desirable.

To demonstrate the effect of Embodiment 1 with certainty, the upper limit value of the conditional expression (2) is preferably 2.08. To demonstrate the effect of Embodiment 1 with higher certainty, the upper limit value of the conditional expression (2) is preferably 2.07.

To demonstrate the effect of Embodiment 1 with certainty, the lower limit value of the conditional expression (2) is preferably 1.30. To demonstrate the effect of Embodiment 1 with higher certainty, the lower limit value of the conditional expression (2) is preferably 1.50. To demonstrate the effect of Embodiment 1 to the maximum, the lower limit value of the conditional expression (2) is preferably 1.70.

In the zoom lens ZL according to Embodiment 1, it is preferable that the second lens group G2 is constituted by a negative lens, a negative lens and a positive lens. By this configuration, fluctuation of astigmatism due to zooming can be corrected well. In the second lens group G2, the arrangement of the lenses may be the negative lens, the negative lens, and the positive lens in order from the object. In the second lens group G2, the arrangement of the lenses may also be the negative lens, the positive lens, and the negative lens in order from the object.

In the zoom lens ZL according to Embodiment 1, it is preferable that the fourth lens group G4 is constituted by one positive lens. By this configuration, fluctuation of astigmatism due to zooming can be corrected well.

In the zoom lens ZL according to Embodiment 1, it is preferable that the third lens group G3 includes at least one aspherical lens. By this configuration, fluctuation of spherical aberration due to zooming can be corrected well.

In the zoom lens ZL according to Embodiment 1, it is preferable that the second lens group G2 includes at least one aspherical lens. By this configuration, fluctuation of astigmatism due to zooming can be corrected well.

In the zoom lens ZL according to Embodiment 1, it is preferable that the fourth lens group G4 includes at least one aspherical lens. By this configuration, fluctuation of astigmatism due to zooming can be corrected well.

In the zoom lens ZL according to Embodiment 1, it is preferable that the first lens group G1 includes at least one aspherical lens. By this configuration, spherical aberration in the telephoto end state can be corrected well.

According to the zoom lens ZL of Embodiment 1 which has the above mentioned configuration, a compact zoom lens having high variable power can be implemented.

FIG. 13 and FIG. 14 show a configuration of a digital still camera CAM (optical apparatus), which is an optical apparatus including the zoom lens ZL according to Embodiment 1. If a power button (not illustrated) of the digital still camera CAM is pressed, a shutter (not illustrated) of a photographing lens (zoom lens ZL) is released, and lights from an object are collected by the zoom lens ZL and form an image on a picture element C (e.g. CCD, CMOS), which is disposed on the image plane I (see FIG. 1). The object image formed on the picture element C is disposed on a liquid crystal monitor M, which is disposed on the back of the digital still camera CAM. The user determines the composition of the object image while viewing the liquid crystal monitor M, then presses a release button B1 to photograph the object image by the picture element C, and stores it in memory (not illustrated).

The camera CAM has an auxiliary light emitting unit EF, which emits auxiliary light when the object is dark, and a function button B2, which is used for setting various conditions for the digital still camera CAM. Here a compact type camera, in which the camera CAM and the zoom lens ZL are integrated, was described as an example, but a single-lens reflex camera, where the lens barrel including the zoom lens ZL is detachable from the camera body, may be used as the optical apparatus.

According to the camera CAM of Embodiment 1, which has the above mentioned configuration, a compact camera having high variable power can be implemented by including the above mentioned zoom lens ZL as the photographing lens.

A method for manufacturing the zoom lens ZL according to Embodiment 1 will now be described with reference to FIG. 15. First, each lens is disposed in a lens barrel, so that the first lens group having positive refractive power, the second lens group having negative refractive power, the third lens group having positive refractive power, and the fourth lens group having positive refractive power are arranged in order from the object (step ST10). At this time, each lens is disposed so that, upon zooming from the wide-angle end state to the telephoto end state, the distance between the first lens group and the second lens group changes, the distance between the second lens group and the third lens group changes, the distance between the third lens group and the fourth lens group changes, and at least the first lens group G1 moves (step ST20). Each lens is disposed in the lens barrel so that the first lens group G1 is constituted by a set of cemented lenses (step ST30). Each lens is disposed in the lens barrel so that the third lens group G3 is constituted by, in order from the object, a positive lens and a negative lens (step ST40). Then each lens is disposed in the lens barrel so that the following conditional expression (1) is satisfied (step ST50).

$$0.50 < TL/ft < 1.28 \quad (1)$$

where TL denotes a total length of the zoom lens in the telephoto end state, and ft denotes a focal length of the zoom lens in the telephoto end state.

An example of the lens arrangement according to Embodiment 1 will now be described. In the zoom lens ZL shown in FIG. 1, as the first lens group G1 having positive refractive power, a set of cemented lenses constituted by, in order from the object, a negative meniscus lens L11 having a convex surface facing the object and a biconvex positive lens L12 is disposed in the lens barrel. As the second lens group G2 having negative refractive power, each lens is disposed in the lens barrel so that a biconcave negative lens L21, a biconcave negative lens L22 and a positive meniscus lens L23 having a convex surface facing the object are arranged in order from the object. As the third lens group G3 having positive refractive power, each lens is disposed in the lens barrel so that a biconvex positive lens L31, and a negative meniscus lens L32 having a convex surface facing the object are arranged in order from the object. As the fourth lens group G4 having positive refractive power, a biconvex positive lens L41 is disposed in the lens barrel. Each lens is disposed in the lens barrel so that the above mentioned conditional expression (1) is satisfied (the correspondence value of the conditional expression (1) is 1.247).

According to the method for manufacturing the zoom lens ZL, a compact zoom lens having high variable power can be manufactured.

Embodiment 2 will be described next with reference to the drawings. As shown in FIG. 1, a zoom lens ZL according to Embodiment 2 has, in order from an object: a first lens group G1 having positive refractive power; a second lens group G2 having negative refractive power; a third lens group G3 having positive refractive power; and a fourth lens group G4 having positive refractive power. Upon zooming from a wide-angle end state to a telephoto end state, a distance between the first lens group and the second lens group changes, a distance between the second lens group and the third lens group changes, a distance between the third lens group and the fourth lens group changes, and at least the first lens group G1 moves, and the following conditional expressions (3) and (4) are satisfied.

$$0.1 < fG1/fG4 < 1.0 \quad (3)$$

$$10.0 < ft/dG1 < 16.0 \quad (4)$$

where fG1 denotes a focal length of the first lens group G1, fG4 denotes a focal length of the fourth lens group G4, ft denotes a focal length of the zoom lens ZL in the telephoto end state, and dG1 denotes a thickness of the first lens group G1 on the optical axis.

In the zoom lens ZL according to Embodiment 2, all of the first lens group G1 to the fourth lens group G4 are moved upon zooming from the wide-angle end state to the telephoto end state, whereby fluctuation of the position of the image plane due to zooming can be corrected well.

The conditional expression (3) specifies a ratio between the focal length fG1 of the first lens group G1 and the focal length fG4 of the fourth lens group G4. If the upper limit value of the conditional expression (3) is exceeded, astigmatism generated in each subsequent lens group after the first lens group G1 increases, and as a result, it becomes difficult to appropriately correct astigmatism in the entire zoom range, which is not desirable. If the lower limit value of the conditional expression (3) is not reached, the amount of lateral chromatic aberration and the amount of spherical aberration generated in the first lens group G1 increase, and as a result, it becomes difficult to appropriately correct lateral chromatic aberration and spherical aberration in the telephoto end state, which is not desirable.

To demonstrate the effect of Embodiment 2 with certainty, the upper limit value of the conditional expression (3) is preferably 0.98. To demonstrate the effect of Embodiment 2 with higher certainty, the upper limit value of the conditional expression (3) is preferably 0.90.

To demonstrate the effect of Embodiment 2 with certainty, the lower limit value of the conditional expression (3) is preferably 0.3. To demonstrate the effect of Embodiment 2 with higher certainty, the lower limit value of the conditional expression (3) is preferably 0.6.

The conditional expression (4) specifies a ratio between the focal length ft of the zoom lens in the telephoto end state, and the thickness dG1 of the first lens group G1 on the optical axis (distance on the optical axis from the first surface to the last surface of the lenses constituting the first lens group G1). If the upper limit value of the conditional expression (4) is exceeded, the amount of lateral chromatic aberration and the amount of spherical aberration generated in the first lens group G1 increase, and as a result, it becomes difficult to appropriately correct lateral chromatic aberration and spherical aberration in the telephoto end state, which is not desirable. If the lower limit value of the conditional expression (4) is not reached, the moving distance of the second lens group G2 and the third lens group G3 for zooming cannot be secured, therefore it is inevitable to increase the refractive power of these lens groups. As a result, it becomes difficult to appropriately correct fluctuation of the spherical aberration and fluctuation of astigmatism due to zooming, which is not preferable.

To demonstrate the effect of Embodiment 2 with certainty, the upper limit value of the conditional expression (4) is preferably 15.0. To demonstrate the effect of Embodiment 2 with higher certainty, the upper limit value of the conditional expression (4) is preferably 14.0.

To demonstrate the effect of Embodiment 2 with certainty, the lower limit value of the conditional expression (4) is preferably 11.0. To demonstrate the effect of Embodiment 2 with higher certainty, the lower limit value of the conditional expression (4) is preferably 12.0.

In the zoom lens ZL according to Embodiment 2, it is preferable that the first lens group G1 is constituted by a negative lens and a positive lens. By this configuration, spherical aberration and lateral chromatic aberration generated in the first lens group G1 can be corrected well, and as a result, spherical aberration and lateral chromatic aberration in the telephoto end state can be corrected well. It is even more preferable that the first lens group G1 is constituted by a set of cemented lenses where a negative lens and a positive lens are cemented in order from the object. By constructing the first lens group G1 by one lens component like this, manufacturing is easier than arranging a plurality of lenses side by side.

In the zoom lens ZL according to Embodiment 2, it is preferable that the third lens group G3 is constituted by, in order from the object, a positive lens and a negative lens. By this configuration, fluctuation of spherical aberration and longitudinal chromatic aberration due to zooming can be corrected well. Further, downsizing can be implemented by constituting the third lens group G3 by two lenses. It is preferable that the lens surface closest to the Object in the third lens group G3 has a convex shape facing the object.

In the zoom lens ZL according to Embodiment 2, it is preferable that the second lens group G2 is constituted by a negative lens, a negative lens and a positive lens. By this configuration, fluctuation of astigmatism due to zooming can be corrected well. In the second lens group G2, the arrangement of the lenses may be the negative lens, the negative lens, and the positive lens in order from the object. In the second lens group G2, the arrangement of the lenses may also be the negative lens, the positive lens, and the negative lens in order from the object.

In the zoom lens ZL according to Embodiment 2, it is preferable that the fourth lens group G4 is constituted by one positive lens. By this configuration, fluctuation of astigmatism due to zooming can be corrected well.

In the zoom lens ZL according to Embodiment 2, it is preferable that the following conditional expression (5) is satisfied.

$$1.00 < fG1/(fw \cdot ft)^{1/2} < 2.10 \quad (5)$$

where fG1 denotes a focal length of the first lens group G1, and fw denotes a focal length of the zoom lens ZL in the wide-angle end state.

The conditional expression (5) specifies the focal length fG1 of the first lens group G1 using the focal length fw of the zoom lens ZL in the wide-angle end state, and the focal length ft of the zoom lens ZL in the telephoto end state. If the upper limit value of the conditional expression (5) is exceeded, astigmatism that generates in each subsequent lens group after the first lens group G1 increases, and as a result, it becomes difficult to appropriately correct astigmatism in the entire zoom range, which is not desirable. If the lower limit value of the conditional expression (5) is not reached, the amount of lateral chromatic aberration and the amount of spherical aberration generated in the first lens group G1 increase, and as a result, it becomes difficult to appropriately correct lateral chromatic aberration and spherical aberration in the telephoto end state, which is not desirable.

To demonstrate the effect of Embodiment 2 with certainty, the upper limit value of the conditional expression (5) is preferably 2.08. To demonstrate the effect of Embodiment 2 with higher certainty, the upper limit value of the conditional expression (5) is preferably 2.07.

To demonstrate the effect of Embodiment 2 with certainty, the lower limit value of the conditional expression (5) is preferably 1.30. To demonstrate the effect of Embodiment 2 with higher certainty, the lower limit value of the conditional expression (5) is preferably 1.50. To demonstrate the effect of Embodiment 2 to the maximum, the lower limit value of the conditional expression (5) is preferably 1.70.

In the zoom lens ZL according to Embodiment 2, it is preferable that upon zooming from the wide-angle end state to the telephoto end state, the fourth lens group G4 moves toward the object first, and then moves toward the image. By this configuration, fluctuation of the position of the image plane due to zooming can be corrected well. Further, if this configuration is used, the positions of the first lens group G1 to the third lens group G3 on the optical axis can be made closer to the image side in the telephoto end state, compared with the configuration of moving the fourth lens group G4 only toward the object upon zooming, which allows to decrease the moving distance of the first lens group G1, and to make the moving mechanism (e.g. barrel member) of each lens group shorter, that is, to decrease the total length of the zoom lens.

In the zoom lens ZL according to Embodiment 2, it is preferable that upon zooming from the wide-angle end state to the telephoto end state, the second lens group G2 moves toward the image first, and then moves toward the object. By this configuration, longitudinal chromatic aberration in the telephoto end state can be corrected well. If the second lens group G2 is constructed only to move toward the image upon zooming, a sufficient moving distance of the second lens group G2 or the third lens group G3 cannot be secured, which may result in a drop in optical performance and an increase in total length of the zoom lens.

In the zoom lens ZL according to Embodiment 2, it is preferable that the third lens group G3 includes at least one aspherical lens. By this configuration, fluctuation of spherical aberration due to zooming can be corrected well.

In the zoom lens ZL according to Embodiment 2, it is preferable that the second lens group G2 includes at least one aspherical lens. By this configuration, fluctuation of astigmatism due to zooming can be corrected well.

In the zoom lens ZL according to Embodiment 2, it is preferable that the fourth lens group G4 includes at least one aspherical lens. By this configuration, coma aberration in the intermediate focal length state can be corrected well.

In the zoom lens ZL according to Embodiment 2, it is preferable that the first lens group G1 includes at least one aspherical lens. By this configuration, spherical aberration in the telephoto end state can be corrected well.

According to the zoom lens ZL of Embodiment 2 which has the above mentioned configuration, a compact zoom lens having high variable power can be implemented.

FIG. 13 and FIG. 14 show a configuration of a digital still camera CAM (optical apparatus) which is an optical apparatus including the zoom lens ZL according to Embodiment 2. This digital still camera CAM is the same as the above described digital still camera CAM of Embodiment 1, therefore description thereof is omitted here.

According to the camera CAM of Embodiment 2, which has the above mentioned configuration, a compact camera with high variable power can be implemented by including the above mentioned zoom lens ZL as the photographing lens.

A method for manufacturing the zoom lens ZL according to Embodiment 2 will now be described with reference to FIG. 16. First, each lens is disposed in a lens barrel, so that the first lens group having positive refractive power, the second lens group having negative refractive power, the third lens group having positive refractive power, and the fourth lens group having positive refractive power are arranged in order from the object (step ST10). At this time, each lens is disposed so that, upon zooming from the wide-angle end state to the telephoto end state, the distance between the first lens group and the second lens group changes, the distance between the second lens group and the third lens group changes, the distance between the third lens group and the fourth lens group changes, and at least the first lens group G1 moves (step S20). Each lens is disposed in the lens barrel so that the following conditional expressions (3) and (4) are satisfied (step ST30).

$$0.1 < fG1/fG4 < 1.0 \quad (3)$$

$$10.0 < ft/dG1 < 16.0 \quad (4)$$

where fG1 denotes a focal length of the first lens group G1, fG4 denotes a focal length of the fourth lens group G4, ft denotes a focal length of the zoom lens ZL in the telephoto end state, and dG1 denotes a thickness of the first lens group G1 on the optical axis.

An example of the lens arrangement according to Embodiment 2 will now be described. In the zoom lens ZL shown in FIG. 1, as the first lens group G1 having positive refractive power, a set of cemented lenses constituted by, in order from the object, a negative meniscus lens L11 having a convex surface facing the object and a biconvex positive lens L12 is disposed in the lens barrel. As the second lens group G2 having negative refractive power, each lens is disposed in the lens barrel so that a biconcave negative lens L21, a biconcave negative lens L22 and a positive meniscus lens L23 having a convex surface facing the object are disposed in order from the object. As the third lens group G3 having positive refractive power, each lens is disposed in the lens barrel so that a biconvex positive lens L31 and a negative meniscus lens L32 having a convex surface facing the object are disposed in order from the object. As the fourth lens group G4 having positive refractive power, a biconvex positive lens L41 is disposed in the lens barrel. Each lens is disposed in the lens barrel so that the above mentioned conditional expressions (3) and (4) are satisfied (the correspondence value of the conditional expression (3) is 0.881, and the correspondence value of the conditional expression (4) is 12.471).

According to the method for manufacturing the zoom lens ZL, a compact zoom lens with high variable power can be manufactured.

Examples of Embodiments 1 and 2

Each example of Embodiments 1 and 2 will now be described with reference to the drawings. Table 1 to Table 4 are data tables of Example 1 to Example 4 respectively.

To simplify explanation, each reference symbol in FIG. 1, which corresponds to Example 1, is independently used from the other examples. Therefore even if a reference symbol is the same as a reference symbol of another example, this does not means that configurations thereof are the same.

In each example, the C-line (wavelength: 656.2730 nm), the d-line (wavelength: 587.5620 nm), the F-line (wavelength: 486.1330 nm) and the g-line (wavelength: 435.8350 nm) are used to calculate aberration characteristics.

In [Lens Data] in each table, the surface number indicates a sequential number assigned to the optical surface counted from the object side along the light traveling direction, R indicates a radius of curvature of each optical surface, D indicates a surface distance which is a distance from each optical surface to the next optical surface (or image plane) on the optical axis, nd indicates a refractive index of the material of the optical member at d-line, νd indicates an Abbe number of the material of the optical member based on d-line. The object plane indicates a surface of the object, (Variable) indicates a variable surface distance, "∞" of the radius of curvature indicates a plane or an aperture, (stop S) indicates an aperture stop S, and the image plane indicates an image plane I. The refractive index of air "1.00000" is omitted. If the optical surface is aspherical, a paraxial radius of curvature is shown in the column of the radius of curvature R.

In [Aspherical Data] in each table, the shape of the aspherical surface shown in [Lens Data] is given by the following Expression (a). X(y) denotes a distance along the optical axis from the tangential plane at the vertex of the aspherical surface to the position on the aspherical surface at height y, R denotes a radius of curvature (paraxial radius of curvature) of the reference spherical surface, κ denotes a conical coefficient, and Ai denotes an aspherical coefficient at degree i. "E-n" indicates "×10$^{-n}$". For example, 1.234E-05=1.234×10$^{-5}$.

$$X(y) = (y^2/R)/\{1+(1-\kappa \times y^2/R^2)^{1/2}\} + A4 \times y^4 + A6 \times y^6 + A8 \times y^8 \quad (a)$$

In [General Data] in each table, f indicates a focal length of the zoom lens, FNo indicates an F number, ω indicates a half angle of view (maximum incident angle, unit: °), Y indicates an image height, Bf indicates a distance on the optical axis from the last surface of the lens to the paraxial image plane, Bf (air equivalent) indicates an air-equivalent distance on the optical axis from the last surface of the lens to the paraxial image plane, TL indicates a total length of the zoom lens (Bf is added to the distance on the optical axis from the front surface of the lens to the last surface of the lens), WL indicates the total lens length in the wide-angle end state, and TL indicates the total lens length in the telephoto end state.

In [Zooming Data] in each table, Di indicates a value of variable distance in each of the wide-angle end state, the intermediate focal length state (intermediate position 1 is on the wide-angle end side, and intermediate position 2 is on the telephoto end side), and the telephoto end state. Di is a variable distance between the i-th surface and the (i+1)th surface.

In [Zoom Lens Group Data] in each table, G indicates a group number, "First surface of group" indicates a surface number of the surface closest to the object in each group, "Group focal length" indicates a focal length of each group, and "Lens configuration length" indicates a distance on the optical axis from the lens surface closest to the object to the lens surface closest to the image in each group.

In [Conditional Expression] in each table, values corresponding to the above mentioned conditional expressions (1) and (2) are shown.

In all the data values, "mm" is normally used as the unit of focal length f, radius of curvature R, surface distance D and other lengths, unless otherwise specified, but unit is not limited to "mm", and another appropriate unit may be used since an equivalent optical performance is acquired even if the zoom lens is proportionally expanded or proportionally reduced.

The above description on the tables is common for all the examples, hence this description is omitted herein below.

Example 1

Example 1 will be described with reference to FIG. 1 to FIG. 3 and Table 1. As FIG. 1 shows, a zoom lens ZL (ZL1) according to Example 1 is constituted by, in order from an object, a first lens group G1 having positive refractive power, a second lens group G2 having negative refractive power, an aperture stop S for adjusting quantity of light, a third lens group G3 having positive refractive power, and a fourth lens group G4 having positive refractive power.

The first lens group G1 is constituted by a cemented lens of a negative meniscus lens L11 having a convex surface facing the object and a biconvex positive lens L12 disposed in order from the object.

The second lens group G2 is constituted by, in order from the object, a biconcave negative lens L21, a biconcave negative lens L22, and a positive meniscus lens L23 having a convex surface facing the object.

The third lens group G3 is constituted by, in order from the object, a biconvex positive lens L31 and a negative meniscus lens L32 having a convex surface facing the object.

The fourth lens group G4 is constituted by a biconvex positive lens L41.

Between the fourth lens group G4 and the image plane I, a glass block GB constituted by a low-pass filter, an infrared cut-off filter or the like, to cut off a spatial frequency exceeding the critical resolution of the solid-state image sensor (e.g CCD disposed on the image plane I), and a sensor cover glass CG of the solid-state image sensor, are disposed.

In the zoom lens ZL1 according to this example, upon zooming from the wide-angle end state to the telephoto end state, a distance between the first lens group and the second lens group changes, a distance between the second lens group and the third lens group changes, a distance between the third lens group and the fourth lens group changes, and all of the first lens group G1 to the fourth lens group G4 move. Upon zooming, the first lens group G1 moves toward the image first and then moves toward the object. Upon zooming, the second lens group G2 moves toward the image first and then moves toward the object. Upon zooming, the third lens group G3 moves toward the object. Upon zooming, the fourth lens group G4 moves toward the object first and then moves toward the image. Upon zooming, the aperture stop S moves toward the object together with the third lens group G3.

Table 1 shows each data value of Example 1. The surface numbers 1 to 20 in Table 1 correspond to each optical surface of m1 to m20 shown in FIG. 1.

TABLE 1

[Lens Data]

| Surface number | R | D | nd | νd |
|---|---|---|---|---|
| Object plane | ∞ | | | |
| 1 | 15.1335 | 0.40 | 1.846660 | 23.80 |
| 2 | 10.8229 | 2.40 | 1.622630 | 58.19 |
| 3(Aspherical) | −181.0268 | D3(Variable) | | |
| 4 | −74.4862 | 0.30 | 1.834810 | 42.73 |
| 5 | 4.8217 | 1.85 | | |
| 6(Aspherical) | −38.6322 | 0.70 | 1.531130 | 55.90 |
| 7(Aspherical) | 8.2801 | 0.10 | | |
| 8 | 7.4753 | 1.05 | 1.945950 | 17.98 |
| 9 | 17.5000 | D9(Variable) | | |
| 10(Aperture stop) | ∞ | 0.20 | | |
| 11(Aspherical) | 3.8315 | 2.00 | 1.589130 | 61.24 |
| 12(Aspherical) | −8.3456 | 0.20 | | |
| 13 | 357.2080 | 1.10 | 1.634940 | 23.96 |
| 14(Aspherical) | 4.7701 | D14(Variable) | | |
| 15(Aspherical) | 25.4371 | 1.30 | 1.531130 | 55.90 |
| 16 | −39.4019 | D16(Variable) | | |
| 17 | ∞ | 0.21 | 1.516800 | 63.88 |
| 18 | ∞ | 0.39 | | |
| 19 | ∞ | 0.50 | 1.516800 | 63.88 |
| 20 | ∞ | Bf | | |
| Image plane | ∞ | | | |

[Aspherical Data]

| Surface number | κ | A4 | A6 | A8 | A10 |
|---|---|---|---|---|---|
| 3 | 1.0000 | 1.29719E−05 | 3.61922E−08 | 0.00000E+00 | 0.00000E+00 |
| 6 | 1.0000 | −2.15880E−03 | 3.12591E−05 | 1.07858E−05 | −3.73219E−07 |
| 7 | 1.0000 | −2.41357E−03 | 1.54254E−04 | 4.62223E−07 | 0.00000E+00 |
| 11 | 1.0000 | −5.32252E−04 | 0.00000E+00 | 0.00000E+00 | 0.00000E+00 |
| 12 | 1.0000 | 3.34168E−03 | −1.12800E−04 | 0.00000E+00 | 0.00000E+00 |
| 14 | 5.5071 | −3.15120E−03 | −2.67555E−04 | −9.73940E−05 | 0.00000E+00 |
| 15 | 1.0000 | 8.84897E−05 | 8.14627E−06 | 0.00000E+00 | 0.00000E+00 |

[General Data]
Zoom ratio 7.542

| | Wide-angle end | Intermediate position 1 | Intermediate position 2 | Telephoto end |
|---|---|---|---|---|
| f | 4.63000 | 9.10000 | 17.69999 | 34.91999 |
| FNo | 3.81952 | 5.20872 | 6.08863 | 6.82898 |

TABLE 1-continued

| | | | | |
|---|---|---|---|---|
| ω | 42.09211 | 25.29917 | 12.95583 | 6.63865 |
| Y | 3.30 | 4.05 | 4.05 | 4.05 |
| Bf | 0.41999 | 0.41999 | 0.41997 | 0.41994 |
| Bf(Air equivalent) | 1.27809 | 1.27808 | 1.27806 | 1.27803 |
| WL 31.087 | | | | |
| TL 43.544 | | | | |

[Zooming Data]

| Variable distance | Wide-angle end | Intermediate position 1 | Intermediate position 2 | Telephoto end |
|---|---|---|---|---|
| D3 | 0.40000 | 1.99608 | 7.53964 | 12.05887 |
| D9 | 9.94216 | 5.13205 | 2.83585 | 0.59009 |
| D14 | 4.98440 | 9.29684 | 11.57322 | 14.20962 |
| D16 | 2.64064 | 2.89064 | 3.81610 | 3.56545 |

[Zoom Lens Group Data]

| Group number | First surface of group | Group focal length | Lens configuration length |
|---|---|---|---|
| G1 | 1 | 25.83002 | 2.8 |
| G2 | 4 | −5.20273 | 4.0 |
| G3 | 11 | 7.73411 | 3.3 |
| G4 | 15 | 29.30751 | 1.3 |

[Conditional Expressions]

| | |
|---|---|
| Conditional Expression (1) | TL/ft = 1.247 |
| Conditional Expression (2) | fG1/(fw · ft)$^{1/2}$ = 2.031 |
| Conditional Expression (3) | fG1/fG4 = 0.881 |
| Conditional Expression (4) | ft/dG1 = 12.471 |
| Conditional Expression (5) | fG1/(fw · ft)$^{1/2}$ = 2.031 |

As Table 1 shows, the zoom lens ZL1 according to this example satisfies the conditional expressions (1) to (5).

FIG. 2 and FIG. 3 are graphs showing various aberrations (spherical aberration, astigmatism, distortion, coma aberration and lateral chromatic aberration) of the zoom lens according to Example 1. FIG. 2(a) is a set of graphs showing various aberrations of this example upon focusing on infinity in the wide-angle end state, FIG. 2(b) is a set of graphs showing various aberrations of this example upon focusing on infinity in the intermediate focal length state on the wide-angle end side (intermediate position 1), FIG. 3(a) is a set of graphs showing various aberrations of this example upon focusing on infinity in the intermediate focal length state on the telephoto end side (intermediate position 2), and FIG. 3(b) is a set of graphs showing various aberrations of this example upon focusing on infinity in the telephoto end state.

In each graph showing aberrations, FNO indicates an F number, and Y indicates an image height. d indicates aberration at d-line, g indicates aberration at g-line, C indicates aberration at C-line, and F indicates aberration at F-line. No indication refers to an aberration at d-line. In each graph showing astigmatism, the solid line indicates the sagittal image plane, and the broken line indicates the meridional image plane. The above description on the graphs showing aberrations is the same for the other examples, where this description is omitted.

As each graph showing aberration in FIG. 2 and FIG. 3 clarifies, the zoom lens ZL1 according to Example 1 has an excellent optical performance, where various aberrations are corrected well.

Example 2

Example 2 will be described with reference to FIG. 4 to FIG. 6 and Table 2. As FIG. 4 shows, a zoom lens ZL (ZL2) according to Example 2 is constituted by, in order from an object, a first lens group G1 having positive refractive power, a second lens group G2 having negative refractive power, an aperture stop S for adjusting quantity of light, a third lens group G3 having positive refractive power, and a fourth lens group G4 having positive refractive power.

The first lens group G1 is constituted by a cemented lens of a negative meniscus lens L11 having a convex surface facing the object and a biconvex positive lens L12 disposed in order from the object.

The second lens group G2 is constituted by, in order from the object, a biconcave negative lens L21, a biconcave negative lens L22, and a positive meniscus lens L23 having a convex surface facing the object.

The third lens group G3 is constituted by, in order from the object, a biconvex positive lens L31 and a negative meniscus lens L32 having a convex surface facing the object.

The fourth lens group G4 is constituted by a biconvex positive lens L41.

Between the fourth lens group G4 and the image plane I, a glass block GB constituted by a low-pass filter, an infrared cut-off filter or the like, to cut off a spatial frequency exceeding the critical resolution of the solid-state image sensor (e.g CCD disposed on image plane I), and a sensor cover glass CG of the solid-state image sensor, are disposed.

In the zoom lens ZL2 according to this example, upon zooming from the wide-angle end state to the telephoto end state, a distance between the first lens group and the second lens group changes, a distance between the second lens group and the third lens group changes, a distance between the third lens group and the fourth lens group changes, and all of the first lens group G1 to the fourth lens group G4 move. Upon zooming, the first lens group G1 moves toward the image first and then moves toward the object. Upon zooming, the second lens group G2 moves toward the image first and then moves toward the object. Upon zooming, the third lens group G3 moves toward the object. Upon zooming, the fourth lens group G4 moves toward the object first and then moves toward the image. Upon zooming, the aperture stop S moves toward the object together with the third lens group G3.

Table 2 shows each data value of Example 2. The surface numbers 1 to 20 in Table 2 correspond to each optical surface of m1 to m20 shown in FIG. 4.

TABLE 2

[Lens Data]

| Surface number | R | D | nd | νd |
|---|---|---|---|---|
| Object plane | ∞ | | | |
| 1 | 15.3990 | 0.40 | 1.846660 | 23.80 |
| 2 | 10.9551 | 2.40 | 1.622630 | 58.19 |
| 3(Aspherical) | −148.0387 | D3(Variable) | | |
| 4 | −75.3049 | 0.30 | 1.834810 | 42.73 |
| 5 | 4.9414 | 1.85 | | |
| 6(Aspherical) | −38.6026 | 0.70 | 1.531130 | 55.90 |
| 7(Aspherical) | 8.1327 | 0.10 | | |
| 8 | 7.4470 | 1.05 | 1.945950 | 17.98 |
| 9 | 17.5000 | D9(Variable) | | |
| 10(Aperture stop) | ∞ | 0.20 | | |
| 11(Aspherical) | 3.8990 | 2.00 | 1.589130 | 61.24 |
| 12(Aspherical) | −8.0329 | 0.20 | | |
| 13 | 150.0000 | 1.10 | 1.635510 | 23.89 |
| 14(Aspherical) | 4.6958 | D14(Variable) | | |
| 15(Aspherical) | 26.2260 | 1.30 | 1.531130 | 55.90 |
| 16 | −37.6379 | D16(Variable) | | |
| 17 | ∞ | 0.21 | 1.516800 | 63.88 |
| 18 | ∞ | 0.39 | | |
| 19 | ∞ | 0.50 | 1.516800 | 63.88 |
| 20 | ∞ | Bf | | |
| Image plane | ∞ | | | |

[Aspherical Data]

| Surface number | κ | A4 | A6 | A8 | A10 |
|---|---|---|---|---|---|
| 3 | 1.0000 | 1.35954E−05 | 3.52240E−08 | 0.00000E+00 | 0.00000E+00 |
| 6 | 1.0000 | −2.42468E−03 | 6.73131E−05 | 9.05900E−06 | −4.02301E−07 |
| 7 | 1.0000 | −2.61547E−03 | 1.95582E−04 | −1.73855E−06 | 0.00000E+00 |
| 11 | 1.0000 | −9.26677E−04 | 0.00000E+00 | 0.00000E+00 | 0.00000E+00 |
| 12 | 1.0000 | 2.58282E−03 | −3.58732E−05 | 0.00000E+00 | 0.00000E+00 |
| 14 | 4.3310 | −1.72854E−03 | −2.39675E−04 | −2.66496E−06 | 0.00000E+00 |
| 15 | 1.0000 | 5.75499E−05 | 8.85772E−06 | 0.00000E+00 | 0.00000E+00 |

[General Data]
Zoom ratio 7.542

| | Wide-angle end | Intermediate position 1 | Intermediate position 2 | Telephoto end |
|---|---|---|---|---|
| f | 4.63000 | 9.10000 | 17.69999 | 34.91999 |
| FNo | 3.81400 | 5.19868 | 6.07570 | 6.81567 |
| ω | 42.09220 | 25.25186 | 12.90628 | 6.61491 |
| Y | 3.30 | 4.05 | 4.05 | 4.05 |
| Bf | 0.41999 | 0.41999 | 0.41997 | 0.41994 |
| Bf(Air equivalent) | 1.27809 | 1.27808 | 1.27806 | 1.27803 |
| WL 31.123 | | | | |
| TL 43.580 | | | | |

[Zooming Data]

| Variable distance | Wide-angle end | Intermediate position 1 | Intermediate position 2 | Telephoto end |
|---|---|---|---|---|
| D3 | 0.40000 | 1.99608 | 7.53964 | 12.05887 |
| D9 | 9.96046 | 5.15035 | 2.85415 | 0.60839 |
| D14 | 4.98645 | 9.29889 | 11.57527 | 14.21167 |
| D16 | 2.65627 | 2.90627 | 3.83173 | 3.58108 |

TABLE 2-continued

[Zoom Lens Group Data]

| Group number | First surface of group | Group focal length | Lens configuration length |
|---|---|---|---|
| G1 | 1 | 25.83002 | 2.8 |
| G2 | 4 | −5.20273 | 4.0 |
| G3 | 11 | 7.73411 | 3.3 |
| G4 | 15 | 29.30751 | 1.3 |

[Conditional Expressions]

| | |
|---|---|
| Conditional Expression (1) | TL/ft = 1.248 |
| Conditional Expression (2) | fG1/(fw · ft)$^{1/2}$ = 2.031 |
| Conditional Expression (3) | fG1/fG4 = 0.881 |
| Conditional Expression (4) | ft/dG1 = 12.471 |
| Conditional Expression (5) | fG1/(fw · ft)$^{1/2}$ = 2.031 |

As Table 2 shows, the zoom lens ZL2 according to this example satisfies the conditional expressions (1) to (5).

FIG. 5 and FIG. 6 are graphs showing various aberrations (spherical aberration, astigmatism, distortion, coma aberration and lateral chromatic aberration) of the zoom lens according to Example 2. FIG. 5(a) is a set of graphs showing various aberrations of this example upon focusing on infinity in the wide-angle end state, FIG. 5(b) is a set of graphs showing various aberrations of this example upon focusing on infinity in the intermediate focal length state on the wide-angle end side (intermediate position 1), FIG. 6(a) is a set of graphs showing various aberrations of this example upon focusing on infinity in the intermediate focal length state on the telephoto end side (intermediate position 2), and FIG. 6(b) is a set of graphs showing various aberrations of this example upon focusing on infinity in the telephoto end state.

As each graph showing aberration in FIG. 5 and FIG. 6 clarifies, the zoom lens ZL2 according to Example 2 has an excellent optical performance, where various aberrations are corrected well.

Example 3

Example 3 will be described with reference to FIG. 7 to FIG. 9 and Table 3. As FIG. 7 shows, a zoom lens ZL (ZL3) according to Example 3 is constituted by, in order from an object, a first lens group G1 having positive refractive power, a second lens group G2 having negative refractive power, an aperture stop S for adjusting quantity of light, a third lens group G3 having positive refractive power, and a fourth lens group G4 having positive refractive power.

The first lens group G1 is constituted by a cemented lens of a negative meniscus lens L11 having a convex surface facing the object, and a biconvex positive lens L12 disposed in order from the object.

The second lens group G2 is constituted by, in order from the object, a biconcave negative lens L21, a biconcave negative lens L22, and a positive meniscus lens L23 having a convex surface facing the object.

The third lens group G3 is constituted by, in order from the object, a biconvex positive lens L31 and a negative meniscus lens L32 having a convex surface facing the object.

The fourth lens group G4 is constituted by a biconvex positive lens L41.

Between the fourth lens group G4 and the image plane I, a glass block GB constituted by a low-pass filter, an infrared cut-off filter or the like, to cut off a spatial frequency exceeding the critical resolution of the solid-state image sensor (e.g CCD disposed on image plane I), and a sensor cover glass CG of the solid-state image sensor, are disposed.

In the zoom lens ZL3 according to this example, upon zooming from the wide-angle end state to the telephoto end state, a distance between the first lens group and the second lens group changes, a distance between the second lens group and the third lens group changes, a distance between the third lens group and the fourth lens group changes, and all of the first lens group G1 to the fourth lens group G4 move. Upon zooming, the first lens group G1 moves toward the image first and then moves toward the object. Upon zooming, the second lens group G2 moves toward the image first and then moves toward the object. Upon zooming, the third lens group G3 moves toward the object. Upon zooming, the fourth lens group G4 moves toward the object first and then moves toward the image. Upon zooming, the aperture stop S moves toward the object together with the third lens group G3.

Table 3 shows each data value of Example 3. The surface numbers 1 to 20 in Table 3 correspond to each optical surface of m1 to m20 shown in FIG. 7.

TABLE 3

[Lens Data]

| Surface number | R | D | nd | vd |
|---|---|---|---|---|
| Object plane | ∞ | | | |
| 1 | 15.3926 | 0.40 | 1.846660 | 23.80 |
| 2 | 11.1253 | 2.40 | 1.622630 | 58.19 |
| 3(Aspherical) | −188.5599 | D3(Variable) | | |
| 4 | −110.8316 | 0.30 | 1.834810 | 42.73 |
| 5 | 4.9051 | 1.90 | | |

TABLE 3-continued

| | | | | |
|---|---|---|---|---|
| 6(Aspherical) | −33.6723 | 0.70 | 1.531130 | 55.90 |
| 7(Aspherical) | 8.9314 | 0.10 | | |
| 8 | 7.8592 | 1.00 | 1.945950 | 17.98 |
| 9 | 18.0000 | D9(Variable) | | |
| 10(Aperture stop) | ∞ | 0.20 | | |
| 11(Aspherical) | 3.9086 | 2.00 | 1.589130 | 61.24 |
| 12(Aspherical) | −8.4504 | 0.20 | | |
| 13 | 46.8242 | 1.10 | 1.635510 | 23.89 |
| 14(Aspherical) | 4.4257 | D14(Variable) | | |
| 15(Aspherical) | 28.5749 | 1.30 | 1.531130 | 55.90 |
| 16 | −34.5274 | D16(Variable) | | |
| 17 | ∞ | 0.21 | 1.516800 | 63.88 |
| 18 | ∞ | 0.39 | | |
| 19 | ∞ | 0.50 | 1.516800 | 63.88 |
| 20 | ∞ | Bf | | |
| Image plane | ∞ | | | |

[Aspherical Data]

| Surface number | κ | A4 | A6 | A8 | A10 |
|---|---|---|---|---|---|
| 3 | 1.0000 | 1.31891E−05 | 3.67047E−08 | 0.00000E+00 | 0.00000E+00 |
| 6 | 1.0000 | −2.62600E−03 | 5.99532E−05 | 8.21675E−06 | −3.25393E−07 |
| 7 | 1.0000 | −2.78015E−03 | 1.73673E−04 | −7.25525E−07 | 0.00000E+00 |
| 11 | 1.0000 | −1.09066E−03 | 0.00000E+00 | 0.00000E+00 | 0.00000E+00 |
| 12 | 1.0000 | 2.18089E−03 | 0.00000E+00 | 0.00000E+00 | 0.00000E+00 |
| 14 | 1.1731 | 1.93942E−03 | 3.89327E−04 | 2.11441E−05 | 0.00000E+00 |
| 15 | 1.0000 | 1.59177E−04 | 6.48193E−06 | 0.00000E+00 | 0.00000E+00 |

[General Data]
Zoom ratio 7.542

| | Wide-angle end | Intermediate position 1 | Intermediate position 2 | Telephoto end |
|---|---|---|---|---|
| f | 4.63000 | 9.10000 | 17.70000 | 34.92000 |
| FNo | 3.81236 | 6.83942 | 6.06678 | 5.26535 |
| ω | 42.09322 | 6.68168 | 13.01848 | 25.49271 |
| Y | 3.30 | 4.05 | 4.05 | 4.05 |
| Bf | 0.59999 | 0.59999 | 0.59997 | 0.59994 |
| Bf(Air equivalent) | 1.45809 | 1.45808 | 1.45806 | 1.45803 |
| WL 31.287 | | | | |
| TL 43.536 | | | | |

[Zooming Data]

| Variable distance | Wide-angle end | Intermediate position 1 | Intermediate position 2 | Telephoto end |
|---|---|---|---|---|
| D3 | 0.40000 | 1.58487 | 7.55020 | 12.12811 |
| D9 | 10.19987 | 5.13906 | 2.83506 | 0.57040 |
| D14 | 4.78750 | 9.29480 | 11.17093 | 14.03750 |
| D16 | 2.59965 | 2.84966 | 3.95153 | 3.49965 |

[Zoom Lens Group Data]

| Group number | First surface of group | Group focal length | Lens configuration length |
|---|---|---|---|
| G1 | 1 | 26.17906 | 2.8 |
| G2 | 4 | −5.31537 | 4.0 |
| G3 | 11 | 7.79597 | 3.3 |
| G4 | 15 | 29.64947 | 1.3 |

[Conditional Expressions]

| | |
|---|---|
| Conditional Expression (1) | TL/ft = 1.247 |
| Conditional Expression (2) | fG1/(fw · ft)$^{1/2}$ = 2.059 |
| Conditional Expression (3) | fG1/fG4 = 0.883 |
| Conditional Expression (4) | ft/dG1 = 12.471 |
| Conditional Expression (5) | fG1/(fw · ft)$^{1/2}$ = 2.059 |

As Table 3 shows, the zoom lens ZL3 according to this example satisfies the conditional expressions (1) to (5).

FIG. 8 and FIG. 9 are graphs showing various aberrations (spherical aberration, astigmatism, distortion, coma aberration and lateral chromatic aberration) of the zoom lens according to Example 3. FIG. 8(a) is a set of graphs showing various aberrations of this example upon focusing on infinity in the wide-angle end state, FIG. 8(b) is a set of graphs showing various aberrations of this example upon focusing on infinity in the intermediate focal length state on the wide-angle end side (intermediate position 1), FIG. 9(a) is a set of graphs showing various aberrations of this example upon focusing on infinity in the intermediate focal length state on the telephoto end side (intermediate position 2), and FIG. 9(b) is a set of graphs showing various aberrations of this example upon focusing on infinity in the telephoto end state.

As each graph showing aberration in FIG. 8 and FIG. 9 clarifies, the zoom lens ZL3 according to Example 3 has an excellent optical performance, where various aberrations are corrected well.

Example 4

Example 4 will be described with reference to FIG. 10 to FIG. 12 and Table 4. As FIG. 10 shows, a zoom lens ZL (ZL4) according to Example 4 is constituted by, in order from an object, a first lens group G1 having positive refractive power, a second lens group G2 having negative refractive power, an aperture stop S for adjusting quantity of light, a third lens group G3 having positive refractive power, and a fourth lens group G4 having positive refractive power.

The first lens group G1 is constituted by a cemented lens of a negative meniscus lens L11 having a convex surface facing the object and a biconvex positive lens L12 disposed in order from the object.

The second lens group G2 is constituted by, in order from the object, a biconcave negative lens L21, a biconcave negative lens L22, and a positive meniscus lens L23 having a convex surface facing the object.

The third lens group G3 is constituted by, in order from the object, a biconvex positive lens L31 and a biconcave negative lens L32.

The fourth lens group G4 is constituted by a biconvex positive lens L41.

Between the fourth lens group G4 and the image plane I, a glass block GB constituted by a low-pass filter, an infrared cut-off filter or the like, to cut off a spatial frequency exceeding the critical resolution of the solid-state image sensor (e.g CCD disposed on image plane I), and a sensor cover glass CG of the solid-state image sensor, are disposed.

In the zoom lens ZL4 according to this example, upon zooming from the wide-angle end state to the telephoto end state, a distance between the first lens group and the second lens group changes, a distance between the second lens group and the third lens group changes, a distance between the third lens group and the fourth lens group changes, and all of the first lens group G1 to the fourth lens group G4 move. Upon zooming, the first lens group G1 moves toward the image first and then moves toward the object. Upon zooming, the second lens group G2 moves toward the image first and then moves toward the object. Upon zooming, the third lens group G3 moves toward the object. Upon zooming, the fourth lens group G4 moves toward the object first and then moves toward the image. Upon zooming, the aperture stop S moves toward the object together with the third lens group G3.

Table 4 shows each data value of Example 4. The surface numbers 1 to 20 in Table 4 correspond to each optical surface of m1 to m20 shown in FIG. 10.

TABLE 4

| [Lens Data] | | | | |
|---|---|---|---|---|
| Surface number | R | D | nd | vd |
| Object plane | ∞ | | | |
| 1 | 13.6018 | 0.40 | 1.846660 | 23.80 |
| 2 | 10.0291 | 2.40 | 1.622630 | 58.19 |
| 3(Aspherical) | −311.9862 | D3(Variable) | | |
| 4 | −85.9677 | 0.30 | 1.834810 | 42.73 |
| 5 | 4.4709 | 2.00 | | |
| 6(Aspherical) | −51.9445 | 0.60 | 1.531130 | 55.90 |
| 7(Aspherical) | 8.4843 | 0.10 | | |
| 8 | 8.0908 | 1.00 | 1.945950 | 17.98 |
| 9 | 20.0000 | D9(Variable) | | |
| 10(Aperture stop) | ∞ | 0.20 | | |
| 11(Aspherical) | 3.7526 | 2.40 | 1.589130 | 61.24 |
| 12(Aspherical) | −8.7294 | 0.20 | | |
| 13 | −77.3329 | 0.60 | 1.634940 | 23.96 |
| 14(Aspherical) | 5.4214 | D14(Variable) | | |
| 15(Aspherical) | 27.1715 | 1.30 | 1.531130 | 55.90 |
| 16 | −35.0002 | D16(Variable) | | |
| 17 | ∞ | 0.21 | 1.516800 | 63.88 |
| 18 | ∞ | 0.39 | | |
| 19 | ∞ | 0.50 | 1.516800 | 63.88 |
| 20 | ∞ | Bf | | |

| [Aspherical Data] | | | | | |
|---|---|---|---|---|---|
| Surface number | κ | A4 | A6 | A8 | A10 |
| 3 | 1.0000 | 1.78584E−05 | 3.60592E−08 | 0.00000E+00 | 0.00000E+00 |
| 6 | 1.0000 | −3.22885E−03 | 2.15898E−04 | −3.33463E−06 | 0.00000E+00 |
| 7 | 1.0000 | −3.66232E−03 | 2.84074E−04 | −7.45119E−06 | 0.00000E+00 |
| 11 | 1.0000 | −5.37880E−04 | 0.00000E+00 | 0.00000E+00 | 0.00000E+00 |
| 12 | 1.0000 | 2.51208E−03 | 0.00000E+00 | 0.00000E+00 | 0.00000E+00 |
| 14 | 2.9047 | 1.77634E−03 | 1.99194E−04 | 7.55455E−05 | 0.00000E+00 |
| 15 | 1.0000 | 1.64792E−04 | 5.11434E−06 | 0.00000E+00 | 0.00000E+00 |

TABLE 4-continued

[General Data]
Zoom ratio 7.542

|  | Wide-angle end | Intermediate position 1 | Intermediate position 2 | Telephoto end |
|---|---|---|---|---|
| f | 4.63000 | 9.00000 | 17.70000 | 34.92000 |
| FNo | 3.73119 | 4.98117 | 6.09770 | 6.85529 |
| ω | 41.76905 | 25.66074 | 13.17878 | 6.73182 |
| Y | 3.30 | 4.05 | 4.05 | 4.05 |
| Bf | 0.60000 | 0.60000 | 0.60000 | 0.60000 |
| Bf (Air equivalent) | 1.45809 | 1.45809 | 1.45809 | 1.45808 |
| WL 31.237 | | | | |
| TL 43.601 | | | | |

[Zooming Data]

| Variable distance | Wide-angle end | Intermediate position 1 | Intermediate position 2 | Telephoto end |
|---|---|---|---|---|
| D3 | 0.40000 | 2.01602 | 6.42120 | 10.73069 |
| D9 | 9.71788 | 4.99023 | 2.60992 | 0.57221 |
| D14 | 4.96639 | 8.70236 | 12.25371 | 15.59826 |
| D16 | 2.95273 | 3.79440 | 4.55360 | 3.50000 |

[Zoom Lens Group Data]

| Group number | First surface of group | Group focal length | Lens configuration length |
|---|---|---|---|
| G1 | 1 | 23.77593 | 2.8 |
| G2 | 4 | −4.96037 | 4.0 |
| G3 | 11 | 7.88644 | 3.2 |
| G4 | 15 | 29.01028 | 1.3 |

[Conditional Expressions]

| Conditional Expression (1) | TL/ft = 1.249 |
| Conditional Expression (2) | $fG1/(fw \cdot ft)^{1/2} = 1.870$ |
| Conditional Expression (3) | fG1/fG4 = 0.820 |
| Conditional Expression (4) | ft/dG1 = 12.471 |
| Conditional Expression (5) | $fG1/(fw \cdot ft)^{1/2} = 1.870$ |

As Table 4 shows, the zoom lens ZL4 according to this example satisfies the conditional expressions (1) to (5).

FIG. 11 and FIG. 12 are graphs showing various aberrations (spherical aberration, astigmatism, distortion, coma aberration and lateral chromatic aberration) of the zoom lens according to Example 4. FIG. 11(a) is a set of graphs showing various aberrations of this example upon focusing on infinity in the wide-angle end state, FIG. 11(b) is a set of graphs showing various aberrations of this example upon focusing on infinity in the intermediate focal length state on the wide-angle end side (intermediate position 1), FIG. 12(a) is a set of graphs showing various aberrations of this example upon focusing on infinity in the intermediate focal length state on the telephoto end side (intermediate position 2), and FIG. 12(b) is a set of graphs showing various aberrations of this example upon focusing on infinity in the telephoto end state.

As each graph showing aberration in FIG. 11 and FIG. 12 clarifies, the zoom lens ZL4 according to Example 4 has an excellent optical performance, where various aberrations are corrected well.

According to each example, a compact zoom lens having high variable power can be implemented.

Although the present invention has been described using the configuration requirements of the embodiments to clarify the present invention, the present invention is not limited to these configuration requirements.

In each example, the zoom lens constituted by four lens groups was shown, but the present invention can also be applied to a zoom lens constituted by a different number of lens groups, such as five or six lens groups. A lens or a lens group may be added to the configuration on the side closest to the object, or a lens or a lens group may be added to the configuration on the side closest to the image. "Lens group" refers to a portion having at least one lens isolated by an air distance which changes upon zooming.

A single or plurality of lens group(s) or a partial lens group may be designed to be a focusing lens group, which performs focusing from an object at infinity to an object at a close distance by moving in the optical axis direction. This focusing lens group can be applied to auto focus, and is also suitable for driving a motor for auto focusing (driving using an ultrasonic motor or the like). It is particularly preferable that at least a part of the fourth lens group G4 is designed to be the focusing lens group.

A lens group or a partial lens group may be designed to be a vibration-isolating lens group, which corrects image blurs generated by camera shake, by moving the lens group or the partial lens group in a direction orthogonal to the optical axis or rotating (oscillating) the lens group or the partial lens group in an in-plane direction that includes the optical axis. It is particularly preferable that at least a part of the third lens group G3 is designed to be the vibration-isolating lens group.

The lens surface may be formed to be a spherical surface or a plane, or an aspherical surface. If the lens surface is a spherical surface or a plane, lens processing, assembly and adjustment are easy, and deterioration of optical performance, due to an error generated in processing, assembly or adjustment can be prevented. Even if the image plane is shifted, the drawing performance is not affected very much, which is desirable. If the lens surface is aspherical, the aspherical surface can be any aspherical surface out of an aspherical surface generated by grinding, a glass-molded aspherical surface generated by forming glass in an aspherical shape using a die, and a composite aspherical surface generated by forming resin on the surface of the glass to be an aspherical shape. The lens surface may be a diffraction surface, and the lens may be a refractive index-distributed lens (GRIN lens) or a plastic lens.

It is preferable that the aperture stop is disposed near the third lens group G3, but the role of the aperture stop may be substituted by a frame of the lens, without disposing a separate member as the aperture stop.

Each lens surface may be coated with an anti-reflection film, which has high transmittance in a wide wavelength region in order to decrease flares and ghosts, and implement high optical performance with high contrast.

DESCRIPTION OF THE EMBODIMENTS
(EMBODIMENTS 3 AND 4)

Embodiment 3 will be described next with reference to the drawings. As shown in FIG. 17, a zoom lens ZL according to Embodiment 3 has, in order from an object: a first lens group G1 having positive refractive power; a second lens group G2 having negative refractive power; a third lens group G3 having positive refractive power; and a fourth lens group G4 having positive refractive power. In this zoom lens ZL, upon zooming from a wide-angle end state to a telephoto end state, a distance between the first lens group G1 and the second lens group G2 changes, a distance between the second lens group G2 and the third lens group G3 changes, and a distance between the third lens group G3 and the fourth lens group G4 changes. By this configuration, aberrations can be corrected well upon zooming. Further, in this zoom lens ZL, the first lens group, the second lens group, the third lens group, and the fourth lens group move upon zooming from the wide-angle end state to the telephoto end state, whereby various aberrations generated due to the high variable power can be corrected well.

In the zoom lens ZL according to Embodiment 3, the first lens group G1 is constituted by, in order from the object, a lens having negative refractive power, and a lens having positive refractive power. By this configuration, astigmatism, curvature of field and distortion in the wide-angle end state, and aspherical aberration and lateral chromatic aberration in the telephoto end state can be corrected well.

In the zoom lens ZL according to Embodiment 3, the second lens group G2 is constituted by, in order from the object, a lens having negative refractive power, a lens having negative refractive power, and a lens having positive refractive power. By this configuration, curvature of field and astigmatism can be corrected well. Further, a number of lenses constituting the second lens group G2 is small, which is effective to make the zoom lens lighter and can decrease thickness of the zoom lens in the retracted state.

In the zoom lens ZL according to Embodiment 3, it is preferable that the following conditional expression (6) is satisfied.

$$0.050 < \Sigma D2/ft < 0.115 \quad (6)$$

where $\Sigma D2$ denotes a distance on the optical axis from the lens surface closest to the object to the lens surface closest to the image in the second lens group G2, and ft denotes a focal length of the zoom lens ZL in the telephoto end state.

The conditional expression (6) specifies an appropriate range of the thickness of the second lens group G2 on the optical axis. If the lower limit value of the conditional expression (6) is not reached, it becomes difficult to correct curvature of field and coma aberration in the wide-angle end state, which is not desirable. To demonstrate the effect of the invention with certainty, the lower limit value of the conditional expression (6) is preferable 0.065. To demonstrate the effect of the invention with higher certainty, the lower limit value of the conditional expression (6) is preferably 0.080. If the upper limit value of the conditional expression (6) is exceeded, on the other hand, it becomes difficult to correct curvature of field. Moreover, thickness of the zoom lens in the retracted state increases, which is not desirable. To demonstrate the effect of the invention with certainty, the upper limit value of the conditional expression (6) is preferably 0.113. To demonstrate the effect of the invention with higher certainty, the upper limit value of the conditional expression (6) is preferably 0.110. By satisfying the conditional expression (6) like this, aberrations can be corrected well, while decreasing the thickness of the zoom lens in the retracted state.

In the zoom lens ZL according to Embodiment 3, it is preferable that the following conditional expression (7) is satisfied.

$$4.3 < f4/fw < 6.8 \quad (7)$$

where fw denotes a focal length of the zoom lens ZL in the wide-angle end state, and f4 denotes a focal length of the fourth lens group G4.

The conditional expression (7) specifies an appropriate range of the ratio between the focal length of the fourth lens group G4 and the focal length of the zoom lens ZL in the wide-angle end state. If the lower limit value of the conditional expression (7) is not reached, it becomes difficult to correct curvature of field, which is not desirable. To demonstrate the effect of the invention with certainty, the lower limit value of the conditional expression (7) is preferably 4.6. To demonstrate the effect of the invention with higher certainty, the lower limit value of the conditional expression (7) is preferably 5.0. If the upper limit value of the conditional expression (7) is exceeded, on the other hand, it becomes difficult to correct curvature of field, which is not desirable. To demonstrate the effect of the invention with certainty, the upper limit value of the conditional expression (7) is preferably 6.4. To demonstrate the effect of the invention with higher certainty, the upper limit value of the conditional expression (7) is preferably 5.9. By satisfying the conditional expression (7) like this, aberrations can be corrected well.

In the zoom lens ZL according to Embodiment 3, it is preferable that the third lens group G3 is constituted by one single lens having positive refractive power and one single lens having negative refractive power. By this configuration, spherical aberration and longitudinal chromatic aberration can be corrected well even if a number of lenses is small.

In the zoom lens ZL according to Embodiment 3, it is preferable that the following conditional expression (8) is satisfied.

$$0.50 < TLt/ft < 1.40 \quad (8)$$

where TLt denotes a total length of the optical system of the zoom lens ZL in the telephoto end state, and ft denotes a focal length of the zoom lens ZL in the telephoto end state.

The conditional expression (8) specifies an appropriate range of the total length of the optical system in the telephoto end state and the focal length of the zoom lens ZL in the telephoto end state. If the lower limit value of the conditional expression (8) is not reached, it becomes difficult to correct curvature of field and astigmatism, which is not desirable. To demonstrate the effect of the invention with certainty, the lower limit value of the conditional expression (8) is preferably 0.80. To demonstrate the effect of the invention with higher certainty, the lower limit value of the conditional expression (8) is preferably 1.20. If the upper limit value of the conditional expression (8) is exceeded, on the other hand, it becomes difficult to correct spherical aberration and lateral chromatic aberration in the telephoto end state, which is not desirable. Furthermore, the total length of the optical system increases, which is not desirable. To demonstrate the effect of the invention with certainty, the upper limit value of the conditional expression (8) is preferably 1.35. To demonstrate the effect of the invention with higher certainty, the upper limit value of the conditional expression (8) is preferably 1.30. By satisfying the conditional expression (8) like this, aberrations can be corrected well while keeping the total length of the optical system short.

In the zoom lens ZL according to Embodiment 3, it is preferable that the following conditional expression (9) is satisfied.

$$0.16<(-f2)/f1<0.40 \quad (9)$$

where f1 denotes a focal length of the first lens group G1, and f2 denotes a focal length of the second lens group G2.

The conditional expression (9) specifies an appropriate range of the focal length of the second lens group G2 and the focal length of the first lens group G1.

If the lower limit value of the conditional expression (9) is not reached, it becomes difficult to correct curvature of field and astigmatism, which is not desirable. To demonstrate the effect of the invention with certainty, the lower limit value of the conditional expression (9) is preferably 0.18. To demonstrate the effect of the invention with higher certainty, the lower limit value of the conditional expression (9) is preferably 0.20. If the upper limit value of the conditional expression (9) is exceeded, on the other hand, it becomes difficult to correct spherical aberration and lateral chromatic aberration in the telephoto end state, which is not desirable. To demonstrate the effect of the invention with certainty, the upper limit value of the conditional expression (9) is preferably 0.30. To demonstrate the effect of the invention with higher certainty, the upper limit value of the conditional expression (9) is 0.22. By satisfying the conditional expression (9) like this, aberrations can be corrected well.

In the zoom lens ZL according to Embodiment 3, it is preferable that the following conditional expression (10) is satisfied.

$$0.70<f4/f1<1.40 \quad (10)$$

where f1 denotes a focal length of the first lens group G1, and f4 denotes a focal length of the fourth lens group G4.

The conditional expression (10) specifies an appropriate range of the focal length of the first lens group G1. If the lower limit value of the conditional expression (10) is not reached, it becomes difficult to correct curvature of field and astigmatism, which is not desirable. To demonstrate the effect of the invention with certainty, the lower limit value of the conditional expression (10) is preferably 0.75. To demonstrate the effect of the invention with higher certainty, the lower limit value of the conditional expression (10) is preferably 0.85. If the upper limit value of the conditional expression (10) is exceeded, on the other hand, it becomes difficult to correct spherical aberration and lateral chromatic aberration in the telephoto end state, which is not desirable. To demonstrate the effect of the invention with certainty, the upper limit value of the conditional expression (10) is preferably 1.25. To demonstrate the effect of the invention with higher certainty, the upper limit value of the conditional expression (10) is preferably 1.10. By satisfying the conditional expression (10) like this, aberrations can be corrected well.

In the zoom lens ZL according to Embodiment 3, it is preferable that the lens having negative refractive power and the lens having positive refractive power constituting the first lens group are cemented. If these lenses are cemented lenses, chromatic aberration can be corrected better.

In the zoom lens ZL according to Embodiment 3, it is preferable that the lens having negative refractive power, the lens having negative refractive power, and the lens having positive refractive power, which constitute the second lens group G2, are separated from each other by an air distance. By this configuration, correction of aberrations (particularly curvature of field and astigmatism) become more flexible.

In the zoom lens ZL according to Embodiment 3, it is preferable that the fourth lens group G4 is constituted by one single lens having positive refractive power. By this configuration, curvature of field and astigmatism can be corrected well, even if a number of lenses is small. The fourth lens group G4 may be constituted by one cemented lens having positive refractive power.

In the zoom lens ZL according to Embodiment 3, it is preferable that the image side lens surface of the lens having positive refractive power, which constitutes the first lens group G1, is formed in an aspherical shape. If the image side lens surface of the lens having positive refractive power, which constitutes the first lens group G1, is aspherical, spherical aberration in the telephoto end state can be corrected well.

In the zoom lens ZL according to Embodiment 3, it is preferable that at least one of lens surfaces of the lenses having negative refractive power, which constitute the second lens group G2, is formed in an aspherical shape. If at least one of the surfaces of the lenses having negative refractive power, which constitute the second lens group G2, is aspherical, curvature of field and astigmatism can be corrected well.

In the zoom lens ZL according to Embodiment 3, it is preferable that at least one of the surfaces of the lenses, which constitute the third lens group G3, is formed in an aspherical shape. If at least one of the surfaces of the lenses, which constitute the third lens group G3, is aspherical, aspherical aberration and coma aberration can be corrected well.

In the zoom lens ZL according to Embodiment 3, it is preferable that at least one of the surfaces of the lenses, which constitute the fourth lens group G4, is formed in an aspherical shape. If at least one of the surfaces of the lenses, which constitute the fourth lens group G4, is aspherical, curvature of field and astigmatism can be corrected well.

In the zoom lens ZL according to Embodiment 3, it is preferable that a medium of the lenses constituting the fourth lens group G4 is plastic resin. By using a plastic lens for the fourth lens group G4, cost can be reduced while minimizing the moving of the focal point and deterioration of performance due to temperature change.

In the zoom lens ZL according to Embodiment 3, it is preferable that upon focusing from an object at infinity to an object at a close distance, the fourth lens group G4 moves along the optical axis. If the fourth lens group G4 is used for focusing, fluctuation of curvature of field and astigmatism upon focusing on an object at a finite distance can be decreased.

A camera, which is an optical apparatus including the zoom lens ZL according to Embodiment 3, will be described next with reference to FIG. 27. This camera 1 is an interchangeable lens type mirrorless camera that includes the zoom lens ZL according to Embodiment 3 as a photographing lens 2. In this camera 1, lights from an object (not illustrated) are collected by the photographing lens 2, and form an object image on an image plane of an imaging unit 3 via an OLPF (Optical Low pass filter), which is not illustrated.

Then the object image is photoelectrically-converted by a photoelectric conversion element disposed in the imaging unit 3, whereby the image of the object is generated. This image is displayed on an EVF (Electronic View Finder) 4 disposed in the camera 1. Thereby the user can view the object via the EVF 4.

If a release button (not illustrated) is pressed by the user, the photoelectrically-converted image is stored in memory (not illustrated) by the imaging unit 3. Thus the user can photograph the image of the object using this camera 1. In Embodiment 3, an example of the mirrorless camera was described, but an effect similar to the case of this camera 1 can be demonstrated even when the zoom lens ZL according to Embodiment 3 is included in a single lens reflex type camera, which has a quick return mirror in the camera main unit, and views the object using a finder optical system.

The following content can be adopted within a range where the optical performance is not diminished. This is the same for Embodiment 4, to be described later.

In each example, the zoom lens ZL constituted by four lens groups was shown, but the present invention can also be applied to a zoom lens constituted by a different number of lens groups, such as five or six lens groups. A lens or a lens group may be added to the configuration on the side closest to the object, or a lens or a lens group may be added to the configuration on the side closest to the image. "Lens group" refers to a portion having at least one lens isolated by an air distance which changes upon zooming.

A single or plurality of lens group(s) or a partial lens group may be designed to be a focusing lens group, which performs focusing from an object at infinity to an object at a close distance by moving in the optical axis direction. This focusing lens group can be applied to auto focus, and is also suitable for driving a motor for auto focusing (driving using an ultrasonic motor or the like). It is particularly preferable that at least a part of the fourth lens group G4 is designed to be the focusing lens group.

A lens group or a partial lens group may be designed to be a vibration-isolating lens group, which corrects image blurs generated by camera shake, by moving the lens group or the partial lens group in a direction orthogonal to the optical axis or rotating (oscillating) the lens group or the partial lens group in an in-plane direction that includes the optical axis. It is particularly preferable that at least a part of the third lens group G3 is designed to be the vibration-isolating lens group.

The lens surface may be formed to be a spherical surface or a plane, or an aspherical surface. If the lens surface is a spherical surface or a plane, lens processing, assembly and adjustment are easy, and deterioration of optical performance, due to an error generated in processing, assembly or adjustment can be prevented. Even if the image plane is shifted, the drawing performance is not affected very much, which is desirable. If the lens surface is aspherical, the aspherical surface can be any aspherical surface out of an aspherical surface generated by grinding, a glass-molded aspherical surface generated by forming glass in an aspherical shape using a die, and a composite aspherical surface generated by forming resin on the surface of the glass to be an aspherical shape. The lens surface may be a diffraction surface, and the lens may be a refractive index-distributed lens (GRIN lens) or a plastic lens.

It is preferable that the aperture stop S is disposed near the third lens group G3, but the role of the aperture stop may be substituted by a frame of the lens, without disposing a separate member as the aperture stop.

Each lens surface may be coated with an anti-reflection film, which has high transmittance in a wide wavelength region in order to decrease flares and ghosts, and implement high optical performance with high contrast.

The zoom ratio of the zoom lens ZL of Embodiment 3 is about 7 to 8.

An outline of a method for manufacturing the zoom lens ZL according to Embodiment 3 will now be described with reference to FIG. 28. First, each lens is disposed to prepare the first to fourth lens group G1 to G4 respectively (step S100). Each lens group is disposed so that upon zooming from the wide-angle end state to the telephoto end state, the distance between the first lens group G1 and the second lens group G2 changes, the distance between the second lens group G2 and the third lens group G3 changes, and the distance between the third lens group G3 and the fourth lens group G4 changes (step S200). For the first lens group G1, a lens having negative refractive power and a lens having positive refractive power are disposed in order from the object (step S300). For the second lens group G2, a lens having negative refractive power, a lens having negative refractive power, and a lens having positive refractive power are disposed in order from the object (step S400). Each lens group is disposed so that the above mentioned conditional expressions (6) and (7) are satisfied (step S500).

As shown in FIG. 17, which is a concrete example of Embodiment 3, the first lens group G1 is prepared by disposing a cemented lens where a negative meniscus lens L11 having a convex surface facing the object and a positive lens L12 of which image side surface is aspherical, are cemented in order from the object. The second lens group G2 is prepared by disposing: a biconcave negative lens L21; a negative lens L22 of which object side surface and image side surface are aspherical; and a positive meniscus lens L23 having a convex surface facing the object. The third lens group G3 is prepared by disposing: a positive lens L31 of which object side surface and image side surface are aspherical; and a negative lens L32 of which image side surface is aspherical. The fourth lens group G4 is prepared by disposing a positive lens L41 of which object side surface and image side surfaced are aspherical. Each lens group prepared like this is disposed according to the above mentioned procedure, whereby the zoom lens ZL is manufactured.

Embodiment 4 will be described next with reference to the drawings. As shown in FIG. 17, a zoom lens ZL according to Embodiment 4 has, in order from an object: a first lens group G1 having positive refractive power; a second lens group G2 having negative refractive power; a third lens group G3 having positive refractive power; and a fourth lens group G4 having positive refractive power. In this zoom lens ZL, upon zooming from a wide-angle end state to a telephoto end state, a distance between the first lens group G1 and the second lens group G2 changes, a distance between the second lens group G2 and the third lens group G3 changes, and a distance between the third lens group G3 and the fourth lens group G4 changes. By this configuration, aberrations can be corrected well upon zooming. Further, in this zoom lens ZL, the first lens group, the second lens group, the third lens group, and the fourth lens group move upon zooming from the wide-angle end state to the telephoto end state, whereby various aberrations generated due to the high variable power can be corrected well.

In the zoom lens ZL according to Embodiment 4, the first lens group G1 is constituted by, in order from the object, a lens having negative refractive power, and a lens having positive refractive power. By this configuration, astigmatism, curvature of field and distortion in the wide-angle end state and spherical aberration and lateral chromatic aberration in the telephoto end state can be corrected. Further, a number of lenses constituting the first lens group G1 is small, which is effective to make the zoom lens lighter, and can decrease thickness of the zoom lens in the retracted state.

In the zoom lens ZL according to Embodiment 4, it is preferable that the following conditional expression (11) is satisfied.

$$-0.25 < M2/fw < 1.10 \quad (11)$$

where M2 denotes a moving distance of the second lens group G2 upon zooming from the wide-angle end state to the telephoto end state (where a direction toward an image plane is positive), and fw denotes a focal length of the zoom lens ZL in the wide-angle end state.

The conditional expression (11) specifies an appropriate range of the moving distance of the second lens group G2 upon zooming from the wide-angle end state to the telephoto end state. If the lower limit value of the conditional expression (11) is not reached, it becomes difficult to correct curvature of field, which is not desirable. To demonstrate the effect of the invention with certainty, the lower limit value of the conditional expression (11) is preferable −0.21. To demonstrate the effect of the invention with higher certainty, the lower limit value of the conditional expression (11) is −0.17. If the upper limit value of the conditional expression (11) is exceeded, it becomes difficult to correct curvature of field, which is not desirable. Moreover, the moving distance of the second lens group G2 increases and thickness of the zoom lens in the retracted state increases, which is not desirable. To demonstrate the effect of the invention with certainty, the upper limit value of the conditional expression (11) is preferably 0.93. To demonstrate the effect of the invention with higher certainty, the upper limit value of the conditional expression (11) is preferably 0.10. By satisfying the conditional expression (11) like this, aberrations can be corrected well, while decreasing the thickness of the zoom lens in the retracted state.

In the zoom lens ZL according to Embodiment 4, it is preferable that the following conditional expression (12) is satisfied.

$$3.0 < fL2/fw < 4.5 \quad (12)$$

where fL2 denotes a focal length of the lens having positive refractive power included in the first lens group G1, and fw denotes a focal length of the zoom lens ZL in the wide-angle end state.

The conditional expression (12) specifies an appropriate range of the ratio between the focal length of the lens having positive refractive power included in the first lens group G1 and the focal length of the zoom lens ZL in the wide-angle end state. If the lower limit value of the conditional expression (12) is not reached, it becomes difficult to correct chromatic aberration, which is not desirable. Moreover, because of the increase in refractive power of the positive lens in the first lens group G1, the edge thickness of this positive lens becomes thinner, which makes manufacturing difficult. This means that the center thickness of the lens must be increased to secure an appropriate edge thickness, and in this case, the thickness of the zoom lens in the retracted state increases, which is not desirable. To demonstrate the effect of the invention with certainty, the lower limit value of the conditional expression (12) is preferably 3.2. To demonstrate the effect of the invention with higher certainty, the lower limit value of the conditional expression (12) is preferably 3.5. If the upper limit value of the conditional expression (12) is exceeded, on the other hand, it becomes difficult to correct chromatic aberration, which is not desirable. To demonstrate the effect of the invention with certainty, the upper limit value of the conditional expression (12) is preferably 4.2. To demonstrate the effect of the invention with higher certainty, the upper limit value of the conditional expression (12) is preferably 3.8. By satisfying the conditional expression (12) like this, aberrations can be corrected well, while decreasing the thickness of the zoom lens in the retracted state.

In the zoom lens ZL according to Embodiment 4, it is preferable that the third lens group G3 is constituted by one single lens having positive refractive power and one single lens having negative refractive power. By this configuration, spherical aberration and longitudinal chromatic aberration can be corrected well even if a number of lenses is small.

In the zoom lens ZL according to Embodiment 4, it is preferable that the third lens group G3 includes a lens having negative refractive power, and the following conditional expression (13) is satisfied.

$$-4.5 < (R72+R71)/(R72-R71) < -0.1 \quad (13)$$

where R71 denotes a radius of curvature of the object side lens surface of the lens having negative refractive power included in the third lens group G3, and R72 denotes a radius of curvature of the image side lens surface of the lens having negative refractive power included in the third lens group G3.

The conditional expression (13) specifies an appropriate range of the shape of the lens having negative refractive power which is included in the third lens group G3. If the lower limit value of the conditional expression (13) is not reached, it becomes difficult to correct spherical aberration and coma aberration, which is not desirable. To demonstrate the effect of the invention with certainty, the lower limit value of the conditional expression (13) is preferably −3.8. To demonstrate the effect of the invention with higher certainty, the lower limit value of the conditional expression (13) is preferably −2.0. If the upper limit value of the conditional expression (13) is exceeded, it becomes difficult to correct spherical aberration and coma aberration, which is not desirable. To demonstrate the effect of the invention with certainty, the upper limit value of the conditional expression (13) is preferably −0.3. To demonstrate the effect of the invention with higher certainty, the upper limit value of the conditional expression (13) is preferably −0.5.

In the zoom lens ZL according to Embodiment 4, it is preferable that the following conditional expression (14) is satisfied.

$$0.50 < TLt/ft < 1.40 \quad (14)$$

where TLt denotes a total length of the optical system of the zoom lens ZL in the telephoto end state, and ft denotes a focal length of the zoom lens ZL in the telephoto end state.

The conditional expression (14) specifies an appropriate range of the total length of the optical system in the telephoto end state and the focal length of the zoom lens ZL in the telephoto end state. If the lower limit value of the conditional expression (14) is not reached, it becomes difficult to correct curvature of field and astigmatism, which is not desirable. To demonstrate the effect of the invention with certainty, the lower limit value of the conditional expression (14) is preferably 0.80. To demonstrate the effect of the invention with higher certainty, the lower limit value of the conditional expression (14) is preferably 1.20. If the upper limit value of the conditional expression (14) is exceeded, on the other hand, it becomes difficult to correct spherical aberration and lateral chromatic aberration in the telephoto end state, which is not desirable. Furthermore, the total length of the optical system increases, which is not desirable. To demonstrate the effect of the invention with certainty, the upper limit value of the conditional expression (14) is preferably 1.35. To demonstrate the effect of the invention with higher certainty, the upper limit value of the conditional expression (14) is preferably 1.30. By satisfying the conditional expression (14) like this, aberrations can be corrected well while keeping the total length of the optical system short.

In the zoom lens ZL according to Embodiment 4, it is preferable that the following conditional expression (15) is satisfied.

$$0.16<(-f2)/f1<0.40 \qquad (15)$$

where f1 denotes a focal length of the first lens group G1, and f2 denotes a focal length of the second lens group G2.

The conditional expression (15) specifies an appropriate range of the focal length of the second lens group G2 and the focal length of the first lens group G1.
If the lower limit value of the conditional expression (15) is not reached, it becomes difficult to correct curvature of field and astigmatism, which is not desirable. To demonstrate the effect of the invention with certainty, the lower limit value of the conditional expression (15) is preferably 0.18. To demonstrate the effect of the invention with higher certainty, the lower limit value of the conditional expression (15) is preferably 0.20. If the upper limit value of the conditional expression (15) is exceeded, on the other hand, it becomes difficult to correct spherical aberration and lateral chromatic aberration in the telephoto end state, which is not desirable. To demonstrate the effect of the invention with certainty, the upper limit value of the conditional expression (15) is preferably 0.30. To demonstrate the effect of the invention with higher certainty, the upper limit value of the conditional expression (15) is 0.22. By satisfying the conditional expression (15) like this, aberrations can be corrected well.

In the zoom lens ZL according to Embodiment 4, it is preferable that the following conditional expression (16) is satisfied.

$$0.70<f4/f1<1.40 \qquad (16)$$

where f1 denotes a focal length of the first lens group G1, and f4 denotes a focal length of the fourth lens group G4.

The conditional expression (16) specifies an appropriate range of the focal length of the first lens group G1. If the lower limit value of the conditional expression (16) is not reached, it becomes difficult to correct curvature of field and astigmatism, which is not desirable. To demonstrate the effect of the invention with certainty, the lower limit value of the conditional expression (16) is preferably 0.75. To demonstrate the effect of the invention with higher certainty, the lower limit value of the conditional expression (16) is preferably 0.85. If the upper limit value of the conditional expression (16) is exceeded, on the other hand, it becomes difficult to correct spherical aberration and lateral chromatic aberration in the telephoto end state, which is not desirable. To demonstrate the effect of the invention with certainty, the upper limit value of the conditional expression (16) is preferably 1.25. To demonstrate the effect of the invention with higher certainty, the upper limit value of the conditional expression (16) is preferably 1.10. By satisfying the conditional expression (16) like this, aberrations can be corrected well.

In the zoom lens ZL according to Embodiment 4, it is preferable that the following conditional expression (17) is satisfied.

$$4.0<f1/fw<6.5 \qquad (17)$$

where f1 denotes a focal length of the first lens group G1, and fw denotes a focal length of the zoom lens ZL in the wide-angle end state.

The conditional expression (17) specifies an appropriate range of the ratio between the focal length of the first lens group G1 and the focal length of the zoom lens ZL in the wide-angle end state. If the lower limit value of the conditional expression (17) is not reached, it becomes difficult to correct spherical aberration and lateral chromatic aberration in the telephoto end state, which is not desirable. To demonstrate the effect of the invention with certainty, the lower limit value of the conditional expression (17) is preferably 4.6. To demonstrate the effect of the invention with higher certainty, the lower limit value of the conditional expression (17) is preferably 5.3. If the upper limit value of the conditional expression (17) is exceeded, on the other hand, it becomes difficult to correct curvature of field and astigmatism, which is not desirable. To demonstrate the effect of the invention with certainty, the upper limit value of the conditional expression (17) is preferably 6.2. To demonstrate the effect of the invention with higher certainty, the upper limit value of the conditional expression (17) is preferably 5.9. By satisfying the conditional expression (17) like this, aberrations can be corrected well.

In the zoom lens ZL according to Embodiment 4, it is preferable that the following conditional expression (18) is satisfied.

$$-0.4<M3/ft<-0.05 \qquad (18)$$

where M3 denotes a moving distance of the third lens group G3 upon zooming from the wide-angle end state to the telephoto end state (where the direction toward the image plane is positive), and ft denotes a focal length of the zoom lens ZL in the telephoto end state.

The conditional expression (18) specifies an appropriate range of the moving distance of the third lens group G3 upon zooming from the wide-angle end state to the telephoto end state. If the lower limit value of the conditional expression (18) is not reached, it becomes difficult to correct spherical aberration and coma aberration, which is not desirable. To demonstrate the effect of the invention with certainty, the lower limit value of the conditional expression (18) is preferably −0.34. To demonstrate the effect of the invention with higher certainty, the lower limit value of the conditional expression (18) is −0.30. If the upper limit value of the conditional expression (18) is exceeded, on the other hand, it becomes difficult to correct spherical aberration and coma aberration, which is not desirable. Moreover, the moving distance of the third lens group G3 increases and the thickness of the zoom lens in the retracted state increases, which is not desirable. To demonstrate the effect of the invention with certainty, the upper limit value of the conditional expression (18) is preferably −0.10. To demonstrate the effect of the invention with higher certainty, the upper limit value of the conditional expression (18) is preferably −0.20. By satisfying the conditional expression (18) like this, aberrations will be corrected well, while decreasing the thickness of the zoom lens in the retracted state.

In the zoom lens ZL according to Embodiment 4, it is preferable that the second lens group G2 is constituted by, in order from the object: a lens having negative refractive power; a lens having negative refractive power; and a lens having positive refractive power. By this configuration, curvature of field and astigmatism can be corrected well.

In the zoom lens ZL according to Embodiment 4, it is preferable that the following conditional expression (19) is satisfied.

$$1.55 < (R52+R51)/(R52-R51) < 3.65 \quad (19)$$

where R51 denotes a radius of curvature of the object side lens surface of the lens disposed closest to the image in the second lens group G2, and R52 denotes a radius of curvature of the image side lens surface of the lens disposed closest to the image in the second lens group G2.

The conditional expression (19) specifies an appropriate range of the shape of the lens disposed closest to the image in the lenses having negative refractive power constituting the second lens group G2. If the lower limit value of the conditional expression (19) is not reached, it becomes difficult to correct curvature of field in the wide-angle end state and spherical aberration in the telephoto end state, which is not desirable. To demonstrate the effect of the invention with certainty, the lower limit value of the conditional expression (19) is preferably 1.98. To demonstrate the effect of the invention with higher certainty, the lower limit value of the conditional expression (19) is preferably 2.20. If the upper limit value of the conditional expression (19) is exceeded, it becomes difficult to correct curvature of field in the wide-angle end state and spherical aberration in the telephoto end state, which is not desirable. To demonstrate the effect of the invention with certainty, the upper limit value of the conditional expression (19) is preferably 3.23. To demonstrate the effect of the invention with higher certainty, the upper limit value of the conditional expression (19) is preferably 3.00.

In the zoom lens ZL according to Embodiment 4, it is preferable that the lens having negative refractive power, the lens having negative refractive power, and the lens having positive refractive power, which constitute the second lens group G2, are separated from each other by an air distance. By this configuration, correction of aberrations (particularly curvature of field and astigmatism) become more flexible.

In the zoom lens ZL according to Embodiment 4, it is preferable that at least one of lens surfaces of the lenses having negative refractive power, which constitute the second lens group G2, is formed in an aspherical shape. If at least one of the surfaces of the lenses having negative refractive power, which constitute the second lens group G2, is aspherical, curvature of field and astigmatism can be corrected well.

In the zoom lens ZL according to Embodiment 4, it is preferable that the lens having negative refractive power and the lens having positive refractive power constituting the first lens group are cemented. If these lenses are cemented lenses, chromatic aberration can be corrected better.

In the zoom lens ZL according to Embodiment 4, it is preferable that the fourth lens group G4 is constituted by one single lens having positive refractive power. By this configuration, curvature of field and astigmatism can be corrected well, even if a number of lenses is small. The fourth lens group G4 may be constituted by one cemented lens having positive refractive power.

In the zoom lens ZL according to Embodiment 4, it is preferable that the image side lens surface of the lens having positive refractive power, which constitutes the first lens group G1, is formed in an aspherical shape. If the image side lens surface of the lens having positive refractive power, which constitutes the first lens group G1, is aspherical, spherical aberration in the telephoto end state can be corrected well.

In the zoom lens ZL according to Embodiment 4, it is preferable that at least one of the surfaces of the lenses, which constitute the third lens group G3, is formed in an aspherical shape. If at least one of the surfaces of the lenses, which constitute the third lens group G3, is aspherical, spherical aberration and coma aberration can be corrected well.

In the zoom lens ZL according to Embodiment 4, it is preferable that at least one of the surfaces of the lenses, which constitute the fourth lens group G4, is formed in an aspherical shape. If at least one of the surfaces of the lenses, which constitute the fourth lens group G4, is aspherical, curvature of field and astigmatism can be corrected well.

In the zoom lens ZL according to Embodiment 4, it is preferable that a medium of the lenses constituting the fourth lens group G4 is plastic resin. By using a plastic lens for the fourth lens group G4, cost can be reduced while minimizing the moving of the focal point and deterioration of performance due to temperature change.

In the zoom lens ZL according to Embodiment 4, it is preferable that upon focusing from an object at infinity to an object at a close distance, the fourth lens group G4 moves along the optical axis. If the fourth lens group G4 is used for focusing, fluctuation of curvature of field and astigmatism upon focusing on an object at a finite distance can be decreased.

FIG. 27 shows a camera, which is an optical apparatus including the zoom lens ZL according to Embodiment 4. This camera 1 has the same configuration as the camera of Embodiment 3. Therefore description of the configuration thereof is omitted.

The zoom ratio of the zoom lens ZL of Embodiment 4 is about 7 to 8.

An outline of a method for manufacturing the zoom lens ZL according to Embodiment 4 will now be described with reference to FIG. 29. First, each lens is disposed to prepare the first to fourth lens group G1 to G4 respectively (step S100). Each lens group is disposed so that upon zooming from the wide-angle end state to the telephoto end state, the distance between the first lens group G1 and the second lens group G2 changes, the distance between the second lens group G2 and the third lens group G3 changes, and the distance between the third lens group G3 and the fourth lens group G4 changes (step S200). For the first lens group G1, a lens having negative refractive power and a lens having positive refractive power are disposed in order from the object (step S300). Each lens is disposed so that the above mentioned conditional expressions (11) and (12) are satisfied (step S400).

As shown in FIG. 17, which is a concrete example of Embodiment 4, the first lens group G1 is prepared by disposing a cemented lens where a negative meniscus lens L11 having a convex surface facing the object and a positive lens L12 of which image side surface is aspherical, are cemented in order from the object. The second lens group G2 is prepared by disposing: a biconcave negative lens L21; a negative lens L22 of which object side surface and image side surface are aspherical; and a positive meniscus lens L23 having a convex surface facing the object. The third lens group G3 is prepared by disposing: a positive lens L31 of which object side surface and image side surface are aspherical; and a negative lens L32 of which image side surface is aspherical. The fourth lens group G4 is prepared by disposing a positive lens L41 of which object side surface and image side surfaced are aspherical. Each lens group prepared like this is disposed according to the above mentioned procedure, whereby the zoom lens ZL is manufactured.

Examples of Embodiments 3 and 4

Each example of Embodiments 3 and 4 will now be described with reference to the drawings. FIG. 17, FIG. 19, FIG. 21, FIG. 23 and FIG. 25 are cross-sectional views depicting a configuration and refractive power allocation of the zoom lens ZL (ZL1 to ZL5) according to each example. Example 7 shown in FIG. 21 corresponds only to Embodiment 3, and the other examples are applicable to both Embodiments 3 and 4.

In each example, an aspherical surface is expressed by the following expression (b), where y denotes a height in the direction orthogonal to the optical axis, S(y) denotes a distance (sag) along the optical axis from the tangential plane at the vertex of each aspherical surface to the position on the aspherical surface at height y, r denotes a radius of curvature (paraxial radius of curvature) of the reference spherical surface, K denotes a conical coefficient, and An denotes an aspherical coefficient at degree n. In the following examples, "E-n" indicates "$\times 10^{-n}$".

$$S(y) = (y^2/r)/\{1 + (1 - K \times y^2/r^2)^{1/2}\} + A4 \times y^4 + A6 \times y^6 + A8 \times y^8 + A10 \times y^{10} \quad (b)$$

In each embodiment, A2, which is the aspherical coefficient at degree 2, is 0. In the table of each example, "*" is attached at the right side of the surface number if the surface is aspherical.

Example 5

FIG. 17 shows a configuration of the zoom lens ZL1 according to Example 5. The zoom lens ZL1 shown in FIG. 17 is constituted by, in order from an object: a first lens group G1 having positive refractive power; a second lens group G2 having negative refractive power; a third lens group G3 having positive refractive power; and a fourth lens group G4 having positive refractive power.

In the zoom lens ZL1, the first lens group G1 is constituted by a cemented lens of a negative meniscus lens L11 having a convex surface facing the object and a positive lens L12 of which image side surface is aspherical, disposed in order from the object. The second lens group G2 is constituted by, in order from the object, a biconcave negative lens L21, a negative lens L22 of which object side surface and image side surface are aspherical, and a positive meniscus lens L23 having a convex surface facing the object. The third lens group G3 is constituted by, in order from the object, a positive lens L31 of which object side surface and image side surface are aspherical, and a negative lens L32 of which image side surface is aspherical. The fourth lens group G4 is constituted by a positive lens L41 of which object side surface and image side surface are aspherical. An aperture stop S is disposed between the second lens group G2 and the third lens group G3. Between the fourth lens group G4 and the image plane I, a filter group FL including a low-pass filter, infrared filer and the like is disposed.

In the zoom lens ZL1 according to Example 5, upon zooming from the wide-angle end state to the telephoto end state, the first lens group G1 moves toward the image first and then moves toward the object, the second lens group G2 moves toward the image first and then moves toward the object, the third lens group G3 moves toward the object, and the fourth lens group G4 moves toward the object first and then moves toward the image, whereby the distance between each lens group changes. The aperture stop S moves together with the third lens group G3.

In the zoom lens ZL1 according to Example 5, focusing from an object at infinity to an object at a close distance is performed by the fourth lens group G4 moving toward the object.

Table 5 shows the data values of the zoom lens ZL1 according to Example 5. In [General Data] of Table 5, f indicates a focal length of the zoom lens, FNO indicates an F number, 2ω indicates an angle of view, Y indicates a maximum image height, BF indicates back focus, and TL indicates a total length. The back focus BF indicates a distance (air equivalent length) on the optical axis from the lens surface closest to the image (surface 12 in FIG. 17) to the image plane I upon focusing on infinity. The total length TL indicates a distance (air equivalent length) on the optical axis from the lens surface closest to the object (surface 1 in FIG. 17) to the image plane I upon focusing on infinity. The first column m in [Lens Data] indicates a sequential number assigned to the lens surface (surface number) counted from the object side along the light traveling direction, the second column r indicates a radius of curvature of each lens surface, the third column d indicates a distance from each optical surface to the next optical surface on the optical axis (surface distance), and the fourth column nd and the fifth column vd indicate a refractive index and an Abbe number at d-line (λ=587.6 nm). The radius of curvature ∞ indicates a plane, and the refractive index of air 1.00000 is omitted. The surface numbers 1 to 18 in Table 5 correspond to the numbers 1 to 18 in FIG. 17. [Lens Group Focal Length] indicates the first surface and the focal length of the first to fourth lens groups G1 to G4 respectively.

For all the data values, "mm" is normally used as a unit of focal length f, radius of curvature r, surface distance d and other lengths, but unit is not limited to "mm", since an equivalent optical performance is acquired even if an optical system is proportionally expanded or proportionally reduced. The description on the symbols and the description on the data tables are the same for the other examples herein below.

TABLE 5

Example 5

[General Data]
Zoom ratio = 7.54

|  | Wide-angle end state | Intermediate focal length state | Telephoto end state |
|---|---|---|---|
| f = | 4.63~ | 12.50~ | 34.92 |
| FNO = | 3.78~ | 5.51~ | 6.79 |
| 2ω = | 84.00~ | 36.58~ | 13.25 |
| Y = | 3.25~ | 4.05~ | 4.05 |
| BF(air equivalent length) = | 3.74~ | 5.47~ | 4.83 |
| TL(air equivalent length) = | 30.53~ | 34.81~ | 42.86 |

[Lens Data]

| m | r | d | nd | vd |
|---|---|---|---|---|
| Object plane | ∞ | | | |
| 1 | 15.7575 | 0.4000 | 1.8467 | 23.80 |
| 2 | 11.3000 | 2.4000 | 1.6226 | 58.19 |
| 3* | −120.5650 | d3 | | |
| 4 | −78.1193 | 0.3000 | 1.8348 | 42.73 |
| 5 | 5.2385 | 1.8000 | | |
| 6* | −35.8816 | 0.6000 | 1.5311 | 55.9 |
| 7* | 7.4375 | 0.2000 | | |
| 8 | 7.6077 | 1.0000 | 1.9460 | 17.98 |
| 9 | 17.4750 | d9 | | |
| 10 | ∞ | −0.2000 | | Aperture stop S |
| 11* | 3.7732 | 2.0000 | 1.5891 | 61.24 |
| 12* | −8.8998 | 0.2000 | | |
| 13 | 149.9138 | 1.0000 | 1.6349 | 23.96 |
| 14* | 4.8199 | d14 | | |
| 15* | 19.3000 | 1.4000 | 1.5311 | 55.90 |
| 16* | −52.0980 | d16 | | |
| 17 | ∞ | 0.5000 | 1.5168 | 63.88 |
| 18 | ∞ | 0.5000 | | |
| Image plane | ∞ | | | |

[Lens Group Focal Length]

| Lens group | First surface | Focal length |
|---|---|---|
| First lens group | 1 | 25.655 |
| Second lens group | 4 | −5.254 |
| Third lens group | 11 | 7.731 |
| Fourth lens group | 15 | 26.697 |

In the zoom lens ZL1 according to Example 5, surfaces 3, 6, 7, 11, 12, 14, 15 and 16 are aspherical. Table 6 shows aspherical data, that is, the values of the conical coefficient K and each aspherical coefficient A4 to A10.

TABLE 6

[Aspherical Data]

|  | K | A4 | A6 | A8 | A10 |
|---|---|---|---|---|---|
| Surface 3 | 1.0000 | 1.55E−05 | 1.57E−08 | 0.00E+00 | 0.00E+00 |
| Surface 6 | 1.0000 | −3.66E−03 | 2.77E−04 | −6.32E−06 | −1.69E−07 |
| Surface 7 | 1.0000 | −3.79E−03 | 3.93E−04 | −1.45E−05 | 0.00E+00 |
| Surface 11 | 1.0000 | −6.80E−04 | 2.10E−06 | 0.00E+00 | 0.00E+00 |
| Surface 12 | 1.0000 | 2.44E−03 | 9.11E−06 | 0.00E+00 | 0.00E+00 |
| Surface 14 | 1.0000 | 3.09E−03 | 2.10E−04 | 1.12E−04 | 0.00E+00 |
| Surface 15 | 1.0000 | 1.51E−04 | 1.60E−05 | −2.38E−07 | 0.00E+00 |
| Surface 16 | 1.0000 | 6.25E−05 | 4.98E−06 | 0.00E+00 | 0.00E+00 |

In the zoom lens ZL1 according to Example 5, the axial air distance d3 between the first lens group G1 and the second lens group G2, the axial air distance d9 between the second lens group G2 and the third lens group G3 (aperture stop S), the axial air distance d14 between the third lens group G3 and the fourth lens group G4, and the axial air distance d16 between the fourth lens group G4 and the filter group FL change upon zooming, as mentioned above. Table 7 shows the variable distance in each focal length state of the wide-angle end state, the intermediate focal length state, and the telephoto end state upon focusing on infinity.

TABLE 7

[Variable Distance Data]

|  | Wide-angle end | Intermediate | Telephoto end |
|---|---|---|---|
| f | 4.63 | 12.50 | 34.92 |
| d3 | 0.322 | 4.693 | 11.924 |
| d9 | 10.249 | 4.071 | 0.814 |
| d14 | 5.115 | 9.478 | 14.187 |
| d16 | 2.914 | 4.639 | 4.005 |

Table 8 shows each conditional expression correspondence value of the zoom lens ZL1 according to Example 5. In Table 8, ΣD2 denotes a distance on the optical axis from the lens surface closest to the object and the lens surface closest to the image in the second lens group G2, TLt denotes a total length of the optical system of the zoom lens ZL1 in the telephoto end state, ft denotes the focal length of the zoom lens ZL1 in the telephoto end state, fw denotes the focal length of the zoom lens ZL1 in the wide-angle end state, f1 denotes the focal length of the first lens group G1, f2 denotes the focal length of the second lens group G2, and f4 denotes the focal length of the fourth lens group G4.

M2 denotes the moving distance of the second lens group G2 from the wide-angle end state to the telephoto end state (where a direction toward an image plane is positive), M3 denotes the moving distance of the third lens group G3 from the wide-angle end state to the telephoto end state (where the direction toward the image plane is positive). TLt denotes the total length of the optical system of the zoom lens ZL1 in the telephoto end state, ft denotes the focal length of the zoom lens ZL1 in the telephoto end state, fw denotes the focal length of the zoom lens ZL1 in the wide-angle end state, f1 denotes the focal length of the first lens group G1, f2 denotes the focal length of the second lens group G2, f4 denotes the focal length of the fourth lens group G4, fL2 denotes the focal length of the lens having positive refractive power included in the first lens group G1, R51 and R52 denote the radiuses of curvature of the object side and the image side lens surfaces of the lens disposed closest to the image in the second lens group G2, R71 and R72 denote the radiuses of curvature of the object side and the image side lens surfaces of the lens having negative refractive power included in the third lens group G3 respectively. This description on the reference symbols is the same for the other examples herein below. The lens having negative refractive power, which is disposed closest to the image in the second lens group G2, is the negative lens L22, and the lens having negative refractive power, included in the third lens group G3, is the negative lens L32.

TABLE 8

[Conditional Expression Correspondence Value]

ΣD2 = 3.90000
TLt = 43.03027
M2 = −0.72838
M3 = −10.16258
fL2 = 16.71028
TLt = 43.03027
(6)ΣD2/ft = 0.1117
(7)f4/fw = 5.766
(8)TLt/ft = 1.232
(9)(−f2)/f1 = 0.205
(10)f4/f1 = 1.041
(11)M2/fw = −0.157
(12)fL2/fw = 3.609
(13)(R72 + R71)/(R72 − R71) = −1.066
(14)TLt/ft = 1.232
(15)(−f2)/f1 = 0.205
(16)f4/f1 = 1.041
(17)f1/fw = 5.541
(18)M3/ft = −0.291
(19)(R52 + R51)/(R52 − R51) = 2.542

As shown in this table, the zoom lens ZL1 according to Example 5 satisfies all the conditional expressions (6) to (19).

FIG. 18 is a set of graphs of the zoom lens ZL1 according to Example 5, showing spherical aberration, astigmatism, distortion, lateral chromatic aberration and coma aberration upon focusing on infinity in the wide-angle end state, intermediate focal length state, and telephoto end state. In each graph showing aberration, FNO indicates an F number, and Y indicates an image height. In each graph showing spherical aberration, a value of the F number corresponding to the maximum aperture is shown, in each graph showing astigmatism and distortion, the maximum value of the image height is shown, and in each graph showing coma aberration, a value of each image height is shown. d indicates d-line (λ=587.6 nm), g indicates g-line (λ=435.8 nm), C indicates C-line (λ=656.3 nm), and F indicates F-line (λ=486.1 nm). In each graph showing astigmatism, the solid line indicates the sagittal image plane, and the broken line indicates the meridional image plane. The same reference symbols as this example are also the same for the graphs showing aberrations of the other examples herein below. As these graphs showing various aberrations clarify, various aberrations are corrected well in the zoom lens ZL1 according to Example 5 throughout the wide-angle end state to the telephoto end state.

Example 6

FIG. 19 shows a configuration of the zoom lens ZL2 according to Example 6. The zoom lens ZL2 shown in FIG. 19 is constituted by, in order from an object: a first lens group G1 having positive refractive power; a second lens group G2 having negative refractive power; a third lens group G3 having positive refractive power; and a fourth lens group G4 having positive refractive power.

In the zoom lens ZL2, the first lens group G1 is constituted by a cemented lens of a negative meniscus lens L11 having a convex surface facing the object and a positive lens L12 of which image side surface is aspherical, disposed in order from the object. The second lens group G2 is constituted by, in order from the object, a biconcave negative lens L21, a negative lens L22 of which object side surface and image side surface are aspherical, and a positive meniscus lens L23 having a convex surface facing the object. The third lens group G3 is constituted by, in order from the object, a positive lens L31 of which object side surface and image side surface are aspherical, and a negative lens L32 of which image side surface is aspherical. The fourth lens group G4 is constituted by a positive lens L41 of which object side surface is aspherical. An aperture stoop S is disposed between the second lens group G2 and the third lens group G3. Between the fourth lens group G4 and the image plane I, a filter group FL including a low-pass filter, infrared filer and the like is disposed.

In the zoom lens ZL2 according to Example 6, upon zooming from the wide-angle end state to the telephoto end state, the first lens group G1 moves toward the object, the second lens group G2 moves toward the object first and then moves toward the image, the third lens group G3 moves toward the object, and the fourth lens group G4 moves toward the object first and then moves toward the image, whereby the distance between each lens group changes. The aperture stop S moves together with the third lens group G3.

In the zoom lens ZL2 according to Example 6, focusing from an object at infinity to an object at a close distance is performed by the fourth lens group G4 moving toward the object.

Table 9 shows the data values of the zoom lens ZL2 according to Example 6. The surface numbers 1 to 18 in Table 9 correspond to the numbers 1 to 18 in FIG. 19.

TABLE 9

Example 6

[General Data]
Zoom ratio = 7.54

| | Wide-angle end state | Intermediate focal length state | Telephoto end state |
|---|---|---|---|
| f = | 4.63~ | 12.50~ | 34.92 |
| FNO = | 3.85~ | 5.92~ | 6.73 |
| 2ω = | 85.08~ | 37.53~ | 13.57 |
| Y = | 3.35~ | 4.05~ | 4.05 |
| BF(air equivalent length) = | 3.94~ | 5.62~ | 5.39 |
| TL(air equivalent length) = | 30.74~ | 35.06~ | 43.05 |

[Lens Data]

| m | r | d | nd | νd |
|---|---|---|---|---|
| Object plane | ∞ | | | |
| 1 | 14.3242 | 0.4000 | 1.8467 | 23.80 |
| 2 | 10.6000 | 2.3000 | 1.6226 | 58.19 |
| 3* | −460.2854 | d3 | | |
| 4 | −80.0000 | 0.3000 | 1.8348 | 42.73 |
| 5 | 4.6243 | 1.9000 | | |
| 6* | −45.0000 | 0.6000 | 1.5311 | 55.90 |
| 7* | 9.1000 | 0.2000 | | |
| 8 | 8.0835 | 1.0000 | 1.9460 | 17.98 |
| 9 | 19.0000 | d9 | | |
| 10 | ∞ | 0.2000 | | Aperture stop S |
| 11* | 3.5396 | 1.8000 | 1.5891 | 61.24 |
| 12* | −11.1147 | 0.3000 | | |
| 13 | −48.5000 | 1.1000 | 1.6355 | 23.89 |
| 14* | 5.4114 | d14 | | |
| 15* | 20.5000 | 1.4000 | 1.5311 | 55.90 |
| 16 | −43.0000 | d16 | | |
| 17 | ∞ | 0.5000 | 1.5168 | 63.88 |
| 18 | ∞ | 0.5000 | | |
| Image plane | ∞ | | | |

TABLE 9-continued

Example 6

[Lens Group Focal Length]

| Lens group | First surface | Focal length |
|---|---|---|
| First lens group | 1 | 25.313 |
| Second lens group | 4 | −5.166 |
| Third lens group | 11 | 7.844 |
| Fourth lens group | 15 | 26.338 |

In the zoom lens ZL2 according to Example 6, surfaces 3, 6, 7, 11, 12, 14 and 15 are aspherical. Table 10 shows aspherical data, that is, the values of the conical coefficient K and each aspherical coefficient A4 to A10.

TABLE 10

[Aspherical Data]

| | K | A4 | A6 | A8 | A10 |
|---|---|---|---|---|---|
| Surface 3 | 1.0000 | 1.57E−05 | −8.08E−09 | 0.00E+00 | 0.00E+00 |
| Surface 6 | 1.0000 | −1.37E−03 | −3.37E−05 | 6.99E−06 | 0.00E+00 |
| Surface 7 | 1.0000 | −1.74E−03 | 7.85E−06 | 5.39E−06 | 0.00E+00 |
| Surface 11 | 1.0000 | −6.93E−04 | 0.00E+00 | 0.00E+00 | 0.00E+00 |
| Surface 12 | 1.0000 | 8.40E−04 | 1.58E−04 | 0.00E+00 | 0.00E+00 |
| Surface 14 | 1.0000 | 5.99E−03 | 3.98E−04 | 8.84E−05 | 0.00E+00 |
| Surface 15 | 1.0000 | 2.00E−04 | 8.51E−06 | −1.43E−07 | 0.00E+00 |

In the zoom lens ZL2 according to Example 6, the axial air distance d3 between the first lens group G1 and the second lens group G2, the axial air distance d9 between the second lens group G2 and the third lens group G3 (aperture stop S), the axial air distance d14 between the third lens group G3 and the fourth lens group G4, and the axial air distance d16 between the fourth lens group G4 and the filter group FL change upon zooming, as mentioned above. Table 11 shows the variable distance in each focal length state of the wide-angle end state, the intermediate focal length state, and the telephoto end state upon focusing on infinity.

TABLE 11

[Variable Distance Data]

| | Wide-angle end | Intermediate | Telephoto end |
|---|---|---|---|
| f | 4.63 | 12.50 | 34.92 |
| d3 | 0.399 | 3.659 | 12.020 |
| d9 | 9.900 | 3.596 | 0.491 |
| d14 | 5.000 | 10.680 | 13.650 |
| d16 | 3.109 | 4.791 | 4.557 |

Table 12 shows each conditional expression correspondence value of the zoom lens ZL2 according to Example 6.

TABLE 12

[Conditional Expression Correspondence Value]

ΣD2 = 4.00000
TLt = 43.21868
M2 = −0.68942
M3 = −10.09845
fL2 = 16.67257
TLt = 43.21868
(6)ΣD2/ft = 0.1146
(7)f4/fw = 5.689
(8)TLt/ft = 1.238
(9)(−f2)/f1 = 0.204

TABLE 12-continued

[Conditional Expression Correspondence Value]

(10)f4/f1 = 1.040
(11)M2/fw = −0.149
(12)fL2/fw = 3.602
(13)(R72 + R71)/(R72 − R71) = −0.799
(14)TLt/ft = 1.238
(15)(−f2)/f1 = 0.204
(16)f4/f1 = 1.040
(17)f1/fw = 5.468
(18)M3/ft = −0.289
(19)(R52 + R51)/(R52 − R51) = 2.481

As shown in this table, the zoom lens ZL2 according to Example 6 satisfies all the conditional expressions (6) to (19).

FIG. 20 is a set of graphs of the zoom lens ZL2 according to Example 6, showing spherical aberration, astigmatism, distortion, lateral chromatic aberration and coma aberration upon focusing on infinity in the wide-angle end state, the intermediate focal length state and the telephoto end state. As these graphs showing aberrations clarify, the zoom lens ZL2 according to Example 6 can correct various aberrations well throughout the wide-angle end state to the telephoto end state.

Example 7

FIG. 21 shows a configuration of the zoom lens ZL3 according to Example 7. The zoom lens ZL3 shown in FIG. 21 is constituted by, in order from an object: a first lens group G1 having positive refractive power; a second lens group G2 having negative refractive power; a third lens group G3 having positive refractive power; and a fourth lens group G4 having positive refractive power. As mentioned above, Example 7 corresponds only to Embodiment 3, and does not correspond to Embodiment 4.

In the zoom lens ZL3, the first lens group G1 is constituted by a cemented lens of a negative meniscus lens L11 having a convex surface facing the object and a positive lens L12 of which image side surface is aspherical, disposed in order from the object. The second lens group G2 is constituted by, in order from the object, a biconcave negative lens L21, a negative lens L22 of which object side surface and image side surface are aspherical, and a positive meniscus lens L23 having a convex surface facing the object. The third lens group G3 is constituted by, in order from the object, a positive lens L31 of which object side surface and image side surface are aspherical, and a negative lens L32 of which image side surface is aspherical. The fourth lens group G4 is constituted by a positive lens L41 of which object side surface is aspherical. An aperture stoop S is disposed between the second lens group G2 and the third lens group G3. Between the fourth lens group G4 and the image plane I, a filter group FL including a low-pass filter, infrared filer and the like is disposed.

In the zoom lens ZL3 according to Example 7, upon zooming from the wide-angle end state to the telephoto end state, the first lens group G1 moves toward the image first and then moves toward the object, the second lens group G2 moves toward the image first and then moves toward the object, the third lens group G3 moves toward the object, and the fourth lens group G4 moves toward the object first and then moves toward the image, whereby the distance between each lens group changes. The aperture stop S moves together with the third lens group G3.

In the zoom lens ZL3 according to Example 7, focusing from an object at infinity to an object at a close distance is performed by the fourth lens group G4 moving toward the object.

Table 13 shows the data values of the zoom lens ZL3 according to Example 7. The surface numbers 1 to 18 in Table 13 correspond to the numbers 1 to 18 in FIG. 21.

TABLE 13

Example 7

Zoom ratio = 7.48

|  | Wide-angle end state | Intermediate focal length state | Telephoto end state |
|---|---|---|---|
| f = | 4.63~ | 12.50~ | 34.62 |
| FNO = | 3.39~ | 4.93~ | 6.36 |
| 2ω = | 84.40~ | 37.57~ | 13.68 |
| Y = | 3.35~ | 4.05~ | 4.05 |
| BF(air equivalent length) = | 4.92~ | 6.08~ | 4.36 |
| TL(air equivalent length) = | 31.93~ | 36.40~ | 44.67 |

[Lens Data]

| m | r | d | nd | νd |
|---|---|---|---|---|
| Object plane | ∞ | | | |
| 1 | 14.5069 | 0.5000 | 1.8467 | 23.80 |
| 2 | 10.6249 | 2.9000 | 1.6226 | 58.19 |
| 3* | −464.3218 | d3 | | |
| 4 | −70.6067 | 0.3000 | 1.8348 | 42.73 |
| 5 | 4.7493 | 1.9000 | | |
| 6* | −60.0000 | 0.6000 | 1.5311 | 55.9 |
| 7* | 9.6504 | 0.2000 | | |
| 8 | 7.7649 | 1.1000 | 1.9460 | 17.98 |
| 9 | 17.1668 | d9 | | |
| 10 | ∞ | 0.2000 | | Aperture stop S |
| 11* | 3.7500 | 2.2000 | 1.6188 | 63.86 |
| 12* | −15.2369 | 0.4000 | | |
| 13 | −20.8649 | 0.6000 | 1.6355 | 23.89 |
| 14* | 7.2303 | d14 | | |

TABLE 13-continued

Example 7

| 15* | 14.0000 | 1.7000 | 1.5311 | 55.9 |
|---|---|---|---|---|
| 16 | −100.0000 | d16 | | |
| 17 | ∞ | 0.5000 | 1.5168 | 63.88 |
| 18 | ∞ | 0.5000 | | |
| Image plane | ∞ | | | |

[Lens Group Focal Length]

| Lens group | First surface | Focal length |
|---|---|---|
| First lens group | 1 | 25.747 |
| Second lens group | 4 | −5.480 |
| Third lens group | 11 | 8.357 |
| Fourth lens group | 15 | 23.242 |

In the zoom lens ZL3 according to Example 7, surfaces 3, 6, 7, 11, 12, 14 and 15 are aspherical. Table 14 shows aspherical data, that is, the values of the conical coefficient K and each aspherical coefficient A4 to A10.

TABLE 14

[Aspherical Data]

|  | K | A4 | A6 | A8 | A10 |
|---|---|---|---|---|---|
| Surface 3 | 1.0000 | 1.38E−05 | −2.25E−08 | 0.00E+00 | 0.00E+00 |
| Surface 6 | 1.0000 | −1.92E−03 | 2.17E−04 | −5.14E−06 | 0.00E+00 |
| Surface 7 | 1.0000 | −2.19E−03 | 2.60E−04 | −8.65E−06 | 0.00E+00 |
| Surface11 | 1.0000 | −4.67E−04 | 0.00E+00 | 0.00E+00 | 0.00E+00 |
| Surface12 | 1.0000 | −1.38E−03 | 2.70E−04 | 0.00E+00 | 0.00E+00 |
| Surface14 | 1.0000 | 7.83E−03 | 1.66E−04 | 4.33E−05 | 0.00E+00 |
| Surface15 | 1.0000 | 2.25E−04 | 5.03E−06 | −6.20E−08 | 0.00E+00 |

In the zoom lens ZL3 according to Example 7, the axial air distance d3 between the first lens group G1 and the second lens group G2, the axial air distance d9 between the second lens group G2 and the third lens group G3 (aperture stop S), the axial air distance d14 between the third lens group G3 and the fourth lens group G4, and the axial air distance d16 between the fourth lens group G4 and the filter group FL change upon zooming, as mentioned above. Table 15 shows the variable distance in each focal length state of the wide-angle end state, the intermediate focal length state, and the telephoto end state upon focusing on infinity.

TABLE 15

[Variable Distance Data]

|  | Wide-angle end | Intermediate | Telephoto end |
|---|---|---|---|
| f | 4.63 | 12.50 | 34.62 |
| d3 | 0.400 | 4.767 | 11.414 |
| d9 | 10.300 | 3.897 | 0.620 |
| d14 | 3.707 | 9.050 | 15.681 |
| d16 | 4.090 | 5.253 | 3.529 |

Table 16 shows each conditional expression correspondence value of the zoom lens ZL3 according to Example 7.

TABLE 16

[Conditional Expression Correspondence Value]

ΣD2 = 4.10000
TLt = 44.84346
(6)ΣD2/ft = 0.1184
(7)f4/fw = 5.018
(8)TLt/ft = 1.295

TABLE 16-continued

[Conditional Expression Correspondence Value]

(9)(−f2)/f1 = 0.213
(10)f4/f1 = 0.903

As shown in this table, this zoom lens ZL3 according to Example 7 satisfies all the conditional expressions (6) to (10).

FIG. 22 is a set of graphs of the zoom lens ZL3 according to Example 7 showing spherical aberration, astigmatism, distortion, lateral chromatic aberration and coma aberration, upon focusing on infinity in the wide-angle end state, the intermediate focal length state and the telephoto end state. As these graphs showing aberrations clarify, the zoom lens ZL3 according to Example 7 can correct various aberrations well throughout the wide-angle end state to the telephoto end state.

Example 8

FIG. 23 shows a configuration of the zoom lens ZL4 according to Example 8. The zoom lens ZL4 shown in FIG. 23 is constituted by, in order from an object: a first lens group G1 having positive refractive power; a second lens group G2 having negative refractive power; a third lens group G3 having positive refractive power; and a fourth lens group G4 having positive refractive power.

In the zoom lens ZL4, the first lens group G1 is constituted by a cemented lens of a negative meniscus lens L11 having a convex surface facing the object and a positive lens L12 of which image side surface is aspherical, disposed in order from the object. The second lens group G2 is constituted by, in order from the object, a biconcave negative lens L21, a negative lens L22 of which object side surface and image side surface are aspherical, and a positive meniscus lens L23 having a convex surface facing the object. The third lens group G3 is constituted by, in order from the object, a positive lens L31 of which object side surface and image side surface are aspherical, and a negative lens L32 of which image side surface is aspherical. The fourth lens group G4 is constituted by a positive lens L41 of which object side surface and image side surface are aspherical. An aperture stoop S is disposed between the second lens group G2 and the third lens group G3. Between the fourth lens group G4 and the image plane I, a filter group FL including a low-pass filter, infrared filer and the like is disposed.

In the zoom lens ZL4 according to Example 8, upon zooming from the wide-angle end state to the telephoto end state, the first lens group G1 moves toward the image first and then moves toward the object, the second lens group G2 moves toward the image first and then moves toward the object, the third lens group G3 moves toward the object, and the fourth lens group G4 moves toward the object first and then moves toward the image, whereby the distance between each lens group changes. The aperture stop S moves together with the third lens group G3.

In the zoom lens ZL4 according to Example 8, focusing from an object at infinity to an object at a close distance is performed by the fourth lens group G4 moving toward the object.

Table 17 shows the data values of the zoom lens ZL4 according to Example 8. The surface numbers 1 to 18 in Table 17 correspond to the numbers 1 to 18 in FIG. 23.

TABLE 17

Example 8

Zoom ratio = 7.54

|  | Wide-angle end state | Intermediate focal length state | Telephoto end state |
|---|---|---|---|
| f = | 4.63~ | 12.50~ | 34.92 |
| FNO = | 3.75~ | 5.43~ | 6.65 |
| 2ω = | 84.10~ | 36.34~ | 13.16 |
| Y = | 3.25~ | 4.05~ | 4.05 |
| BF(air equivalent length) = | 3.99~ | 5.74~ | 5.07 |
| TL(air equivalent length) = | 30.66~ | 34.94~ | 42.91 |

[Lens Data]

| m | r | d | nd | νd |
|---|---|---|---|---|
| Object plane | ∞ | | | |
| 1 | 15.9130 | 0.4000 | 1.8467 | 23.80 |
| 2 | 11.3134 | 2.4000 | 1.6226 | 58.19 |
| 3* | −106.8375 | d3 | | |
| 4 | −57.7324 | 0.3000 | 1.8348 | 42.73 |
| 5 | 5.3573 | 1.8000 | | |
| 6* | −60.7030 | 0.6000 | 1.5311 | 55.90 |
| 7* | 6.7177 | 0.2000 | | |
| 8 | 7.5046 | 1.0000 | 1.9460 | 17.98 |
| 9 | 17.5000 | d9 | | |
| 10 | ∞ | 0.2000 | | Aperture stop S |
| 11* | 3.7701 | 2.0000 | 1.5891 | 61.24 |
| 12* | −8.9926 | 0.2000 | | |
| 13 | 147.2515 | 1.0000 | 1.6355 | 23.89 |
| 14* | 4.8214 | d14 | | |
| 15* | 26.0000 | 1.4000 | 1.5311 | 55.9 |
| 16* | −30.4896 | d16 | | |
| 17 | ∞ | 0.5000 | 1.5168 | 63.88 |
| 18 | ∞ | 0.5000 | | |
| Image plane | ∞ | | | |

[Lens Group Focal Length]

| Lens group | First surface | Focal length |
|---|---|---|
| First lens group | 1 | 25.574 |
| Second lens group | 4 | −5.243 |
| Third lens group | 11 | 7.758 |
| Fourth lens group | 15 | 26.651 |

In the zoom lens ZL4 according to Example 8, surfaces 3, 6, 7, 11, 12, 14, 15 and 16 are aspherical. Table 18 shows aspherical data, that is, the values of the conical coefficient K and each aspherical coefficient A4 to A10.

TABLE 18

[Aspherical Data]

|  | K | A4 | A6 | A8 | A10 |
|---|---|---|---|---|---|
| Surface 3 | 1.0000 | 1.68E−05 | −1.25E−08 | 0.00E+00 | 0.00E+00 |
| Surface 6 | 1.0000 | −4.42E−03 | 4.05E−04 | −1.47E−05 | 0.00E+00 |

TABLE 18-continued

| [Aspherical Data] | | | | | |
|---|---|---|---|---|---|
| | K | A4 | A6 | A8 | A10 |
| Surface 7 | 1.0000 | −4.76E−03 | 5.26E−04 | −2.17E−05 | 0.00E+00 |
| Surface11 | 1.0000 | −7.36E−04 | 0.00E+00 | 0.00E+00 | 0.00E+00 |
| Surface12 | 1.0000 | 2.29E−03 | 1.38E−05 | 0.00E+00 | 0.00E+00 |
| Surface14 | 1.0000 | 3.20E−03 | 2.07E−04 | 1.11E−04 | 0.00E+00 |
| Surface15 | 1.0000 | 1.63E−04 | 1.03E−05 | −1.80E−07 | 0.00E+00 |
| Surface16 | 1.0000 | 7.23E−05 | 2.01E−06 | 0.00E+00 | 0.00E+00 |

In the zoom lens ZL4 according to Example 8, the axial air distance d3 between the first lens group G1 and the second lens group G2, the axial air distance d9 between the second lens group G2 and the third lens group G3 (aperture stop S), the axial air distance d14 between the third lens group G3 and the fourth lens group G4, and the axial air distance d16 between the fourth lens group G4 and the filter group FL change upon zooming, as mentioned above. Table 19 shows the variable distance in each focal length state of the wide-angle end state, the intermediate focal length state, and the telephoto end state upon focusing on infinity.

TABLE 19

| [Variable Distance Data] | | | |
|---|---|---|---|
| | Wide-angle end | Intermediate | Telephoto end |
| f | 4.63 | 12.50 | 34.92 |
| d3 | 0.371 | 4.717 | 11.957 |
| d9 | 9.906 | 3.720 | 0.464 |
| d14 | 4.894 | 9.266 | 13.919 |
| d16 | 3.159 | 4.909 | 4.244 |

Table 20 shows each conditional expression correspondence value of the zoom lens ZL4 according to Example 8.

TABLE 20

[Conditional Expression Correspondence Value]

ΣD2 = 3.90000
TLt = 43.08456
M2 = −0.66799
M3 = −10.11011
fL2 = 16.55956
TLt = 43.08456
(6)ΣD2/ft = 0.1117
(7)f4/fw = 5.756
(8)TLt/ft = 1.234
(9)(−f2)/f1 = 0.205
(10)f4/f1 = 1.042
(11)M2/fw = −0.144
(12)fL2/fw = 3.577
(13)(R72 + R71)/(R72 − R71) = −1.068
(14)TLt/ft = 1.234
(15)(−f2)/f1 = 0.205
(16)f4/f1 = 1.042
(17)f1/fw = 5.523
(18)M3/ft = −0.290
(19)(R52 + R51)/(R52 − R51) = 2.502

As shown in this table, the zoom lens ZL4 according to Example 8 satisfies all the conditional expressions (6) to (19).

FIG. 24 is a set of graphs of the zoom lens ZL4 according to Example 8 showing spherical aberration, astigmatism, distortion, lateral chromatic aberration and coma aberration, upon focusing on infinity in the wide-angle end state, the intermediate focal length state and the telephoto end state.

As these graphs showing aberrations clarify, the zoom lens ZL4 according to Example 8 can correct various aberrations well throughout the wide-angle end state to the telephoto end state.

Example 9

FIG. 25 shows a configuration of the zoom lens ZL5 according to Example 9. The zoom lens ZL5 shown in FIG. 25 is constituted by, in order from an object: a first lens group G1 having positive refractive power; a second lens group G2 having negative refractive power; a third lens group G3 having positive refractive power; and a fourth lens group G4 having positive refractive power.

In the zoom lens ZL5, the first lens group G1 is constituted by a cemented lens of a negative meniscus lens L11 having a convex surface facing the object and a positive lens L12 of which image side surface is aspherical, disposed in order from the object. The second lens group G2 is constituted by, in order from the object, a biconcave negative lens L21, a negative lens L22 of which object side surface and image side surface are aspherical, and a positive meniscus lens L23 having a convex surface facing the object. The third lens group G3 is constituted by, in order from the object, a positive lens L31 of which object side surface and image side surface are aspherical, and a negative lens L32 of which image side surface is aspherical. The fourth lens group G4 is constituted by a positive lens L41 of which object side surface is aspherical. An aperture stoop S is disposed between the second lens group G2 and the third lens group G3. Between the fourth lens group G4 and the image plane I, a filter group FL including a low-pass filter, infrared filer and the like is disposed.

In the zoom lens ZL5 according to Example 9, upon zooming from the wide-angle end state to the telephoto end state, the first lens group G1 moves toward the object, the second lens group G2 moves toward the object first and then moves toward the image, the third lens group G3 moves toward the object, and the fourth lens group G4 moves toward the object first and then moves toward the image, whereby the distance between each lens group changes. The aperture stop S moves together with the third lens group G3.

In the zoom lens ZL5 according to Example 9, focusing from an object at infinity to an object at a close distance is performed by the fourth lens group G4 moving toward the object.

Table 21 shows the data values of the zoom lens ZL5 according to Example 9. The surface numbers 1 to 18 in Table 21 correspond to the numbers 1 to 18 in FIG. 25.

TABLE 21

Example 9

Zoom ratio = 7.54

|  | Wide-angle end state | Intermediate focal length state | Telephoto end state |
|---|---|---|---|
| f = | 4.53~ | 12.50~ | 34.20 |
| FNO = | 3.53~ | 5.45~ | 6.12 |
| 2ω = | 85.77~ | 36.57~ | 13.48 |
| Y = | 3.40~ | 4.05~ | 4.05 |
| BF(air equivalent length) = | 4.54~ | 5.61~ | 5.36 |
| TL(air equivalent length) = | 30.94~ | 35.20~ | 42.93 |

[Lens Data]

| m | r | d | nd | vd |
|---|---|---|---|---|
| Object plane | ∞ | | | |
| 1 | 15.2088 | 0.4000 | 1.8467 | 23.80 |
| 2 | 11.0756 | 2.4000 | 1.6226 | 58.19 |
| 3* | −240.5554 | d3 | | |
| 4 | −88.0063 | 0.3000 | 1.8348 | 42.73 |
| 5 | 4.5877 | 2.0000 | | |
| 6* | −100.0000 | 0.6000 | 1.5311 | 55.9 |
| 7* | 9.6801 | 0.1000 | | |
| 8 | 8.6174 | 1.0000 | 1.9460 | 17.98 |
| 9 | 21.2278 | d9 | | |
| 10 | ∞ | 0.2000 | | |
| 11* | 3.7223 | 2.4000 | 1.5891 | 61.24 |
| 12* | −9.3242 | 0.4000 | | |
| 13 | −90.0000 | 0.6000 | 1.6355 | 23.89 |
| 14* | 5.0319 | d14 | | |
| 15* | 20.0000 | 1.4000 | 1.5311 | 55.9 |
| 16 | −45.0000 | d16 | | |
| 17 | ∞ | 0.5000 | 1.5168 | 63.88 |
| 18 | ∞ | 0.5000 | | |
| Image plane | ∞ | | | |

[Lens Group Focal Length]

| Lens group | First surface | Focal length |
|---|---|---|
| First lens group | 1 | 26.242 |
| Second lens group | 4 | −5.412 |
| Third lens group | 11 | 7.986 |
| Fourth lens group | 15 | 26.265 |

In the zoom lens ZL5 according to Example 9, surfaces 3, 6, 7, 11, 12, 14 and 15 are aspherical. Table 22 shows aspherical data, that is, the values of the conical coefficient K and each aspherical coefficient A4 to A10.

TABLE 22

[Aspherical Data]

|  | K | A4 | A6 | A8 | A10 |
|---|---|---|---|---|---|
| Surface 3 | 1.0000 | 1.47E−05 | −1.66E−08 | 0.00E+00 | 0.00E+00 |
| Surface 6 | 1.0000 | −6.77E−04 | −9.76E−05 | 7.30E−06 | 0.00E+00 |
| Surface 7 | 1.0000 | −1.29E−03 | −6.00E−05 | 5.57E−06 | 0.00E+00 |
| Surface 11 | 1.0000 | −6.26E−04 | 0.00E+00 | 0.00E+00 | 0.00E+00 |
| Surface 12 | 1.0000 | 2.82E−03 | 1.41E−05 | 0.00E+00 | 0.00E+00 |
| Surface 14 | 1.0000 | 2.77E−03 | 3.27E−04 | 9.07E−05 | 0.00E+00 |
| Surface 15 | 1.0000 | 4.31E−05 | 1.21E−05 | −2.15E−07 | 0.00E+00 |

In the zoom lens ZL5 according to Example 9, the axial air distance d3 between the first lens group G1 and the second lens group G2, the axial air distance d9 between the second lens group G2 and the third lens group G3 (aperture stop S), the axial air distance d14 between the third lens group G3 and the fourth lens group G4, and the axial air distance d16 between the fourth lens group G4 and the filter group FL change upon zooming, as mentioned above. Table 23 shows the variable distance in each focal length state of the wide-angle end state, the intermediate focal length state, and the telephoto end state upon focusing on infinity.

TABLE 23

[Variable Distance Data]

|  | Wide-angle end | Intermediate | Telephoto end |
|---|---|---|---|
| f | 4.53 | 12.50 | 34.20 |
| d3 | 0.400 | 3.999 | 12.537 |
| d9 | 10.202 | 3.627 | 0.394 |
| d14 | 4.000 | 10.166 | 12.840 |
| d16 | 3.707 | 4.782 | 4.530 |

Table 24 shows each conditional expression correspondence value of the zoom lens ZL5 according to Example 9.

TABLE 24

[Conditional Expression Correspondence Value]

ΣD2 = 4.00000
TLt = 43.10129
M2 = 0.14516
M3 = −9.66299
fL2 = 17.06797
TLt = 43.10129
(6)ΣD2/ft = 0.1170
(7)f4/fw = 5.794
(8)TLt/ft = 1.260
(9)(−f2)/f1 = 0.206
(10)f4/f1 = 1.001
(11)M2/fw = 0.032
(12)fL2/fw = 3.765
(13)(R72 + R71)/(R72 − R71) = −0.894
(14)TLt/ft = 1.260
(15)(−f2)/f1 = 0.206
(16)f4/f1 = 1.001
(17)f1/fw = 5.789
(18)M3/ft = −0.283
(19)(R52 + R51)/(R52 − R51) = 2.367

As shown in this table, the zoom lens ZL5 according to Example 9 satisfies all the conditional expressions (6) to (19).

FIG. 26 is a set of graphs of the zoom lens ZL5 according to Example 9 showing spherical aberration, astigmatism, distortion, lateral chromatic aberration and coma aberration, upon focusing on infinity in the wide-angle end state, the intermediate focal length state and the telephoto end state. As these graphs showing aberrations clarify, the zoom lens ZL5 according to Example 9 can correct various aberrations well throughout the wide-angle end state to the telephoto end state.

DESCRIPTION OF THE EMBODIMENTS
(EMBODIMENT 5)

Embodiment 5 will be described with reference to the drawings. As shown in FIG. 30, a zoom lens ZL according to Embodiment 5 has, in order from an object: a first lens group G1 having positive refractive power; a second lens group G2 having negative refractive power; a third lens group G3 having positive refractive power; and a fourth lens group G4 having positive refractive power. Upon zooming from a wide-angle end state to a telephoto end state, a distance between the first lens group and the second lens group changes, a distance between the second group and the third lens group changes, a distance between the third lens group and the fourth lens group changes, and at least the first lens group G1 moves. The first lens group G1 is constituted by a negative lens and a positive lens, the second lens group G2 is constituted by, in order from the object, a negative lens, a negative lens and a positive lens, the third lens group is constituted by a positive lens and a negative lens, and the following conditional expressions (20) and (21) are satisfied.

$$-1.50<(G2R2+G2R1)/(G2R2-G2R1)<-0.10 \quad (20)$$

$$-2.00<(G3R2+G3R1)/(G3R2-G3R1)<-0.50 \quad (21)$$

where G2R1 denotes a radius of curvature of the object side lens surface of the negative lens disposed on the image side of the second lens group G2, G2R2 denotes a radius of curvature of the image side lens surface of the negative lens disposed on the image side of the second lens group G2, G3R1 denotes a radius of curvature of the object side lens surface of the negative lens of the third lens group G3, and G3R2 denotes a radius of curvature of the image side lens surface of the negative lens of the third lens group G3.

In the zoom lens ZL according to Embodiment 5, upon zooming from the wide-angle end state to the telephoto end state, all of the first lens group G1 to the fourth lens group G4 are moved, whereby fluctuation of the position of the image plane due to zooming can be corrected well.

Moreover, the first lens group G1 is constituted by a negative lens and a positive lens, and the third lens group G3 is constituted by a positive lens and a negative lens, whereby chromatic aberration generated in the first lens group G1 can be corrected well, and as a result, longitudinal chromatic aberration in the telephoto end state can be corrected well.

In the zoom lens ZL according to Embodiment 5, the first lens group G1 is constituted by two lenses, whereby the zoom lens ZL can be downsized. Further, the negative lens and the positive lens are cemented in this order, so that the first lens group G1 is constituted by one cemented lens, whereby manufacturing can become easier than disposing a plurality of lenses side by side.

In the zoom lens ZL according to Embodiment 5, it is preferable that the third lens group G3 is constituted by a positive lens and a negative lens, then fluctuation of longitudinal chromatic aberration due to zooming can be corrected well. Further, it is preferable that the third lens group is constituted by two lenses, then the zoom lens ZL can be downsized. It is preferable that the lens surface closest to the object in the third lens group G3 is a convex surface facing the object.

Further, the second lens group G2 is constituted by, in order from the object, a negative lens, a negative lens and a positive lens, whereby fluctuation of astigmatism due to zooming can be corrected well.

The conditional expression (20) specifies a shape of the negative lens disposed on the image side in the second lens group G2. If the upper limit value of the conditional expression (20) is exceeded, it becomes difficult to correct lateral chromatic aberration well in the entire zoom range, which is not desirable. If the lower limit value of the conditional expression (20) is not reached, it becomes difficult to correct astigmatism well in the entire zoom lens, which is not desirable.

To demonstrate the effect of Embodiment 5 with certainty, the lower limit value of the conditional expression (20) is preferably −1.30. To demonstrate the effect of Embodiment 5 with higher certainty, the lower limit value of the conditional expression (20) is preferably −1.00.

The conditional expression (21) specifies the shape of the negative lens of the third lens group G3. If the upper limit value of the conditional expression (21) is exceeded, astigmatism generated in the third lens group G3 increases, and as a result, it becomes difficult to correct astigmatism well in the entire zoom range, which is not desirable. If the lower limit value of the conditional expression (21) is not reached, spherical aberration generated in the third lens group G3 increases, and as a result, it becomes difficult to correct spherical aberration in the entire zoom range, which is not desirable.

To demonstrate the effect of Embodiment 5 with certainty, the upper limit value of the conditional expression (21) is preferable −0.60.

To demonstrate the effect of Embodiment 5 with certainty, the lower limit value of the conditional expression (21) is preferably −1.70. To demonstrate the effect of Embodiment 5 with higher certainty, the lower limit value of the conditional expression (21) is preferably −1.50.

In the zoom lens ZL according to Embodiment 5, it is preferable that the following conditional expression (22) is satisfied.

$$1.00<fG1/(fw \cdot ft)^{1/2}<2.10 \quad (22)$$

where fG1 denotes a focal length of the first lens group G1, and fw denotes a focal length of the zoom lens ZL in the wide-angle end state.

The conditional expression (22) specifies the focal length fG1 of the first lens group G1 using the focal length fw of the zoom lens ZL in the wide-angle end state, and the focal length ft of the zoom lens ZL in the telephoto end state. If the upper limit value of the conditional expression (22) is exceeded, astigmatism that generates in each subsequent lens group after the first lens group G1 increases, and as a result, it becomes difficult to correct astigmatism well in the entire zoom range, which is not desirable. If the lower limit value of the conditional expression (22) is not reached, the amount of lateral chromatic aberration and the amount of spherical aberration generated in the first lens group G1 increase, and as a result, it becomes difficult to correct lateral chromatic aberration and spherical aberration well in the telephoto end state, which is not desirable.

To demonstrate the effect of Embodiment 5 with certainty, the upper limit value of the conditional expression (22) is preferably 2.08. To demonstrate the effect of Embodiment 5 with higher certainty, the upper limit value of the conditional expression (22) is preferably 2.07.

To demonstrate the effect of Embodiment 5 with certainty, the lower limit value of the conditional expression (22) is preferably 1.30. To demonstrate the effect of Embodiment 5 with higher certainty, the lower limit value of the conditional expression (22) is preferably 1.50. To demonstrate the effect of Embodiment 5 to the maximum, the lower limit value of the conditional expression (22) is preferably 1.70.

In the zoom lens ZL according to Embodiment 5, it is preferable that the fourth lens group G4 is constituted by a positive lens. By this configuration, fluctuation of astigmatism due to zooming can be corrected well.

In the zoom lens ZL according to Embodiment 5, it is preferable that upon zooming from the wide-angle end state to the telephoto end state, the fourth lens group G4 moves toward the object first, and then moves toward the image. By this configuration, fluctuation of the position of the image plane due to zooming can be corrected well. Further, if this configuration is used, the positions of the first lens group G1 to the third lens group G3 on the optical axis can be made closer to the image side in the telephoto end state, compared with the configuration of moving the fourth lens group G4 only toward the object, which allows to decrease the moving distance of the first lens group G1, and to make the moving mechanism (e.g. barrel member) of each lens group shorter, that is, to decrease the total length of the zoom lens.

In the zoom lens ZL according to Embodiment 5, it is preferable that the third lens group G3 includes at least one aspherical lens. By this configuration, fluctuation of spherical aberration due to zooming can be corrected well.

In the zoom lens ZL according to Embodiment 5, it is preferable that the second lens group G2 includes at least one aspherical lens. By this configuration, fluctuation of astigmatism due to zooming can be corrected well.

In the zoom lens ZL according to Embodiment 5, it is preferable that the fourth lens group G4 includes at least one aspherical lens. By this configuration, coma aberration in the intermediate range can be corrected well.

In the zoom lens ZL according to Embodiment 5, it is preferable that the first lens group G1 includes at least one aspherical lens. By this configuration, spherical aberration in the telephoto end state can be corrected well.

According to the zoom lens ZL of Embodiment 5 which has the above mentioned configuration, a compact zoom lens having high variable power can be implemented.

FIG. 48 and FIG. 49 show a configuration of a digital still camera CAM (optical apparatus), which is an optical apparatus including the above mentioned zoom lens ZL. If a power button (not illustrated) of the digital still camera CAM is pressed, a shutter (not illustrated) of a photographing lens (zoom lens ZL) is released, and lights from an object are collected by the zoom lens ZL and form an image on a picture element C (e.g. CCD, CMOS), which is disposed on the image plane I (see FIG. 30). The object image formed on the picture element C is disposed on a liquid crystal monitor M, which is disposed on the back of the digital still camera CAM. The user determines the composition of the object image while viewing the liquid crystal monitor M, then presses a release button B1 to photograph the object image by the picture element C, and stores it in memory (not illustrated).

The camera CAM has an auxiliary light emitting unit EF, which emits auxiliary light when the object is dark, and a function button B2, which is used for setting various conditions for the digital still camera CAM. Here a compact type camera, in which the camera CAM and the zoom lens ZL are integrated, was described as an example, but a single-lens reflex camera, where the lens barrel including the zoom lens ZL is detachable from the camera body, may be used as the optical apparatus.

According to the camera CAM of this example which has the above mentioned configuration, a compact camera with high variable power can be implemented by including the above mentioned zoom lens ZL as the photographing lens.

A method for manufacturing the zoom lens ZL according to Embodiment 5 will now be described with reference to FIG. 50. First each lens is disposed in a lens barrel so that the first lens group having positive refractive power, the second lens group having negative refractive power, the third lens group having positive refractive power, and the fourth lens group having positive refractive power are arranged in order from the object (step ST10). At this time, each lens is disposed so that, upon zooming from the wide-angle end state in the telephoto end state, the distance between the first lens group and the second lens group changes, the distance between the second lens group and the third lens group changes, the distance between the third lens group and the fourth lens group changes, and at least the first lens group G1 moves (step ST20). Each lens is disposed in the lens barrel so that the first lens group G1 is constituted by a negative lens and a positive lens (step ST30). Each lens is disposed in the lens barrel so that the second lens group G2 is constituted by, in order from the object, a negative lens, a negative lens and a positive lens (step ST40). Each lens is disposed in the lens barrel so that the third lens group G3 is constituted by a positive lens and a negative lens (step ST50). Then each lens is disposed in the lens barrel so that the following conditional expressions (20) and (21) are satisfied (step ST60).

$$-1.50 < (G2R2+G2R1)/(G2R2-G2R1) < -0.10 \quad (20)$$

$$-2.00 < (G3R2+G3R1)/(G3R2-G3R1) < -0.50 \quad (21)$$

An example of the lens arrangement according to Embodiment 5 will now be described. In the zoom lens ZL shown in FIG. 30, as the first lens group G1 having positive refractive power, each lens is disposed in the lens barrel so that a negative meniscus lens L11 having a convex surface facing the object and a biconvex positive lens L12 are arranged in order from the object. As the second lens group G2 having negative refractive power, each lens is disposed in the lens barrel so that a biconcave negative lens L21, a biconcave negative lens L22, and a positive meniscus lens L23 having a convex surface facing the object are arranged in order from the object. As the third lens group G3 having positive refractive power, each lens is disposed in the lens barrel so that a biconvex positive lens L31 and a negative meniscus lens L32 having a convex surface facing the object are arranged in order from the object. As the fourth lens group G4 having positive refractive power, a biconvex positive lens L41 is disposed in the lens barrel. Each lens is disposed in the lens barrel so that the above mentioned conditional expressions (20) and (21) are satisfied (the correspondence value of the conditional expression (20) is −1.0271, and the correspondence value of the conditional expression (21) is −0.6470).

According to the method for manufacturing the zoom lens ZL, a compact zoom lens having high variable power can be manufactured.

Examples of Embodiment 5

Each example of Embodiment 5 will now be described with reference to the drawings. Table 25 to Table 30 are data tables of Example 10 to Example 15 respectively.

To simplify explanation, each reference symbol in FIG. 30, which corresponds to Example 10, is independently used from the other examples. Therefore even if a reference symbol is the same as a reference symbol of another example, this does not means that configurations thereof are the same.

In each example, the C-line (wavelength: 656.2730 nm), the d-line (wavelength: 587.5620 nm), the F-line (wavelength: 486.1330 nm) and the g-line (wavelength: 435.8350 nm) are used to calculate aberration characteristics.

In [Lens Data] in each table, the surface number indicates a sequential number assigned to the optical surface counted from the object side along the light traveling direction, R indicates a radius of curvature of each optical surface, D indicates a surface distance which is a distance from each optical surface to the next optical surface (or image plane) on the optical axis, nd indicates a refractive index of the material of the optical member at d-line, νd indicates an Abbe number of the material of the optical member based on d-line. The object plane indicates a surface of the object, (Variable) indicates a variable surface distance, "∞" of the radius of curvature indicates a plane or an aperture, (stop S) indicates an aperture stop S, and the image plane indicates an image plane I. The refractive index of air "1.00000" is omitted. If the optical surface is aspherical, a paraxial radius of curvature is shown in the column of the radius of curvature R.

In [Aspherical Data] in each table, the shape of the aspherical surface shown in [Lens Data] is given by the following Expression (a). X(y) denotes a distance along the optical axis from the tangential plane at the vertex of the aspherical surface to the position on the aspherical surface at height y, R denotes a radius of curvature (paraxial radius of curvature) of the reference spherical surface, κ denotes a conical coefficient, and Ai denotes an aspherical coefficient at degree i. "E-n" indicates "×10$^{-n}$". For example, 1.234E-05=1.234×10$^{-5}$.

$$X(y)=(y^2/R)/\{1+(1-\kappa \times y^2/R^2)^{1/2}\}+A4 \times y^4+A6 \times y^6+A8 \times y^8 \quad (a)$$

In [General Data] in each table, f indicates a focal length of the zoom lens, FNo indicates an F number, ω indicates a half angle of view (maximum incident angle, unit: °), Y indicates an image height, Bf indicates a distance on the optical axis from the last surface of the lens to the paraxial image plane, Bf (air equivalent) indicates an air-equivalent distance on the optical axis from the last surface of the lens to the paraxial image plane converted into air, TL indicates a total length of the zoom lens (Bf is added to the distance on the optical axis from the front surface of the lens to the last surface of the lens), WL indicates the total lens length in the wide-angle end state, and TL indicates the total lens length in the telephoto end state.

In [Zooming Data] in each table, Di indicates a value of variable distance in each of the wide-angle end state, the intermediate focal length state (intermediate position 1 is on the wide-angle end side, and intermediate position 2 is on the telephoto end side), and the telephoto end state. Di is a variable distance between the i-th surface and the (i+1)th surface.

In [Zoom Lens Group Data] in each table, G indicates a group number, "First surface of group" indicates a surface number of the surface closest to the object in each group, "Group focal length" indicates a focal length of each group, and "Lens configuration length" indicates a distance on the optical axis from the lens surface closest to the object to the lens surface closest to the image in each group.

In [Conditional Expression] in each table, values corresponding to the above mentioned conditional expressions (20) to (22) are shown.

In all the data values, "mm" is normally used as the unit of focal length f, radius of curvature R, surface distance D and other lengths, unless otherwise specified, but unit is not limited to "mm", and another appropriate unit may be used since an equivalent optical performance is acquired even if the zoom lens is proportionally expanded or proportionally reduced.

The above description on the tables is common for all the examples, hence this description is omitted herein below.

Example 10

Example 10 will be described with reference to FIG. 30 to FIG. 32 and Table 25. As FIG. 30 shows, a zoom lens ZL (ZL1) according to Example 10 is constituted by, in order from an object, a first lens group G1 having positive refractive power, a second lens group G2 having negative refractive power, an aperture stop S for adjusting quantity of light, a third lens group G3 having positive refractive power, and a fourth lens group G4 having positive refractive power.

The first lens group G1 is constituted by a cemented lens of a negative meniscus lens L11 having a convex surface facing the object and a biconvex positive lens L12 disposed in order from the object.

The second lens group G2 is constituted by, in order from the object, a biconcave negative lens L21, a biconcave negative lens L22, and a positive meniscus lens L23 having a convex surface facing the object.

The third lens group G3 is constituted by, in order from the object, a biconvex positive lens L31 and a negative meniscus lens L32 having a convex surface facing the object.

The fourth lens group G4 is constituted by a biconvex positive lens L41.

Between the fourth lens group G4 and the image plane I, a glass block GB constituted by a low-pass filter, an infrared cut-off filter or the like, to cut off a spatial frequency exceeding the critical resolution of the solid-state image sensor (e.g CCD disposed on the image plane I), and a sensor cover glass CG of the solid-state image sensor, are disposed.

In the zoom lens ZL1 according to this example, upon zooming from the wide-angle end state to the telephoto end state, a distance between the first lens group and the second lens group changes, a distance between the second lens group and the third lens group changes, a distance between the third lens group and the fourth lens group changes, and all of the first lens group G1 to the fourth lens group G4 move. Upon zooming, the first lens group G1 moves toward the image first and then moves toward the object. Upon zooming, the second lens group G2 moves toward the image first and then moves toward the object. Upon zooming, the third lens group G3 moves toward the object. Upon zooming, the fourth lens group G4 moves toward the object first and then moves toward the image. Upon zooming, the aperture stop S moves toward the object together with the third lens group G3.

Table 25 shows each data value of Example 10. The surface numbers 1 to 20 in Table 25 correspond to each optical surface of m1 to m20 shown in FIG. 30.

TABLE 25

[Lens Data]

| Surface number | R | D | nd | νd |
|---|---|---|---|---|
| Object plane | ∞ | | | |
| 1 | 15.1335 | 0.40 | 1.846660 | 23.80 |
| 2 | 10.8229 | 2.40 | 1.622630 | 58.19 |
| 3(Aspherical) | −181.0268 | D3(Variable) | | |
| 4 | −74.4862 | 0.30 | 1.834810 | 42.73 |
| 5 | 4.8217 | 1.85 | | |
| 6(Aspherical) | −38.6322 | 0.70 | 1.531130 | 55.90 |
| 7(Aspherical) | 8.2801 | 0.10 | | |
| 8 | 7.4753 | 1.05 | 1.945950 | 17.98 |
| 9 | 17.5000 | D9(Variable) | | |
| 10(Aperture stop) | ∞ | 0.20 | | |
| 11(Aspherical) | 3.8315 | 2.00 | 1.589130 | 61.24 |
| 12(Aspherical) | −8.3456 | 0.20 | | |
| 13 | 357.2080 | 1.10 | 1.634940 | 23.96 |
| 14(Aspherical) | 4.7701 | D14(Variable) | | |
| 15(Aspherical) | 25.4371 | 1.30 | 1.531130 | 55.90 |
| 16 | −39.4019 | D16(Variable) | | |
| 17 | ∞ | 0.21 | 1.516800 | 63.88 |
| 18 | ∞ | 0.39 | | |
| 19 | ∞ | 0.50 | 1.516800 | 63.88 |
| 20 | ∞ | Bf | | |
| Image plane | ∞ | | | |

[Aspherical Data]

| Surface number | κ | A4 | A6 | A8 | A10 |
|---|---|---|---|---|---|
| 3 | 1.0000 | 1.29719E−05 | 3.61922E−08 | 0.00000E+00 | 0.00000E+00 |
| 6 | 1.0000 | −2.15880E−03 | 3.12591E−05 | 1.07858E−05 | −3.73219E−07 |
| 7 | 1.0000 | −2.41357E−03 | 1.54254E−04 | 4.62223E−07 | 0.00000E+00 |
| 11 | 1.0000 | −5.32252E−04 | 0.00000E+00 | 0.00000E+00 | 0.00000E+00 |
| 12 | 1.0000 | 3.34168E−03 | −1.12800E−04 | 0.00000E+00 | 0.00000E+00 |
| 14 | 5.5071 | −3.15120E−03 | −2.67555E−04 | −9.73940E−05 | 0.00000E+00 |
| 15 | 1.0000 | 8.84897E−05 | 8.14627E−06 | 0.00000E+00 | 0.00000E+00 |

[General Data]
Zoom ratio 7.542

| | Wide-angle end | Intermediate position 1 | Intermediate position 2 | Telephoto end |
|---|---|---|---|---|
| f | 4.63000 | 9.10000 | 17.69999 | 34.91999 |
| FNo | 3.81952 | 5.20872 | 6.08863 | 6.82898 |
| ω | 42.09211 | 25.29917 | 12.95583 | 6.63865 |
| Y | 3.30 | 4.05 | 4.05 | 4.05 |
| Bf | 0.41999 | 0.41999 | 0.41997 | 0.41994 |
| Bf(Air equivalent) | 1.27809 | 1.27808 | 1.27806 | 1.27803 |

WL 31.087
TL 43.544

[Zooming Data]

| Variable distance | Wide-angle end | Intermediate position 1 | Intermediate position 2 | Telephoto end |
|---|---|---|---|---|
| D3 | 0.40000 | 1.99608 | 7.53964 | 12.05887 |
| D9 | 9.94216 | 5.13205 | 2.83585 | 0.59009 |
| D14 | 4.98440 | 9.29684 | 11.57322 | 14.20962 |
| D16 | 2.64064 | 2.89064 | 3.81610 | 3.56545 |

[Zoom Lens Group Data]

| Group number | First surface of group | Group focal length | Lens configuration length |
|---|---|---|---|
| G1 | 1 | 25.83002 | 2.8 |
| G2 | 4 | −5.20273 | 4.0 |
| G3 | 11 | 7.73411 | 3.3 |
| G4 | 15 | 29.30751 | 1.3 |

TABLE 25-continued

[Conditional Expressions]

| | |
|---|---|
| Conditional Expression (20) | (G2R2 + G2R1)/(G2R2 − G2R1) = −0.6470 |
| Conditional Expression (21) | (G3R2 + G3R1)/(G3R2 − G3R1) = −1.0271 |
| Conditional Expression (22) | fG1/(fw · ft)$^{1/2}$ = 2.031 |

As Table 25 shows, the zoom lens ZL1 according to this example satisfies the conditional expressions (20) to (22).

FIG. 31 and FIG. 32 are graphs showing various aberrations (spherical aberration, astigmatism, distortion, coma aberration and lateral chromatic aberration) of the zoom lens according to Example 10. FIG. 31(a) is a set of graphs showing various aberrations of this example upon focusing on infinity in the wide-angle end state, FIG. 31(b) is a set of graphs showing various aberrations of this example upon focusing on infinity in the intermediate focal length state on the wide-angle end side (intermediate position 1), FIG. 32(a) is a set of graphs showing various aberrations of this example upon focusing on infinity in the intermediate focal length state on the telephoto end side (intermediate position 2), and FIG. 32(b) is a set of graphs showing various aberrations of this example upon focusing on infinity in the telephoto end state.

In each graph showing aberrations, FNO indicates an F number, and Y indicates an image height. d indicates aberration at d-line, g indicates aberration at g-line, C indicates aberration at C-line, and F indicates aberration at F-line. No indication refers to an aberration at d-line. In each graph showing astigmatism, the solid line indicates the sagittal image plane, and the broken line indicates the meridional image plane. The above description on the graphs showing aberrations is the same for the other examples, where this description is omitted.

As each graph showing aberration in FIG. 31 and FIG. 32 clarifies, the zoom lens ZL1 according to Example 10 has an excellent optical performance, where various aberrations are corrected well.

Example 11

Example 11 will be described with reference to FIG. 33 to FIG. 35 and Table 26. As FIG. 33 shows, a zoom lens ZL (ZL2) according to Example 11 is constituted by, in order from an object, a first lens group G1 having positive refractive power, a second lens group G2 having negative refractive power, an aperture stop S for adjusting quantity of light, a third lens group G3 having positive refractive power, and a fourth lens group G4 having positive refractive power.

The first lens group G1 is constituted by a cemented lens of a negative meniscus lens L11 having a convex surface facing the object and a biconvex positive lens L12 disposed in order from the object.

The second lens group G2 is constituted by, in order from the object, a biconcave negative lens L21, a biconcave negative lens L22, and a positive meniscus lens L23 having a convex surface facing the object.

The third lens group G3 is constituted by, in order from the object, a biconvex positive lens L31 and a negative meniscus lens L32 having a convex surface facing the object.

The fourth lens group G4 is constituted by a biconvex positive lens L41.

Between the fourth lens group G4 and the image plane I, a glass block GB constituted by a low-pass filter, an infrared cut-off filter or the like, to cut off a spatial frequency exceeding the critical resolution of the solid-state image sensor (e.g CCD disposed on the image plane I), and a sensor cover glass CG of the solid-state image sensor, are disposed.

In the zoom lens ZL2 according to this example, upon zooming from the wide-angle end state to the telephoto end state, a distance between the first lens group and the second lens group changes, a distance between the second lens group and the third lens group changes, a distance between the third lens group and the fourth lens group changes, and all of the first lens group G1 to the fourth lens group G4 move. Upon zooming, the first lens group G1 moves toward the image first and then moves toward the object. Upon zooming, the second lens group G2 moves toward the image first and then moves toward the object. Upon zooming, the third lens group G3 moves toward the object. Upon zooming, the fourth lens group G4 moves toward the object first and then moves toward the image. Upon zooming, the aperture stop S moves toward the object together with the third lens group G3.

Table 26 shows each data value of Example 11. The surface numbers 1 to 20 in Table 26 correspond to each optical surface of m1 to m20 shown in FIG. 33.

TABLE 26

[Lens Data]

| Surface number | R | D | nd | vd |
|---|---|---|---|---|
| Object plane | ∞ | | | |
| 1 | 15.3990 | 0.40 | 1.846660 | 23.80 |
| 2 | 10.9551 | 2.40 | 1.622630 | 58.19 |
| 3(Aspherical) | −148.0387 | D3(Variable) | | |
| 4 | −75.3049 | 0.30 | 1.834810 | 42.73 |
| 5 | 4.9414 | 1.85 | | |
| 6(Aspherical) | −38.6026 | 0.70 | 1.531130 | 55.90 |
| 7(Aspherical) | 8.1327 | 0.10 | | |
| 8 | 7.4470 | 1.05 | 1.945950 | 17.98 |
| 9 | 17.5000 | D9(Variable) | | |
| 10(Aperture stop) | ∞ | 0.20 | | |
| 11(Aspherical) | 3.8990 | 2.00 | 1.589130 | 61.24 |

TABLE 26-continued

| | | | | |
|---|---|---|---|---|
| 12(Aspherical) | −8.0329 | 0.20 | | |
| 13 | 150.0000 | 1.10 | 1.635510 | 23.89 |
| 14(Aspherical) | 4.6958 | D14(Variable) | | |
| 15(Aspherical) | 26.2260 | 1.30 | 1.531130 | 55.90 |
| 16 | −37.6379 | D16(Variable) | | |
| 17 | ∞ | 0.21 | 1.516800 | 63.88 |
| 18 | ∞ | 0.39 | | |
| 19 | ∞ | 0.50 | 1.516800 | 63.88 |
| 20 | ∞ | Bf | | |
| Image plane | ∞ | | | |

[Aspherical Data]

| Surface number | κ | A4 | A6 | A8 | A10 |
|---|---|---|---|---|---|
| 3 | 1.0000 | 1.35954E−05 | 3.52240E−08 | 0.00000E+00 | 0.00000E+00 |
| 6 | 1.0000 | −2.42468E−03 | 6.73131E−05 | 9.05900E−06 | −4.02301E−07 |
| 7 | 1.0000 | −2.61547E−03 | 1.95582E−04 | −1.73855E−06 | 0.00000E+00 |
| 11 | 1.0000 | −9.26677E−04 | 0.00000E+00 | 0.00000E+00 | 0.00000E+00 |
| 12 | 1.0000 | 2.58282E−03 | −3.58732E−05 | 0.00000E+00 | 0.00000E+00 |
| 14 | 4.3310 | −1.72854E−03 | −2.39675E−04 | −2.66496E−06 | 0.00000E+00 |
| 15 | 1.0000 | 5.75499E−05 | 8.85772E−06 | 0.00000E+00 | 0.00000E+00 |

[General Data]
Zoom ratio 7.542

| | Wide-angle end | Intermediate position 1 | Intermediate position 2 | Telephoto end |
|---|---|---|---|---|
| f | 4.63000 | 9.10000 | 17.69999 | 34.91999 |
| FNo | 3.81400 | 5.19868 | 6.07570 | 6.81567 |
| ω | 42.09220 | 25.25186 | 12.90628 | 6.61491 |
| Y | 3.30 | 4.05 | 4.05 | 4.05 |
| Bf | 0.41999 | 0.41999 | 0.41997 | 0.41994 |
| Bf(Air equivalent) | 1.27809 | 1.27808 | 1.27806 | 1.27803 |
| WL 31.123 | | | | |
| TL 43.580 | | | | |

[Zooming Data]

| Variable distance | Wide-angle end | Intermediate position 1 | Intermediate position 2 | Telephoto end |
|---|---|---|---|---|
| D3 | 0.40000 | 1.99608 | 7.53964 | 12.05887 |
| D9 | 9.96046 | 5.15035 | 2.85415 | 0.60839 |
| D14 | 4.98645 | 9.29889 | 11.57527 | 14.21167 |
| D16 | 2.65627 | 2.90627 | 3.83173 | 3.58108 |

[Zoom Lens Group Data]

| Group number | First surface of group | Group focal length | Lens configuration length |
|---|---|---|---|
| G1 | 1 | 25.83002 | 2.8 |
| G2 | 4 | −5.20273 | 4.0 |
| G3 | 11 | 7.73411 | 3.3 |
| G4 | 15 | 29.30751 | 1.3 |

[Conditional Expressions]

| | |
|---|---|
| Conditional Expression (20) | (G2R2 + G2R1)/(G2R2 − G2R1) = −0.6007 |
| Conditional Expression (21) | (G3R2 + G3R1)/(G3R2 − G3R1) = −1.0646 |
| Conditional Expression (22) | $fG1/(fw \cdot ft)^{1/2}$ = 2.031 |

As Table 26 shows, the zoom lens ZL2 according to this example satisfies the conditional expressions (20) to (22).

FIG. 34 and FIG. 35 are graphs showing various aberrations (spherical aberration, astigmatism, distortion, coma aberration and lateral chromatic aberration) of the zoom lens according to Example 11. FIG. 34(a) is a set of graphs showing various aberrations of this example upon focusing on infinity in the wide-angle end state, FIG. 34(b) is a set of graphs showing various aberrations of this example upon focusing on infinity in the intermediate focal length state on the wide-angle end side (intermediate position 1), FIG. 35(a) is a set of graphs showing various aberrations of this example upon focusing on infinity in the intermediate focal length state on the telephoto end side (intermediate position 2), and FIG. 35(b) is a set of graphs showing various aberrations of this example upon focusing on infinity in the telephoto end state.

As each graph showing aberration in FIG. 34 and FIG. 35 clarifies, the zoom lens ZL2 according to Example 11 has an excellent optical performance, where various aberrations are corrected well.

Example 12

Example 12 will be described with reference to FIG. 36 to FIG. 38 and Table 27. As FIG. 36 shows, a zoom lens ZL (ZL3) according to Example 12 is constituted by, in order from an object, a first lens group G1 having positive refractive power, a second lens group G2 having negative refractive power, an aperture stop S for adjusting quantity of light, a third lens group G3 having positive refractive power, and a fourth lens group G4 having positive refractive power.

The first lens group G1 is constituted by a cemented lens of a negative meniscus lens L11 having a convex surface facing the object and a biconvex positive lens L12 disposed in order from the object.

The second lens group G2 is constituted by, in order from the object, a biconcave negative lens L21, a biconcave negative lens L22, and a positive meniscus lens L23 having a convex surface facing the object.

The third lens group G3 is constituted by, in order from the object, a biconvex positive lens L31 and a negative meniscus lens L32 having a convex surface facing the object.

The fourth lens group G4 is constituted by a biconvex positive lens L41.

Between the fourth lens group G4 and the image plane I, a glass block GB constituted by a low-pass filter, an infrared cut-off filter or the like, to cut off a spatial frequency exceeding the critical resolution of the solid-state image sensor (e.g CCD disposed on the image plane I), and a sensor cover glass CG of the solid-state image sensor, are disposed.

In the zoom lens ZL3 according to this example, upon zooming from the wide-angle end state to the telephoto end state, a distance between the first lens group and the second lens group changes, a distance between the second lens group and the third lens group changes, a distance between the third lens group and the fourth lens group changes, and all of the first lens group G1 to the fourth lens group G4 move. Upon zooming, the first lens group G1 moves toward the image first and then moves toward the object. Upon zooming, the second lens group G2 moves toward the image first and then moves toward the object. Upon zooming, the third lens group G3 moves toward the object. Upon zooming, the fourth lens group G4 moves toward the object first and then moves toward the image. Upon zooming, the aperture stop S moves toward the object together with the third lens group G3.

Table 27 shows each data value of Example 12. The surface numbers 1 to 20 in Table 27 correspond to each optical surface of m1 to m20 shown in FIG. 36.

TABLE 27

| [Lens Data] | | | | |
|---|---|---|---|---|
| Surface number | R | D | nd | vd |
| Object plane | ∞ | | | |
| 1 | 15.3926 | 0.40 | 1.846660 | 23.80 |
| 2 | 11.1253 | 2.40 | 1.622630 | 58.19 |
| 3(Aspherical) | −188.5599 | D3(Variable) | | |
| 4 | −110.8316 | 0.30 | 1.834810 | 42.73 |
| 5 | 4.9051 | 1.90 | | |
| 6(Aspherical) | −33.6723 | 0.70 | 1.531130 | 55.90 |
| 7(Aspherical) | 8.9314 | 0.10 | | |
| 8 | 7.8592 | 1.00 | 1.945950 | 17.98 |
| 9 | 18.0000 | D9(Variable) | | |
| 10(Aperture stop) | ∞ | 0.20 | | |
| 11(Aspherical) | 3.9086 | 2.00 | 1.589130 | 61.24 |
| 12(Aspherical) | −8.4504 | 0.20 | | |
| 13 | 46.8242 | 1.10 | 1.635510 | 23.89 |
| 14(Aspherical) | 4.4257 | D14(Variable) | | |
| 15(Aspherical) | 28.5749 | 1.30 | 1.531130 | 55.90 |
| 16 | −34.5274 | D16(Variable) | | |
| 17 | ∞ | 0.21 | 1.516800 | 63.88 |
| 18 | ∞ | 0.39 | | |
| 19 | ∞ | 0.50 | 1.516800 | 63.88 |
| 20 | ∞ | Bf | | |
| Image plane | ∞ | | | |

| [Aspherical Data] | | | | | |
|---|---|---|---|---|---|
| Surface number | κ | A4 | A6 | A8 | A10 |
| 3 | 1.0000 | 1.31891E−05 | 3.67047E−08 | 0.00000E+00 | 0.00000E+00 |
| 6 | 1.0000 | −2.62600E−03 | 5.99532E−05 | 8.21675E−06 | −3.25393E−07 |
| 7 | 1.0000 | −2.78015E−03 | 1.73673E−04 | −7.25525E−07 | 0.00000E+00 |
| 11 | 1.0000 | −1.09066E−03 | 0.00000E+00 | 0.00000E+00 | 0.00000E+00 |
| 12 | 1.0000 | 2.18089E−03 | 0.00000E+00 | 0.00000E+00 | 0.00000E+00 |
| 14 | 1.1731 | 1.93942E−03 | 3.89327E−04 | 2.11441E−05 | 0.00000E+00 |
| 15 | 1.0000 | 1.59177E−04 | 6.48193E−06 | 0.00000E+00 | 0.00000E+00 |

| [General Data] Zoom ratio 7.542 | | | | |
|---|---|---|---|---|
| | Wide-angle end | Intermediate position 1 | Intermediate position 2 | Telephoto end |
| f | 4.63000 | 9.10000 | 17.70000 | 34.92000 |
| FNo | 3.81236 | 6.83942 | 6.06678 | 5.26535 |

TABLE 27-continued

| | | | | |
|---|---|---|---|---|
| ω | 42.09322 | 6.68168 | 13.01848 | 25.49271 |
| Y | 3.30 | 4.05 | 4.05 | 4.05 |
| Bf | 0.59999 | 0.59999 | 0.59997 | 0.59994 |
| Bf(Air equivalent) | 1.45809 | 1.45808 | 1.45806 | 1.45803 |
| WL 31.287 | | | | |
| TL 43.536 | | | | |

[Zooming Data]

| Variable distance | Wide-angle end | Intermediate position 1 | Intermediate position 2 | Telephoto end |
|---|---|---|---|---|
| D3 | 0.40000 | 1.58487 | 7.55020 | 12.12811 |
| D9 | 10.19987 | 5.13906 | 2.83506 | 0.57040 |
| D14 | 4.78750 | 9.29480 | 11.17093 | 14.03750 |
| D16 | 2.59965 | 2.84966 | 3.95153 | 3.49965 |

[Zoom Lens Group Data]

| Group number | First surface of group | Group focal length | Lens configuration length |
|---|---|---|---|
| G1 | 1 | 26.17906 | 2.8 |
| G2 | 4 | −5.31537 | 4.0 |
| G3 | 11 | 7.79597 | 3.3 |
| G4 | 15 | 29.64947 | 1.3 |

[Conditional Expressions]

| | |
|---|---|
| Conditional Expression (20) | (G2R2 + G2R1)/(G2R2 − G2R1) = −0.5807 |
| Conditional Expression (21) | (G3R2 + G3R1)/(G3R2 − G3R1) = −1.2088 |
| Conditional Expression (22) | $fG1/(fw \cdot ft)^{1/2} = 2.059$ |

As Table 27 shows, the zoom lens ZL3 according to this example satisfies the conditional expressions (20) to (22).

FIG. 37 and FIG. 38 are graphs showing various aberrations (spherical aberration, astigmatism, distortion, coma aberration and lateral chromatic aberration) of the zoom lens according to Example 12. FIG. 37(a) is a set of graphs showing various aberrations of this example upon focusing on infinity in the wide-angle end state, FIG. 37(b) is a set of graphs showing various aberrations of this example upon focusing on infinity in the intermediate focal length state on the wide-angle end side (intermediate position 1), FIG. 38(a) is a set of graphs showing various aberrations of this example upon focusing on infinity in the intermediate focal length state on the telephoto end side (intermediate position 2), and FIG. 38(b) is a set of graphs showing various aberrations of this example upon focusing on infinity in the telephoto end state.

As each graph showing aberration in FIG. 37 and FIG. 38 clarifies, the zoom lens ZL3 according to Example 12 has an excellent optical performance, where various aberrations are corrected well.

Example 13

Example 13 will be described with reference to FIG. 39 to FIG. 41 and Table 28. As FIG. 39 shows, a zoom lens ZL (ZL4) according to Example 13 is constituted by, in order from an object, a first lens group G1 having positive refractive power, a second lens group G2 having negative refractive power, an aperture stop S for adjusting quantity of light, a third lens group G3 having positive refractive power, and a fourth lens group G4 having positive refractive power.

The first lens group G1 is constituted by a cemented lens of a negative meniscus lens L11 having a convex surface facing the object and a biconvex positive lens L12 disposed in order from the object.

The second lens group G2 is constituted by, in order from the object, a biconcave negative lens L21, a biconcave negative lens L22, and a positive meniscus lens L23 having a convex surface facing the object.

The third lens group G3 is constituted by, in order from the object, a biconvex positive lens L31 and a biconcave negative lens L32.

The fourth lens group G4 is constituted by a biconvex positive lens L41.

Between the fourth lens group G4 and the image plane I, a glass block GB constituted by a low-pass filter, an infrared cut-off filter or the like, to cut off a spatial frequency exceeding the critical resolution of the solid-state image sensor (e.g CCD disposed on the image plane I), and a sensor cover glass CG of the solid-state image sensor, are disposed.

In the zoom lens ZL4 according to this example, upon zooming from the wide-angle end state to the telephoto end state, a distance between the first lens group and the second lens group changes, a distance between the second lens group and the third lens group changes, a distance between the third lens group and the fourth lens group changes, and all of the first lens group G1 to the fourth lens group G4 move. Upon zooming, the first lens group G1 moves toward the image first and then moves toward the object. Upon zooming, the second lens group G2 moves toward the image first and then moves toward the object. Upon zooming, the third lens group G3 moves toward the object. Upon zooming, the fourth lens group G4 moves toward the object first and then moves toward the image. Upon zooming, the aperture stop S moves toward the object together with the third lens group G3.

Table 28 shows each data value of Example 13. The surface numbers 1 to 20 in Table 28 correspond to each optical surface of m1 to m20 shown in FIG. 39.

TABLE 28

[Lens Data]

| Surface number | R | D | nd | vd |
|---|---|---|---|---|
| Object plane | ∞ | | | |
| 1 | 13.6018 | 0.40 | 1.846660 | 23.80 |
| 2 | 10.0291 | 2.40 | 1.622630 | 58.19 |
| 3(Aspherical) | −311.9862 | D3(Variable) | | |
| 4 | −85.9677 | 0.30 | 1.834810 | 42.73 |
| 5 | 4.4709 | 2.00 | | |
| 6(Aspherical) | −51.9445 | 0.60 | 1.531130 | 55.90 |
| 7(Aspherical) | 8.4843 | 0.10 | | |
| 8 | 8.0908 | 1.00 | 1.945950 | 17.98 |
| 9 | 20.0000 | D9(Variable) | | |
| 10(Aperture stop) | ∞ | 0.20 | | |
| 11(Aspherical) | 3.7526 | 2.40 | 1.589130 | 61.24 |
| 12(Aspherical) | −8.7294 | 0.20 | | |
| 13 | −77.3329 | 0.60 | 1.634940 | 23.96 |
| 14(Aspherical) | 5.4214 | D14(Variable) | | |
| 15(Aspherical) | 27.1715 | 1.30 | 1.531130 | 55.90 |
| 16 | −35.0002 | D16(Variable) | | |
| 17 | ∞ | 0.21 | 1.516800 | 63.88 |
| 18 | ∞ | 0.39 | | |
| 19 | ∞ | 0.50 | 1.516800 | 63.88 |
| 20 | ∞ | Bf | | |
| Image plane | ∞ | | | |

[Aspherical Data]

| Surface number | κ | A4 | A6 | A8 | A10 |
|---|---|---|---|---|---|
| 3 | 1.0000 | 1.78584E−05 | 3.60592E−08 | 0.00000E+00 | 0.00000E+00 |
| 6 | 1.0000 | −3.22885E−03 | 2.15898E−04 | −3.33463E−06 | 0.00000E+00 |
| 7 | 1.0000 | −3.66232E−03 | 2.84074E−04 | −7.45119E−06 | 0.00000E+00 |
| 11 | 1.0000 | −5.37880E−04 | 0.00000E+00 | 0.00000E+00 | 0.00000E+00 |
| 12 | 1.0000 | 2.51208E−03 | 0.00000E+00 | 0.00000E+00 | 0.00000E+00 |
| 14 | 2.9047 | 1.77634E−03 | 1.99194E−04 | 7.55455E−05 | 0.00000E+00 |
| 15 | 1.0000 | 1.64792E−04 | 5.11434E−06 | 0.00000E+00 | 0.00000E+00 |

[General Data]
Zoom ratio 7.542

| | Wide-angle end | Intermediate position 1 | Intermediate position 2 | Telephoto end |
|---|---|---|---|---|
| f | 4.63000 | 9.00000 | 17.70000 | 34.92000 |
| FNo | 3.73119 | 4.98117 | 6.09770 | 6.85529 |
| ω | 41.76905 | 25.66074 | 13.17878 | 6.73182 |
| Y | 3.30 | 4.05 | 4.05 | 4.05 |
| Bf | 0.60000 | 0.60000 | 0.60000 | 0.60000 |
| Bf(Air equivalent) | 1.45809 | 1.45809 | 1.45809 | 1.45808 |
| WL 31.237 | | | | |
| TL 43.601 | | | | |

[Zooming Data]

| Variable distance | Wide-angle end | Intermediate position 1 | Intermediate position 2 | Telephoto end |
|---|---|---|---|---|
| D3 | 0.40000 | 2.01602 | 6.42120 | 10.73069 |
| D9 | 9.71788 | 4.99023 | 2.60992 | 0.57221 |
| D14 | 4.96639 | 8.70236 | 12.25371 | 15.59826 |
| D16 | 2.95273 | 3.79440 | 4.55360 | 3.50000 |

[Zoom Lens Group Data]

| Group number | First surface of group | Group focal length | Lens configuration length |
|---|---|---|---|
| G1 | 1 | 23.77593 | 2.8 |
| G2 | 4 | −4.96037 | 4.0 |
| G3 | 11 | 7.88644 | 3.2 |
| G4 | 15 | 29.01028 | 1.3 |

TABLE 28-continued

[Conditional Expressions]

| | |
|---|---|
| Conditional Expression (20) | (G2R2 + G2R1)/(G2R2 − G2R1) = −0.7192 |
| Conditional Expression (21) | (G3R2 + G3R1)/(G3R2 − G3R1) = −0.8690 |
| Conditional Expression (22) | fG1/(fw · ft)$^{1/2}$ = 1.870 |

As Table 28 shows, the zoom lens ZL4 according to this example satisfies the conditional expressions (20) to (22).

FIG. 40 and FIG. 41 are graphs showing various aberrations (spherical aberration, astigmatism, distortion, coma aberration and lateral chromatic aberration) of the zoom lens according to Example 13. FIG. 40(a) is a set of graphs showing various aberrations of this example upon focusing on infinity in the wide-angle end state, FIG. 40(b) is a set of graphs showing various aberrations of this example upon focusing on infinity in the intermediate focal length state on the wide-angle end side (intermediate position 1), FIG. 41(a) is a set of graphs showing various aberrations of this example upon focusing on infinity in the intermediate focal length state on the telephoto end side (intermediate position 2), and FIG. 41(b) is a set of graphs showing various aberrations of this example upon focusing on infinity in the telephoto end state.

As each graph showing aberration in FIG. 40 and FIG. 41 clarifies, the zoom lens ZL4 according to Example 13 has an excellent optical performance, where various aberrations are corrected well.

Example 14

Example 14 will be described with reference to FIG. 42 to FIG. 44 and Table 29. As FIG. 42 shows, a zoom lens ZL (ZL5) according to Example 14 is constituted by, in order from an object, a first lens group G1 having positive refractive power, a second lens group G2 having negative refractive power, an aperture stop S for adjusting quantity of light, a third lens group G3 having positive refractive power, and a fourth lens group G4 having positive refractive power.

The first lens group G1 is constituted by a cemented lens of a negative meniscus lens L11 having a convex surface facing the object and a biconvex positive lens L12 disposed in order from the object.

The second lens group G2 is constituted by, in order from the object, a biconcave negative lens L21, a biconcave negative lens L22, and a positive meniscus lens L23 having a convex surface facing the object.

The third lens group G3 is constituted by, in order from the object, a biconvex positive lens L31 and a negative meniscus lens L32 having a convex surface facing the object.

The fourth lens group G4 is constituted by a biconvex positive lens L41.

Between the fourth lens group G4 and the image plane I, a glass block GB constituted by a low-pass filter, an infrared cut-off filter or the like, to cut off a spatial frequency exceeding the critical resolution of the solid-state image sensor (e.g CCD disposed on the image plane I), and a sensor cover glass CG of the solid-state image sensor, are disposed.

In the zoom lens ZL5 according to this example, upon zooming from the wide-angle end state to the telephoto end state, a distance between the first lens group and the second lens group changes, a distance between the second lens group and the third lens group changes, a distance between the third lens group and the fourth lens group changes, and all of the first lens group G1 to the fourth lens group G4 move. Upon zooming, the first lens group G1 moves toward the image first and then moves toward the object. Upon zooming, the second lens group G2 moves toward the image first and then moves toward the object. Upon zooming, the third lens group G3 moves toward the object. Upon zooming, the fourth lens group G4 moves toward the object first and then moves toward the image. Upon zooming, the aperture stop S moves toward the object together with the third lens group G3.

Table 29 shows each data value of Example 14. The surface numbers 1 to 20 in Table 29 correspond to each optical surface of m1 to m20 shown in FIG. 42.

TABLE 29

[Lens Data]

| Surface number | R | D | nd | vd |
|---|---|---|---|---|
| Object plane | ∞ | | | |
| 1 | 15.7575 | 0.40 | 1.846660 | 23.80 |
| 2 | 11.3000 | 2.40 | 1.622630 | 58.19 |
| 3(Aspherical) | −120.5650 | D3(Variable) | | |
| 4 | −78.1193 | 0.30 | 1.834810 | 42.73 |
| 5 | 5.2385 | 1.80 | | |
| 6(Aspherical) | −35.8816 | 0.60 | 1.531130 | 55.90 |
| 7(Aspherical) | 7.4375 | 0.20 | | |
| 8 | 7.6077 | 1.00 | 1.945950 | 17.98 |
| 9 | 17.4750 | D9(Variable) | | |
| 10(Aperture stop) | ∞ | −0.20 | | |
| 11(Aspherical) | 3.7732 | 2.00 | 1.589130 | 61.24 |
| 12(Aspherical) | −8.8998 | 0.20 | | |
| 13 | 149.9138 | 1.00 | 1.634940 | 23.96 |
| 14(Aspherical) | 4.8199 | D14(Variable) | | |
| 15(Aspherical) | 19.3000 | 1.40 | 1.531130 | 55.90 |
| 16(Aspherical) | −52.0980 | D16(Variable) | | |
| 17 | ∞ | 0.21 | 1.516800 | 63.88 |
| 18 | ∞ | 0.39 | | |
| 19 | ∞ | 0.50 | 1.516800 | 63.88 |

TABLE 29-continued

| | | |
|---|---|---|
| 20 | ∞ | Bf |
| Image plane | ∞ | |

[Aspherical Data]

| Surface number | κ | A4 | A6 | A8 | A10 |
|---|---|---|---|---|---|
| 3 | 1.0000 | 1.54817E−05 | 1.57371E−08 | 0.00000E+00 | 0.00000E+00 |
| 6 | 1.0000 | −3.65705E−03 | 2.76758E−04 | −6.31652E−06 | −1.68766E−07 |
| 7 | 1.0000 | −3.79056E−03 | 3.93068E−04 | −1.45268E−05 | 0.00000E+00 |
| 11 | 1.0000 | −6.79768E−04 | 2.09993E−06 | 0.00000E+00 | 0.00000E+00 |
| 12 | 1.0000 | 2.44223E−03 | 9.10565E−06 | 0.00000E+00 | 0.00000E+00 |
| 14 | 1.0000 | 3.09043E−03 | 2.09835E−04 | 1.11895E−04 | 0.00000E+00 |
| 15 | 1.0000 | 1.50664E−04 | 1.60251E−05 | −2.38230E−07 | 0.00000E+00 |
| 16 | 1.0000 | 6.24623E−05 | 4.98315E−06 | 0.00000E+00 | 0.00000E+00 |

[General Data]
Zoom ratio 7.542

| | Wide-angle end | Intermediate position 1 | Intermediate position 2 | Telephoto end |
|---|---|---|---|---|
| f | 4.62987 | 9.07968 | 17.80626 | 34.92010 |
| FNo | 3.78428 | 5.07027 | 5.93889 | 6.78269 |
| ω | 42.00733 | 12.87423 | 12.87423 | 6.62713 |
| Y | 3.30 | 4.05 | 4.05 | 4.05 |
| Bf | 0.56005 | 0.55622 | 0.55250 | 0.54508 |
| Bf(Air equivalent) | 1.41814 | 1.41431 | 1.41060 | 1.40317 |
| WL 30.771 | | | | |
| TL 43.102 | | | | |

[Zooming Data]

| Variable distance | Wide-angle end | Intermediate position 1 | Intermediate position 2 | Telephoto end |
|---|---|---|---|---|
| D3 | 0.32190 | 2.14772 | 7.62042 | 11.92415 |
| D9 | 10.24862 | 5.33492 | 2.95734 | 0.81442 |
| D14 | 5.11478 | 8.51688 | 10.70325 | 14.18710 |
| D16 | 2.32583 | 3.31146 | 4.39003 | 3.43106 |

[Zoom Lens Group Data]

| Group number | First surface of group | Group focal length | Lens configuration length |
|---|---|---|---|
| G1 | 1 | 25.65474 | 2.8 |
| G2 | 4 | −5.25359 | 3.9 |
| G3 | 11 | 7.73127 | 3.2 |
| G4 | 15 | 26.69657 | 1.4 |

[Conditional Expressions]

| | |
|---|---|
| Conditional Expression (20) | (G2R2 + G2R1)/(G2R2 − G2R1) = −0.6566 |
| Conditional Expression (21) | (G3R2 + G3R1)/(G3R2 − G3R1) = −1.0664 |
| Conditional Expression (22) | $fG1/(fw \cdot ft)^{1/2}$ = 2.018 |

As Table 29 shows, the zoom lens ZL5 according to this example satisfies the conditional expressions (20) to (22).

FIG. 43 and FIG. 44 are graphs showing various aberrations (spherical aberration, astigmatism, distortion, coma aberration and lateral chromatic aberration) of the zoom lens according to Example 14. FIG. 43(*a*) is a set of graphs showing various aberrations of this example upon focusing on infinity in the wide-angle end state, FIG. 43(*b*) is a set of graphs showing various aberrations of this example upon focusing on infinity in the intermediate focal length state on the wide-angle end side (intermediate position 1), FIG. 44(*a*) is a set of graphs showing various aberrations of this example upon focusing on infinity in the intermediate focal length state on the telephoto end side (intermediate position 2), and FIG. 44(*b*) is a set of graphs showing various aberrations of this example upon focusing on infinity in the telephoto end state.

As each graph showing aberration in FIG. 43 and FIG. 44 clarifies, the zoom lens ZL5 according to Example 14 has an excellent optical performance, where various aberrations are corrected well.

Example 15

Example 15 will be described with reference to FIG. 45 to FIG. 47 and Table 30. As FIG. 45 shows, a zoom lens ZL (ZL6) according to Example 15 is constituted by, in order from an object, a first lens group G1 having positive refractive power, a second lens group G2 having negative refractive power, an aperture stop S for adjusting quantity of light, a third lens group G3 having positive refractive power, and a fourth lens group G4 having positive refractive power.

The first lens group G1 is constituted by a cemented lens of a negative meniscus lens L11 having a convex surface facing the object and a biconvex positive lens L12 disposed in order from the object.

The second lens group G2 is constituted by, in order from the object, a biconcave negative lens L21, a biconcave negative lens L22, and a positive meniscus lens L23 having a convex surface facing the object.

The third lens group G3 is constituted by, in order from the object, a biconvex positive lens L31 and a negative meniscus lens L32 having a convex surface facing the object.

The fourth lens group G4 is constituted by a biconvex positive lens L41.

Between the fourth lens group G4 and the image plane I, a glass block GB constituted by a low-pass filter, an infrared cut-off filter or the like, to cut off a spatial frequency exceeding the critical resolution of the solid-state image sensor (e.g CCD disposed on the image plane I), and a sensor cover glass CG of the solid-state image sensor, are disposed.

In the zoom lens ZL6 according to this example, upon zooming from the wide-angle end state to the telephoto end state, a distance between the first lens group and the second lens group changes, a distance between the second lens group and the third lens group changes, a distance between the third lens group and the fourth lens group changes, and all of the first lens group G1 to the fourth lens group G4 move. Upon zooming, the first lens group G1 moves toward the image first and then moves toward the object. Upon zooming, the second lens group G2 moves toward the image first and then moves toward the object. Upon zooming, the third lens group G3 moves toward the object. Upon zooming, the fourth lens group G4 moves toward the object first and then moves toward the image. Upon zooming, the aperture stop S moves toward the object together with the third lens group G3.

Table 30 shows each data value of Example 15. The surface numbers 1 to 20 in Table 30 correspond to each optical surface of m1 to m20 shown in FIG. 45.

TABLE 30

[Lens Data]

| Surface number | R | D | nd | vd |
|---|---|---|---|---|
| Object plane | ∞ | | | |
| 1 | 15.7332 | 0.40 | 1.846660 | 23.80 |
| 2 | 11.1811 | 2.40 | 1.622630 | 58.19 |
| 3(Aspherical) | −114.7104 | D3(Variable) | | |
| 4 | −70.7581 | 0.30 | 1.834810 | 42.73 |
| 5 | 5.1023 | 1.80 | | |
| 6(Aspherical) | −80.0000 | 0.60 | 1.531130 | 55.90 |
| 7(Aspherical) | 6.8500 | 0.20 | | |
| 8 | 7.4929 | 1.00 | 1.945950 | 17.98 |
| 9 | 17.5000 | D9(Variable) | | |
| 10(Aperture stop) | ∞ | 0.20 | | |
| 11(Aspherical) | 3.7058 | 2.00 | 1.589130 | 61.24 |
| 12(Aspherical) | −9.3430 | 0.20 | | |
| 13 | 180.0000 | 1.00 | 1.635510 | 23.89 |
| 14(Aspherical) | 4.8000 | D14(Variable) | | |
| 15(Aspherical) | 25.2439 | 1.40 | 1.531130 | 55.90 |
| 16(Aspherical) | −31.6034 | D16(Variable) | | |
| 17 | ∞ | 0.21 | 1.516800 | 63.88 |
| 18 | ∞ | 0.39 | | |
| 19 | ∞ | 0.50 | 1.516800 | 63.88 |
| 20 | ∞ | Bf | | |
| Image plane | ∞ | | | |

[Aspherical Data]

| Surface number | κ | A4 | A6 | A8 | A10 |
|---|---|---|---|---|---|
| 3 | 1.0000 | 1.69888E−05 | −2.33930E−08 | 0.00000E+00 | 0.00000E+00 |
| 6 | 1.0000 | −4.60329E−03 | 4.21631E−04 | −1.54563E−05 | 0.00000E+00 |
| 7 | 1.0000 | −4.97295E−03 | 5.43398E−04 | −2.27061E−05 | 0.00000E+00 |
| 11 | 1.0000 | −6.13218E−04 | 0.00000E+00 | 0.00000E+00 | 0.00000E+00 |
| 12 | 1.0000 | 2.54037E−03 | −5.24835E−06 | 0.00000E+00 | 0.00000E+00 |
| 14 | 1.0000 | 3.41054E−03 | 2.22242E−04 | 1.31105E−04 | 0.00000E+00 |
| 15 | 1.0000 | 1.47204E−04 | 8.32314E−06 | −2.12893E−07 | 0.00000E+00 |
| 16 | 1.0000 | 1.86483E−05 | −7.24917E−08 | 0.00000E+00 | 0.00000E+00 |

[General Data]
Zoom ratio 7.542

| | Wide-angle end | Intermediate position 1 | Intermediate position 2 | Telephoto end |
|---|---|---|---|---|
| f | 4.63009 | 9.08000 | 17.70000 | 34.91998 |
| FNo | 3.76829 | 5.01857 | 5.85297 | 6.67189 |
| ω | 42.05472 | 25.23026 | 12.88042 | 6.60228 |
| Y | 3.30 | 4.05 | 4.05 | 4.05 |
| Bf | 0.53000 | 0.53000 | 0.53000 | 0.53000 |

TABLE 30-continued

| | | | | |
|---|---|---|---|---|
| Bf(Air equivalent) | 1.38809 | 1.38809 | 1.38009 | 1.38009 |
| WL 30.890 | | | | |
| TL 43.147 | | | | |

[Zooming Data]

| Variable distance | Wide-angle end | Intermediate position 1 | Intermediate position 2 | Telephoto end |
|---|---|---|---|---|
| D3 | 0.32190 | 2.14772 | 7.62042 | 11.92415 |
| D9 | 10.24862 | 5.33492 | 2.95734 | 0.81442 |
| D14 | 5.11478 | 8.51688 | 10.70325 | 14.18710 |
| D16 | 2.32583 | 3.31146 | 4.39003 | 3.43106 |

[Zoom Lens Group Data]

| Group number | First surface of group | Group focal length | Lens configuration length |
|---|---|---|---|
| G1 | 1 | 25.57393 | 2.8 |
| G2 | 4 | −5.24300 | 3.9 |
| G3 | 11 | 7.75800 | 3.2 |
| G4 | 15 | 26.65053 | 1.4 |

[Conditional Expressions]

| | |
|---|---|
| Conditional Expression (20) | (G2R2 + G2R1)/(G2R2 − G2R1) = −0.6566 |
| Conditional Expression (21) | (G3R2 + G3R1)/(G3R2 − G3R1) = −1.0664 |
| Conditional Expression (22) | $fG1/(fw \cdot ft)^{1/2} = 2.011$ |

As Table 30 shows, the zoom lens ZL6 according to this example satisfies the conditional expressions (20) to (22).

FIG. 46 and FIG. 47 are graphs showing various aberrations (spherical aberration, astigmatism, distortion, coma aberration and lateral chromatic aberration) of the zoom lens according to Example 15. FIG. 46(a) is a set of graphs showing various aberrations of this example upon focusing on infinity in the wide-angle end state, FIG. 46(b) is a set of graphs showing various aberrations of this example upon focusing on infinity in the intermediate focal length state on the wide-angle end side (intermediate position 1), FIG. 47(a) is a set of graphs showing various aberrations of this example upon focusing on infinity in the intermediate focal length state on the telephoto end side (intermediate position 2), and FIG. 47(b) is a set of graphs showing various aberrations of this example upon focusing on infinity in the telephoto end state.

As each graph showing aberration in FIG. 46 and FIG. 47 clarifies, the zoom lens ZL6 according to Example 15 has an excellent optical performance, where various aberrations are corrected well.

According to each example of Embodiment 5, a compact zoom lens having high variable power can be implemented.

Although the present invention has been described using the configuration requirements of Embodiment 5 to clarify the present invention, the present invention is not limited to these configuration requirements.

In each example of Embodiment 5, the zoom lens constituted by four lens groups was shown, but the present invention can also be applied to a zoom lens constituted by a different number of lens groups, such as five or six lens groups. A lens or a lens group may be added to the configuration on the side closest to the object, or a lens or a lens group may be added to the configuration on the side closest to the image. "Lens group" refers to a portion having at least one lens isolated by an air distance which changes upon zooming.

A single or plurality of lens group(s) or a partial lens group may be designed to be a focusing lens group, which performs focusing from an object at infinity to an object at a close distance by moving in the optical axis direction. This focusing lens group can be applied to auto focus, and is also suitable for driving a motor for auto focusing (driving using an ultrasonic motor or the like). It is particularly preferable that at least part of the fourth lens group G4 is designed to be the focusing lens group.

A lens group or a partial lens group may be designed to be a vibration-isolating lens group, which corrects image blurs generated by camera shake, by moving the lens group or the partial lens group in a direction orthogonal to the optical axis or rotating (oscillating) the lens group or the partial lens group in an in-plane direction that includes the optical axis. It is particularly preferable that at least a part of the third lens group G3 is designed to be the vibration-isolating lens group.

The lens surface may be formed to be a spherical surface or a plane, or an aspherical surface. If the lens surface is a spherical surface or a plane, lens processing, assembly and adjustment are easy, and deterioration of optical performance, due to an error generated in processing, assembly or adjustment can be prevented. Even if the image plane is shifted, the drawing performance is not affected very much, which is desirable. If the lens surface is aspherical, the aspherical surface can be any aspherical surface out of an aspherical surface generated by grinding, a glass-molded aspherical surface generated by forming glass in an aspherical shape using a die, and a composite aspherical surface generated by forming resin on the surface of the glass to be an aspherical shape. The lens surface may be a diffraction surface, and the lens may be a refractive index-distributed lens (GRIN lens) or a plastic lens.

It is preferable that the aperture stop is disposed near the third lens group G3, but the role of the aperture stop may be substituted by a frame of the lens, without disposing a separate member as the aperture stop.

Each lens surface may be coated with an anti-reflection film, which has high transmittance in a wide wavelength region in order to decrease flares and ghosts, and implement high optical performance with high contrast.

EXPLANATION OF NUMERALS AND CHARACTERS

ZL (ZL1 to ZL4) zoom lens
G1 first lens group
G2 second lens group
S aperture stop
G3 third lens group
G4 fourth lens group
GB glass block
CG sensor cover glass
I image plane
CAM digital still camera (optical apparatus)

The invention claimed is:

1. A zoom lens comprising, in order from an object:
a first lens group having positive refractive power;
a second lens group having negative refractive power;
a third lens group having positive refractive power; and
a fourth lens group having positive refractive power,
upon zooming from a wide-angle end state to a telephoto end state, a distance between the first lens group and the second lens group changing, a distance between the second lens group and the third lens group changing, a distance between the third lens group and the fourth lens group changing, and at least the first lens group moving,
the first lens group consisting of a set of cemented lenses,
the third lens group consisting of, in order from the object, a positive lens and a negative lens,
the following conditional expression being satisfied:

$0.50 < TL/ft < 1.28$ where TL denotes a total length of the zoom lens in the telephoto end state, and ft denotes a focal length of the zoom lens in the telephoto end state, and
the following conditional expressions being satisfied:

$0.1 < fG1/fG4 < 1.0$ $10.0 < ft/dG1 < 16.0$ where fG1 denotes a focal length of the first lens group, fG4 denotes a focal length of the fourth lens group, ft denotes a focal length of the zoom lens in the telephoto end state, and dG1 denotes a thickness of the first lens group on the optical axis.

2. The zoom lens according to claim 1, wherein
the first lens group is constituted by, in order from the object, a lens having negative refractive power and a lens having positive refractive power,
the second lens group is constituted by, in order from the object, a lens having negative refractive power, a lens having negative refractive power, and a lens having positive refractive power, and
the following conditional expressions are satisfied:

$0.050 < \Sigma D2/ft < 0.115$ $4.3 < f4/fw < 6.8$ where $\Sigma D2$ denotes a distance on the optical axis from a lens surface closest to the object to a lens surface closest to an image in the second lens group, ft denotes a focal length of the zoom lens in the telephoto end state, fw denotes a focal length of the zoom lens in the wide-angle end state, and f4 denotes a focal length of the fourth lens group.

3. The zoom lens according to claim 1, wherein
the first lens group is constituted by, in order from the object, a lens having negative refractive power and a lens having positive refractive power, and
the following conditional expressions are satisfied:

$-0.25 < M2/fw < 1.10$ $3.0 < fL2/fw < 4.5$ where M2 denotes a moving distance of the second lens group upon zooming from the wide-angle end state to the telephoto end state (where a direction toward an image plane is positive), fw denotes a focal length of the zoom lens in the wide-angle end state, and fL2 denotes a focal length of the lens having positive refractive power included in the first lens group.

4. The zoom lens according to claim 1, wherein
the first lens group is constituted by a negative lens and a positive lens,
the second lens group is constituted by, in order from the object, a negative lens, a negative lens and a positive lens,
the third lens group is constituted by a positive lens and a negative lens, and
the following conditional expressions are satisfied:

$-1.50 < (G2R2+G2R1)/(G2R2-G2R1) < -0.10$ $-2.00 < (G3R2+G3R1)/(G3R2-G3R1) < -0.50$ where G2R1 denotes a radius of curvature of an object side lens surface of the negative lens disposed on an image side of the second lens group, G2R2 denotes a radius of curvature of an image side lens surface of the negative lens disposed on the image side of the second lens group, G3R1 denotes a radius of curvature of an object side lens surface of the negative lens of the third lens group, and G3R2 denotes a radius of curvature of an image side lens surface of the negative lens of the third lens group.

5. The zoom lens according to claim 1, wherein
upon zooming from the wide-angle end state to the telephoto end state, the second lens group moves to an image side first, and then moves to an object side.

6. The zoom lens according to claim 1, wherein
upon zooming from the wide-angle end state to the telephoto end state, the fourth lens group moves to an object side first, and then moves to an image side.

7. The zoom lens according to claim 1, wherein
the following conditional expression is satisfied:

$1.00 < fG1/(fw \cdot ft)^{1/2} < 2.10$ where fG1 denotes a focal length of the first lens group, and fw denotes a focal length of the zoom lens in the wide-angle end state.

8. The zoom lens according to claim 1, wherein
the second lens group is constituted by a negative lens, a negative lens and a positive lens.

9. The zoom lens according to claim 1, wherein
the fourth lens group is constituted by one positive lens.

10. The zoom lens according to claim 1, wherein
each of the positive lens and the negative lens of the third lens group is a single lens element.

11. The zoom lens according to claim 1, wherein
at least one of the first, the second, the third and the fourth lens groups includes at least one aspherical lens.

12. Optical apparatus having a zoom lens comprising, in order from an object:
- a first lens group having positive refractive power;
- a second lens group having negative refractive power;
- a third lens group having positive refractive power; and
- a fourth lens group having positive refractive power,
- upon zooming from a wide-angle end state to a telephoto end state, a distance between the first lens group and the second lens group changing, a distance between the second lens group and the third lens group changing, a distance between the third lens group and the fourth lens group changing, and at least the first lens group moving,
- the first lens group consisting of a set of cemented lenses,
- the third lens group consisting of, in order from the object, a positive lens and a negative lens, and
- the following conditional expression being satisfied:

$$0.50 < TL/ft < 1.28$$

where TL denotes a total length of the zoom lens in the telephoto end state, and ft denotes a focal length of the zoom lens in the telephoto end state,
the following conditional expressions being satisfied:

$$0.1 < fG1/fG4 < 1.0$$

$$10.0 < ft/dG1 < 16.0$$

where fG1 denotes a focal length of the first lens group, fG4 denotes a focal length of the fourth lens group, ft denotes a focal length of the zoom lens in the telephoto end state, and dG1 denotes a thickness of the first lens group on the optical axis.

13. A method for manufacturing a zoom lens that comprises, in order from an object:
- a first lens group having positive refractive power;
- a second lens group having negative refractive power;
- a third lens group having positive refractive power; and
- a fourth lens group having positive refractive power,
- the first lens group consisting of a set of cemented lenses,
- the third lens group consisting of, in order from the object, a positive lens and a negative lens,
- the method comprising disposing each lens in a lens barrel and constructing the zoom lens such that upon zooming from a wide-angle end state to a telephoto end state, a distance between the first lens group and the second lens group changes, a distance between the second lens group and the third lens group changes, a distance between the third lens group and the fourth lens group changes, and at least the first lens group moves, and such that the following conditional expression is satisfied:

$$0.50 < TL/ft < 1.28$$

where TL denotes a total length of the zoom lens in the telephoto end state, and ft denotes a focal length of the zoom lens in the telephoto end state, and
the following conditional expressions are satisfied:

$$0.1 < fG1/fG4 < 1.0$$

$$10.0 < ft/dG1 < 16.0$$

where fG1 denotes a focal length of the first lens group, fG4 denotes a focal length of the fourth lens group, ft denotes a focal length of the zoom lens in the telephoto end state, and dG1 denotes a thickness of the first lens group on the optical axis.

14. A zoom lens comprising, in order from an object:
- a first lens group having positive refractive power;
- a second lens group having negative refractive power;
- a third lens group having positive refractive power; and
- a fourth lens group having positive refractive power,
- upon zooming from a wide-angle end state to a telephoto end state, a distance between the first lens group and the second lens group changing, a distance between the second lens group and the third lens group changing, a distance between the third lens group and the fourth lens group changing, and at least the first lens group moving,
- the first lens group consisting of a set of cemented lenses,
- the third lens group consisting of, in order from the object, a positive lens and a negative lens,
- the following conditional expression being satisfied:

$$0.50 < TL/ft < 1.28$$

where TL denotes a total length of the zoom lens in the telephoto end state, and ft denotes a focal length of the zoom lens in the telephoto end state, and
wherein
the first lens group is constituted by, in order from the object, a lens having negative refractive power and a lens having positive refractive power,
the second lens group is constituted by, in order from the object, a lens having negative refractive power, a lens having negative refractive power, and a lens having positive refractive power, and
the following conditional expressions are satisfied:

$$0.050 < \Sigma D2/ft < 0.115$$

$$4.3 < f4/fw < 6.8$$

where $\Sigma D2$ denotes a distance on the optical axis from a lens surface closest to the object to a lens surface closest to an image in the second lens group, ft denotes a focal length of the zoom lens in the telephoto end state, fw denotes a focal length of the zoom lens in the wide-angle end state, and f4 denotes a focal length of the fourth lens group.

15. The zoom lens according to claim 14, wherein
the first lens group is constituted by, in order from the object, a lens having negative refractive power and a lens having positive refractive power, and
the following conditional expressions are satisfied:

$$-0.25 < M2/fw < 1.10$$

$$3.0 < fL2/fw < 4.5$$

where M2 denotes a moving distance of the second lens group upon zooming from the wide-angle end state to the telephoto end state (where a direction toward an image plane is positive), fw denotes a focal length of the zoom lens in the wide-angle end state, and fL2 denotes a focal length of the lens having positive refractive power included in the first lens group.

16. The zoom lens according to claim 14, wherein
the first lens group is constituted by a negative lens and a positive lens,
the second lens group is constituted by, in order from the object, a negative lens, a negative lens and a positive lens,
the third lens group is constituted by a positive lens and a negative lens, and the following conditional expressions are satisfied:

$$-1.50 < (G2R2+G2R1)/(G2R2-G2R1) < -0.10$$

$$-2.00 < (G3R2+G3R1)/(G3R2-G3R1) < -0.50$$

where G2R1 denotes a radius of curvature of an object side lens surface of the negative lens disposed on an image side of the second lens group, G2R2 denotes a radius of curvature of an image side lens surface of the negative lens disposed on the image side of the second lens group, G3R1 denotes a radius of curvature of an object side lens surface of the negative lens of the third lens group, and G3R2 denotes a radius of curvature of an image side lens surface of the negative lens of the third lens group.

17. The zoom lens according to claim 14, wherein upon zooming from the wide-angle end state to the telephoto end state, the second lens group moves to an image side first, and then moves to an object side.

18. The zoom lens according to claim 14, wherein upon zooming from the wide-angle end state to the telephoto end state, the fourth lens group moves to an object side first, and then moves to an image side.

19. The zoom lens according to claim 14, wherein the following conditional expression is satisfied:

$$1.00 < fG1/(fw \cdot ft)^{1/2} < 2.10$$

where fG1 denotes a focal length of the first lens group, and fw denotes a focal length of the zoom lens in the wide-angle end state.

20. The zoom lens according to claim 14, wherein the second lens group is constituted by a negative lens, a negative lens and a positive lens.

21. The zoom lens according to claim 14, wherein the fourth lens group is constituted by one positive lens.

22. The zoom lens according to claim 14, wherein each of the positive lens and the negative lens of the third lens group is a single lens element.

23. The zoom lens according to claim 14, wherein at least one of the first, the second, the third and the fourth lens groups includes at least one aspherical lens.

24. Optical apparatus having a zoom lens comprising, in order from an object:
a first lens group having positive refractive power;
a second lens group having negative refractive power;
a third lens group having positive refractive power; and
a fourth lens group having positive refractive power,
upon zooming from a wide-angle end state to a telephoto end state, a distance between the first lens group and the second lens group changing, a distance between the second lens group and the third lens group changing, a distance between the third lens group and the fourth lens group changing, and at least the first lens group moving,
the first lens group consisting of a set of cemented lenses,
the third lens group consisting of, in order from the object, a positive lens and a negative lens,
the following conditional expression being satisfied:

$$0.50 < TL/ft < 1.28$$

where TL denotes a total length of the zoom lens in the telephoto end state, and ft denotes a focal length of the zoom lens in the telephoto end state, and
wherein
the first lens group is constituted by, in order from the object, a lens having negative refractive power and a lens having positive refractive power,
the second lens group is constituted by, in order from the object, a lens having negative refractive power, a lens having negative refractive power, and a lens having positive refractive power, and
the following conditional expressions are satisfied:

$$0.050 < \Sigma D2/ft < 0.115$$

$$4.3 < f4/fw < 6.8$$

where $\Sigma D2$ denotes a distance on the optical axis from a lens surface closest to the object to a lens surface closest to an image in the second lens group, ft denotes a focal length of the zoom lens in the telephoto end state, fw denotes a focal length of the zoom lens in the wide-angle end state, and f4 denotes a focal length of the fourth lens group.

25. A method for manufacturing a zoom lens that comprises, in order from an object:
a first lens group having positive refractive power;
a second lens group having negative refractive power;
a third lens group having positive refractive power; and
a fourth lens group having positive refractive power,
the first lens group consisting of a set of cemented lenses and being constituted by, in order from the object, a lens having negative refractive power and a lens having positive refractive power,
the second lens group being constituted by, in order from the object, a lens having negative refractive power, a lens having negative refractive power, and a lens having positive refractive power, and
the third lens group consisting of, in order from the object, a positive lens and a negative lens,
the method comprising disposing each lens in a lens barrel and constructing the zoom lens such that upon zooming from a wide-angle end state to a telephoto end state, a distance between the first lens group and the second lens group changes, a distance between the second lens group and the third lens group changes, a distance between the third lens group and the fourth lens group changes, and at least the first lens group moves, and such that the following conditional expression is satisfied:

$$0.50 < TL/ft < 1.28$$

where TL denotes a total length of the zoom lens in the telephoto end state, and ft denotes a focal length of the zoom lens in the telephoto end state, and
the following conditional expressions are satisfied:

$$0.050 < \Sigma D2/ft < 0.115$$

$$4.3 < f4/fw < 6.8$$

where $\Sigma D2$ denotes a distance on the optical axis from a lens surface closest to the object to a lens surface closest to an image in the second lens group, ft denotes a focal length of the zoom lens in the telephoto end state, fw denotes a focal length of the zoom lens in the wide-angle end state, and f4 denotes a focal length of the fourth lens group.

26. A zoom lens comprising, in order from an object:
a first lens group having positive refractive power;
a second lens group having negative refractive power;
a third lens group having positive refractive power; and
a fourth lens group having positive refractive power,
upon zooming from a wide-angle end state to a telephoto end state, a distance between the first lens group and the second lens group changing, a distance between the second lens group and the third lens group changing, a distance between the third lens group and the fourth lens group changing, and at least the first lens group moving, the first lens group consisting of a set of cemented lenses, the third lens group consisting of, in order from the object, a positive lens and a negative lens, and the following conditional expression being satisfied:

$$0.50 < TL/ft < 1.28$$

where TL denotes a total length of the zoom lens in the telephoto end state, and ft denotes a focal length of the zoom lens in the telephoto end state, wherein the first lens group is constituted by, in order from the object, a lens having negative refractive power and a lens having positive refractive power, and the following conditional expressions are satisfied:

$$-0.25 < M2/fw < 1.10$$

$$3.0 < fL2/fw < 4.5$$

where M2 denotes a moving distance of the second lens group upon zooming from the wide-angle end state to the telephoto end state (where a direction toward an image plane is positive), fw denotes a focal length of the zoom lens in the wide-angle end state, and fL2 denotes a focal length of the lens having positive refractive power included in the first lens group.

27. The zoom lens according to claim 26, wherein the first lens group is constituted by a negative lens and a positive lens, the second lens group is constituted by, in order from the object, a negative lens, a negative lens and a positive lens, the third lens group is constituted by a positive lens and a negative lens, and the following conditional expressions are satisfied:

$$-1.50 < (G2R2+G2R1)/(G2R2-G2R1) < -0.10$$

$$-2.00 < (G3R2+G3R1)/(G3R2-G3R1) < -0.50$$

where G2R1 denotes a radius of curvature of an object side lens surface of the negative lens disposed on an image side of the second lens group, G2R2 denotes a radius of curvature of an image side lens surface of the negative lens disposed on the image side of the second lens group, G3R1 denotes a radius of curvature of an object side lens surface of the negative lens of the third lens group, and G3R2 denotes a radius of curvature of an image side lens surface of the negative lens of the third lens group.

28. The zoom lens according to claim 26, wherein upon zooming from the wide-angle end state to the telephoto end state, the second lens group moves to an image side first, and then moves to an object side.

29. The zoom lens according to claim 26, wherein upon zooming from the wide-angle end state to the telephoto end state, the fourth lens group moves to an object side first, and then moves to an image side.

30. The zoom lens according to claim 26, wherein the following conditional expression is satisfied:

$$1.00 < fG1/(fw \cdot ft)^{1/2} < 2.10$$

where fG1 denotes a focal length of the first lens group, and fw denotes a focal length of the zoom lens in the wide-angle end state.

31. The zoom lens according to claim 26, wherein the second lens group is constituted by a negative lens, a negative lens and a positive lens.

32. The zoom lens according to claim 26, wherein the fourth lens group is constituted by one positive lens.

33. The zoom lens according to claim 26, wherein each of the positive lens and the negative lens of the third lens group is a single lens element.

34. The zoom lens according to claim 26, wherein at least one of the first, the second, the third and the fourth lens groups includes at least one aspherical lens.

35. Optical apparatus having a zoom lens comprising, in order from an object:

a first lens group having positive refractive power;

a second lens group having negative refractive power;

a third lens group having positive refractive power; and a fourth lens group having positive refractive power, upon zooming from a wide-angle end state to a telephoto end state, a distance between the first lens group and the second lens group changing, a distance between the second lens group and the third lens group changing, a distance between the third lens group and the fourth lens group changing, and at least the first lens group moving, the first lens group consisting of a set of cemented lenses, the third lens group consisting of, in order from the object, a positive lens and a negative lens, and the following conditional expression being satisfied:

$$0.50 < TL/ft < 1.28$$

where TL denotes a total length of the zoom lens in the telephoto end state, and ft denotes a focal length of the zoom lens in the telephoto end state, wherein the first lens group is constituted by, in order from the object, a lens having negative refractive power and a lens having positive refractive power, and the following conditional expressions are satisfied:

$$-0.25 < M2/fw < 1.10$$

$$3.0 < fL2/fw < 4.5$$

where M2 denotes a moving distance of the second lens group upon zooming from the wide-angle end state to the telephoto end state (where a direction toward an image plane is positive), fw denotes a focal length of the zoom lens in the wide-angle end state, and fL2 denotes a focal length of the lens having positive refractive power included in the first lens group.

36. A method for manufacturing a zoom lens that comprises, in order from an object:

a first lens group having positive refractive power;

a second lens group having negative refractive power;

a third lens group having positive refractive power; and a fourth lens group having positive refractive power, the first lens group consisting of a set of cemented lenses and being constituted by, in order from the object, a lens having negative refractive power and a lens having positive refractive power, and the third lens group consisting of, in order from the object, a positive lens and a negative lens, the method comprising disposing each lens in a lens barrel and constructing the zoom lens such that upon zooming from a wide-angle end state to a telephoto end state, a distance between the first lens group and the second lens group changes, a distance between the second lens group and the third lens group changes, a distance between the third lens group and the fourth lens group changes, and at least the first lens group moves, and such that the following conditional expression is satisfied:

$$0.50 < TL/ft < 1.28$$

where TL denotes a total length of the zoom lens in the telephoto end state, and ft denotes a focal length of the zoom lens in the telephoto end state, and
the following conditional expressions are satisfied:

$$-0.25 < M2/fw < 1.10$$

$$3.0 < fL2/fw < 4.5$$

where M2 denotes a moving distance of the second lens group upon zooming from the wide-angle end state to the telephoto end state (where a direction toward an image plane is positive), fw denotes a focal length of the zoom lens in the wide-angle end state, and fL2 denotes a focal length of the lens having positive refractive power included in the first lens group.

37. A zoom lens comprising, in order from an object:
a first lens group having positive refractive power;
a second lens group having negative refractive power;
a third lens group having positive refractive power; and
a fourth lens group having positive refractive power,
upon zooming from a wide-angle end state to a telephoto end state, a distance between the first lens group and the second lens group changing, a distance between the second lens group and the third lens group changing, a distance between the third lens group and the fourth lens group changing, and at least the first lens group moving,
the first lens group consisting of a set of cemented lenses,
the third lens group consisting of, in order from the object, a positive lens and a negative lens, and
the following conditional expression being satisfied:

$$0.50 < TL/ft < 1.28$$

where TL denotes a total length of the zoom lens in the telephoto end state, and ft denotes a focal length of the zoom lens in the telephoto end state, and
wherein
the first lens group is constituted by a negative lens and a positive lens,
the second lens group is constituted by, in order from the object, a negative lens, a negative lens and a positive lens,
the third lens group is constituted by a positive lens and a negative lens, and
the following conditional expressions are satisfied:

$$-1.50 < (G2R2+G2R1)/(G2R2-G2R1) < -0.10$$

$$-2.00 < (G3R2+G3R1)/(G3R2-G3R1) < -0.50$$

where G2R1 denotes a radius of curvature of an object side lens surface of the negative lens disposed on an image side of the second lens group, G2R2 denotes a radius of curvature of an image side lens surface of the negative lens disposed on the image side of the second lens group, G3R1 denotes a radius of curvature of an object side lens surface of the negative lens of the third lens group, and G3R2 denotes a radius of curvature of an image side lens surface of the negative lens of the third lens group.

38. The zoom lens according to claim 37, wherein upon zooming from the wide-angle end state to the telephoto end state, the second lens group moves to an image side first, and then moves to an object side.

39. The zoom lens according to claim 37, wherein upon zooming from the wide-angle end state to the telephoto end state, the fourth lens group moves to an object side first, and then moves to an image side.

40. The zoom lens according to claim 37, wherein the following conditional expression is satisfied:

$$1.00 < fG1/(fw \cdot ft)^{1/2} < 2.10$$

where fG1 denotes a focal length of the first lens group, and fw denotes a focal length of the zoom lens in the wide-angle end state.

41. The zoom lens according to claim 37, wherein the second lens group is constituted by a negative lens, a negative lens and a positive lens.

42. The zoom lens according to claim 37, wherein the fourth lens group is constituted by one positive lens.

43. The zoom lens according to claim 37, wherein each of the positive lens and the negative lens of the third lens group is a single lens element.

44. The zoom lens according to claim 37, wherein at least one of the first, the second, the third and the fourth lens groups includes at least one aspherical lens.

45. Optical apparatus having a zoom lens comprising, in order from an object:
a first lens group having positive refractive power;
a second lens group having negative refractive power;
a third lens group having positive refractive power; and
a fourth lens group having positive refractive power,
upon zooming from a wide-angle end state to a telephoto end state, a distance between the first lens group and the second lens group changing, a distance between the second lens group and the third lens group changing, a distance between the third lens group and the fourth lens group changing, and at least the first lens group moving,
the first lens group consisting of a set of cemented lenses,
the third lens group consisting of, in order from the object, a positive lens and a negative lens, and
the following conditional expression being satisfied:

$$0.50 < TL/ft < 1.28$$

where TL denotes a total length of the zoom lens in the telephoto end state, and ft denotes a focal length of the zoom lens in the telephoto end state, and
wherein
the first lens group is constituted by a negative lens and a positive lens,
the second lens group is constituted by, in order from the object, a negative lens, a negative lens and a positive lens,
the third lens group is constituted by a positive lens and a negative lens, and
the following conditional expressions are satisfied:

$$-1.50 < (G2R2+G2R1)/(G2R2-G2R1) < -0.10$$

$$-2.00 < (G3R2+G3R1)/(G3R2-G3R1) < -0.50$$

where G2R1 denotes a radius of curvature of an object side lens surface of the negative lens disposed on an image side of the second lens group, G2R2 denotes a radius of curvature of an image side lens surface of the negative lens disposed on the image side of the second lens group, G3R1 denotes a radius of curvature of an object side lens surface of the negative lens of the third lens group, and G3R2 denotes a radius of curvature of an image side lens surface of the negative lens of the third lens group.

46. A method for manufacturing a zoom lens that comprises, in order from an object:
a first lens group having positive refractive power;
a second lens group having negative refractive power;
a third lens group having positive refractive power; and
a fourth lens group having positive refractive power,
the first lens group consisting of a set of cemented lenses and being constituted by a negative lens and a positive lens,
the second lens group being constituted by, in order from the object, a negative lens, a negative lens and a positive lens, and
the third lens group consisting of, in order from the object, a positive lens and a negative lens,
the method comprising disposing each lens in a lens barrel and constructing the zoom lens such that upon zooming from a wide-angle end state to a telephoto end state, a distance between the first lens group and the second lens group changes, a distance between the second lens group and the third lens group changes, a distance between the third lens group and the fourth lens group changing, and at least the first lens group moves, and such that the following conditional expression is satisfied:

$0.50 < TL/ft < 1.28$ where TL denotes a total length of the zoom lens in the telephoto end state, and ft denotes a focal length of the zoom lens in the telephoto end state, and
the following conditional expressions are satisfied:

$-1.50 < (G2R2+G2R1)/(G2R2-G2R1) < -0.10$ $-2.00 < (G3R2+G3R1)/(G3R2-G3R1) < -0.50$ where G2R1 denotes a radius of curvature of an object side lens surface of the negative lens disposed on an image side of the second lens group, G2R2 denotes a radius of curvature of an image side lens surface of the negative lens disposed on the image side of the second lens group, G3R1 denotes a radius of curvature of an object side lens surface of the negative lens of the third lens group, and G3R2 denotes a radius of curvature of an image side lens surface of the negative lens of the third lens group.

* * * * *